(12) United States Patent
Realini

(10) Patent No.: US 7,873,573 B2
(45) Date of Patent: Jan. 18, 2011

(54) VIRTUAL POOLED ACCOUNT FOR MOBILE BANKING

(75) Inventor: Carol Realini, Woodside, CA (US)

(73) Assignee: Obopay, Inc., Redwood City, CA (US)

( * ) Notice: Subject to any disclaimer, the term of this patent is extended or adjusted under 35 U.S.C. 154(b) by 290 days.

(21) Appl. No.: 11/694,896

(22) Filed: Mar. 30, 2007

(65) Prior Publication Data

US 2009/0119190 A1    May 7, 2009

Related U.S. Application Data

(60) Provisional application No. 60/744,013, filed on Mar. 30, 2006, provisional application No. 60/744,930, filed on Apr. 15, 2006.

(51) Int. Cl.
*G06Q 40/00* (2006.01)
(52) U.S. Cl. .................. 705/39; 235/379; 705/35; 705/37
(58) Field of Classification Search .............. 235/379; 705/35, 37
See application file for complete search history.

(56) References Cited

U.S. PATENT DOCUMENTS

| | | | |
|---|---|---|---|
| 3,829,706 A | 8/1974 | Seip | |
| 5,155,860 A | 10/1992 | McClure | |
| 5,249,218 A | 9/1993 | Sainton | |
| 5,257,414 A | 10/1993 | Trahan et al. | |
| 5,348,485 A | 9/1994 | Briechle et al. | |
| 5,428,666 A | 6/1995 | Fyfe et al. | |
| 5,541,985 A | 7/1996 | Ishii et al. | |
| 5,557,516 A | 9/1996 | Hogan | |
| 5,586,166 A | 12/1996 | Turban | |
| 5,815,426 A | 9/1998 | Jigour et al. | |
| 6,012,634 A | 1/2000 | Brogan et al. | |
| 6,029,144 A | 2/2000 | Barrett et al. | |
| 6,175,922 B1 | 1/2001 | Wang | |
| 6,213,390 B1 * | 4/2001 | Oneda | 235/379 |
| 6,601,761 B1 | 8/2003 | Katis | |
| 6,736,322 B2 | 5/2004 | Gobburu et al. | |

(Continued)

FOREIGN PATENT DOCUMENTS

AU    5991994    2/1995

(Continued)

OTHER PUBLICATIONS

Investigating mobile payment: supporting technologies, methods, and use Emilie Valcourt, Jean-Marc Robert and Francis Beaulieu.*

(Continued)

*Primary Examiner*—Hani Kazimi
*Assistant Examiner*—William Rankins
(74) *Attorney, Agent, or Firm*—James E. Eakin

(57) ABSTRACT

A virtual pooled account is used in operating a system having multiple financial partners. In a specific implementation, the system is a mobile banking system. Instead of maintaining separate general ledgers for each financial institution, the system will keep one general virtual pooled account. This will reduce the settlement and operational costs of the system. The owner of the virtual pooled account will receive the float on the virtual pooled account, and this float will be distributed to the multiple financial partners according to a formula.

17 Claims, 77 Drawing Sheets

U.S. PATENT DOCUMENTS

| | | |
|---|---|---|
| 6,747,547 B2 | 6/2004 | Benson |
| 7,044,362 B2 | 5/2006 | Yu |
| 7,089,208 B1 * | 8/2006 | Levchin et al. ............... 705/39 |
| 7,119,659 B2 | 10/2006 | Bonalle et al. |
| 7,191,151 B1 | 3/2007 | Nosek |
| 7,216,144 B1 | 5/2007 | Morris et al. |
| 7,249,094 B2 | 7/2007 | Levchin et al. |
| 7,364,068 B1 | 4/2008 | Strubbe et al. |
| 7,475,043 B2 | 1/2009 | Light et al. |
| 2002/0025795 A1 | 2/2002 | Sharon et al. |
| 2002/0178098 A1* | 11/2002 | Beard ......................... 705/35 |
| 2002/0194072 A1 | 12/2002 | Blink et al. |
| 2002/0194099 A1* | 12/2002 | Weiss ......................... 705/36 |
| 2003/0019881 A1 | 1/2003 | Kim |
| 2003/0078793 A1 | 4/2003 | Toth |
| 2003/0126094 A1 | 7/2003 | Fisher et al. |
| 2003/0187754 A1 | 10/2003 | Dixson, Jr. |
| 2003/0220884 A1 | 11/2003 | Choi et al. |
| 2004/0030601 A1 | 2/2004 | Pond et al. |
| 2004/0054592 A1 | 3/2004 | Hernblad |
| 2004/0093281 A1 | 5/2004 | Silverstein et al. |
| 2004/0111367 A1 | 6/2004 | Gallagher et al. |
| 2004/0143552 A1 | 7/2004 | Weichert et al. |
| 2004/0210518 A1 | 10/2004 | Tiem |
| 2004/0215507 A1 | 10/2004 | Levitt et al. |
| 2004/0215526 A1 | 10/2004 | Luo et al. |
| 2004/0267665 A1 | 12/2004 | Nam et al. |
| 2005/0033684 A1 | 2/2005 | Benedyk et al. |
| 2005/0043996 A1 | 2/2005 | Silver |
| 2005/0044038 A1* | 2/2005 | Whiting et al. ............... 705/39 |
| 2005/0044040 A1 | 2/2005 | Howard |
| 2005/0044042 A1 | 2/2005 | Mendiola et al. |
| 2005/0065851 A1 | 3/2005 | Aronoff et al. |
| 2005/0147057 A1 | 7/2005 | LaDue |
| 2005/0182724 A1 | 8/2005 | Willard |
| 2005/0187873 A1 | 8/2005 | Labrou et al. |
| 2005/0199709 A1 | 9/2005 | Linlor |
| 2005/0278222 A1 | 12/2005 | Nortrup |
| 2006/0000900 A1 | 1/2006 | Fernandes et al. |
| 2006/0004655 A1* | 1/2006 | Alexander et al. ............ 705/39 |
| 2006/0106738 A1 | 5/2006 | Schleicher |
| 2006/0143087 A1 | 6/2006 | Tripp et al. |
| 2006/0149665 A1 | 7/2006 | Weksler |
| 2006/0224470 A1 | 10/2006 | Garcia Ruano et al. |
| 2006/0224508 A1 | 10/2006 | Fietz |
| 2006/0235758 A1 | 10/2006 | Schleicher |
| 2006/0265493 A1 | 11/2006 | Brindley et al. |
| 2006/0283935 A1 | 12/2006 | Henry et al. |
| 2006/0294025 A1 | 12/2006 | Mengerink |
| 2007/0055635 A1 | 3/2007 | Kanapur et al. |
| 2007/0106564 A1 | 5/2007 | Matotek et al. |
| 2007/0125838 A1 | 6/2007 | Law et al. |
| 2007/0288373 A1* | 12/2007 | Wilkes ......................... 705/42 |
| 2008/0046359 A1 | 2/2008 | Allin et al. |
| 2008/0046988 A1 | 2/2008 | Baharis et al. |
| 2009/0132347 A1* | 5/2009 | Anderson et al. ............ 705/10 |
| 2009/0150283 A2* | 6/2009 | Bent et al. ..................... 705/39 |

FOREIGN PATENT DOCUMENTS

| | | |
|---|---|---|
| AU | 1264395 | 8/1995 |
| AU | 4534497 | 2/1998 |
| BR | 9408529 | 8/1997 |
| CN | 1145676 | 3/1997 |
| EP | 666549 | 8/1995 |
| EP | 1107198 | 6/2001 |
| EP | 1109138 | 6/2001 |
| EP | 1528518 | 5/2005 |
| GB | 2372615 | 8/2002 |
| HU | 9602116 | 9/1996 |
| IL | 112375 | 3/1999 |
| KR | 1996-705885 | 11/1996 |
| KR | 1996-705887 | 11/1996 |
| KR | 1996-706384 | 12/1996 |
| KR | 1996-706653 | 12/1996 |
| KR | 1996-706694 | 12/1996 |
| KR | 1996-706727 | 12/1996 |
| KR | 1996-706744 | 12/1996 |
| KR | 1997-700336 | 1/1997 |
| KR | 1977-700891 | 2/1997 |
| KR | 1997-700737 | 2/1997 |
| KR | 2001-25740 | 4/2001 |
| KR | 2001-91827 | 10/2001 |
| KR | 2002-83570 | 11/2002 |
| NZ | 277428 | 2/1998 |
| PL | 316012 | 12/1996 |
| RU | 2180761 | 3/2002 |
| SG | 464411 | 2/1998 |
| WO | WO95-21427 | 8/1995 |
| WO | WO 97/45814 | 4/1997 |
| WO | WO9745814 | 12/1997 |
| WO | WO 02/059847 | 1/2002 |
| WO | WO02059847 | 2/2002 |
| WO | WO02059847 | 8/2002 |
| WO | 2007024148 | 3/2007 |
| WO | WO2007024148 | 3/2007 |
| ZA | 9500214 | 5/1996 |

OTHER PUBLICATIONS

Trefor Moss; Show Me the Money; Mobile Communications International, Londong; Nov. 2001; ISS 84; p. 1; Http://proquest.umi.com/pqdweb?did=813964561&sid=4&Fmt=2&clientId=19649&RQT=309&VName=PQD.

Emilie E. Valcourt et al: "Investigating Mobile Payment: Supporting Technologies, Methods, and Use"; Wireless and Mobile Computing, Networking and Communications, 2005. (W IMOB '2005), IEEE International Conference on Montreal, Canada, Aug. 22-24, 2005, Piscataway, NJ, USA IEEE, vol. 4, Aug. 22, 2005, pp. 29-36, XP010839727.

Valcourt et al.; Investigating Mobile Payment Supporting Technologies, Methods, and Use; Wireless and Mobile Computing, Networking and Communications, 2005 (W IMOB '2005); IEEE International Conference on Montreal, Canada, Aug. 22-24, 2005, Piscataway, NJ, USA, IEEE, vol. 4, Aug. 22, 2005, pp. 29-36, XP010839727.

* cited by examiner

Registration

1. Member-to-be "A" submits registration request.
2. New Member account is created.
3. Identity risk controls are checked for new Member and account is updated accordingly.
4. Check for viral records associated to new Member.
5. (a/b) Obopay debits Viral pooled account and credits Member pooled account.
6. (a/b) Obopay records source Viral debit and records target Member credit.
7. Check for incentives applicable to new Member.
8. (a/b) Obopay debits Incentive account and credits Member pooled account.
9. Obopay records new Member Incentive credit.

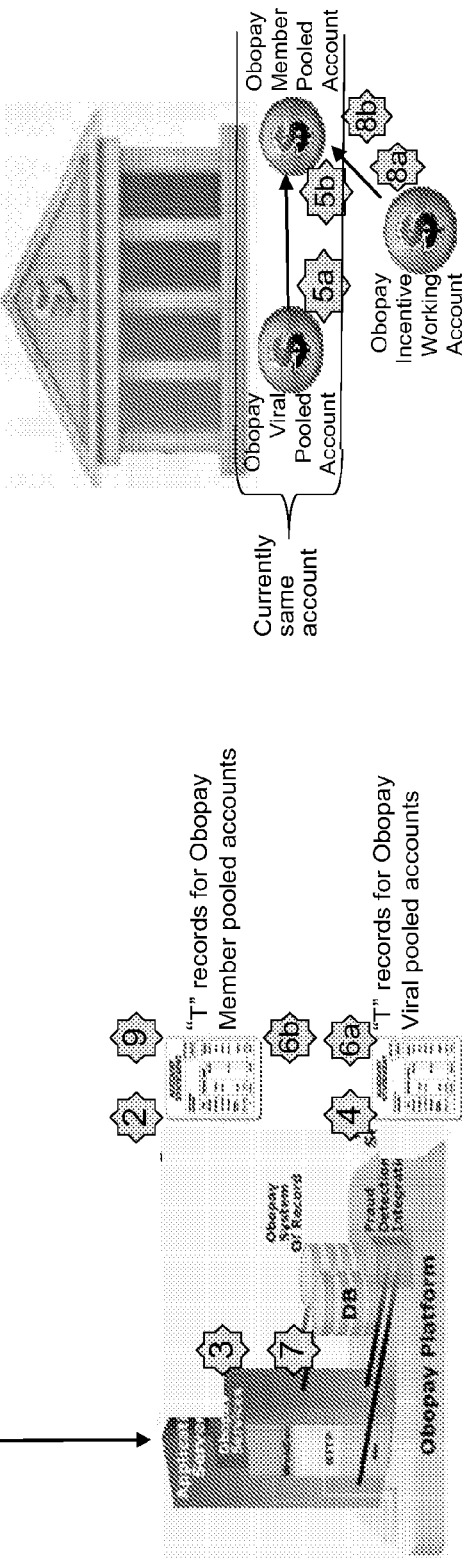

Fig. 17

*Request (device->data center)*

Oby6 10002;1;0;1;0*16507968261;0*1233

*Response (Failure, data center->device)*

0;1;0;1;6*1=Account with device key [16507968261] and PIN did not match records._2=BE104

- Attrbute # 1 – error message
- Return value type 6 – Business Exception
- Return value
- Attribute #2 – error code

Fig. 61

*Request (device->data center)* obo+10002;1;0;2;0*16502837201;0*1234

*Response (Success, data center->device)*

Array of 6 objects of type "10"

0;1;0;2;10<*1=1133997556269 _2=1133997556269 _3=+1.00_4=P2P_5=16502836932 >
1=1133994033855 _2=1133994033855 _3=-
2.34_4=P2P_5=16502836932 >1=1133993961904 _2=1133993961904 _3=-
2.34_4=P2P_5=16502836932 >1=1133993894486 _2=1133993894486 _3=-
2.34_4=P2P_5=16502836932 >1=1133993436257 _2=1133993436257 _3=-
2.34_4=P2P_5=16502836932 >3=$9.96_4=BAL

Fig. 62

OMAP Persistence Design

OMAP Screen Palette

OMAP Screen Transitions

OMAP Main Menu

OMAP Pay Screen Flow (Source)

OMAP Pay Screen Flow (Target)

OMAP Request Pay Screen Flow (Source-Request)

**OMAP Request Pay Screen Flow
(Target - Accept)**

**OMAP Request Pay Screen Flow
(Target - Deny)**

**OMAP Request Pay Screen Flow
(Source – Target Accepted)**

**OMAP Request Pay Screen Flow
(Source – Target Accepted)**

OMAP Balance Screen Flow

OMAP History Screen Flow

OMAP Settings Screen Flow
(Source)

OMAP Unknown Mobile ID Screen Flow

OMAP System Exception Screen Flow

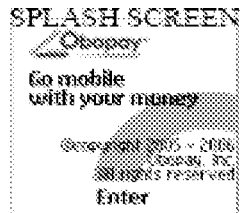
SPLASH SCREEN

☐ 1.1 "Go mobile with your money" tagline displayed correctly.

☐ 1.2 "Enter" key takes user to Main Menu

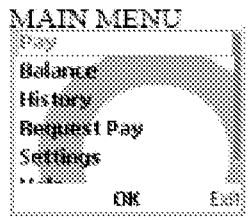
MAIN MENU

☐ 2.1 Menu scrolls and items are highlighted correctly.

☐ 2.2 Pay, Balance, History, Request Pay, Settings, Help, are displayed correctly.
  ☐ 2.2a Small Font
  ☐ 2.2b Medium Font
  ☐ 2.2c Large Font SETTINGS    Pass/Fail

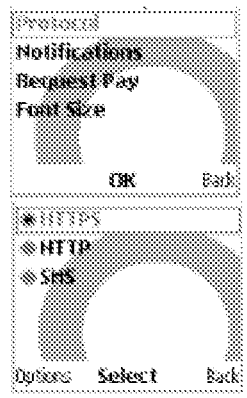

☐ 3.1 Items are highlighted when selected

☐ 3.2 Each protocol can be selected

☐ 3.3 Each option can be toggled.
  3.3a Sound notification when receiving payments toggles with selection.
  ☐ 3.3b Lights notification when receiving payments toggles with selection.
  ☐ Note: When payment notifications are received, a MIDI file plays a short tune. This is what sound notification is.

☐ 3.4 Button toggles correctly
  3.4a When toggled on/off, "Tip" screen on the target phone recipient of a
  ☐ "Request Pay" shows/doesn't show.

☐ 3.5 Each protocol can be selected
  3.5b When toggled on/off, certain fonts throughout the application
  ☐ change size to match corresponding choice.
    Small Font
    ☐ Medium Font
    ☐ Large Font
    ☐

Fig. 81

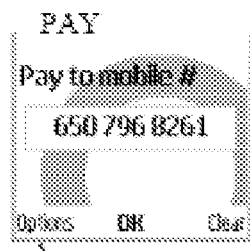

☐ 4.1 Enter a phone number and click 'OK'
  ☐ 4.1a Click the 'Options' button to test addressbook integration.

Addressbook Integration - Not available on all models

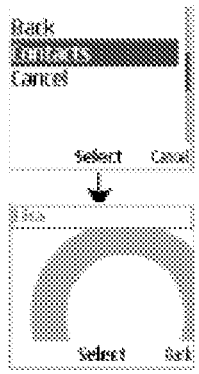

☐ 4.2 Highlight 'Contacts' and click 'Select'
  ☐ 4.2a 'Back' key returns to Main Menu
  ☐ 4.2b 'Cancel' key returns to Main Menu
  ☐ 4.2c 'Contacts' key takes us to phone's addressbook ☐ 4.3 Each item highlights when selected. 'Select' takes
user back to "Pay to mobile #" screen and displays selected
contact phone number in the prompt box.*
  *Note- Functionality on each phone varies. For example,
  on the Nokia 6102, only addressbook entries designated as
  "mobile" numbers (vs. home or work etc.) will be properly
  displayed in the "pay to mobile #" when selected. Currently,
  when selected they do not respond.

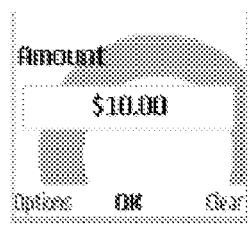

☐ 4.4 Enter amount and click 'OK'
  ☐ 4.4a Test clear key by entering an amount and clicking clear until
  you are returned to the "Pay to Mobile #" screen.

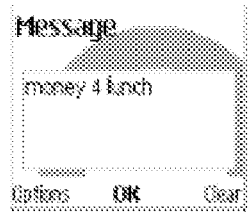

☐ 4.5 Enter a message and click 'OK'
  ☐ 4.5a Test clear key by entering a message and clicking clear until
  you are returned to the "Amount" screen.

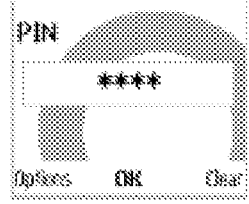

☐ 4.6 Enter the PIN code and click 'OK'
  ☐ 4.6a Test clear key by entering a PIN and clicking clear until
  you are returned to the "Message" screen.

Fig. 82

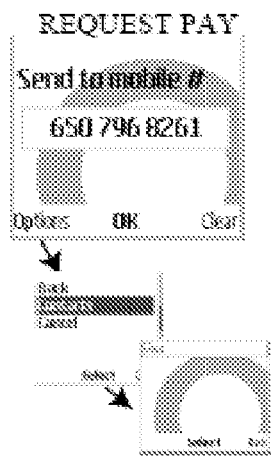

☐ 6.1 Enter a phone number in the prompt and click 'OK'

☐ 6.2 Test the addressbook integration by clicking 'Options'
    ☐ 6.2a Click 'Contacts' to go to the addressbook.
    ☐ 6.2b Highlight a name and click 'Select'
    ☐ 6.2c Verify the number from the addressbook is now in the prompt.

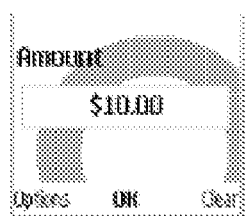

☐ 6.3 Enter an amount and click 'OK'

☐ 6.4 Enter a message and click 'OK'
    ☐ 6.4a Verify that 32 characters can be entered and displayed correctly.
    ☐ 6.4b Verify that the characters can be deleted.
    *Note: Use "m" and "w" letters, as they are larger and fill more space. i.e. mwmwmwmwmwmwmwmwm

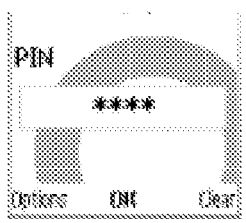

☐ 6.5 Enter the PIN and click 'OK'
    ☐ 6.5a Verify that 6 characters can be entered.
    ☐ 6.5b Verify that the characters can be deleted.

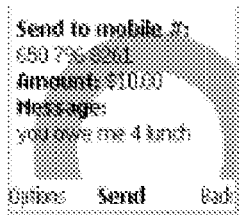

☐ 6.6 Verify information is correct and click 'Send'

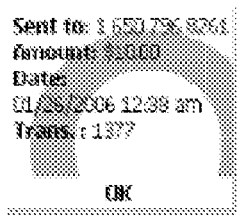

☐ 6.7 This is the confirmation screen, it should appear a few seconds after 'Send' is clicked.
    ☐ 6.7a Click 'OK' to return to the main menu.
    ☐ 6.7b Verify that the TARGET phone receives the request and can successfully accept or decline payment.

Fig. 84

REQUEST PAY
Target Phone            Pass/Fail

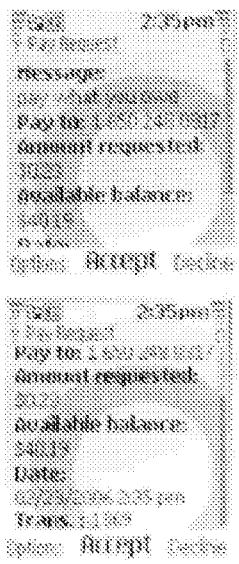

☐ 8.1 Send a Request Pay and confirm the target phone looks (generally) like this.

Note: If you press "Decline", this is the screen the
original sending phone will display:

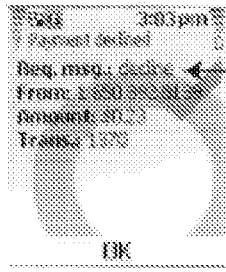

The "Req. msg." is the message that was
originally sent with the Request for Pay.
In this case, the message entered was
"decline".

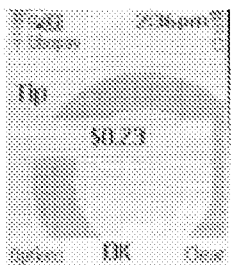

☐ 8.2 This is the "Tip" screen, enter a tip (or not). Confirm it appears.
  ☐ 8.2a Confirm this screen disappears when "Request Tip"
  in Settings is toggled off.

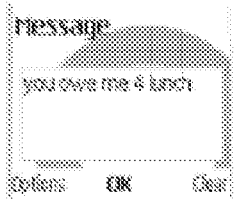

☐ 8.3 Confirm that the subsequent screens appear as displayed.

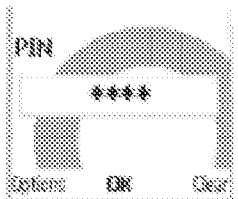

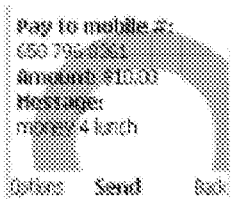

Fig. 86

Obopay Application
Screen Sequence
Class Hierarchy ized such that
financial transactions are easily concluded in a manner similar to cash transactions.

Despite the rising use of credit cards, there is still a huge global population of people who rely primarily on cash transactions and who still need a convenient and cost effective electronic payment system to send and receive money. This need has led to the growing use of prepaid debit cards. Unfortunately, debit cards are primarily designed so that a consumer can cash in the debit card at a merchant who has invested in a point of sale transaction terminal. It is difficult for an individual to transfer a portion of the amount stored on a prepaid debit card to another individual without involving an inconvenient trip to a bank or a merchant with a POS terminal. What is needed is an electronic payment system that enables financial transactions to be concluded between individuals and without the need to directly involve a third party financial institution or an outside financial institution.

Although many people do not have access to POS terminals, most have access to a portable wireless communications device, often referred to as cellular (or cell) or mobile devices. Indeed, people now routinely take advantage of additional features provide by a typical mobile phone such as text messaging, photography, and listening to music as mobile devices have evolved to include integrated PDA, MP3, paging, player, and e-mail capabilities.

There has been explosive growth in mobile telephony devices and other portable devices that handle communications either through voice, e-mail, SMS text messaging, instant messaging, and the Internet. People will often remember to carry their mobile or cellular phones with them, even if they forget to carry their wallet or car keys. Mobile phones are ubiquitous in the U.S. and in many countries around the world. In 2005, it was estimated that 2.14 billion mobile phone subscribers. About 80 percent of the world's population has mobile phone coverage. Therefore, there is a great need for a system to permit mobile phones to send and receive payment, just like cash, and provide other financial and mobile banking transactions.

Attempts to create a mobile payment system using cellular devices have met with mixed success primarily because the cell phone must have an additional circuit device (or "chip") that is used to store account balances and account information. When the person holding the phone wishes to transfer funds, the funds are deducted at the point of sale from the chip and transferred to the financial institution at a later time to be recorded by the financial institution. Clearly, this lag between the time the sale is made and the time the sale is recorded is inefficient and risks having sales lost should the merchant's POS equipment malfunction before the sale is recorded. Further, if the phone is lost, the account balance may be used by whoever is holding the phone. While this system provides better protection against loss of funds and is superior to carrying cash, the system lacks adequate security to protect the account holder from improper use by others.

Further, a credit card indicates that the holder has been granted a line of credit from a bank or other issuer and it enables the holder to make purchases or withdraw cash up to a prearranged amount. Interest is charged based on the terms of the credit card agreement and the holder is sometimes charged an annual fee. Traditionally, a plastic card bearing an account number is assigned to the holder.

Credit card transactions utilize proprietary networks that are paid for by the merchants to settle transactions. Because of the proprietary nature of the payment system, such systems costs are high. Also, because multiple parties are involved in

VIRTUAL POOLED ACCOUNT FOR MOBILE BANKING

CROSS-REFERENCE TO RELATED APPLICATIONS

This patent application claims the benefit of U.S. patent applications 60/744,013, filed Mar. 30, 2006 and 60/744,930, filed Apr. 15, 2006, which are incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

Embodiments of the present invention relate to systems and techniques for effectuating financial transactions via mobile devices, such as mobile or cellular phones, and more particularly to a mobile, individualized payment transfer infrastructure and method for transferring payment. Further, embodiments of the present invention relate to a financial transaction system and more particularly to a closed-loop financial transaction system for person-to-person and consumer to merchant transactions and methods for using the financial transaction system.

Historically, an account holder who wished to conclude a financial transaction to buy an item has relied on various financial instruments such as currency, checks, credit cards, or debit cards. Unfortunately, these types of financial instruments have certain security issues and fraud prevention is a significant drain on the payment industry's profitability. When cash is lost or stolen, there is usually no recourse but to accept the loss. With other financial instruments, loss is not a major issue but fraud causes significant losses for the payment industry. Indeed, credit card, debit card and check fraud have been and continues as a major problem for the industry.

One reason that check fraud is so common arises due to the need to physically present a check to the payer's bank. Thus, when a check is accepted in a financial transaction, the check is not guaranteed funds. Rather, the check is merely a piece of paper where the validity of the bank that it is drawn on must be verified together with the account that is used and the signature used to authorize the payment. With a credit or debit card, the user may not be authorized but may rack up considerable charges before the issuer can deactivate the account.

Clearly, what is needed is a payment system where the receiver of funds in a financial transaction is able to easily verify the validity of the entity holding the funds, the account and the balance and the identity of the person with the phone. Further, what is needed is a more secure manner to access credit and debit cards to conclude financial transactions.

While each of the above listed financial instruments have functioned well in the past, it is clear that consumers desire a simple, secure method for concluding financial transactions. The increasing use of credit cards provide ample evidence that consumers prefer to use electronic payment systems rather than carry large amounts of cash or suffer the hassle of writing multiple checks for small purchases. Even with the wide spread adoption of electronic payment systems, it is clear that there is an increasing need for faster, cheaper and more convenient electronic payment systems for completing financial transactions. Further, there is a need for an eleca credit card transaction such systems are often referred to as "open loop" financial systems.

FIG. 34 shows an example of a proprietary network includes a point-of-sale (POS) terminal 3401 to initiate transactions at a merchant's location and a payment processor 3402 connected with the POS terminal 3401 by a proprietary network 3403. In some instances, the proprietary network is nothing more than a connection to the Internet. Payment processor 3402 is, in turn, connected by a proprietary network 3404 to a credit card interchange 3408.

To initiate the transaction, a consumer would present a credit card 3406, or alternatively an RFID key fob 3407, at the POS terminal. A key fob is a type of security token: a small hardware device with built-in storage mechanism. Both the credit card 3406 and key fob 3407 include encoded information that the POS terminal detects and forwards to transaction processor 3402 over the proprietary network 3403. Unfortunately, both the credit card and key fob are unable to work without access to the POS terminal either by proximity or over the telephone.

The transaction processor 3402 submits the transaction to the credit card interchange (a network of financial entities that communicate to manage the processing, clearing, and settlement of credit card transactions) via private network 3404. The credit card interchange routes the transaction to the customer's credit card issuer 3409. The issuer identifies the consumer based on the detected account number and determines the available credit limit before either approving or declining the transaction. If the transaction is approved, the amount is forwarded to the merchant's bank processor 3405 over the credit card interchange with the amount being added to the credit account maintained by the bank for the merchant.

Since information for the transaction is carried on proprietary networks, merchants pay a steep monthly service charge for the privilege accepting credit cards and for accessing these proprietary networks. Merchants further pay a substantial per-transaction charge for each transaction. For example, to handle a simple transaction to purchase a bottle of water at a convenience store for a $1.00, the merchant may incur a per-transaction charge of about $0.25 and 3 percent of the transaction amount although much higher charges are typical if the merchant incurs a lot of charge backs. After accounting for their overhead expenses, the per-transaction charge can be a substantial part of the overall expenses and, in some cases, can be more than the profit margin on a particular item. Unfortunately, for many small merchants, the combination of the monthly service charge and the per-transaction interchange charge may exceed their total profit on credit card sales for the month. For larger merchants, the interchange fee is less of a significant drag on profitability but still an unwelcome erosion of their profit margins.

Not only are credit cards a "high cost" expense item for most merchants, they are also subject to substantial fraud and abuse. For example, if a credit card is stolen, it may be used at a POS terminal by anyone, even if they are not the holder. To prevent such use, many POS terminals now include a request that the consumer enter in the postal zip code where the credit card bill is sent, to authenticate the consumer as the holder. Unfortunately, postal information is readily available on the Internet so the enterprising thief is not deterred by the additional information request to complete the transaction. The holder, however, is annoyed by having to enter such superfluous information.

Finally, the open loop credit card system is simply not adaptable to person-to-person transactions where one party is not a merchant. For example, if two students want to share the expenses for a pair of movie tickets, one student may wish to electronically transfer funds to the other student. However, the interchange fee alone would make the transaction sufficiently expensive to discourage use. Further, it is unlikely, that either student would agree to pay the monthly fee and other charges associated with a merchant's account in order to access the credit card interchange. Accordingly, the closed-loop system deployed and operated by the credit card issuers is wholly ill suited for person-to-person financial transactions.

Therefore, what is needed is a cost-effective mobile payment system that enables an account holder the flexibility to conduct their financial transactions any time anywhere. What is also needed is a "mobile wallet," that people can carry as a cash source that is accessible from a mobile phone. Further, what is needed is a software application and managed service for consumer mobile payments that operates as a mobile wallet on a mobile phone platform. This mobile wallet should be secure, easy to use, and easy to acquire so that the ability to make mobile payments is available to any mobile account holder. Moreover, what is needed is a closed-loop financial transaction system that facilitates payments without the substantial payment charges associated with closed-loop financial systems and has a high level of security for the holder, the merchant and others involved in the financial transactions. Accordingly, the following embodiments and exemplary descriptions of inventions are disclosed.

SUMMARY OF THE INVENTION

A virtual pooled account is used in operating a system having multiple financial partners. In a specific implementation, the system is a mobile banking system. Instead of maintaining separate general ledgers for each financial institution, the system will keep one general virtual pooled account. This will reduce the settlement and operational costs of the system. The owner of the virtual pooled account will receive the float on the virtual pooled account, and this float will be distributed to the multiple financial partners according to a formula.

In an embodiment, the invention is a method including: handling financial transactions of a group of users of a system, where the financial transactions may be specified through mobile phones and subgroups of the users are associated with a banking institution; processing financial transactions associated with a first banking institution, where users in a first subgroup are associated with the first banking institution; processing financial transactions associated with a second banking institution, where users in a second subgroup are associated with the second banking institution; processing financial transactions associated with a third banking institution, where users in a third subgroup are associated with the third banking institution; maintaining a virtual pooled account including funds for the first, second, and third subgroup users associated with the first, second, and third banking institutions; and distributing a first dividend to the first banking institution based on float for funds in the virtual pooled account for the first subgroup users plus a percentage of float on funds in the virtual pooled account for the third subgroup users.

In an implementation, the method includes distributing a second dividend to the second banking institution based on float for funds in the virtual pooled account for the second subgroup users plus a percentage of float on funds in the virtual pooled account for the third subgroup users. In an implementation, the method includes receiving an instruction from a first user in the first subgroup to transfer money to a second user in the second subgroup, where money is not transferred outside the virtual pooled account. The instruction may be wirelessly sent from a mobile phone via SMS messaging. The instruction may be wirelessly sent from a mobile phone using an application executing on the mobile phone.

The third banking institution may be a direct partner of the system. In an implementation, the method includes each user is associated with only one of the first, second, or third financial institutions. In an implementation, the method includes managing a system of record for virtual pooled account, where the system of record includes records of transactions for users in the first, second, and third subgroups.

In an embodiment, the invention is a method including: handling financial transactions of a group of users of a system, where the financial transactions may be specified through mobile phones and subgroups of the users are associated with a banking institution; processing financial transactions associated with a first banking institution, where users in a first subgroup are associated with the first banking institution; processing financial transactions associated with a second banking institution, where users in a second subgroup are associated with the second banking institution; processing financial transactions users in a third subgroup that are associated with the system and not the first and second banking institutions; maintaining a virtual pooled account including funds for the first, second, and third subgroup users associated with the first and second banking institutions and the system; and distributing a first dividend to the first banking institution based on float for funds in the virtual pooled account for the first subgroup users plus a percentage of float on funds in the virtual pooled account for the third subgroup users.

In an implementation, the method includes distributing a second dividend to the second banking institution based on float for funds in the virtual pooled account for the second subgroup users plus a percentage of float on funds in the virtual pooled account for the third subgroup users. In an implementation, the method includes receiving an instruction from a first user in the first subgroup to transfer money to a second user in the second subgroup, where money is not transferred outside the virtual pooled account. The instruction may be wirelessly sent from a mobile phone via SMS messaging. The instruction may be wirelessly sent from a mobile phone using an application executing on the mobile phone. The instruction may be sent via an Internet browser.

In an implementation, each user is associated with only one of the first financial institution, second financial institution, or the system. In an implementation, the method includes receiving an instruction from a first user in the first subgroup to transfer money to a second user in the third subgroup, where money is not transferred outside the virtual pooled account. In an implementation, the method includes managing a system of record for virtual pooled account, where the system of record includes records of transactions for users in the first, second, and third subgroups.

A mobile payment platform and service provides a fast, easy way to make payments by users of mobile devices. The platform also interfaces with nonmobile channels and devices such as e-mail, instant messenger, and Web. In an implementation, funds are accessed from an account holder's mobile device such as a mobile phone or a personal digital assistant to make or receive payments. Financial transactions may be conducted on a person-to-person (P2P) or person-to-merchant (P2M) basis where each party is identified by a unique indicator such as a telephone number or bar code. Transactions may be requested through any number of means including SMS messaging, Web, e-mail, instant messenger, a mobile client application, an instant messaging plug-in application or "widget." The mobile client application, resident on the mobile device, simplifies access and performing financial transactions in a fast, secure manner.

The invention provides a mobile payment system (MPS) or mobile person-to-person payment system that allows fast and easy money transactions. The mobile phone is becoming more and more ubiquitous around the world. Many people carry a mobile phone or similar portable communications device, even if they do not carry a wallet around with them as they go about their daily lives. Through the mobile payment system and their phones, users will be able to do what they can with a normal wallet and much, much more. Users will be able send and receive money, pay for services, pay for bills, pay for movie tickets, pay for groceries, pay a babysitter, pay for coffee and a newspaper, instantly pay back a friend, split a dinner bill, send money to children, get money from parents, get quick or emergency cash, send emergency cash, pay up or collect on a friendly wager, pay for fantasy football, pay for gardening services, pay for association dues, track purchases, check the balance, and more. As can be appreciated, the system of the invention provides many benefits.

The problems and needs that the invention addresses includes: Cash can be stolen and cash transactions are not traceable. Need to encourage cash to reside in banks rather than consumer's pockets. Need for low-cost or small-deposit cash storage. Need for low cost electronic payments. Need for electronic payments to be available to everyone, any-place, any-time and in near-real-time. Need for electronic payments to result in an instantly usable form (companion prepaid debit card for example, or through a real-time link into a user's demand deposit account (DDA) at a bank). Need for electronic payments to be accessible to banked and unbanked consumers. Need for electronic payments to be able to be linked to existing financial instruments such as credit, debit, prepaid, payroll, and others. Need to be able to load to and unload from existing financial instruments in real time or near-real-time. Need for electronic payments to work across banks. Need for electronic payments to be accessible via mobile devices. Need for electronic payments to be accessible via consumer media devices such as PCs, POS payment terminals, TV cable boxes, digital video recorders (DVRs), satellite boxes, and others. Need for electronic payments to be accessible via person-to-machine devices such as vending machines, parking meters, kiosks, and others. Need for electronic payments to work across electronic networks such as mobile carriers, cable carriers, satellite carriers, and others.

Some of the benefits of the invention include MPS electronic payments encourage cash to stay in the bank (instead of consumer's pockets). MPS electronic payments are safe and traceable. MPS electronic payments occur in near-real-time. MPS electronic payments are accessible to any-one, any-time and any-place. MPS can provide an optional or not required companion prepaid debit card (e.g., MasterCard, Visa, or other) for instant funds accessibility. MPS electronic payments can be leveraged for person-2-person (P2P) as well as person-2-merchant (P2M) transactions. MPS funds are stored within distributed pooled partner bank accounts. "T" records for MPS consumer funds are managed within the MPS payment system of record (for low cost P2P and P2M transfer). MPS facilitates manual or automated load functionality from existing financial instruments (e.g., credit, debit, other). MPS facilitates manual or automated unload functionality to existing financial instruments (e.g., credit, debit, other). MPS can optimize load or unload processing (i.e., performing load or unload within bank when possible). MPS facilitates electronic payments in a cross-bank manner. MPS facilitates electronic payments in a cross carrier or cross network manner. MPS facilitates electronic payments in a cross device or cross channel manner (i.e., mobile, e-mail, Web, instant messenger). MPS funds are electronic, PIN protected, and "live" in the bank.

Further, a closed-loop financial transaction system based, in part, on the use of a cell phone or a PDA to make or receive payments. Financial transactions may be conducted on a person-to-person basis where each party is identified by a unique indicator such as a telephone number, e-mail address, instant messaging identifier, or bar code or on a consumer-to-merchant basis. Fee structures are disclosed to facilitate wide spread adoption and to free people from having to carry cash.

In an embodiment, the invention is a financial transactions system including a consumer interface, connected to a network, including: a Web interface to handle transaction requests from a Web browser client; a mobile Internet browser interface to handle transaction requests from a mobile Internet browser on a mobile phone client; an SMS interface to handle transaction requests using SMS text messaging; and a mobile client application interface to handle requests from a mobile client application executing on mobile phone client.

The consumer interface may include an interactive voice response interface to handle requests from a telephone voice channel. The system may include a pooled account for newly registered users, where newly registered users may conduct transactions from registered users immediately after registration. The mobile client application interface may permit a send money transaction, loading account transaction, unload account transaction, and balance inquiry transaction. The consumer interface may further include an instant messenger interface to handle requests from an instant messenger client.

The system may include: a financial partner interface; a merchant interface, where users through the consumer interface can access their money at a bank connected to the system through the financial partner interface and transfer money to merchants connected to the merchant interface. The system may include a system of record managed by the financial transaction system, recording transaction executed through the consumer interface. The system may include a pooled account managed by the financial transaction system, where a number of the clients accessing the system through the consumer interface have an account in the pooled account. A number of the clients may not have an account in the pooled account but instead have an account at a financial institution, which has access to the system.

In an embodiment, the invention is a method including: providing an application program interface to conduct transactions with a first financial partner; providing an SMS messaging interface to receive requests to conduct transactions; and providing a mobile client application interface to receive requests to conduct transactions, where through the SMS messenger interface or the mobile client interface, a client may request a transfer money from a first account at the first financial partner to a second account at the second financial partner.

The method may further include providing an applications program interface to conduct transactions with a second financial partner, where through the SMS messenger interface or the mobile client interface, a client may request a transfer of money from an account at the first financial partner to an account at the second financial partner. The method may include providing a system of record to record transactions requested through the SMS messaging and mobile client interfaces.

In an embodiment, the invention is a method including: displaying a first screen on a display of a mobile phone to show a number of options including a first option to pay money to another and a second option to request balance information; upon a user selecting the first option, displaying a second screen where the user enters a target phone number to which to send payment; after the user enters the target phone number, displaying a third screen where the user enters a transaction amount; after the user enters the phone number, displaying a fourth screen where the user enters a PIN code; and after the user enters the PIN code, wirelessly sending transaction information including the target phone number, transaction amount, and PIN code to a server for processing.

The method may include after the user enters the target phone number, displaying a fifth screen where the user enters an optional message. The method may include: upon the user selecting the second option, wirelessly sending a request for balance information to the server; receiving balance information from the server; and displaying the balance information in a fifth screen. The method may include where the first screen further provides a third option to request payment from another. The method may include where the second screen has a third option which upon selection by the user provides the user access to an address book from which the user may select an entry to use as the target phone number. The transaction information may include a sequence number generated by the mobile phone. In an implementation, the funds of the user are maintained at the server and not on the mobile phone.

In an implementation, the method includes: upon receiving a request pay request at the mobile phone, displaying fifth screen where the user may enter a tip amount.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 17 shows a method of registration for an unregistered user.

FIG. 61 shows a response to a service call where an exception is generated as a result of the service call in accordance with an embodiment of the invention.

FIG. 62 shows a successful invocation of another service call in accordance with an embodiment of the invention.

FIG. 81 to 86 show user screens and flows for a mobile phone application for performing person-to-person payments.

DETAILED DESCRIPTION OF THE INVENTION

In this description of embodiments of the present invention, numerous specific details are provided, such as examples of components or methods, or both, to provide a thorough understanding of embodiments of the present invention. One skilled in the relevant art will recognize, however, that an embodiment of the invention can be practiced without one or more of the specific details, or with other apparatus, systems, assemblies, methods, components, parts, or the like, and combinations of these. In other instances, well-known structures, materials, or operations are not specifically shown or described in detail to avoid obscuring aspects of embodiments of the present invention.

In a specific implementation, the present invention relates to a mobile payment platform and service. An embodiment of the present invention encompasses a payment platform that provides a fast, easy way to make payments by individuals or merchants using their mobile devices to access an account such as a debit account. Further interfaces include IM, Web, and application widgets. Other accounts may include a DDA or a credit card account. The account may also be a stored value account without a card associated with it. Additional embodiments of the present invention encompass a variety of partners that include mobile phone operators, nationally branded merchants, and financial service providers together with a payment platform that provides a fast, easy way to make payments by individuals using their mobile devices.

Figure 1:
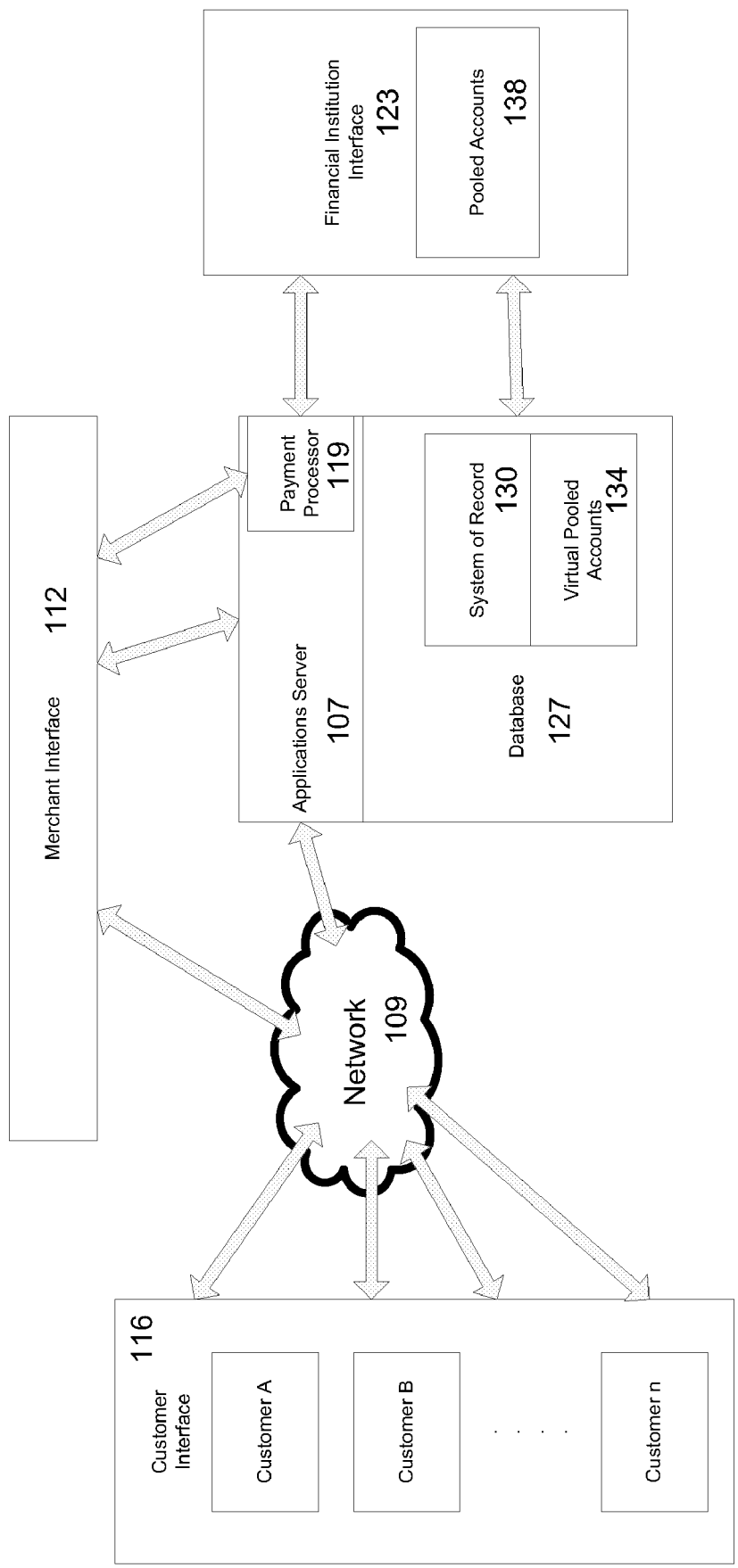
FIG. 1 shows a block diagram of a system of the invention.

FIG. 1 shows a block diagram of a system of the invention for conducting value exchange transactions including in specific implementations, mobile person-to-person payments and transactions, mobile person-to-merchant payment transactions, and mobile banking. An applications server 107 is connected to a network 109. Although only one applications server is shown, there may be any number of applications servers in a system of the invention. Such applications servers may be executing on a singer server machine or a number of server machines. As the load on an applications server increases, typically more machines will be used to handle and respond to the increased load.

A merchant interface 112 and a customer interface 116 are also connected to the network. This network may be any network to carry data including, but not limited to, the Internet, Ethernet, plain old telephone service (POTS) line, public switch telephone network (PSTN), ISDN, DSL, coaxial cable, fiber optics, satellite, cellular, wired, wireless, fixed line, serial, parallel, and many others, and combinations of these. The customer interface may handle any number of customers such as customer A, customer B, and up to customer n, where n is any positive integer. The merchant interface is also connected to the applications server. Similar to the customer interface, there may be any number of merchants that connect to the application server.

On the applications server is a payment processor 119, which may also be connected the merchant interface. A financial institution interface 123 is connected to the applications server and payment processor. There may be any number of financial institutions connected to the applications server. The applications server may also include a database 127. Alternatively, the database may be on a separate server from the applications server and accessible to the applications server through a network or other connection. The financial institution is also connected to the database. The database may include a system of record 130 and virtual pooled accounts 134, which the applications server may manage. The financial institution may manage pooled accounts 138. Therefore the system of record and virtual pooled accounts may be managed separately from the pooled accounts at the financial institution.

A system of the invention may include any number of the elements shown in the figure. The system may include other elements not shown. Some elements may be divided into separate blocks, or some elements may be incorporated or combined with other elements (e.g., two blocks combined into a single block). Additionally, some elements may be substituted with other elements not shown (e.g., replacing one block with a different block).

In operation, the system of the invention facilitates financial transactions between customers and between a customer and a merchant. In an implementation, the customer initiating a transaction may be by using a mobile device, such as a mobile phone or smartphone. Also, the target of a transaction may be a person having a mobile device, which is capable of accessing the mobile payment system.

In an implementation, the funding source these financial transactions may be the owner or operator of the applications server (which may sometimes be referred to a mobile payment server or mobile payment service). Then, customers (and merchants) will be able to load or unload funds from the mobile payment service. These funds may be from any source including a cash, check, cash, on-line payment solution, wire funds transfer, checking account, savings account, certificates of deposit, reverse mortgage account, brokerage account, dividends, bonds, hedge fund account, credit card, debit card, or any financial instrument, or any combination of these.

In other implementations, the funding source is a financial institution that is accessible by the user through the mobile payment server. Funds may be transferred between financial institutions if needed. For example, customer A may sent money to customer B or a merchant, where parties have money at different financial institutions. The mobile payment system will facilitate the transfer between the institutions and notify the parties appropriately.

Figure 2:
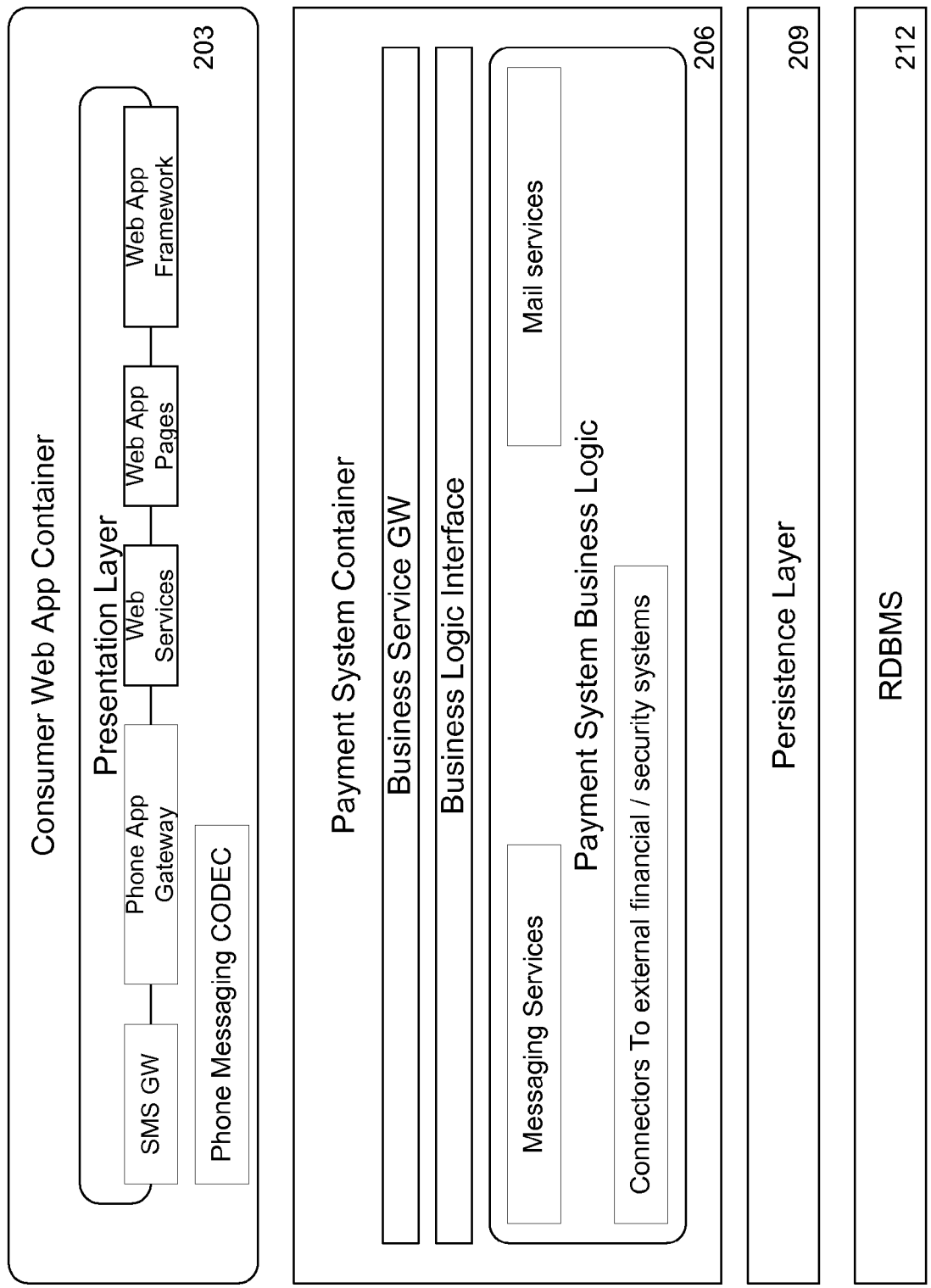
FIG. 2 shows a software architecture for a specific embodiment of the invention.

FIG. 2 shows a software architecture for a specific embodiment of the invention. This block diagram shows the layers for a specific architecture that may be implemented on the applications server. The layers include a consumer web application container 203, payment system container 206, persistence layer 209, and relational database management system (RDBMS) layer 212.

In a specific implementation, the consumer web application container and payment system container may be based on WebLogic by BEA Systems, Inc. The persistence layer may be based on Hibernate. The relational database management system may use a Oracle database. However, in other specific implementations, other vendors, suppliers, or systems may be used. For example, a system of the invention may incorporate open source code.

In the consumer web application container is a presentation layer for interface for different types of clients. Some examples of the interfaces provided include SMS gateway, phone application gateway, web services gateway, web application pages gateway, and web application framework gateway. The phone messaging codec converts the incoming or outgoing requests, or both, such as SMS or Phone into system or client specific messages. An architecture of the invention may be include any number of these interfaces.

The payment system container includes connectors to external financial or security systems, mail servers, and messaging services. There is also a business logic interface and payment system business logic. Service clients can invoke the business services through business service gateway. The gateway implementation could use EJB or other technologies.

A system of the invention may include any number of the elements shown in the figure. The system may include other elements not shown. Some elements may be divided into separate blocks, or some elements may be incorporated or combined with other elements (e.g., two blocks combined into a single block). Additionally, some elements may be substituted with other elements not shown (e.g., replacing one block with a different block).

Payment System Infrastructure—Technology Environment

An aspect of the invention is a mobile payment system or service. This application discusses many specific embodiments and implementations of individual components and elements, variations and modifications of these, and combinations of these. A system of the invention may include any of the variations or specific implementations discussed, singly or in any combination. In this application, an example of a specific implementation of a mobile payment system is provided, and this specific implementation is the Obopay system. The Obopay system is merely an example of an implementation of a mobile payment system and is discussed to describe more easily various aspects of the invention. The invention encompasses many mobile payment system implementations and is not limited to the specific implementations described.

Figure 3:
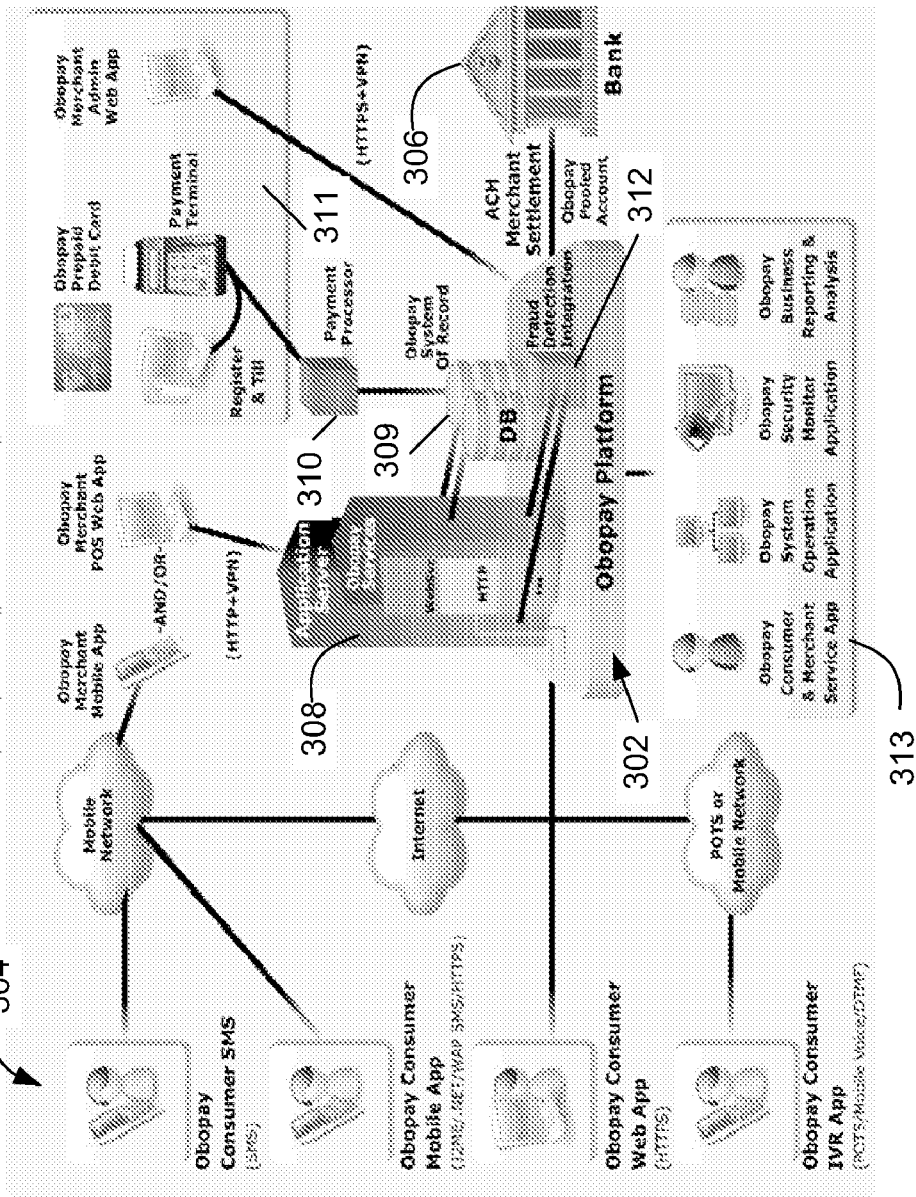
FIG. 3 shows an environment for implementing an embodiment of the invention.

FIG. 3 shows a specific implementation of the invention. FIG. 3 shows a robust technology environment 300 in accordance with an embodiment of the present invention that comprises a mobile client server platform 302, a scalable hardware environment 304, and bank integration 306.

Platform 302 is the heart of the payment system infrastructure offering security, communication, ledger, currency, fraud and reporting, and administration. A mobile client application (MCA) runs on a J2EE payment server, the technology favored by many banks. Incoming and outgoing transaction requests are processed by HTTP or Web Services commands. Fraud detection, transactional databases, and bank integration complete the picture.

It will be appreciated that in view of the ubiquitous nature of the present invention platform 302 comprises many different implementations. For example, platform 302 may comprise a server farm with a plurality of servers coupled to a network of storage devices. In other embodiments, platform may be implemented as a plurality of data centers to provide load balancing and redundancy.

Payment System Infrastructure—Hardware Environment of Platform 302

The payment system infrastructure is based on a horizontally expandable, clustered, and scalable hardware environment that provides robust failover capability. The Linux-based operating system supports thin client applications—most notably browsers such as Microsoft® Internet Explorer, Netscape, Opera, and Mozilla Firefox. The operating system also supports rich client applications. In an implementation, Java 2 Platform, Micro Edition (J2ME) and Microsoft .NET are used on the Mobile Client Platform. The architecture is easily configurable to allow for other rich client applications as necessary.

Examples of clients that may interface with the system include mobile phones, smartphones, personal digital assistant devices, notebook computer, desktop computers, and many others. The clients may connect through a communications network to the system. This network may be wireless or wired. In a specific implementation, the network is wireless and the client devices are mobile devices.

The communication network may be made of many interconnected computer systems and communication links. Communication links may be hardwire links, optical links, satellite or other wireless communications links, wave propagation links, or any other mechanisms for communication of information. Various communication protocols may be used to facilitate communication between the various systems. These communication protocols may include TCP/IP, HTTP protocols, wireless application protocol (WAP), vendor-specific protocols, customized protocols, and others. While in one embodiment, communication network is the Internet, in other embodiments, the communication network may be any suitable communication network including a local area network (LAN), a wide area network (WAN), a wireless network, an intranet, a private network, a public network, a switched network, SMS messaging network, mobile phone network, cellular phone network, Ethernet, and combinations of these, and the like.

The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples).

In an embodiment, a user interfaces with the system through a portable computing device such as a smartphone or mobile phone. A computer system may include a display, enclosure, keypad, and pointing device. Within the enclosure, the may be familiar computer components such as a processor, memory, mass storage devices, and the like. There may be a single processor or multiple processors. The processor may be a multiple core processor.

Some examples of mass storage devices which may interface with a computing device include flash and other nonvolatile memory storage, flash drives, flash card (e.g., SD cards), mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

In an embodiment, the invention is computer software that is executed by a computing device. The computing device may be a client device or a server device, or a combination of these. A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device. The source code of the software of the present invention may also be stored or reside on mass storage device (e.g., hard disk, magnetic disk, tape, or CD-ROM). As a further example, code of the invention may be transmitted via wires, radio waves, or through a network such as the Internet. For example, an application program of the invention may be downloaded and installed onto a phone. After installation, the user of the phone may run the application and send money to another user.

Computer software products may be written in any of various suitable programming languages such as C, C++, C#, Pascal, Fortran, Perl, SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

In an embodiment, with a Web browser executing on a device, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

Platform 302 comprises a server 308 that handles interaction with account holders and maintains transactions records. Server 308 also provides the link to value added services provided by merchant partners. Server 308 utilizes a transactional database 309 that preferably comprises a data storage network. Server 308 uses information (such as account numbers, balance information, etc) obtained from transactional database 309 to manage a payment processor 310 that communicates with merchant point of sale (POS) terminals 311. Merchants may use the POS terminals 311 for financial transactions such as adding funds to a debit card for an account holder. Merchants may also establish a separate link to payment server 302 for accounting purposes.

A settlement engine handles the transactions within the closed loop system which will settle on a real time basis. The user's account and the merchant's account will be updated simultaneously. Because most merchants may also serve as load agents, the merchants will carry a balance in their account. The settlement engine will be primarily used to sweep a preset dollar amount or a dollar amount over a minimum to an external bank account held by the merchant.

The settlement engine facilitates person-to-person (P2P) transactions because of the ability to transfer funds from one enrolled account holder to another enrolled account holder.

Platform 302 further comprises a fraud detection system 312 for tracking information distilled from each financial transaction. Such fraud detection systems are known and are often used to monitor for fraud when credit cards are used. Risk is controlled by a general rules engine (see FIG. 3) that applies limits and determine the acceptability of requested transactions from a risk perspective.

The information collected for each financial transaction may be mined for use by merchant and consumer value added applications, by business monitoring applications, by system operations applications and security monitoring applications as indicated at 313.

To illustrate, a marketing engine delivers coupons or discounts to account holders from participating merchants. This engine also controls the use of instant account credits to stimulate enrollment.

A currency translation module facilitates foreign operation where the value measurement in the closed loop payment system needs to be translated to other currencies. The module will also be used to control foreign exchange exposure.

Viral engine provides the ability to send funds to an unenrolled user. This module allows the account holder to send the funds which will send a message to the receiver that the funds are being held for them provided that they enroll.

A roaming feature provides a Peer to Merchant transaction environment where the merchant will use a mobile phone to receive the funds where the merchant does not have access to a terminal that would typically be used for credit or debit card acceptance. One advantage of the present invention arises from the security of not accepting cash and guaranteed funds versus a check and also provides instant verification which is not feasible with a credit card purchase without a terminal.

Banking Partner Integration

The transactional databases 308 integrate directly with a pooled bank account 306 maintained at a partner bank. All funds stay within this account, although merchants have the option of transferring their funds from their prepaid debit accounts to other accounts through ACH transfers or direct DDA integration through a direct API with their bank or through the AIM network. It will be appreciated that more than one partner bank may be set up such that each account may be linked to a pooled bank account at more than one bank. Since platform 302 knows the available balance for each account (regardless of the number of bank partners) there is no risk of funds not being available when interbank settlements occur.

Working with marketing partners, including mobile operators, nationally branded merchants and financial service providers, such as the major banks and credit unions, the payment system infrastructure takes advantage of the existing mobile infrastructure and messaging technology to offer low-cost, universally accessible financial services. In an implementation, the system of the invention provides interoperability between banks. There is also interoperability between pooled accounts and any card holder accounts that are held as individual accounts.

Mobile Service Providers Partners

Mobile service providers gain incremental revenue, as well as additional data traffic and a competitive advantage, by offering their subscribers a digital payment solution. Unlike other payment systems, the present invention can be offered to a provider's entire customer base, since it can use SMS or mobile Internet service (e.g., WAP) in addition to a downloadable application.

In addition, account holders can either pay their bills or top-off minutes via their service account. This is especially useful for account holders who do not have other financial services available to them.

Merchant Partners

Various merchants who traditionally accept credit cards, debit cards, checks, and cash will accept the mobile individualized payment transfer infrastructure because of the low adoption cost. Merchants also have an opportunity to earn commissions for handling prepaid account transactions such as helping account holders add funds to their accounts. Most merchants may also provide small amounts of cash back, similar to the debit card model in use today.

A specific embodiment of the mobile payment service of the invention has mobile P2M extensions and web services. These allow a merchant to easily accept payment from a user either from a mobile phone or website. They can also help the merchant lower their cost of accepting the transaction and increase their reach to their customers.

Bank Partners

Banks may now "mobilize" their existing customer base with instant access to their accounts and the ability to make account holder-to-account holder payments. Cross bank transactions are also possible. With this partnership, banks can also reach consumers previously too expensive to serve. Rather than incur the expense of establishing a bank and adhering to a heavy regulatory regime, pooled accounts at participating banks, handle the front ledgers, report net positions to or on behalf of its partner banks, and allow the banks to conduct the final settlement. This is to enable compliance with governmental regulations and allow active coexistence with the banking environment.

By using partner banks and companion bank accounts, the payment system infrastructure is designed to enhance account holders' existing bank accounts whenever possible, yet act as a discrete account when necessary. All funds represented by individual prepaid debit accounts will be maintained in commercial bank accounts held in trust for account holders. At the end of each business day, the aggregate balance of all the accounts will equal the bank balance. All transactions created within a twenty-four-hour period will be settled within that period. The accounts function like a wallet with cash where the balance changes immediately. In other words, the present invention does not function as a demand deposit in which instruments may be presented by a third party. For instance, account holders will not be able to issue demand instruments such as checks. As a result, there will be no pending transactions that settle at a future date.

In a specific implementation of the invention, debit card accounts are not held in a pooled account by mobile payment service provider, but in individual debit card accounts at a direct bank partner. The mobile payment service provider holds money in a pooled account for customers without cards is held in trust at the bank.

Method of Operation

In one embodiment of the present invention, an account holder adds money to a prepaid debit account in advance of purchases. Money may be added to a prepaid debit account at a partner's location, by way of interactive voice response (IVR) using their mobile phone or another phone, via a website accessible over the Internet or by contacting a customer service representative. In an embodiment, a user may set up a direct deposit link or link an account to a bank account via the ACH or AIM networks. Money may be transferred from an existing account at a financial service provider partner (such as a banking institution) or by depositing cash or a check to the prepaid debit account (at a participating merchant or other third party). Account holders then have access to these funds through their mobile devices to make payments and they may receive payments to their account activity from others. In other embodiments, funds may be transferred from a designated credit card account into the prepaid debit account.

In another embodiment, funds from each account holder are pooled at a single financial institution and each account holder has an interest in the pooled account equal to the funds deposited, minus the funds transferred to another account plus the funds received from others. Account holders may withdraw some or all of their available funds from the pooled account.

In another embodiment, each account holder may set up a prepaid debit account at any financial institution and access the account indirectly to transfer funds. Thus, account holders are not limited to a debit card with funds maintained in the pooled account at a particular financial institution. Rather, account holders may access a debit card account at a financial institution of their choosing.

In another embodiment, a credit card account is designated as the primary account and a cash advance is moved to a prepaid debit card account whenever the funds in the debit card account drop to, or below, a selected amount.

In yet another embodiment, financial transactions are conducted on a person-to-person basis where each party is identified by a telephone number and a password (e.g., a personal identification number of PIN. Alternatively, the financial transaction may be identified by a user name and password. In other embodiments, at least one party to a transaction is identified by a bar code. The bar code may be displayed on a display such as the screen of a mobile telephone and detected by the camera that is present on most modern mobile devices. The bar code may be printed on the device or may be otherwise attached to the mobile device.

In one specific embodiment, a software application, referred to as a mobile client application (MCA), resident on the mobile phone only requires account holders to have a mobile phone number and the prepaid debit account. Optionally, a credit card or a checking account may be accessed as a source of funding. Advantageously, no additional hardware such as a point of sale terminal or Internet access required. Once registered, a account holder sets up a unique account holder identification number (PIN) to verify all transactions. Upon registering, the account holder enters their mobile phone number and a server pushes the mobile client application to their phone. Once the mobile client application is installed, the account holder can begin using the mobile phone for concluding financial transactions. Another option is for the user to download the application by going to a specific URL using the user's mobile Internet browser (e.g., get.obopay.com) which will start the download process for the mobile application.

Account holders may also choose to link their account to a debit or credit cards offered by financial institution and which can be used at the millions of merchant locations worldwide. In addition, it allows account holders to obtain cash from the prepaid debit account using an AIM should the need arise.

To account holders, concluding a financial transaction is seamless. By simply sending a message from the mobile client application equipped mobile phone to a server. The payment server validates each transaction and transfers funds or responds to the account holder's request for account information.

Sending Transaction Requests to the Server

When an account holder makes a transaction request from their mobile phone, information is routed to the mobile operator, such as Cingular or Verizon or other mobile phone service provider. The information is then routed to the payment server through a secure Internet connection. In alternative embodiments, the information is routed over alternative networks, such as wireless networks, POTS, or other available network. This redundancy is important because the account holder is not limited to a single access path to control their account and conduct financial transactions. Depending on the account holder's location or other circumstances, one or more communications avenues may not be available. However, because of the system redundancy, there will likely be at least one communication avenue available and then the financial transaction will be allowed.

Financial transaction requests are transmitted in one of two ways, depending on the account holder's mobile phone. If the account holder has an application-enabled phone, which enables transmitting the financial request through a Web-based application (HTTP or HTTPS) or a mobile application, such as J2ME, .NET, .NET CF, WAP, or SMS, or any combination of these, the transmission goes directly to the server. A request message is sent once MCA establishes a connection with the payment server.

Since application-enabled devices currently constitute a relatively small portion of the devices being used today, the payment server also transmits and receives through Short Message Service, also referred to as SMS text messaging or simply SMS, because nearly all devices support SMS. In this case, financial data is routed to the mobile operator, and then to an SMS aggregator who transmits messages to the payment server in real time.

A SMS mobile payment system avoids the expense and problems associated with having a chip added to the cell phone. In operation the SMS system, financial information is sent using SMS text messaging. While SMS text messaging works well with all types of cell devices and certain other types of mobile communication devices, such as portable digital assistants or PDAs, SMS exposes unencrypted passwords or personal identification numbers (PINs) as well as balance information or details about the most recent transaction. Since anyone in possession of the phone can read the SMS message file and immediately know how to access the account of another, the present invention. Accordingly, in one embodiment, the present invention provides for the initiation of the financial transaction by way of SMS text message. The SMS message starts with a key word that provides the type of transaction requested-PAY, REQUEST PAYMENT, BALANCE, TRANSFER, or HELP. In an implementation, "PAY" is referred to as "SEND" and "REQUEST PAY" is referred to as "GET."

Where the SMS message contains the key word that indicates a desire to transfer funds from one account holder to another account holder, the key word would be either pay or request payment (or send or get). After the key word, the amount is entered with or without a decimal point. After the amount, the target telephone number (or short code, e-mail address, license number, or other identifying information) is entered. This information may be obtained from the telephone directory of the mobile device. After the telephone number, the account holder may enter in a message for display to the other party. In some circumstances, this message may be a null message. In some embodiments, the account holder may enter a supplemental message for record keeping purposes.

Once the SMS message is sent to the payment server, the PIN is entered by the account holder and sent through a voice channel connection to the payment server to verify the SMS message. The PIN is entered in via the keyboard and may be any alphanumeric code. The PIN is then sent to the payment sever as a DIMF encoded message where DIMF refers to dual tone multi frequency, the signal a telephone company receives when a telephone's touch keys are pressed At the server, the payment server receives the SMS message via the SMS text message communication path and the PIN through the voice channel. The call to the payment server may be made by the account holder or it may be initiated as a "call back" feature by the payment server in response to receipt of the SMS message. The PIN may be sent as a DIMF encoded message to maintain security, but in other embodiments, the PIN may be spoken by the account holder and converted by an interactive voice recognition software module operating on the payment server or another server (not shown) dedicated to the handling voice calls.

In one embodiment, the mobile device includes the mobile client application. The mobile client application is invoked, either directly by the account holder or in response to activation of the SMS text messaging feature on the mobile device. The MCA determines the best method for sending the PIN.

In one alternative embodiment, the PIN is encrypted by the mobile client application and included in a subsequent SMS message that is sent to the payment server. The payment server correlates the messages by matching the telephone number and the time each message was sent. If the PIN was sent in a message that was distant in time compared to the SMS message, the transaction may be rejected. If only one of the two messages are received, the transaction may be rejected. If, however, both the SMS message with the financial transaction details (minimum of at a keyword) and the PIN code are received and are verified, then the financial transaction is concluded.

In an alternative embodiment, when a voice channel is available, the mobile client application invokes a module to encode the PIN into DIMF form. The DIMF is then sent by the mobile client application to the payment server along a voice channel connection established by the mobile client application. The module may be a Java API that generates the appropriate tones based on keypad input.

In yet another alternative embodiment, the mobile client application provides a user interface (UI) on the display screen of the mobile device to guide the account holder for concluding the financial transaction. In this embodiment, the account holder is guided through the process of constructing the SMS text message by the automatic insertion of the keyword, amount, target telephone number, password, and messages, if any.

In yet another alternative embodiment, the SMS message may include the keyword, the amount, the target telephone number and the password. A shortcoming of this implementation is that the password would be visible to anyone controlling the mobile device. However, the present invention manages this problem by sending a message, or instructing the user through help and FAQ information, to the account holder to delete the sent message from the SMS log folder. These instructions may also suggest that the account holder turn off message logging outgoing SMS messages when conducing financial transactions.

The following description illustrates use of SMS text messaging to provide account holders access to the payment server from any SMS capable mobile phone or other SMS-enabled device. The mobile client application is not required to be resident on the mobile device although as has been discussed, there are advantages to having the mobile client application be loaded onto the mobile device.

In operation, the account holder sends a text message to the payment server using the existing text message capability on their phone. The functionality includes Pay (or Send), Request Pay (or Get), Balance, History, and Help invoked by using any of these features as a keyword. There may also be a refer or invite option to permit the user to invite another person to join the system. The referrer or referee, or both, may be given a referral bonus. The account holder enters the keyword together with additional information in the body of the text message to construct a command that is then sent to the payment server. Access to the payment server may be by way of a toll free telephone number, a short code or an e-mail address, all of which identify the payment server to the SMS text messaging system. An example of a short code is 62729 which is used as the target phone number for their text message commands to the payment server. An example of an e-mail address is sms@obopay.com which is the e-mail target for SMS text message commands sent to the payment server.

To send a payment to another person or a merchant using the SMS method, the account holder would enter the command string shown in table A.

TABLE A

| Keyword | PIN | Target mobile # | Amount | Messages (optional) |
|---------|-----|-----------------|--------|---------------------|
| pay | ### | ########## | #.## | Abcd |

Each item should have a space between it and the previous item. In an implementation, the keyword is not case sensitive. The mobile number should include area code plus mobile number with no spaces present in the mobile number. The account holder may enter a leading 1 or not on the phone number. A dollar sign is not required to be entered with the amount, but should be allowed. The user should be able to optionally include a message with their payment.

In an alternative example, the PIN is sent in a second message by way of a voice call. To send a payment to another person or a merchant using the combined SMS plus voice channel method, the account holder would enter the command string shown in table B.

TABLE B

| Keyword | Target mobile # | Amount | Messages (optional) |
|---------|-----------------|--------|---------------------|
| pay | ########## | #.## | Abcd |

The PIN is sent to the payment server over the voice communication channel—that is, the cellular network, the Internet or POTS.

When a request for payment is made to an account holder using either the SMS method or the combined SMS plus voice method, they may either accept or decline the request using the manual SMS text messaging system.

On the payment server side, one or more data centers would have systems for processing the financial transactions. Each data centers would contain a combination of PBX/ACD/VRU technology to allow multiple simultaneous call processing. The VRU technology can be used to provide programmable inbound and outbound DIMF support. The VRU can be connected to an enterprise J2EE system which represent the actual business logic and system of record for the financial transactions. The J2EE system can then integrate with actual banks for settlement of the transactions. In an implementation, there is a one-time password option for SMS security as an option. This would work by having the user send the transaction without a PIN and then the system would either send the user a series of questions that they answer.

Performing Transactions Using Mobile Client Application (MCA)

Sending money to another account holder or merchant is fast and simple. The present system simplifies mass payments, such as collecting for a charity event from many account holders or sending multiple transactions from the same account holder at the same time.

Account holder-to-Account Holder (Person-to-Person) Transactions

Sending money from one account holder to another across the room, across town, or across the country is easy, convenient, and inexpensive. A prepaid debit account holder can send money to any SMS-enabled handset account holder, even if they do not have the mobile client application installed on their mobile device or a prepaid debit account. If the recipient is not already an account holder, the recipient receives a SMS text message indicating that funds have been transferred in their name. To get timely access to these funds, the recipient may register for their own prepaid debit account. This viral messaging makes it easy for nonaccount users to become registered account holders themselves. If the mobile device used by the nonaccount user supports a WAP or mobile Internet browser, then the sign-up may occur immediately via the telephone. The user also has the option to sign up for the service using the web, a kiosk, in person at a merchant partner or through another device.

The flexibility of the present invention enables novel methods of selecting and identifying parties to a transaction. In one embodiment, the payer may type a telephone number or other identifying code into the keypad of their mobile device. An identifying code may be a special three, four, or five digit "short code" that is translated to a specific account by the mobile services provider. For example, if an account holder wishes to download a television show made available by a television network, such as the CBS television network, the account holder may type in a short code of 227 to pay the network for the desired content. The short code may use any alphanumeric character. This embodiment requires that certain parties arrange to acquire a short code to encourage users to access their services.

In an alternative embodiment, the recipient of funds may be identified by a telephone number selected from the address book function on the mobile device. Thus, there is no need to separately enter in the telephone number. In an implementation, a hosted address book is used where the user would set up their address book with the service and then that address book would be available to them through any device that they use. To initially populate the hosted address book, the system may provide interfaces into third party address books such as Outlook, a phone personal information manager (PIM) address book, or third party services such as Plaxo.

In yet another alternative embodiment, the payer may use the camera function on the mobile device to acquire an image that identifies the payee. One example of an image would be a bar code.

In yet another alternative embodiment, the payer is identified by the payee by means of an acquired image. One such acquired image is a bar code displayed either on a display screen or visibly affixed on an outer portion of the mobile device.

In yet another embodiment, either the payer or the payee is identified by means of a proximity device such as a radio frequency identification device (RFID) or a near field communication (FC) device.

Account Holder-to-Merchant

An account holder can withdraw funds or make purchases at a partner merchant in multiple ways:

(1) mobile phone to merchant mobile phone;
(2) mobile phone to merchant point of sale web application;
(3) prepaid companion debit card;
(4) by texting code to the service that identifies the product and merchant that a user wants to purchase;
(5) by selecting a option to pay with the service from with a merchant's electronic shopping cart or web or mobile application; or
(6) by selecting a product from a catalog within a Web or phone application of the service.

In an embodiment of the invention, a mobile device is associated to one or more bank accounts (checking, savings, credit, prepaid, or a pooled account, and the like) and the account holder can transfer funds in real time from one account to another without any access to a service center and without any internet or computer access. Advantageously, the account holder can select the account from which funds are obtained to make a purchase in real time.

In another embodiment of the invention, account holders contribute to a master interest bearing account held by a bank partner. At any time the account holder can withdraw their full contribution without any penalty. The bank partner manages the payment system and is compensated with the interest that is accumulated.

In another embodiment, NFC is used to communicate between mobile devices to conclude financial transactions using the infrastructure of the present invention. In yet another embodiment, NFC is used to communicate from a mobile device to a POS terminal to conclude financial transactions.

There are many existing products, and potentially a large number of new products, that will benefit from the present invention. For example, any Internet enabled telephone device, such as a VoIP telephone may be used to practice the present invention even though it may be affixed at a specific location and is not necessarily mobile. In other embodiments, e-mail addresses are used in addition to or in lieu of telephone numbers to identify one or more parties to a financial transaction.

It will further be appreciated that one or more of the elements depicted in the drawings/figures can also be implemented in a more separated or integrated manner, or even removed or rendered as inoperable in certain cases, as is useful in accordance with a particular application.

Operating Revenue Models for Mobile, Individualized Payment Transfer Infrastructure Operating the mobile, individualized payment transfer infrastructure provides the opportunity to generate a revenue stream without charging a surcharge on transactions where a merchant is one of the parties. It is recognized that in the mobile or wireless world, cell phone users are often willing to invest a small monthly fee to acquire access certain services. Accordingly, revenue is generated by charging a small per transaction to send money. In one exemplary embodiment, the per transaction fee ranges from a few pennies for transactions under a selected amount such as $25. To illustrate further, the "per transaction" fee may range from $0.05 to about $0.10 per transaction in alternative embodiments. Any fee may be charge from less than one cent per transaction to dollars per transaction. For example, the fee may be from $0.00001 to $10 per transaction.

The fee may be charged on both the party receiving payment and the party sending payment. Alternatively, the fee may be charged to account holder sending the money. In still other embodiments, a percentage of the transaction amount is charged to conclude the transaction. In this embodiment, the fee is charged for higher value transactions, such as, by way of illustration $25. A fee notice, if any, is preferably displayed on the approval screen prior to the account holder's final approval and authorization to send the payment. In still other embodiments, the fee may be waived for small transaction amounts. Thus, there would be no "per transaction" fee when small purchases are made using the payment transfer infrastructure. Another operating model is to charge on a subscription basis.

Rather than pay a "per transaction" fee, account holders may elect to pay a flat monthly charge to send and receive payments. In this embodiment, there are no "per transaction" fees. The monthly charge may vary with merchants paying a higher (or lower in some circumstances) fee than individual users.

Accordingly, the present invention contemplates three different revenue generation models. Specifically, (1) a "per transaction" fee is assessed against one or both parties to a financial transaction. Preferably the fee amount is nominal ranging from about a penny to about $0.15; (2) flat rate monthly price plan where every account holder would pay a monthly service charge; (3) high value transaction fee for transactions over a selected amount, such as by way of illustration, $50, the fee waived for all other transactions; and (4) value added services, such as linking to an accounting service to automatically record transaction details or to help prepare for filing tax statements. The service may get float for holding funds or advertising revenue and these may be applied to merchant fees (e.g., interchange).

Figure 4:
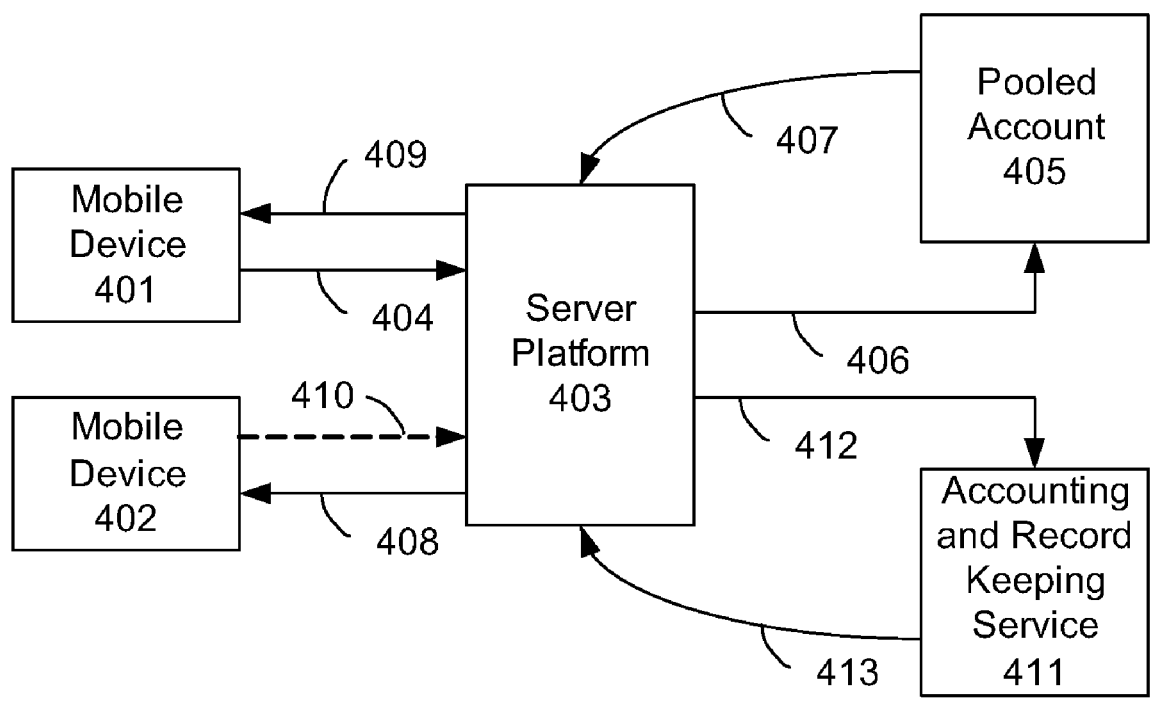
FIG. 4 shows an embodiment of the invention where value added services are provided in conjunction with payment services.

FIG. 4 shows another implementation of a system of the invention. FIG. 4 shows one embodiment where value added service is used between two account holders. By way of example, if an account holder associated with mobile device 401 initiates a transfer to mobile device 402, the pay request is transferred to server platform 403 as indicated by reference arrow 404. The pay request may include an optional description of the payment. For example, the account holder may annotate the payment to denote that it was an expense account item. The description may be selected from a menu displayed on the mobile device 401. Alternatively, the description may be a voice or text message associated with the payment request.

Upon receipt of the payment request, server 403 transfers funds from the payer's account to an account for the account holder associated with mobile device 402. The financial institution that manages pooled account 405 is notified of the transaction as indicated by reference arrow 406. In this manner, money is added to the account associated with mobile device 402 and debited from the account associated with mobile device 401. The financial institution then sends a confirmation as indicated by reference arrow 407.

Server platform 403 also sends a notice of the payment to mobile device 402 as indicated by reference arrow 408. A second message is sent indicating that the payment had been made is sent to mobile phone 401, as indicated by reference arrow 409. If the user of mobile device 402 is not an account holder, a new account may be opened as indicated by reference arrow 410. Alternatively, the user may withdraw funds from a designated AIM or other facility associated with financial institution that manages the pooled funds.

Server platform 403 then documents the transaction by sending the transaction amount and the description of the transaction to an accounting and record keeping service 411 as indicated by reference arrow 412. Thereafter, the account holder may access the information describing their purchases that is stored and organized by account and record keeping service 411 either via the mobile device 401 or by another Internet connection (not shown).

To further show how a bill payment gets into the accounts receivable system, consider a small business that uses an accounting program (which may be stored on a personal computer) to print out a paper invoice that it mails to its customer. The customer must then pay the small business, which is usually done by check. Because the paper invoice may not be sent with the check, the small business needs to associate the account number with the check. If not the account number is not written on the check, time is wasted trying to locate match the payment to a copy of the invoice. The small business then deposits the check to their bank and manually enters the data into their accounts receivable accounting program. Clearly this antiquated process is slow and expensive to support.

However, with the present invention, the small business need only select an invoicing option that puts the invoice from the accounting program into an OFX format, by way of example, or other import/export format readable by an accounting program. This electronic invoice is then sent to the payment platform (see FIG. 3). The payment platform creates a "Request Payment" message that is sent to the customer. When the customer approves payment of the invoice, the payment data is sent back to the account to accounting program via OFX and puts the money into the small business' account. The OFX message posts the item to accounting program. Since the customer's accounts receivable identification is their phone number, tracking and record keeping is greatly simplified. It should be noted that funds are guaranteed all the way through and there are no bounced checks or other such problems.

For accounts payable transactions, accounting and record keeping service 411 sends an OFX message with, by way of illustration, an employee's expense reimbursement (T&E) payment. The money is transferred to the employee's account and notification is sent to their mobile device. Advantageously, the present invention eliminates the manual process of entering each transaction into the accounting program.

Figure 5:
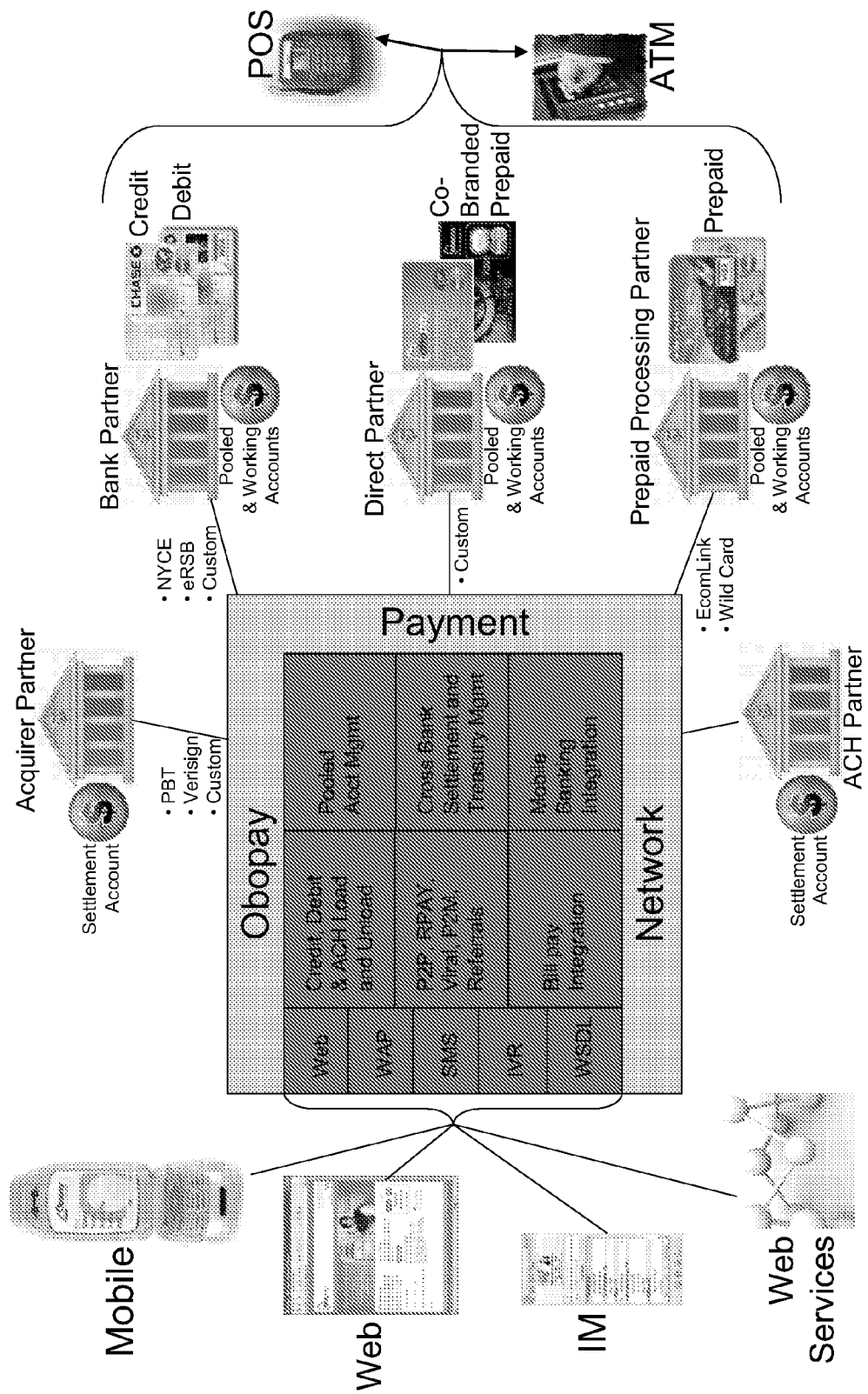
FIG. 5 shows a system topology for mobile person-to-person payments.

FIG. 5 shows a further implementation of system for mobile person-to-person payments. As discussed above, a specific embodiment of the invention allows users or clients to interface with the mobile payment system through the Web (e.g., through an Internet browser), WAP (e.g., through a mobile Internet browser on a mobile phone, smartphone, personal digital assistant device), SMS (e.g., text messaging through a mobile phone), IVR (e.g., interactive voice response system that understands a user's voice responses or tones from telephone key presses), WSDL (e.g., web services that may be accessible through a mobile device such as a smartphone).

The system may interface with wireless phones handle by any of multiple carriers, such as Verizon, Cingular (AT&T), Sprint, Nextel, Alltel, Virgin Mobile, Amp'd Mobile, U.S. Cellular, T-Mobile, and others. The service may also interface with prepaid phones. Some benefits for the mobile carrier include: a revenue share model based transmission or subscription basis. Promotes application download/purchase. Promotes network or data usage. Promotes SMS usage. "Off bill" payment solution which will help alleviate the surprise "big bill" problem.

The mobile payment system allows many different financial services for the user. Examples of some services includes credit card load, debit card load, Automated Clearing House (ACH) load, ACH unload, person-to-person (P2P) payment, remote pay (RPAY), viral, person-to-merchant (P2M), and referrals. Other services may include automated teller machine (AIM) network load and unload such as through the NYCE, PLUS, or STAR AIM system. The system may also include bill pay integration, where a user may pay bills such as a cable bill, electricity bill, Internet service bill, telephone bill, housekeeping service bill, and other bills.

Loading of an account refers to transferring of funds to an account on the mobile payment system where funds may be transacted. For example, a user may load funds from a checking account or credit card to the user's mobile payment system account, which may be managed by financial partner or managed by the operator of the mobile payment system.

Unloading of an account refers to transferring of funds from the mobile payment system to another account. For example, a user may unload funds from the user's mobile payment system account, which may be managed by financial partner or managed by the operator of the mobile payment system, to a checking account or credit card.

Loading and unloading may be performed in any of the ways discussed in this application including through ACH, AIM, or credit card or interchange. The ACH is generally the least expensive but ACH is usually not real time because funds get settled in a batch mode at the end of the day. So, when an ACH fund transfer is requested, the actual funds will not be transferred and made available to the mobile payment system until typically the end of the day. For AIM and credit cards, the money transfer is real time. AIM is typically more expensive than ACH, but less expensive to use than credit cards. Note that both AIM and ACH may be used to access a checking account of a user. Credit cards are generally the most expensive of the three to use. In an implementation, the system of the invention allows load and unload from any of these networks. In another implementation, the system allows load and unload from only one or more of these, such as from ACH only, ACH and AIM only, credit card only, AIM only, AIM and credit card only, or ACH and credit card only.

The mobile person-to-person payment system further provides a platform for one or more financial partners. These partners may includes an acquirer partner such as Pay by Touch (PBT), Verisign, or other; bank or other financial institutional partner such as a New York City, San Francisco, San Jose (California), London, Shanghai, Hong Kong, or Tokyo bank, electronic bank, NYCE; direct partner (such as co-branded prepaid cards); prepaid processing partner; and an ACH partner. The mobile payment system may also interface with point of sale (POS) systems.

There may be any number and combination of partners and services discussed. For example, a system may have only a single partner, may have two partners, three partners, or more than three partners. A system may include a single banking partner providing a debit card only (i.e., no credit card) for access by the mobile clients. A system may include a single banking partner providing a debit card and a credit card for access by the mobile clients. A system may include a two or more banking partners, one providing a debit card and another providing a different debit card for access by the mobile clients. A system may include a two or more banking partners, one providing a debit card and another providing a different debit card and a credit card for access by the mobile clients. A system may include a single banking partner providing a credit card only for access by the mobile clients. A system may include a single banking partner providing a credit card only for access by the mobile clients.

For each type of partner (e.g., debit card), there may be multiple such partner entities that interface with the mobile payment system or network. For example, the system may interface with two banks, bank A and bank B, or any number of banking partners. The system may have any combination of the partners described in this application. For example, the system may have a direct partner and bank partner, but not a prepaid processing partner. The system may have a prepaid processing partner only. The system may have a direct partner only. The system may have multiple bank partners.

Each partner system may have a different electronic interfacing scheme, and the mobile payment system will communicate using the appropriate application program interface (API) for each partner. A system of the invention allows easy integration of financial partners (e.g., banking partners, card partners) to mobile and other consumer partners (e.g., mobile phone carriers).

In a particular implementation of the system, the acquirer partner has a settlement account. The bank partner has pooled and working accounts. The direct partner has pooled and working accounts. The prepaid processing partner has pooled and working accounts. The ACH partner has a settlement account. The mobile payment system may provide one or more of pooled account management, cross-bank settlement and treasury management, and mobile banking integration.

The systems funds are represented by the aggregation of all partner bank pooled accounts. By way of business relationship with the mobile payment system, the mobile payment system facilitates a periodic treasury management process such that partner bank pooled accounts retain balances that are representative of their contribution to the mobile payment system customer base plus an agreed percentage of "other" mobile payment system funds. An acquisition "path" of a customer dictates the pooled account balance for a given partner bank (i.e., the more customers that a partner bank acquires through "their" paths, the higher the balance of their associated pooled account).

Users are typically associated with specific financial partners, such as a particular bank. In the mobile payment system, each user will have a user profile that has settings for that user. These parameters may include (1) a level of participation, (2) which processor (e.g., which financial partner), (3) velocity settings, (4) linked accounts, or any combination of these. The system may include any number of parameter settings in a user profile, more or fewer than described in this patent application.

The system of the invention operates any number of different financial partners (e.g., 1, 2, 3, 4, 5, 6, 7, 8, 507, 1001, 2054, 3096, or more), each of which may have a different API interface. In each user profile, the setting for which processor will indicate which financial partner a user is associated with. When transacting business for that user, the system will then know where (which bank) to direct transactions and which API to use so that the user's value exchange transactions (which are typically money exchanges) are transacted properly.

The setting of the level of participation will be the privileges or level of service the user will have. The level of participation setting may be based on a number of factors such as what information provided when the user signed up, how much money the user has in user's account, how many referrals the user has made, how many transaction the user has made, or total dollars transacted. This profile setting may be updated periodically as new information is gathered. Some examples of names the level of participation for a user may be "bronze," "gold," "silver," and "platinum" levels. The level of participation may be made visible to the user and may be used to build customer loyalty. In other embodiments of the invention, the level of participation may be hidden or otherwise not made available to the user.

When registering with the system, the system will give the user a choice of how much information the user wants to reveal. For example, the user may choose to reveal the user's mobile phone number and then fund the user's account with cash. This may be the minimum required to open account. The user will be given the option to provide other information, such as e-mail address, credit card number, social security number (e.g., for a credit check), checking account number, and so forth. In an implementation of the invention, the more information the user chooses to reveal, the higher the level of participation the user will achieve.

In an implementation, for the level of participation setting, the user may be one of four user states: (1) invited, (2) enrolled, (3) verified, and (4) advanced. In other implementations, there may be additional states. For the invited state, the user has been referred or sent viral money. Viral refers to the sending or receipt of money where one of the users is a user that has not previously registered with the system. A viral user may also be referred to as a nonmember user or unregistered user. Viral refers to a characteristic of the mobile payment system of the invention which encourages or allows current users to transact with nonmember users. As more users register and use of the system, the users will help spread news and bring in additional users, somewhat similarly to how viruses are transmitted. For example, in order for a nonmember user to receive the money, the nonmember will be encouraged to sign up as a member.

For the enrolled state, the user has entered basic information, such as a confirmed phone. The phone may be confirmed by the system calling the phone number provided by the user at sign-up. This call may be an automated or IVR-type call. There may be an incentive for the user to sign up, such as the user receiving money (e.g., $5) that is put into the user's account. The incentive may be referred to as a referral bonus and may be any amount. The referral bonus may be paid only to the referrer, only to the referee, or to both. In this state, the user may receive and request money.

For the verified state, the user's identity is known. The user provides address or other related contact information. A user in the verified state may receive, request, add (i.e., load), or withdraw (i.e., unload) money.

For the advanced state, the user has provided the user's social security number. In this state, for example, the user may sign up for with a particular banking partner to receive a card. This card may be a prepaid debit card. In other embodiments, the card may be a credit card. The user will be able to do everything a verified user can plus be able to instantly spend money wherever the card is accepted. The card may be accepted or usable through one or more networks including Visa, MasterCard, American Express, NYCE, PLUS, or STAR, or any combination of these. The card is linked to the user's account. A user without a card may be called a no-card user, while a user with a card may be called a carded user.

Some ways a person can get verified when signing up includes: For person information, the system may ask for address and driver's license number. An alternative is to ask for address and social security number. The information can be checked against a credit reporting agency's database such as the Equifax database. For a linked bank account, these may be verified using challenge deposits. For example, the system may make any number of small deposits to the user's account. The user tells the system the amount of those deposits to get verification. Alternatively, the user may verify through on-line instant account verification, where a user provide an on-line screen name and password. For adding credit or debit card, these may also be verified using challenge deposits. Some cards such as Visa and MasterCard may alternatively be verified using security codes and the like.

The velocity of participation is a setting that sets certain restrictions or limits on the account. Some examples on limits of an account are how many transactions a day a user may perform or amount of money that may be transferred in a transaction. There may some hard limits and soft limits. Hard limits will not change with intervention by a third party such as person changing the limit. Soft limits may change depending on the user's actions. For example, after the user has remained a member for six months, the user may be automatically allowed five transactions a day when the user's previous limit for some number fewer than five.

Typically the user will not have access or know the velocity of participation setting. However, in certain implementation, the user may be given velocity of participation information, such as credit or transaction limits.

Linked accounts are another feature that may be stored in a user's profile. However, any of the user settings discussed in this application, or combination of these, may be kept in separate location, not necessarily in the user's profile. Linked accounts are a feature of the system where multiple identities of a user are centralized or unified into a single account. There may be an anchor (e.g., such as an account number) for the user and multiple identities would be associated with this anchor. These identities may include multiple phone numbers, e-mail address, instant messenger identifiers, and so forth. The user would not need to know the account number or anchor to access the account. The user would be able to access the user's account through any of the associated identities.

Furthermore, in an implementation, to add identities to an account, the user would validate each of the new identities. This could be done through an IVR callback or responding to an SMS message in the case of a phone number. For an e-mail, it may be done through sending an e-mail with a unique URL or a pass code that the user would respond with on our webpage. And with an instant messenger ID, it could be done by responding to an IM.

Other options available in a user's profile may include preference settings for certain features. Such options may be set or modified by the user at any time by accessing an account maintenance screen. Also, the user may be asked whether to enable or disable options during the registration flow (see below). One feature is an auto accept and manual accept feature. When auto accept is turned on, payments sent to this member will automatically be accepted. When manual accept is enabled, payments sent to this member will need to be manually accepted or rejected.

System Flows

Figure 6:
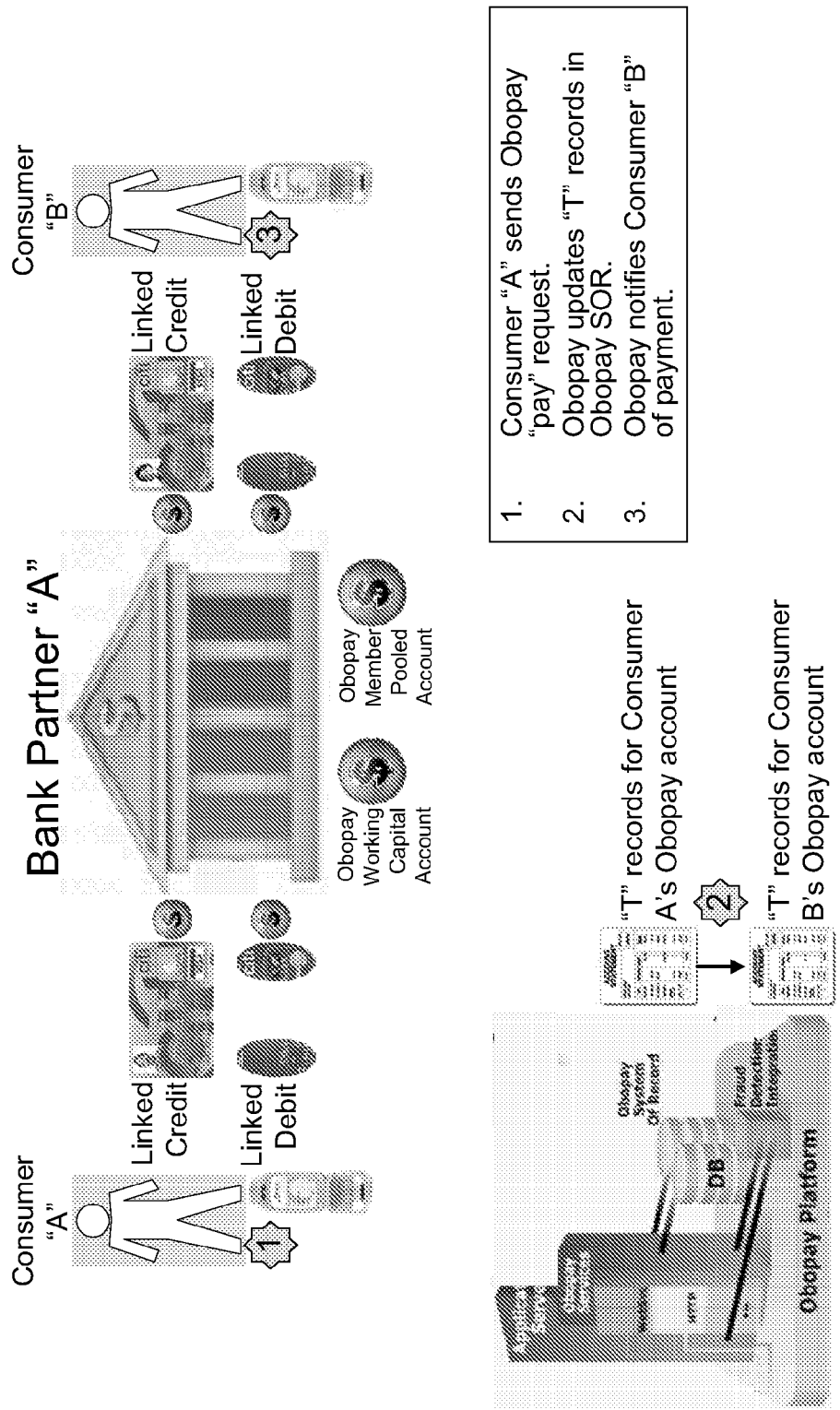
FIG. 6 shows an interbank person-to-person payment.

FIG. 6 shows an interbank person-to-person payment. This figure shows one consumer A sending money to another consumer B, where both consumers are members of the same bank partner, A. The mobile payment system of the invention will handle the transaction.

A basic flow of the transaction is: (1) Consumer A sends mobile payment system a pay request. This pay request may be provided by any one of the ways discussed in this patent. (2) The mobile payment system updates the T or transaction records in mobile payment system system-of-record (SOR) to reflect the transaction. These transaction records are managed by the mobile payment system. (3) The system (e.g., Obopay) notifies consumer B of payment. This may be by way of an electronic notification, e-mail, instant message, SMS message, or other notification.

Figure 7:
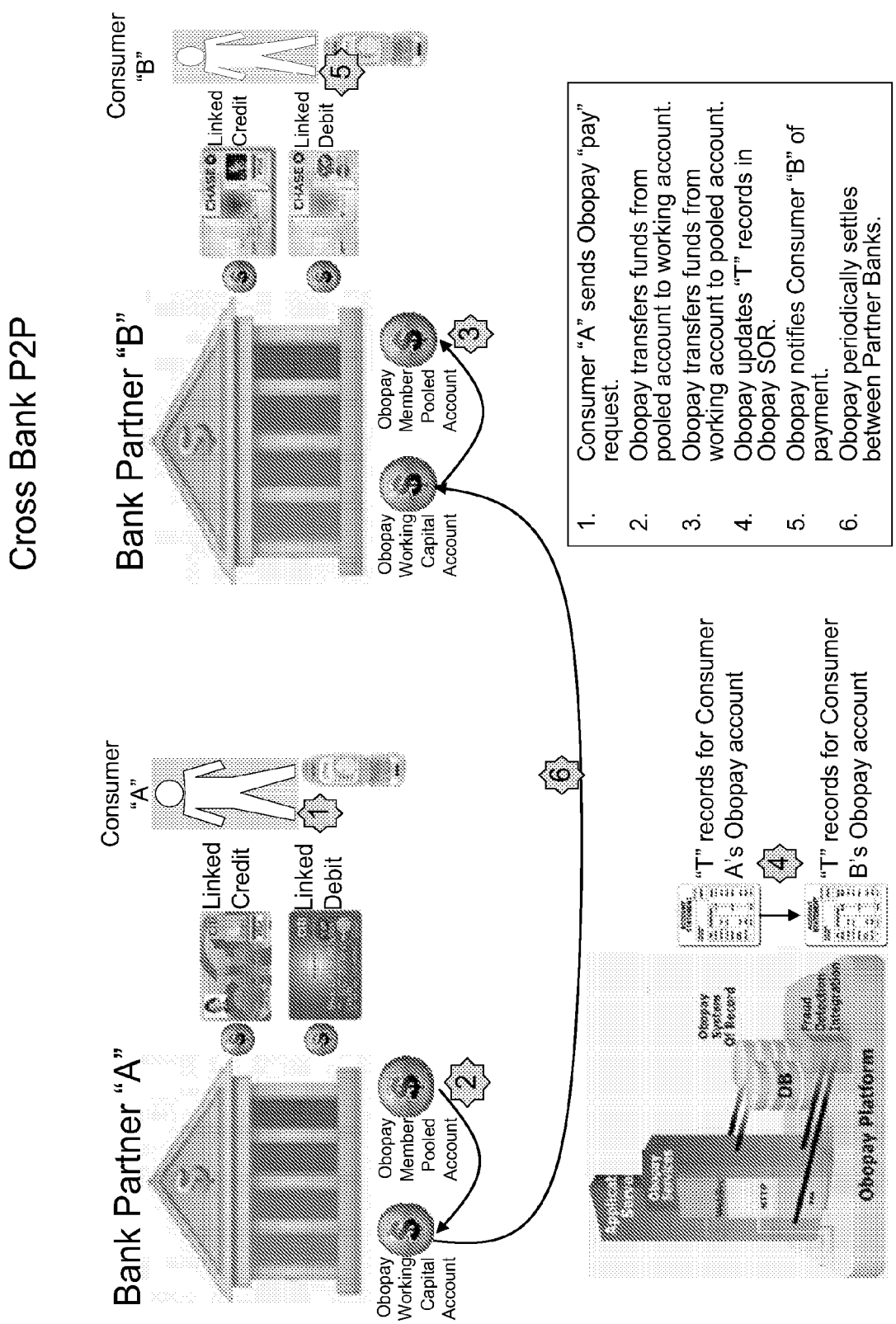
FIG. 7 shows a cross bank person-to-person payment.

FIG. 7 shows a cross-bank person-to-person payment. This figure shows one consumer A sending money to another consumer B, where the consumers are members of different bank partners. Consumer A has bank A, and consumer B has bank partner B. The mobile payment system of the invention will handle the transaction.

A basic flow of the transaction is: (1) Consumer A sends the mobile payment system pay request. (2) Mobile payment system transfers funds from pooled account to working account. (3) Mobile payment system transfers funds from working account to pooled account. (4) Mobile payment system updates T records in mobile payment system system-of-record. (5) Mobile payment system notifies consumer B of payment. (6) Mobile payment system periodically settles between partner banks. This settlement may occur in any periodic time period. Instead of real time, the settlement may be performed in a batch mode. For example, this may be performed once every 24 hours. The periods do not necessarily have to be equal time periods, but may be different time periods.

Figure 8:
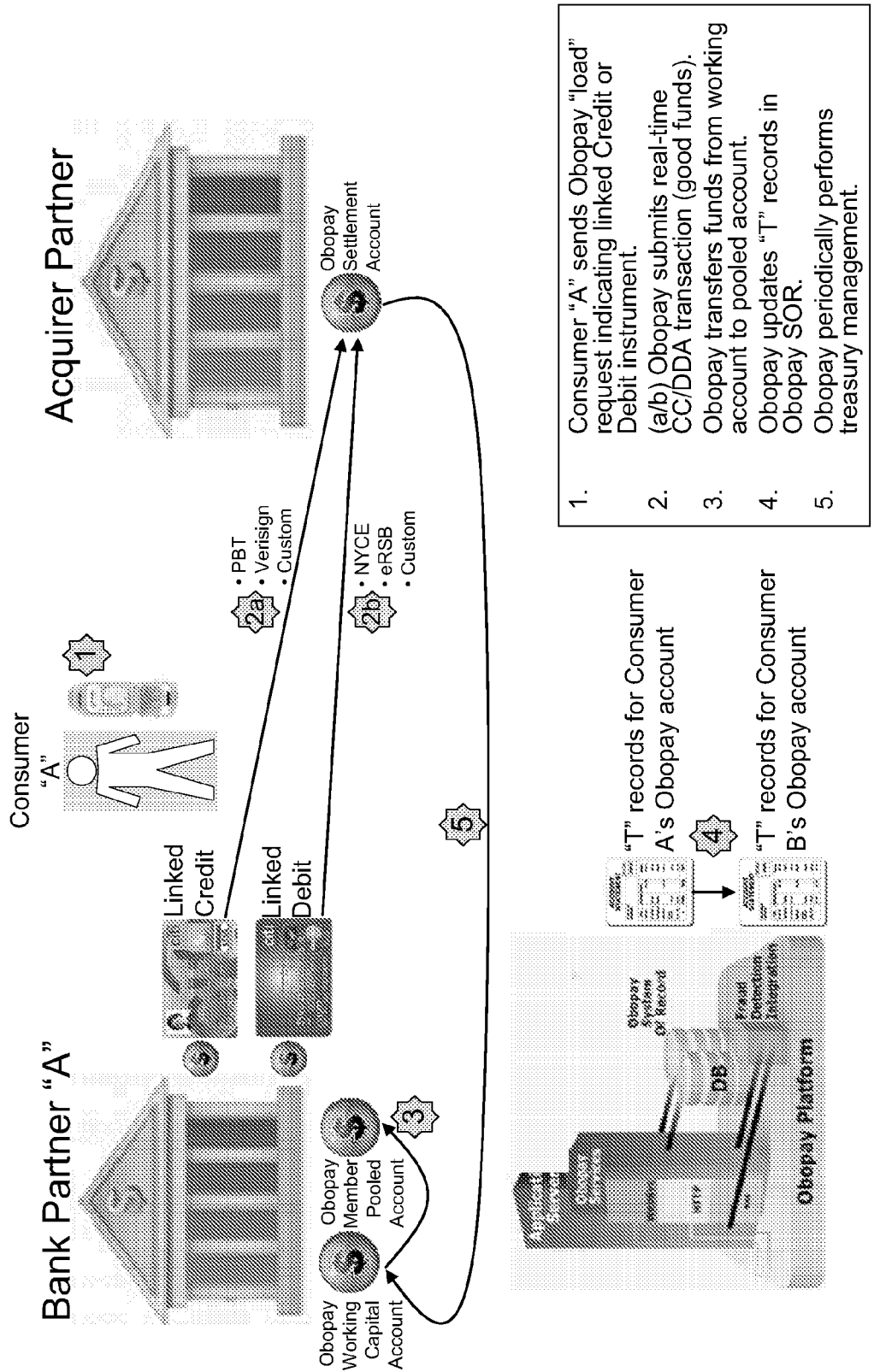
FIG. 8 shows a linked account load.

FIG. 8 shows a linked account load. This figure shows a consumer loading the user's mobile payment system account with funds from another source. For example, a user may want to transfer some funds into the user's mobile payment system account from a checking account or credit card.

A basic flow of this transaction is: (1) Consumer A sends mobile payment system "load" request indicating linked credit or debit instrument. (2) (a/b) Mobile payment system submits real-time credit card (CC)/DDA transaction (good funds). (3) Mobile payment system transfers funds from working account to pooled account. (4) Mobile payment system updates T records in mobile payment system system-of-record. (5) Mobile payment system periodically performs treasury management. This management may occur in any periodic time period. For example, this may be performed once every 24 hours. The periods do not necessarily have to be equal time periods, but may be different time periods.

A specific example of a credit card load. From the web, a user enters a credit card number to load $300 into the user's MPS card. The MPS obtains a $300 authorization from Pay-By-Touch (PBT) for the credit card transaction. The MPS sends a message to the financial partner supporting the MPS card initiating a $300 person-to-person payment from the MPS credit card account to the user's debit card account. The user's account is immediately credited with funds. PBT settles the credit card transaction and send a $300 ACH to the MPS settlement account at MPS's bank handling the settlement account. The MPS sends $300 ACH to the MSP credit card master account to replenish the funds.

Figure 9:
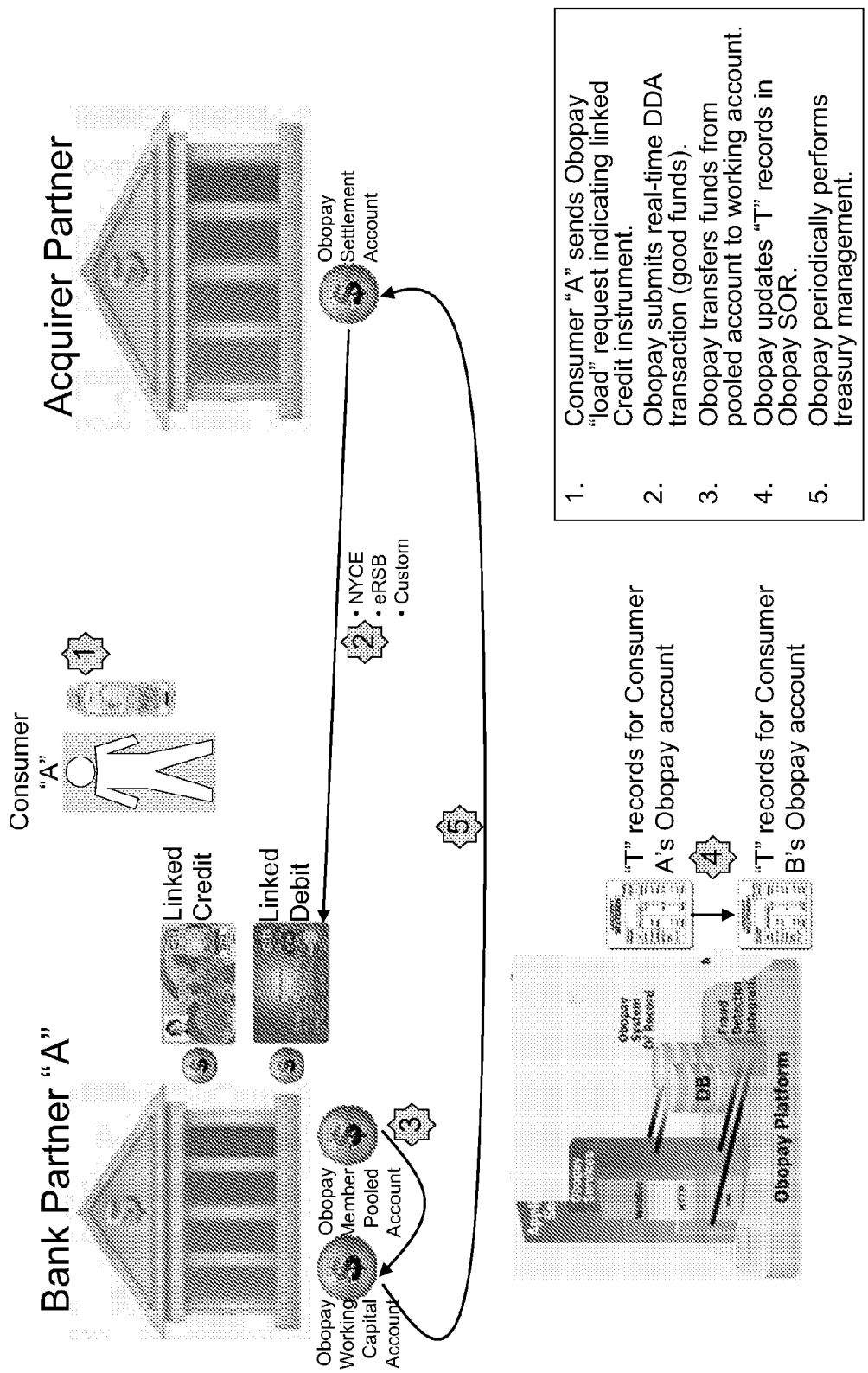
FIG. 9 shows a linked account unload.

FIG. 9 shows a linked account unload. This figure shows a consumer unloading funds from the user's mobile payment system account to another account. For example, a user may want to transfer some funds from the user's mobile payment system account to the user's checking account, credit card, or other account.

A basic flow of this transaction is: (1) Consumer A sends mobile payment system a load request indicating linked credit instrument. (2) Mobile payment system submits real-time DDA transaction (good funds). (3) Mobile payment system transfers funds from pooled account to working account. (4) Mobile payment system updates T records in mobile payment system system-of-record. (5) The system periodically performs treasury management.

In a specific embodiment, this invention relates to a payment system and more specifically, in a specific embodiment, to an on-line system for transacting payments using mobile phones.

There is a need for an on-line system that permits exchange and other transactions of money or other value using mobile phones.

In a person-to-person payment system, existing members of a payment system can send funds to nonmembers (who may also be referred to as unregistered users) with the intent that the nonmember becomes a member. This ability of a payment system may be referred to as "viral" because it promotes new member registrations in an exponential spreading fashion.

With respect to a person-to-person payment system, this invention addresses the ability for existing members of a payment system to send funds to nonmembers with the intent that the nonmember becomes a member. This ability of a payment system may be referred to as "viral" because it promotes new member registrations in an exponential spreading fashion. Some elements of the viral capability include the following, which are not listed in any particular order.

(1) A payment system allows existing members to send funds to nonmembers via some unique identifier or "id." This unique identifier may be commonly available. Some examples of such identifiers include e-mail addresses, phone numbers (e.g., land line, voice over IP, mobile phone, pager, or fax), social security numbers, account number, license plate number, instant messenger username, and others. The identifier may be selected by a user, such as a nonmember choosing a phone number or e-mail address.

(2) The payment system notifies the existing member that the "send funds" transaction that they are about to perform is to a nonmember and give the existing member an opportunity to cancel this transaction as a result.

(3) In the event that the existing member chooses to send funds to a nonmember, the payment system must notify the nonmember that funds have been sent to them via various commonly available communication mechanisms (such as e-mail, phone, and others).

(4) The payment system should allow the "invited" nonmember to accept or decline the funds attempting to be sent from the existing member.

(5) If the invited nonmember decides to accept the funds from the existing member, then the payment system should provide the ability for the nonmember to register via commonly available communication mechanisms (such as e-mail, phone, and others).

(6) In order to complete a viral transaction, the payment system will ultimately facilitate a transfer of funds from the existing members account to the new members account.

Below are several embodiments of techniques of performing viral funds transfer within a payment system.

EMBODIMENT 1A

Follow-up Payment Reminder. Existing member is reminded of payment upon new member signup. In the examples below, Obopay is used as an example of a specific payment system, but other payment systems may be used. A payment system may be called or known by any name. The obopay.com web site is specifically identified, but any appropriate web site, web site name, or IP address may be used. Also, the invention may be used in the context of other network infrastructures, not just the Internet.

1. Existing member user A decides to invite nonmember user B to join by sending B money, which B has to claim by enrolling as an member.

2. User A sends a payment transaction to B by inserting B's mobile phone number and the dollar amount. The system does not initially distinguish between payments sent to members and nonmembers.

3. If the mobile phone number is not for a current member, user A receives the following message, "Note: Your payment to nonmember is pending."

4. User A also receives an e-mail worded as follows: "Thank you for your referral. We have contacted your friend and invited them to sign up for our system."

5. The payment sent to B is debited from A's account and it is held in suspense pending B's enrollment.

6. User B receives a message saying that A has sent them money and that B can get the money by enrolling at obopay.com.

7. User B enrolls at the system web site (e.g., obopay.com).

8. After user B successfully enrolls, B's account is automatically funded with A's payment.

EMBODIMENT 1B

Figure 10:
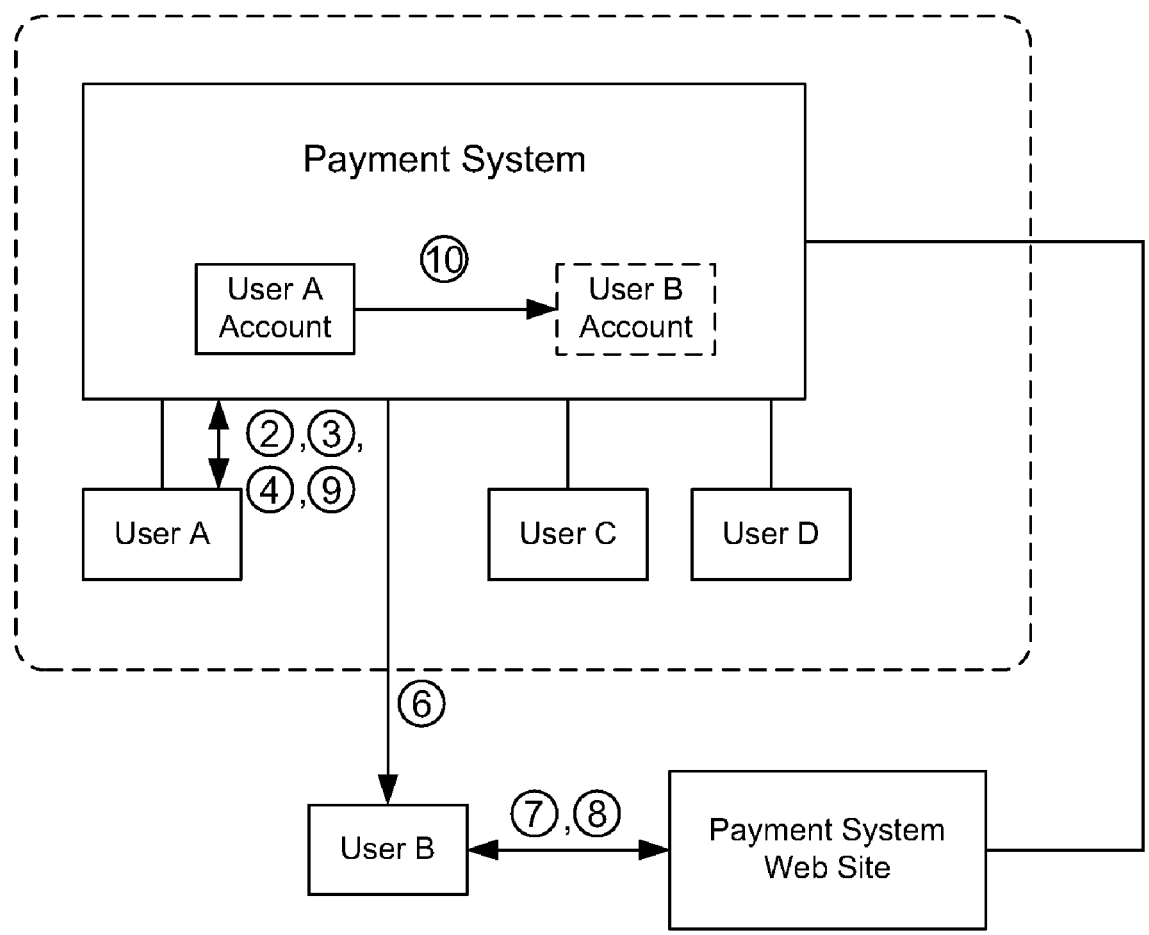
FIG. 10 shows a payment system and a person-to-person payment according to a technique of the invention.

FIG. 10 shows a payment system and a person-to-person payment according to a technique as described for embodiment 1B of the invention.

1. Existing member user A decides to invite nonmember user B to join by sending B money, which B has to claim by enrolling as a member.

2. User A sends a payment transaction to B by inserting B's mobile phone number and the dollar amount. The system does not initially distinguish between payments sent to members and nonmembers.

3. If the mobile phone number is not for a current member, user A receives the following message "Note: Your payment has been sent to a nonmember user. Would you like us to extend an invitation for them to join? Yes/No."

4. If the answer to step 3 is yes, user A also receives an e-mail worded as follows: "Thank you for your referral. We have contacted your friend and invited them to sign up for our system."

5. The payment is not debited from user A's account.

6. User B receives a message saying that A has invited B to join the system so that A can send B money.

7. User B enrolls at the system web site (e.g., obopay.com).

8. After B successfully enrolls, B is notified that A wants to send them money and that B can do a "Request Pay" for the payment. If B agrees, B is shown a prefilled Request Pay transaction with A's phone number and the original payment amount filled in.

9. User A receives a "Request Pay" and agrees to the payment

10. The money is debited from A's account and credited to B's account. B is notified.

EMBODIMENT 2

Personal Reserved Funds Viral—Existing members are allowed to set aside funds that are reserved for viral payments. For example, a user may set aside a certain number of dollars of the user's account to settle viral transactions. These funds will not be otherwise available to the user for use in nonviral transactions (e.g., spending by debit card). In an implementation, the user may change reserved amount through a user account maintenance function.

EMBODIMENT 3

Conversational Viral—The complete viral lifecycle occurs in real-time with both parties being notified of the others "steps" along the way. The ultimate funds transfer is then simply a transfer between two members.

EMBODIMENT 4

Promissory Viral—The existing member promises to pay the invited member if or when they register. The existing member's funds would be reserved for the follow-up payment once the invited member registers.

EMBODIMENT 5

Split Funds Viral—The payment system incentivizes existing members to make viral payments by offering a funds split where the payment system matches the payment amount via fixed or percentage amounts.

EMBODIMENT 6

Request Funds Viral—Instead of the existing member sending funds to a nonmember the existing member is requesting funds from a nonmember.

An implementation of the invention may include any of the features described above. In a system of the invention, the above embodiments may be implemented individually or in combination with any other embodiment or embodiments.

A specific implementation describes using a mobile telephone number as an identifier for a user. However, any identifier may be used for each user, such as any phone number (e.g., home phone number, work phone number, voice-over-IP phone number, fax, or pager), e-mail address, instant messenger user name, social security number, driver's license number, membership number, credit card number, debit card number, or others.

E-mail has been discussed as a technique to send messages between users, but other communication techniques may be used including voice mail, automated voice messaging, instant messages, or text messaging. User A and user B have been discussed merely as representative of two of the numerous users a system may have. A system of the invention may have any number of users.

FIG. 1 shows an overview block diagram depicting a mobile payment system between two or more persons utilizing the present invention. In a system of the invention, user A sends funds to user B via a unique identifier or ID. The unique identifier may be commonly available. Examples include phone numbers (e.g., land-line, voice-over-IP, mobile phone, pager, or fax), e-mail address, social security number, account number, license plate number, instant messenger username, and others. This identifier may be used to contact a user independently of going through the system of the invention (e.g., a phone number or e-mail address where a user may be contacted directly, without involving the system).

Each unique identifier may be only associated with one user to ensure account and system security. User A may also provide details of the financial transaction, such as the amount to be transferred, or the form of the payment, or combinations of these, and a PIN number if requested to validate an account.

The system identifies user A as a member, and may check the PIN number, validate the account, and check the balance for user A's account. In the event that user A's account lacks sufficient funds for the financial transaction, the system may send an electronic notification to user A for insufficient funds. If user A's account has sufficient funds for the transaction, the system also notifies user B of the pending transaction via mobile technology. Due to the immediate electronic notifications Users A and B received, it will seem as though the financial transaction occurs almost instantaneously.

The system may allow users to set preferences regarding acceptance of transactions. If user B has selected an auto-accept setting (selected when a user registers on the system) for automatically accepting payments, the funds are transferred from user A's account to user B's account immediately. If user B has selected a manual-accept setting, the funds are transferred only after user B approves the transaction. The system may also include a setting for users to dictate that they will only accept transactions from specified members, or in the converse, they will not accept payments from specified members.

If user B has not yet approved the transaction after a certain number of days set by the system, such as thirty days, the system may automatically cancel the transaction. The system may then send electronic notifications to both user A and user B notifying both of the canceled transaction. User B may also have the option to decline the transaction, in which case, user A may be notified of the declined payment through electronic notification.

In the event user A has sufficient funds, and user B accepts the transaction, the amount is debited from user A's account and credited to user B's account. The transactions may be delayed due to inherent delays in the electronic financial transaction system.

Some specific examples of flows are presented in this application. However, it should be understood that the invention is not limited to the specific flow and steps presented. A flow of the invention may have additional steps, which may not necessarily described in this application, different steps which replace some of the steps presented, fewer steps or a subset of the steps presented, or steps in a different order than presented, or any combination of these.

Further, the steps in other implementations of the invention may not be exactly the same as the steps presented. As a specific example, the unique or electronic identifier (ID) is described as user B's mobile number. In other embodiments of the invention, the identifier is not limited to user B's telephone number. The identifier may also be user B's instant messenger username or email address in other implementations of the invention.

Another example of a possible variation in the flows, without departing from the scope of the invention, is the specific messages users A and B receive in various steps in the flows. In other embodiments of the invention, these messages may be different from those specifically identified in this application or some messages may not be sent, and combinations of these.

Figure 11:
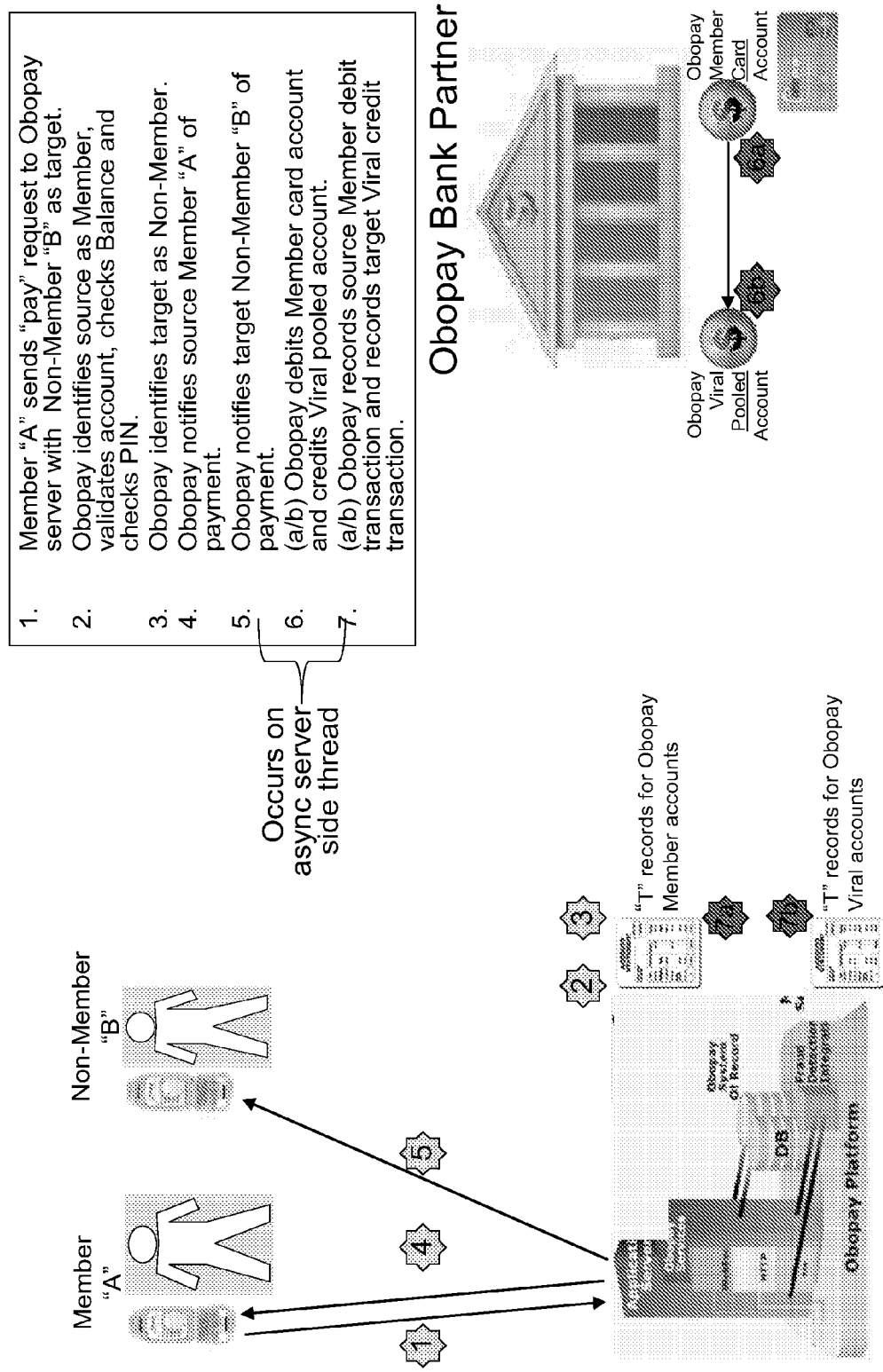
FIG. 11 shows a method for performing a transaction between a member with a card and an unregistered user.

FIG. 11 shows a method for performing a transaction between a member with a card and an unregistered user. This flow includes: (1) Member A sends "pay" request to the mobile payment service server with nonmember B as target. (2) The mobile payment service identifies source as member, validates account, checks balance and checks PIN. (3) The mobile payment service identifies target as nonmember. (4) The mobile payment service notifies source member A of payment. (5) The mobile payment service notifies target nonmember B of payment. (6) (a/b) The mobile payment service debits member card account and credits viral pooled account. (7) (a/b) The mobile payment service records source member debit transaction and records target viral credit transaction. Steps 6 and 7 may be asynchronous server side threads. This means these actions in an embodiment occur asynchronously. The server requests the actions, but they are not necessarily performed by the server itself, so the completion of the actions are independent of calling server procedure.

Figure 12:
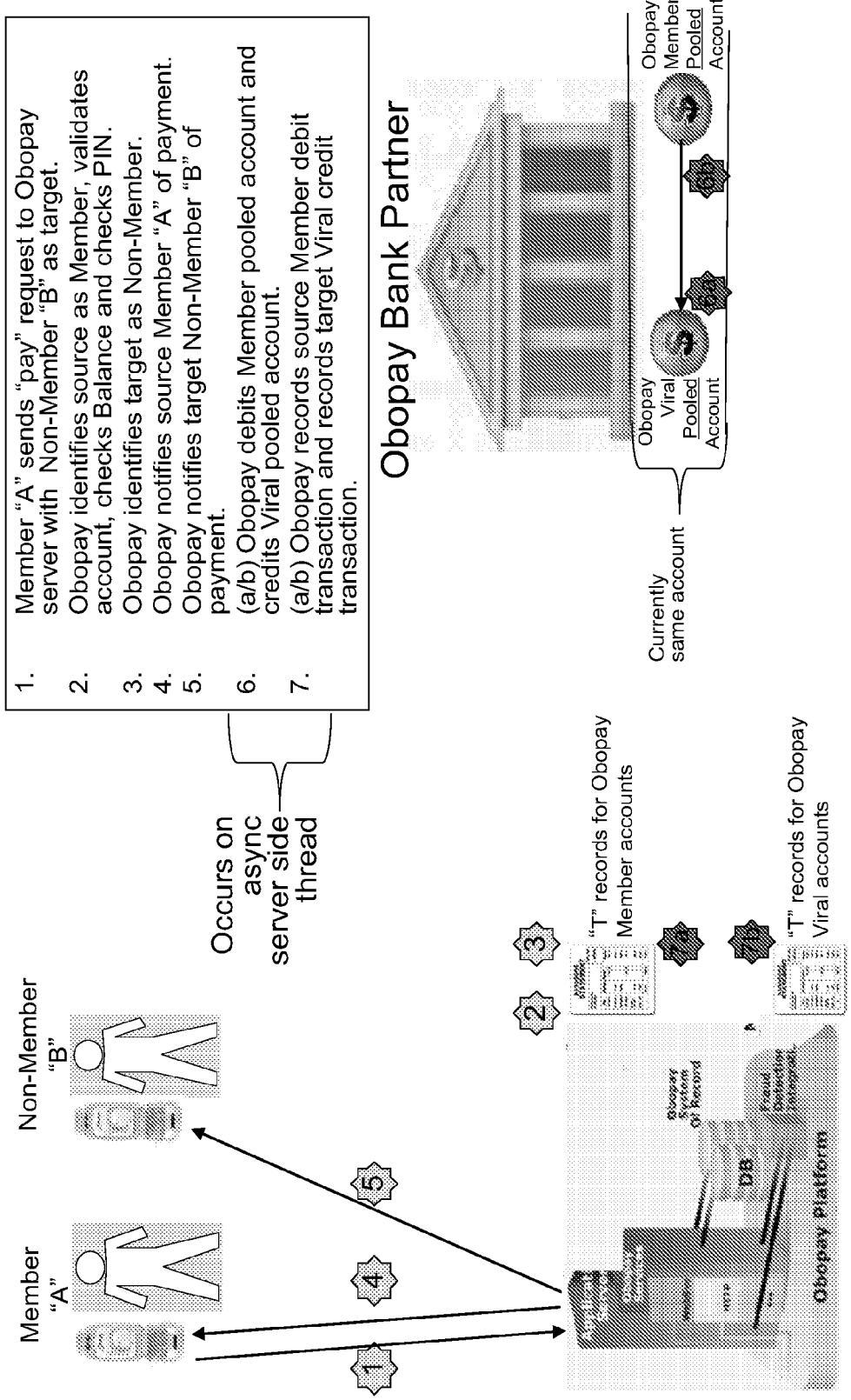
FIG. 12 shows a method for performing a transaction between a member without a card and an unregistered user.

FIG. 12 shows a method for performing a transaction between a member without a card and an unregistered user. The flow includes: (1) Member A sends "pay" request to Mobile payment service server with nonmember B as target. (2) The mobile payment service identifies source as member, validates account, checks balance, and checks PIN. (3) The mobile payment service identifies target as nonmember. (4) The mobile payment service notifies source member A of payment. (5) The mobile payment service notifies target nonmember B of payment. (6) (a/b) The mobile payment service debits member pooled account and credits viral pooled account. (7) (a/b) The mobile payment service records source member debit transaction and records target viral credit transaction. Steps 6 and 7 may be asynchronous server side threads.

Figure 13:
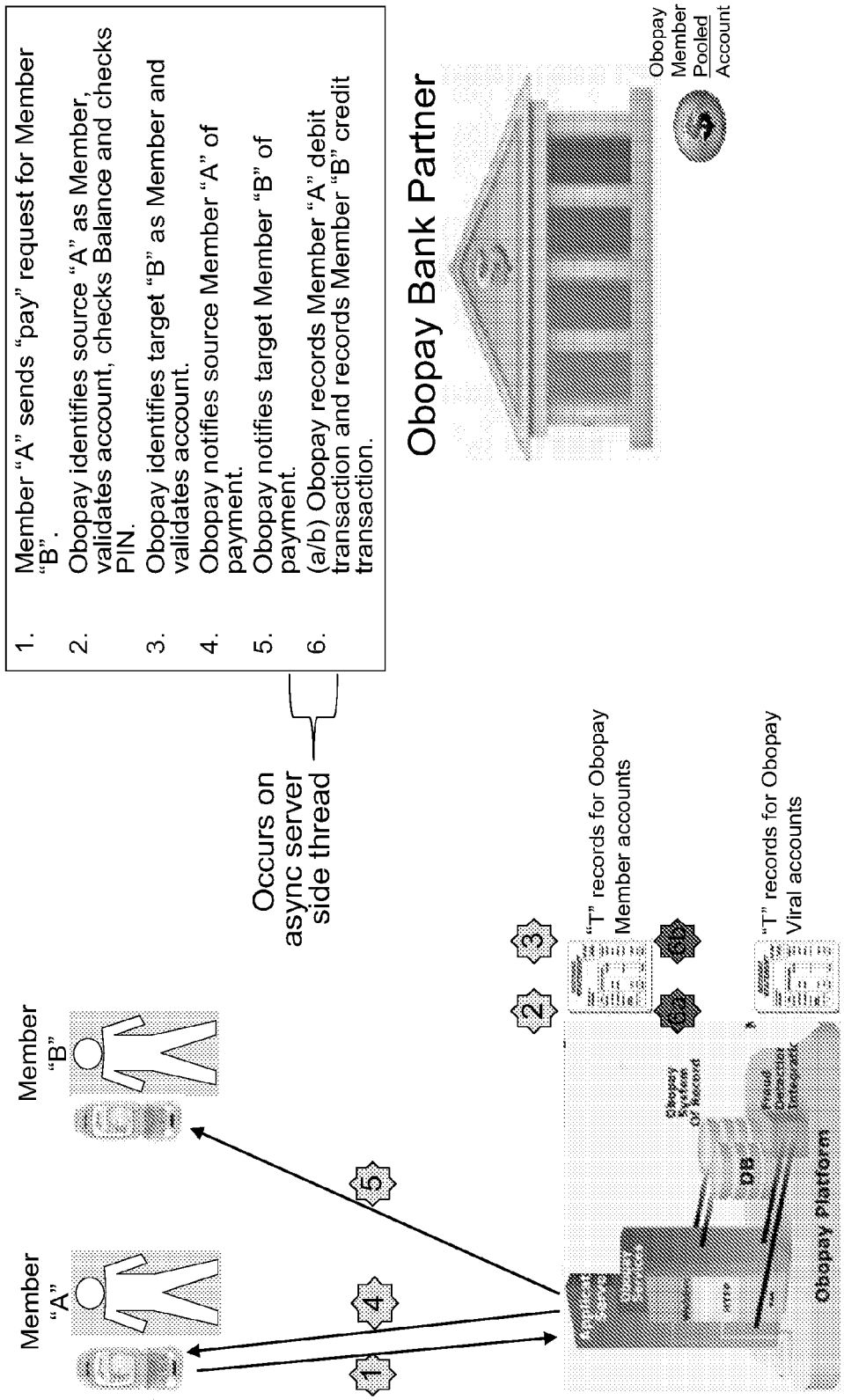
FIG. 13 shows a method for performing a transaction between a no-card member and another no-card member.

FIG. 13 shows a method for performing a transaction between a no-card member and another no-card member. The flow includes: (1) Member A sends "pay" request for member B. (2) The mobile payment service identifies source A as member, validates account, checks balance, and checks PIN. (3) The mobile payment service identifies target B as member and validates account. (4) The mobile payment service notifies source member A of payment. (5) The mobile payment service notifies target member B of payment. (6) (a/b) The mobile payment service records member A debit transaction and records member B credit transaction. Step 6 may occur using an asynchronous server side thread.

Figure 14:
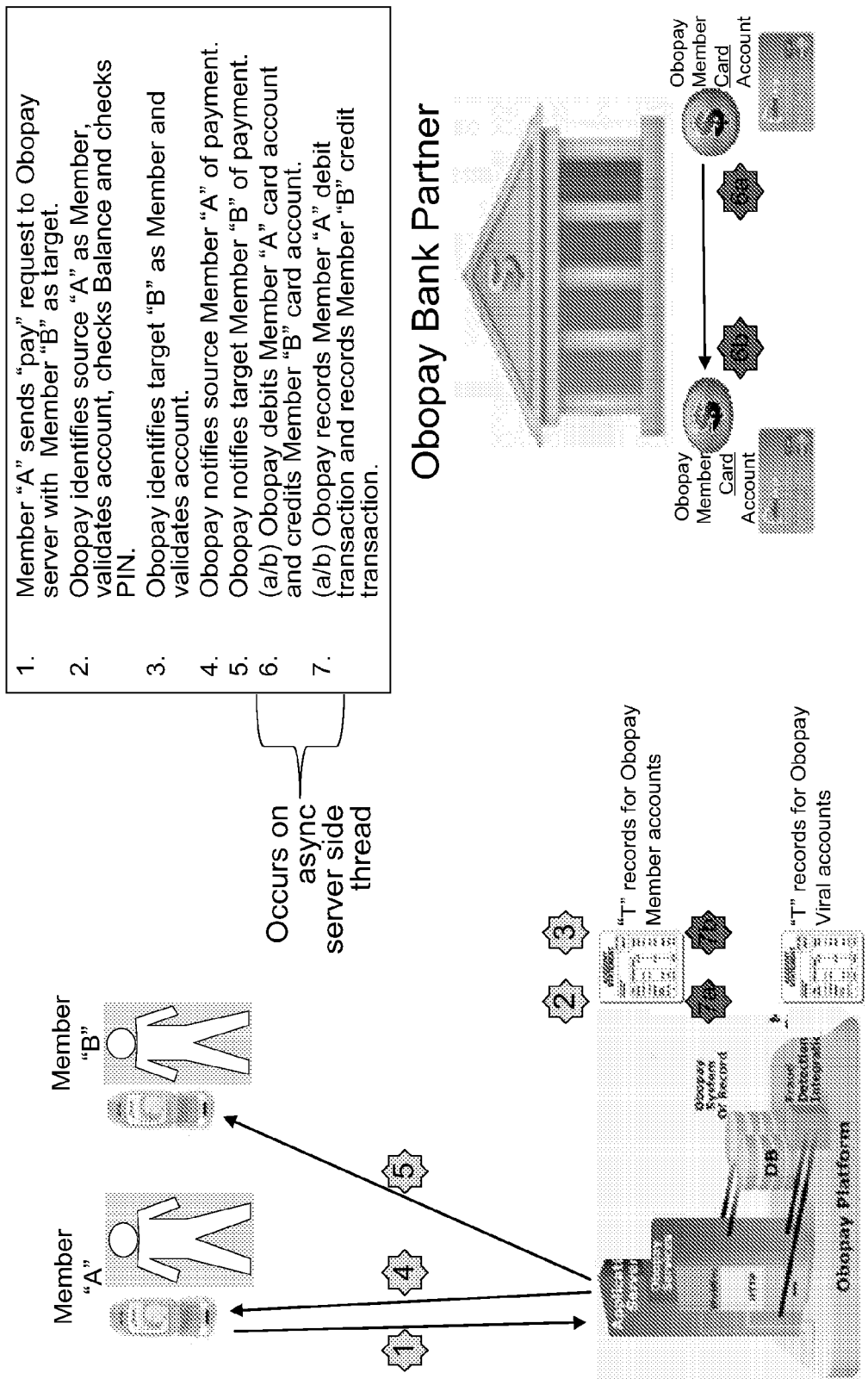
FIG. 14 shows a method for performing a transaction between a carded member and another carded member.

FIG. 14 shows a method for performing a transaction between a carded member and another carded member. The flow includes: (1) Member A sends "pay" request to the mobile payment service server with member B as target. (2) The mobile payment service identifies source A as member, validates account, checks balance, and checks PIN. (3) The mobile payment service identifies target B as member and validates account. (4) The mobile payment service notifies source member A of payment. (5) The mobile payment service notifies target member B of payment. (6) (a/b) The mobile payment service debits member A card account and credits member B card account. (7) (a/b) The mobile payment service records member A debit transaction and records member B credit transaction. Steps 6 and 7 may be asynchronous server side threads.

Figure 15:
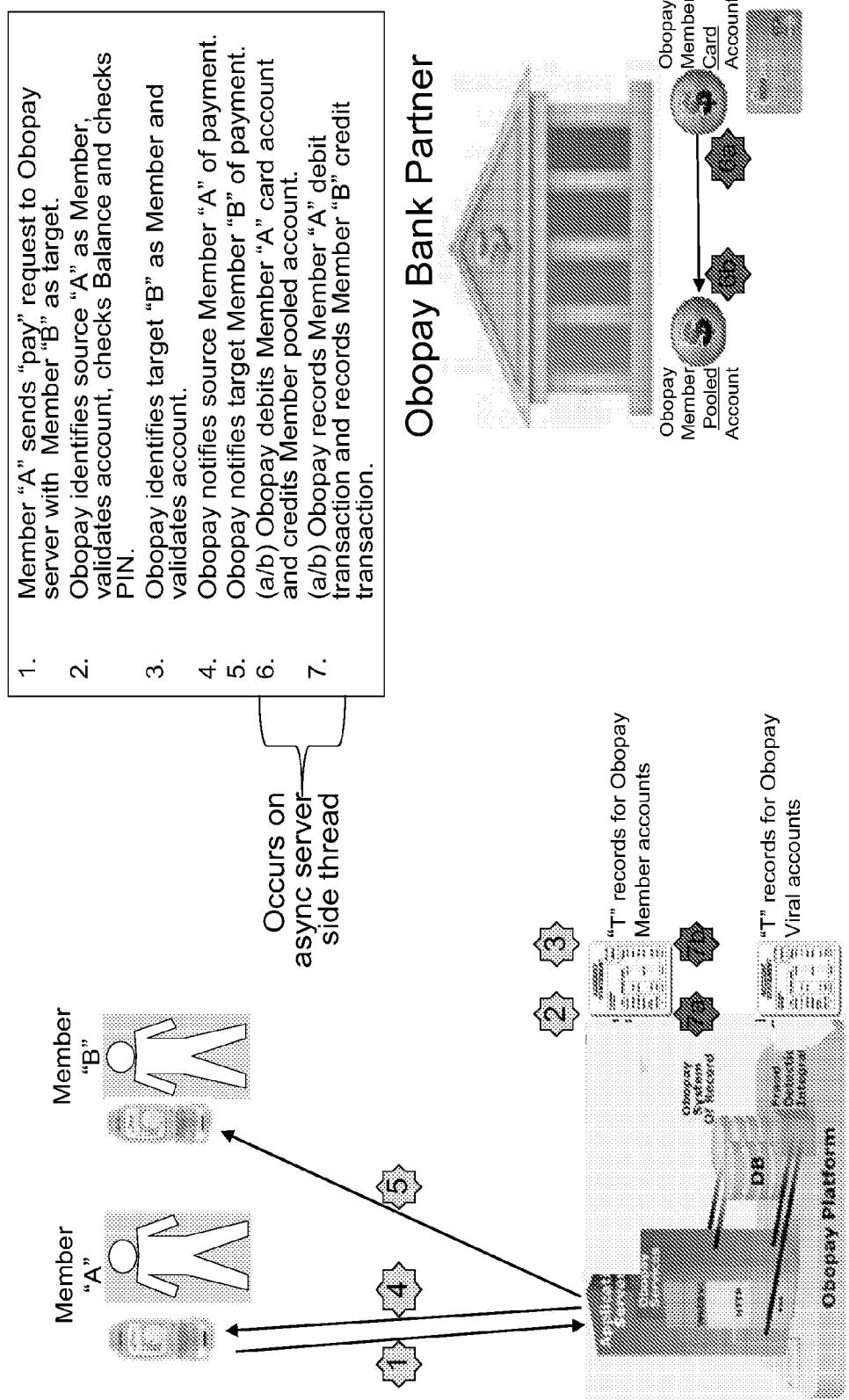
FIG. 15 shows a method for performing a transaction between a carded member and a no-card member.

FIG. 15 shows a method for performing a transaction between a carded member and a no-card member. The flow includes: (1) Member A sends "pay" request to the mobile payment service server with member B as target. (2) The mobile payment service identifies source A as member, validates account, checks balance, and checks PIN. (3) The mobile payment service identifies target B as member and validates account. (4) The mobile payment service notifies source member A of payment. (5) The mobile payment service notifies target member B of payment. (6) (a/b) The mobile payment service debits member A card account and credits Member pooled account. (7) (a/b) The mobile payment service records member A debit transaction and records member B credit transaction. Steps 6 and 7 may be asynchronous server side threads.

Figure 16:
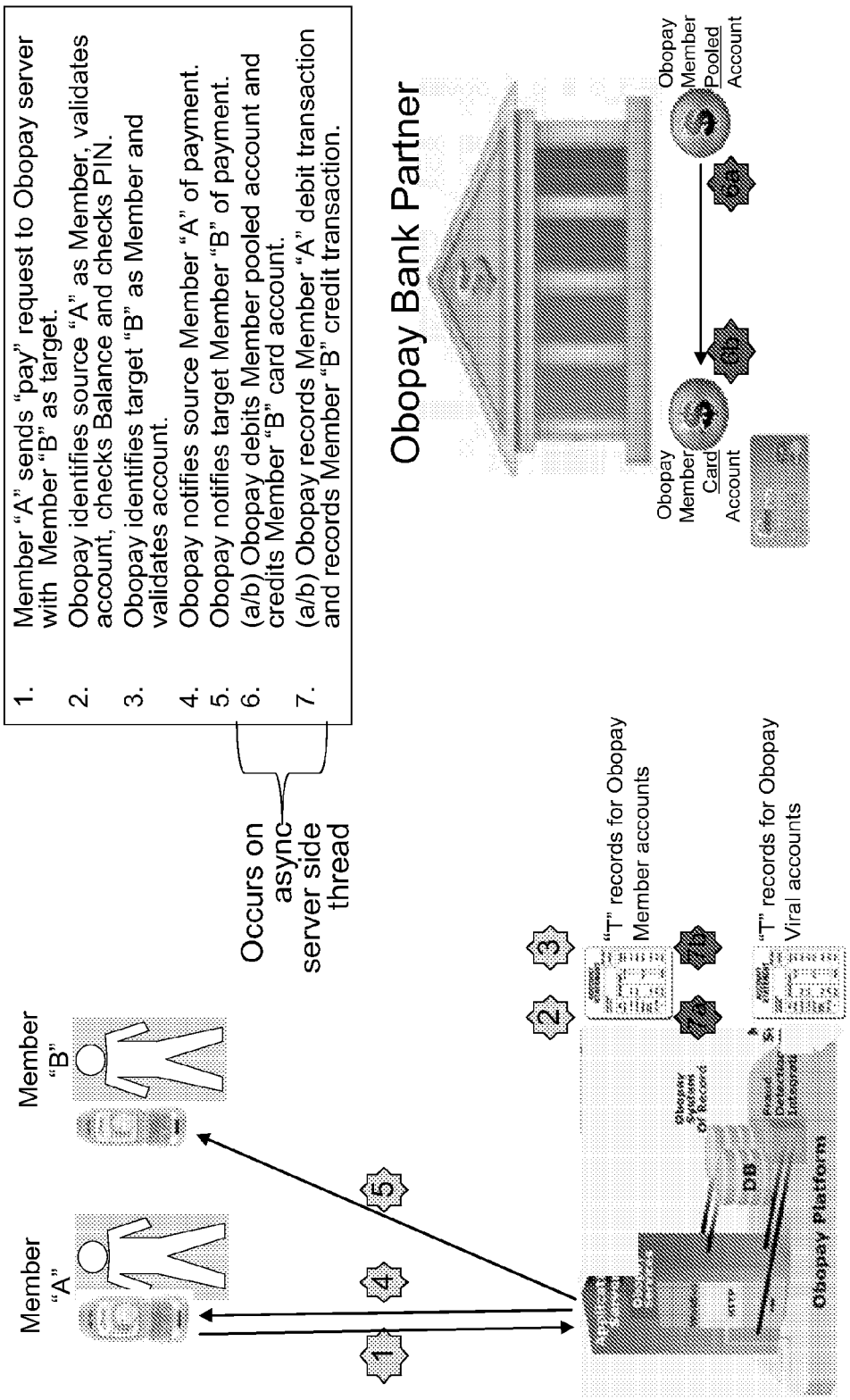
FIG. 16 shows a method for performing a transaction between a no-card member and a carded member.

FIG. 16 shows a method for performing a transaction between a no-card member and a carded member. The flow includes: (1) Member A sends "pay" request to the mobile payment service server with member B as target. (2) The mobile payment service identifies source A as member, validates account, checks balance, and checks PIN. (3) The mobile payment service identifies target B as member and validates account. (4) The mobile payment service notifies source member A of payment. (5) The mobile payment service notifies target member B of payment. (6) (a/b) The mobile payment service debits member pooled account and credits member B card account. (7) (a/b) The mobile payment service records member A debit transaction and records member B credit transaction. Steps 6 and 7 may be asynchronous server side threads.

FIG. 17 shows a method of registration for an unregistered user. The flow includes: (1) Member-to-be A submits registration request. (2) New member account is created. (3) Identity risk controls are checked for new member and account is updated accordingly. (4) Check for viral records associated to new Member. (5) (a/b) The mobile payment service debits viral pooled account and credits member pooled account. (6) (a/b) The mobile payment service records source viral debit and records target member credit. (7) Check for incentives applicable to new Member. (8) (a/b) The mobile payment service debits Incentive account and credits Member pooled account. (9) The mobile payment service records new member incentive credit. Steps 5, 6, and 7 may be asynchronous server side threads.

Figure 18:
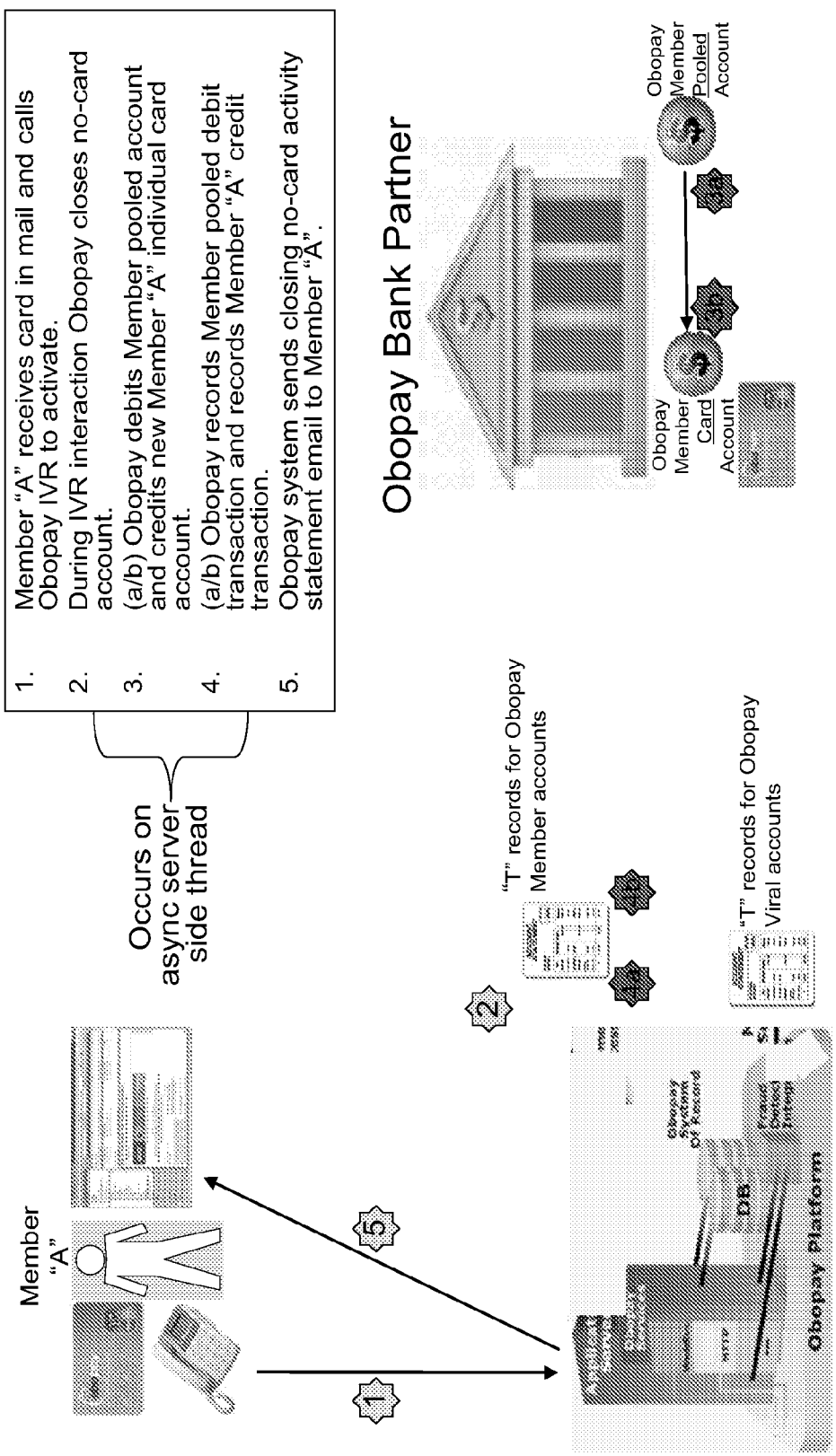
FIG. 18 shows a method of activating a card.

FIG. 18 shows a method of activating a card. The flow includes: (1) Member A receives card in mail and calls The mobile payment service IVR to activate. (2) During IVR interaction the mobile payment service closes no-card account. (3) (a/b) The mobile payment service debits member pooled account and credits new member A individual card account. (4) (a/b) The mobile payment service records member pooled debit transaction and records member A credit transaction. (5) The mobile payment service system sends closing no-card activity statement email to member A. Steps 3 and 4 may be asynchronous server side threads.

In an implementation, the system handles near proximity electronic payments, such as through the use of NFC, Bluetooth, RFID, infrared beam, LED beam, or other near proximity technologies. A situation may be that members A and B are physically near each other and they wish to perform an electronic payment. This could be a consumer-to-consumer or consumer-to-merchant scenario. This could be a send funds, get funds, or any other money transfer scenario.

A basic flow of such a transaction is: (1) A and B agree to a near proximity electronic payment transaction. (2) B selects "make ready for near proximity receive." Device queries for PIN, B enters PIN, device activates receive mode. (3) A selects "make ready for near proximity send." Device queries for PIN, A enters PIN, device activates send mode. (4) A and B place devices within suitable proximity range. A and B are allowed a limited amount of time to perform this step otherwise devices will timeout. (5) A and B devices recognize each other and transmit payment information to each other. (6) A and B review confirmation dialog on devices and select "confirm." (7) Payment transaction commences.

The system allows multichannel and cross-channel transactions. In particular, payments may be requested from any of the available channels (e.g., mobile phone, instant messenger, e-mail, Web, debit card, WAP, SMS message, or dedicated mobile phone application) and the transaction may be directed to any of the available channels, in any combination. For example, someone may request payment from instant messenger to mobile phone, from web to mobile phone, from mobile phone to instant messenger, from WAP to instant messenger, from instant messenger to e-mail, from e-mail to mobile phone, from e-mail to instant messenger, from Web to SMS, from SMS to e-mail, or any other combination. The system may also be used to pay through payment terminals, interactive web sites, pay for services or media content through television (e.g., pay for on-demand movies by a cable or satellite provider), prepaid phones, and many others. For example, a user may pay a merchant via instant messenger. The system may support payment to or through vending machines, parking meters, kiosks, pay phones, airline ticket kiosks, and many others.

Flow A below shows an implementation of performing transaction between a registered user (user A) member and an unregistered user (user B).

| Flow A | |
|---|---|
| Step | Action |
| 1 | Existing user A decides to send some money to user B, an unregistered user. A sends a message to the mobile payment system with B's mobile phone number and the transaction amount. |
| 2 | The mobile payment system checks whether A's account has sufficient funds to cover the transaction. |
| 3 | If there are insufficient funds, A is sent a message:<br>"Insufficient funds.<br>[tel #], [value], [trans #]"<br>B does not receive a message.<br>If there are sufficient funds, proceed to next step. |
| 4 | Check whether B is a registered or unregistered user. If B's mobile phone number is not recognized as a registered user, A receives the following message:<br>"Your request has been accepted and will be processed.<br>[tel #], [value], [trans #]<br>Request pending non-registered user." |
| 5 | Place a hold on the transaction amount in A's account. |
| 6 | B receives the following message:<br>"Payment pending from<br>[tel #], [value], [trans #]<br>Go to system website to register." |
| 7 | Before B approves payment, A may cancel payment. If so, A and B will be sent message:<br>"Payment canceled.<br>[tel #], [value], [trans #]"<br>If more than 30 days passes after A initiates the transaction and before B approves payment, the transaction is automatically canceled. Then, A and B will be sent message:<br>"Payment canceled.<br>[tel #], [value], [trans #]"<br>After 30 days passes, remove hold on the transaction amount in A's account. |
| 8 | B registers with the mobile payment system. An account is created for B on the system. |
| 9 | After B successfully enrolls, B is notified that A wants to send B money. B is presented with a screen asking whether B will accept payment from A, decline payment from A, or request a change in the pending transaction from A. |
| 10 | If B declines the payment, the transaction is canceled and A is sent a message:<br>"Payment declined.<br>[tel #], [value], [trans #]" |
| 11 | If B requests a change, B will be presented with a screen where B will be able to negotiate or request a change in a term of the transaction from A.<br>If B does not request a change, proceed to step 13. |
| 12 | If B wants to change the transaction (e.g., change the transaction amount), a message is sent to A regarding the proposed change.<br>A will be able to accept or reject B's proposed change. |
| 13 | If B accepts payment from A, system checks whether A has sufficient funds to cover transaction. If not, A and B will be sent message:<br>"Insufficient funds.<br>[tel #], [value], [trans #]" |

-continued

Flow A

| Step | Action |
|---|---|
| 14 | If A has sufficient funds, A is sent message:<br>"Payment accepted.<br>[tel #], [value], [trans #]" |
| 15 | The transaction amount is debited from A's account and credited to B's account. |

In step 1, user A identifies user B to the mobile payment system via user B's mobile phone number. In other implementations of the invention, user A may identify user B through other means, such as user B's e-mail address, instant messenger name, or other unique identifiers. These identifiers may be electronic identification identifiers and may be identifiers that maybe used to identify B even outside of context of the mobile payment system. In other words, the identifier is not necessarily unique to the mobile payment system (e.g., account number).

In a specific implementation, the mobile payment system does not permit an existing registered user to request payment from an unregistered user. In another embodiment, a user may request payment from an unregistered user.

In step 2, the mobile payment system checks whether A's account has sufficient funds to cover the transaction. The mobile payment system may also perform a PIN and account validation or other validation steps to ensure A's account has not been suspended, has sufficient funds, and so forth. These steps have been omitted from the above flow to improve clarity.

In step 3, the mobile payment system notifies user A of insufficient funds via SMS messaging. In another embodiment of the invention, user A may receive this message in other forms, such as email, SMS messaging, or other forms of mobile communication. In some embodiments of the invention, the user may not receive this message at all, such as the case when user A has decided and indicated to the system not to receive such messages. The flow may also be applied to e-mail payment system or other payment systems, mobile, nonmobile (i.e., where a mobile phone is not involved in the transaction), or otherwise.

In step 4, the mobile payment system determines user B's is unregistered and notifies user A of this. In another embodiment of the invention, the system may allow user A to send payment to user B regardless of user B's unregistered status, and thus may skip this step.

In step 5, the mobile payment system places a hold on A's account for the transaction amount. The transaction amount is not debited from A's account until the transaction amount is debited in step 15.

In step 6, unregistered user B is sent a message by the mobile payment system requesting user B's registration with the system. This message may be sent to user B's mobile phone via SMS messaging, email, MMS messaging, instant messaging, or other forms of mobile communication.

In step 7, user A is provided the option of being able to cancel the payment before user B accepts it. The payment may also be automatically void if more than 30 days has elapsed after User A sends the payment and before user B accepts the payment. The number of days after which a transaction is automatically canceled may vary. For example, the number of days may be any number such as 5, 10, 14, 15, 16, 21, or more or fewer days than 30. Also, users A and B may not receive a message notifying them of the canceled transaction.

In step 8, the system creates an account for user B upon user B's registration. In another embodiment of the invention, the system may not require user B to register with the system and may instead automatically link the system to one of user B's bank accounts.

In step 9, user B is only sent a message regarding user A's request to send payment only after user B registers with the system. In another embodiment of the invention, user B may receive the message regarding user A's payment without having to register with the system.

In step 10 of the current embodiment, user A is sent an SMS message regarding user B's cancellation of the transaction. In another embodiment of the invention, the system may send user A a different message, and may send it in other forms of mobile communication.

In step 11, B may have options to change or modify the transaction in some way. User B may be provided a yes button, no button, and request change button. Alternatively the request change button may be referred to as a negotiate button, because B is given the opportunity to negotiate with A. B may be given the opportunity to change any term of the transaction. Some terms of the transaction may that B may change include the amount, amount, select which account the money will be credited to, or other.

In step 12, if user B requests a change in the transaction, user A is sent a notification regarding the proposed change. User A is given the ability to accept or reject user B's proposed change. In an embodiment of the invention, user A may have elected to automatically decline proposed changes in his initial setup with the system. Then, user B may be sent a message of user A's automatic declining the change. If user A declines the change, whether manually or automatically, user B may be given the option to send another proposed change to user A. Or B may be given the opportunity to accept the original transaction.

In step 13, the mobile payment system notifies User A of insufficient funds via SMS messaging. In another embodiment of the invention, User A may receive this message in other forms, such as email, MMS messaging, or other forms of mobile communication or may not receive this message at all.

In step 14, user A is sent an SMS notification similar to a receipt notifying him that the transaction was completed. In another embodiment, user A may be sent a notification in other forms, such as through email, instant messenger, MMS messaging, or other forms of mobile communication. The system may also send user B a notification that the transaction has been completed. The system may also not send users A or B any messages regarding the completion of the transaction.

In step 15, the money transaction takes place. In an implementation, credit and debit transactions do not occur in real time. Transactions may take approximately sixty seconds or more to complete after a process is began due to inherent delays in electronic funding systems.

Any number of the steps in flow A, in any combination, may be combined with any other mobile payment system flow including the other flows discussed in this application.

Flow B below shows another implementation of performing transaction between a registered user (user A) member and an unregistered user (user B).

In step 6, the money is transacted. Such transactions may be asynchronous threads that take approximately sixty seconds or more to complete after a process is started due to inherent delays in electronic funding systems. The amount of delay is indeterminate since various factors influence the delay. Generally, the delay is about 60 seconds, but if the power grid goes down, for example, the delay will be much greater.

In particular, payment processing of a system may not be performed in a synchronous manner. A certain amount of up-front request validation is done. The notifications sent to the consumer may indicate that the request has been accepted and will be processed shortly. The asynchronous server side thread is started to actually process the payment request. In an implementation, the asynchronous thread is performed after notifications are sent to the user. This gives the user quicker response regarding the transaction. It is possible the asyn-

| Flow B | |
|---|---|
| Step | Action |
| 1 | Existing user A decides to send some money to user B, an unregistered user. A sends a message to the mobile payment system with B's mobile phone number and the transaction amount. |
| 2 | The mobile payment system checks whether A's account has sufficient funds to cover the transaction. |
| 3 | If there are insufficient funds, A is sent a message:<br>"Insufficient funds.<br>[tel #], [value], [trans #]"<br>B does not receive a message.<br>If there are sufficient funds, proceed to next step. |
| 4 | Check whether B is a registered or unregistered user. If B's mobile phone number is not recognized as a registered user, A receives the following message:<br>"Your payment is pending. Non-registered user must open an account.<br>[tel #], [value], [trans #]" |
| 5 | B receives the following message:<br>"You've got money!<br>[tel #], [value], [trans #]<br>Go to system website to register." |
| 6 | Start debit transaction of money from A's individual account and credit to B in an unregistered user pooled account. |
| 7 | If debit and credit transactions fail, A and B are sent message:<br>"Payment failed.<br>[tel #], [value], [trans #]"<br>Otherwise, debit and credit transactions are successful. No messages are sent. |
| 8 | If more than 30 days passes after A initiates the transaction and B has not yet registered, the transaction is automatically canceled. Then, A and B will be sent message:<br>"Payment canceled.<br>[tel #], [value], [trans #]"<br>Debit and credit transactions requested in step 6 above are reversed. A's individual account is credited with the transaction amount, which is taken from the unregistered user pooled account. |
| 9 | B registers at the system website and becomes a registered, no-card user. Money is transferred from the unregistered user pooled account to the no-card pooled account for B. |
| 10 | Make plastic debit card for B and mail to B. |
| 11 | After B receives the card, B activates the card by calling an interactive voice response (IVR) system.<br>During activation, in real-time while B is connected to the IVR system, the money is transferred from the no-card pooled account to B's individual account. |

The implementation in flow B is similar to flow A above. However, unlike flow A, flow B does not place a hold on the transaction amount in A's account (step 5 of flow A). In step 4 of flow B, since there is no hold on A's account and A's account is not debited, the money is available for user A to spend by mobile payment or debit card payment until the transaction amount is successfully debited from user A's account in step 6.

In step 5, user B is sent a message regarding the transaction and is asked to register with the system.

chronous part of payment processing may fail. For example, this may be because of insufficient funds due to simultaneous card usage. In the event of asynchronous payment processing failure, the user is notified.

In an implementation, there are two types of pooled accounts, an (i) unregistered user pooled account and a (ii) no-card pooled account. All unregistered users funds will be held together in the unregistered user pooled account. If user A is a no-card user who does not yet have an individual account, A will have money held instead in the no-card pooled account. In another implementation of the invention, there may be single pooled account for both the unregistered user pooled and no-card pooled accounts. In another embodiment of the invention, A and B's accounts are credited and debited in the pooled and transactions at the banking partner (partner handling the debit card) occurs at the end of the day (or another specific time) collectively in batch with other system transactions.

In another implementation of the invention, there may be a single type of pooled account, where both unregistered users and no-card users reside. For transfers of money between such users, the money will stay within the same pooled account. In a still further implementation of the invention, there may be more than two types of pooled accounts.

In step 9, after B registers, B becomes as a no-card user. As a no-card user, B can send and receive money like a registered user. However, since B has not yet received his card, B cannot spend money via the card. In an implementation, user B's individual account is created within 24 hours of user B's successful registration. However, the account will have no money until it is activated in step 11 below. In another embodiment of the invention, a no-card pooled account is not used, and the money is directly transferred from user A's account to user B's account.

In step 10, it takes typically about 7 to 10 business days to make a new card and for user B to receive it in the mail. In another embodiment of the invention, user B may receive another type of card, such as a credit card, or may elect to receive no card at all.

In step 11, upon user B's activation of his card, user B becomes a carded registered user and is no longer a no-card user. In an embodiment where a no-card pooled account is not used, there will not be a need to transfer the balance upon card activation.

Flow C below shows another implementation of performing transaction between a registered user (user A) member and an unregistered user (user B).

| | Flow C |
|---|---|
| Step | Action |
| 1 | Existing user A decides to send some money to user B, an unregistered user. A sends a message to the mobile payment system with B's mobile phone number and the transaction amount. |
| 2 | The mobile payment system checks whether A's account has sufficient funds to cover the transaction. |
| 3 | If there are insufficient funds, A is sent a message:<br>"Insufficient funds.<br>[tel #], [value], [trans #]"<br>B does not receive a message.<br>If there are sufficient funds, proceed to next step. |
| 4 | Check whether B is a registered or unregistered user. If B's mobile phone number is not recognized as a registered user, A receives the following message:<br>"Your request has been accepted and will be processed.<br>[tel #], [value], [trans #]<br>Request pending non-registered user." |
| 5 | B receives the following message:<br>"Payment pending from<br>[tel #], [value], [trans #]<br>Go to system website to register." |
| 6 | Before B approves payment, A may cancel payment. If so, A and B will be sent message:<br>"Payment canceled.<br>[tel #], [value], [trans #]"<br>If more than 30 days passes after A initiates the transaction and before B approves payment, the transaction is automatically canceled. Then, A and B will be sent message:<br>"Payment canceled.<br>[tel #], [value], [trans #]" |
| 7 | B registers with the system. An account is created for B on the system. |
| 8 | After B successfully enrolls, B is notified that A wants to send B money. B is presented with a screen asking B whether to accept payment from A. |
| 9 | If B declines the payment, the transaction is canceled and A is sent a message:<br>"Payment declined.<br>[tel #], [value], [trans #]" |
| 10 | If B accepts payment from A, system checks whether A has sufficient funds to cover transaction. If not, A and B will be sent message:<br>"Insufficient funds.<br>[tel #], [value], [trans #]" |
| 11 | If A has sufficient funds, A is sent message:<br>"Payment accepted.<br>[tel #], [value], [trans #]" |
| 12 | The transaction amount is debited from A's account and credited to B's account. |

The implementation in flow C is similar to flow A above. However, unlike flow A, flow C does not place a hold on the transaction amount in A's account (step 5 of flow A). The discussion above for flows A and B are applicable to flow C as appropriate.

In an implementation, while A's payment is pending, A may cancel payment and B will be appropriately notified. In step 8, in the case there are multiple pending payments, B may be presented with a list of pending payments and requested to indicate acceptance or rejection of each pending payment. If the asynchronous server side thread (e.g., step 12) should fail, both parties will be notified.

Flow D below shows an implementation of performing transaction between a no-card user (user A) and a no-card user (user B).

| Flow D | |
|---|---|
| Step | Action |
| 1 | Existing user A, a no-card registered user, decides to send some money to user B, a no-card user. A sends a message to the mobile payment system with B's mobile phone number and the transaction amount. |
| 2 | The mobile payment system checks whether A's account has sufficient funds to cover the transaction. |
| 3 | If there are insufficient funds, A is sent a message:<br>"Insufficient funds.<br>[tel #], [value], [trans #]"<br>B does not receive a message.<br>If there are sufficient funds, proceed to next step. |
| 4 | Check whether B is a registered (no-card or carded) user or unregistered user. Since B is a registered user, send the following message:<br>"You've got money!<br>[tel #], [value], [trans #]" |
| 5 | Check whether B is a no-card registered user or carded registered user. Since B is a no-card user, start debit transaction of money from A in no-card user pooled account and credit to B in a no-card user pooled account. |
| 7 | If debit and credit transactions fail, A and B are sent message:<br>"Payment failed.<br>[tel #], [value], [trans #]" |
| 8 | If B has autoaccept turned on, money is transferred from A to B in the no-card pooled account. No messages are sent. |
| 9 | If B has autoaccept turned off, debit and credit transactions will occur only after B approves the transaction. |
| 10 | If more than 30 days passes after A initiates the transaction and B has not yet approved, the transaction is automatically canceled. Then, A and B will be sent message:<br>"Payment canceled.<br>[tel #], [value], [trans #]"<br>If B declines the payment, the transaction is canceled and A is sent a message:<br>"Payment declined.<br>[tel #], [value], [trans #]" |
| 11 | If B accepts the transaction, and A and B are still no-card users, money is transferred from A to B in the no-card pooled account.<br>If B accepts the transaction, and A is a no-card user and B is now a carded user, money is transferred from A in the no-card pooled account to B's individual account.<br>If A and B have both become carded users, money is transferred from A's individual account to B's individual account.<br>If A has become a carded user, but B is still a no-card user, money is transferred from A's individual account to B in the no-card pooled account. |

The comments provided above apply to flow D as appropriate. For example, in step 3, no hold is placed on A's account for the transaction amount. The transaction amount is not debited from A's account. Until the transaction amount is successfully debited from A's account in a following step, the money is available for A to spend by mobile payment or debit card payment.

User B may have a white list or black list set up. The white list may dictate that B will accept payments from only specified users (which may be stored in the user's profile). The black list may dictate that B will not accept payments from specified members (which may be stored in the user's profile). Various implementations of the invention may have only a white list, only a black list, or both a white and a black list. Unauthorized senders, because of the white or black list, will be notified of the error after their attempted payment fails.

Flow E below shows an implementation of performing transaction between a no-card registered user (user A) and a carded user (user B).

| Flow E | |
|---|---|
| Step | Action |
| 1 | Existing user A, a no-card registered user, decides to send some money to user B, a carded user. A sends a message to the mobile payment system with B's mobile phone number and the transaction amount. |
| 2 | The mobile payment system checks whether A's account has sufficient funds to cover the transaction. |
| 3 | If there are insufficient funds, A is sent a message:<br>"Insufficient funds.<br>[tel #], [value], [trans #]"<br>B does not receive a message.<br>If there are sufficient funds, proceed to next step. |
| 4 | Check whether B is a registered (no-card or card) user or unregistered user. Since B is a registered user, send the following message:<br>"You've got money!<br>[tel #], [value], [trans #]" |
| 5 | Check whether B is a no-card registered user or carded registered user. Since B is a carded user, start debit transaction of money from A's in a no-card user pooled account and credit to B's individual account. |
| 6 | If debit and credit transactions fail, A and B are sent message:<br>"Payment failed.<br>[tel #], [value], [trans #]" |
| 7 | If B has autoaccept turned on, money is transferred from the A in the no-card pooled account to B's individual account. No messages are sent. |
| 8 | If B has autoaccept turned off, debit and credit transactions will occur only after B approves the transaction. |
| 9 | If more than 30 days passes after A initiates the transaction and B has not yet approved, the transaction is automatically canceled. Then, A and B will be sent message: |

-continued

| | Flow E |
|---|---|
| Step | Action |
| | "Payment canceled.<br>[tel #], [value], [trans #]"<br>If B declines the payment, the transaction is canceled and A is sent a message:<br>"Payment declined.<br>[tel #], [value], [trans #]" |
| 10 | If B accepts the transaction and A is still a no-card user, money is transferred from the A's in the no-card pooled account to B's individual account.<br>If B accepts the transaction and A is now a carded user, money is transferred from the A's individual account to B's individual account. |

The comments provided above apply to flow E as appropriate.

Flow F below shows an implementation of performing transaction between a carded user (user A) and a no-card user (user B).

| | Flow F |
|---|---|
| Step | Action |
| 1 | Existing user A, a carded registered user, decides to send some money to user B, a no-card user. A sends a message to the mobile payment system with B's mobile phone number and the transaction amount. |
| 2 | The mobile payment system checks whether A's account has sufficient funds to cover the transaction. |
| 3 | If there are insufficient funds, A is sent a message:<br>"Insufficient funds.<br>[tel #], [value], [trans #]"<br>B does not receive a message.<br>If there are sufficient funds, proceed to next step. |
| 4 | Check whether B is a registered (no-card or card) user or unregistered user. If B is a registered user, send the following message:<br>"You've got money!<br>[tel #], [value], [trans #]" |
| 5 | Check whether B is a no-card registered user or carded registered user. If B is a no-card user, start debit transaction of money from A's individual account and credit to B in a no-card user pooled account. |
| 6 | If debit and credit transactions fail, A and B are sent message:<br>"Payment failed.<br>[tel #], [value], [trans #]" |
| 7 | If B has autoaccept turned on, money is transferred from the A's account to the no-card pooled account for B. No messages are sent. |
| 8 | If B has autoaccept turned off, debit and credit transactions will occur only after B approves the transaction. |
| 9 | If more than 30 days passes after A initiates the transaction and B has not yet approved, the transaction is automatically canceled. Then, A and B will be sent message:<br>"Payment canceled.<br>[tel #], [value], [trans #]"<br>If B declines the payment, the transaction is canceled and A is sent a message:<br>"Payment declined.<br>[tel #], [value], [trans #]" |
| 10 | If B accepts the transaction and B is still a no-card user, money is transferred from the A's account to the no-card pooled account for B.<br>If B accepts the transaction and B is now a carded registered user, money is transferred from the A's account to B's individual account. |

The comments provided above apply to flow F as appropriate.

Flow G below shows an implementation of performing transaction between a carded user (user A) and a carded user (user B).

| | Flow G |
|---|---|
| Step | Action |
| 1 | Existing user A, a carded registered user, decides to send some money to user B, a carded registered user. A sends a message to the mobile payment system with B's mobile phone number and the transaction amount. |
| 2 | The mobile payment system checks whether A's account has sufficient funds to cover the transaction. |
| 3 | If there are insufficient funds, A is sent a message:<br>"Insufficient funds.<br>[tel #], [value], [trans #]"<br>B does not receive a message.<br>If there are sufficient funds, proceed to next step. |
| 4 | Check whether B is a registered (no-card or carded) user or unregistered user. Since B is a registered user, send the following message:<br>"You've got money!<br>[tel #], [value], [trans #]" |
| 5 | Check whether B is a no-card registered user or carded registered user. Since B is a carded user, start debit transaction of money from A's individual account and credit to B's individual account. |
| 6 | If debit and credit transactions fail, A and B are sent message:<br>"Payment failed.<br>[tel #], [value], [trans #]" |
| 7 | If B has autoaccept turned on, money is automatically transferred from the A's account to the no-card pooled account for B. No messages are sent. |
| 8 | If B has autoaccept turned off, debit and credit transactions will occur only after B approves the transaction. |
| 9 | If more than 30 days passes after A initiates the transaction and B has not yet approved, the transaction is automatically canceled. Then, A and B will be sent message:<br>"Payment canceled.<br>[tel #], [value], [trans #]"<br>If B declines the payment, the transaction is canceled and A is sent a message:<br>"Payment declined.<br>[tel #], [value], [trans #]" |
| 10 | If B accepts the transaction, money is transferred from the A's individual account to B's individual account. |

The comments provided above apply to flow G as appropriate.

Flow H shows a referral flow for unregistered users. User A is a registered user and user B is an unregistered user.

| Step | Action |
|---|---|
| 1 | Existing user A decides to send some money to user B, an unregistered user. A sends a message to the mobile payment system with B's mobile phone number and the transaction amount. |
| 2 | The mobile payment system checks whether A's account has sufficient funds to cover the transaction. |
| 3 | If there are insufficient funds, A is sent a message:<br>"Insufficient funds.<br>[tel #], [value], [trans #]"<br>B does not receive a message.<br>If there are sufficient funds, proceed to next step. |
| 4 | Check whether B is a registered or unregistered user. If B's mobile phone number is not recognized as a registered user, A receives the following message:<br>"B is not a member. We have invited B to join the system.<br>[tel #], [value], [trans #]"<br>No money is deducted from A's account. |
| 5 | B receives the following message:<br>"A tried to send you money.<br>[tel #], [value], [trans #]<br>Go to system website to register." |

-continued

| Step | Action |
|---|---|
| 6 | B registers with the system and becomes a registered, no-card user. |
| 7 | A also receives the following message: "B is now a registered user, would you like to submit your transaction again?" |
| 8 | A receives a referral bonus (e.g., $5) in his account. |
| 9 | A resends a message to the mobile payment system with B's mobile phone number and the transaction amount. If yes, the transaction will be handled as a registered user to registered user transaction. |

The comments provided above apply to flow H as appropriate. In this flow, funds are not automatically transferred from A to B after B registers. Rather, B is invited to join and upon B's joining, A is sent a message (step 9) asking if A wants to try to send money to B again. If A wants to send the money, then the subsequent A-to-B will be handled like any of the registered user to registered user transfer.

The implementation may include a referral bonus (e.g., $5). The message in step 4 may include a notice to A that A will receive a referral bonus upon B's joining. After B registers in step 6, user A will be entitled to the referral bonus that is put into A's account (see step 8). Step 8 comes after step 6, but may be before or after steps 7 and 9.

In various implementations of the system, referral bonuses may be paid only to the sender, only to the recipient, or to both the sender and the recipient. Furthermore, in an alternative embodiment of a referral flow, after B registers, the money may be automatically transferred to B without A's need to resend a request pay transaction. In another embodiment, the flow is: (1) User A (Member) sends User B (not a member) $X. (2) The system checks B, find out B is not a member. (3) $X is labeled a pending in A's account. (4) B is notified that B is invited by A to join the system. An incentive of $Y+money sent by A are waiting to be collected. (5) B chooses to sign up as a member and receives the $Y incentive immediately (already in the account). (6) B then receives a message indicating that a payment of $ X was received from A. (7) $X is deducted from A's account. (8) The pending Viral can be cancelled by A, yet the invite can still be processed. (9) If B does not accept the invite in certain period. The pending amount is then released back to the account In a further embodiment of the invention, the financial exchange system may notify users through multiple notifications per transaction, such as with SMS and with email, in specific cases. Examples of such cases include: upon new user registration, upon system card registration, upon sending or receiving a referral, upon credit/debit load, upon ACH/Direct-Deposit load or unload, upon eAllowance (i.e., bill pay) load, and upon account or profile data change.

In a mobile payment system, registered users or members may send payment to other member or unregistered users or nonmembers. In a specific implementation, a person-to-person payment system allows existing members of a payment system to send funds to nonmembers with the intent that the nonmember becomes a member. This ability of a payment system may be referred to as "viral" because it promotes new member registrations in an exponential spreading fashion.

In an embodiment, the invention is a method including: receiving a payment instruction from a first user to pay a second user a money amount, where the first user is a registered user and the second user is identified by a telephone number for the second user; based on the telephone number, determining that the second user is not a registered user; and sending a first electronic message to a device associated with the telephone number notifying the second user of the pending payment from the first user. The method includes: after sending the first electronic message, registering the second user and presenting the second user with an first option to accept the pending payment from the first user and a second option to reject the pending payment from the first user; when the second user selects the first option, debiting the money amount from a first account associated with the first user and crediting the money amount to a second account associated with the second user; and when the second user selects the second option, sending a second electronic message to the first user that the payment was declined.

In an implementation, the second account is in a pooled account and when the first user is a no-card, registered user, the first account is in the pooled account, and the debiting and crediting includes maintaining the money amount within the pooled account. In an implementation, the second account is in a pooled account and when the first user is a no-card, registered user, the first account is in the pooled account, and the debiting and crediting includes not transferring the money amount outside the pooled account. In an implementation, when the first user is a no-card, registered user, the first account is in a first pooled account and the second account is in a second pooled account, different from the first pooled account, and the debiting and crediting includes transferring the money amount from the first pooled account to the second pooled account.

In an implementation, the first user is a carded, registered user and the second account is in a pooled account, and the debiting and crediting includes transferring the money amount from the first account to the second account in the pooled account, whereby the pooled account is increased by the money amount. The card associated with a registered may be a debit card, credit card, automated teller card, or any other physical card showing an account number. Using such a card, the first user may conduct transactions independent of the electronic device from which the payment instruction was sent.

In an implementation, the method includes: receiving in addition to the payment instruction a sequence number generated by a device that sent the payment instruction; and after receiving the sequence number, generating a transaction number for the payment instruction. In an implementation, processing the payment instruction occurs only if the sequence number does not match any previously received sequence number stored in a database. The database may include received sequence numbers for a rolling time period, such as the last week, the last two weeks, the last month, the previous six months, or any other period of time.

In an implementation, after receiving the sequence number, an expected sequence number is generated. Then the payment instruction is processed only if the sequence number matches the expected sequence number.

In an embodiment, the invention is method including: receiving a payment instruction from a first user to pay a second user a money amount, where the first user is a registered user and the second user is identified by a telephone number for the second user; based on the telephone number, determining that the second user is not a registered user; and sending a first electronic message to a device associated with the telephone number notifying the second user of the pending payment from the first user. The method includes: after sending the first electronic message, registering the second user and presenting the second user with an first option to accept the pending payment from the first user, a second option to reject the pending payment from the first user, and a third option to request a change to the pending payment from the first user; when the second user selects the first option, debiting the money amount from a first account associated with the first user and crediting the money amount to a second account associated with the second user; when the second user selects the second option, sending a second electronic message to the first user that the payment was declined.

In implementation, the method includes when the second user selects the third option, sending a third electronic message to the first user that the second user has requested a change in the pending payment. In an implementation, the method includes when the second user selects the third option, receiving a request from the second user to change the pending payment to have a different money amount, sending a third electronic message to the first user notifying the first user of the change to the pending payment, presenting the first user with a fourth option to accept the change to the pending payment or a fifth option to reject the change to the pending payment, and when the first user selects the fourth option, debiting the different money amount from an account of the first user and crediting the different money amount to an account associated with the second user.

The method may further include after determining the second user is not a registered user, placing a hold on the money amount in the first account. The method may include: after determining the second user is not a registered user, placing a hold on the money amount in the first account; and after a certain number of days elapses from the time the payment instruction was received and the second user has not registered, removing the hold on the money amount in the first account.

The device may be is at least one of a smartphone, mobile telephony device, portable e-mail device, personal digital assistant, or computer.

In an embodiment, the invention is a method including: receiving a payment instruction from a first user to pay a second user a money amount, where the first user is a registered user and the second user is identified by a telephone number for the second user; based on the telephone number, determining that the second user is not a registered user; and sending a first electronic message to a device associated with the telephone number notifying the second user of an attempted payment from the first user. The method includes: after sending the first electronic message, registering the second user, sending the first user a second electronic message to the first user that second user has registered, and presenting the first user with a first option to pay the second user the money amount; and when the first user selects the first option, debiting the money amount from a first account associated with the first user and crediting the money amount to a second account associated with the second user.

In an implementation, after the second user registers, the first account is credited with a referral bonus amount. The referral bonus amount may be any money amount, such as $5. In an implementation, after the second user registers, the second account is credited with a referral bonus amount. Additionally, both the first and second user may receive referral bonuses.

In an implementation, the method includes sending a second electronic message to the first user that second user is not registered user. In an implementation, the method includes: receiving in addition to the payment instruction a sequence number generated by a device that sent the payment instruction; and after receiving the sequence number, generating a transaction number for the payment instruction.

Figure 19:
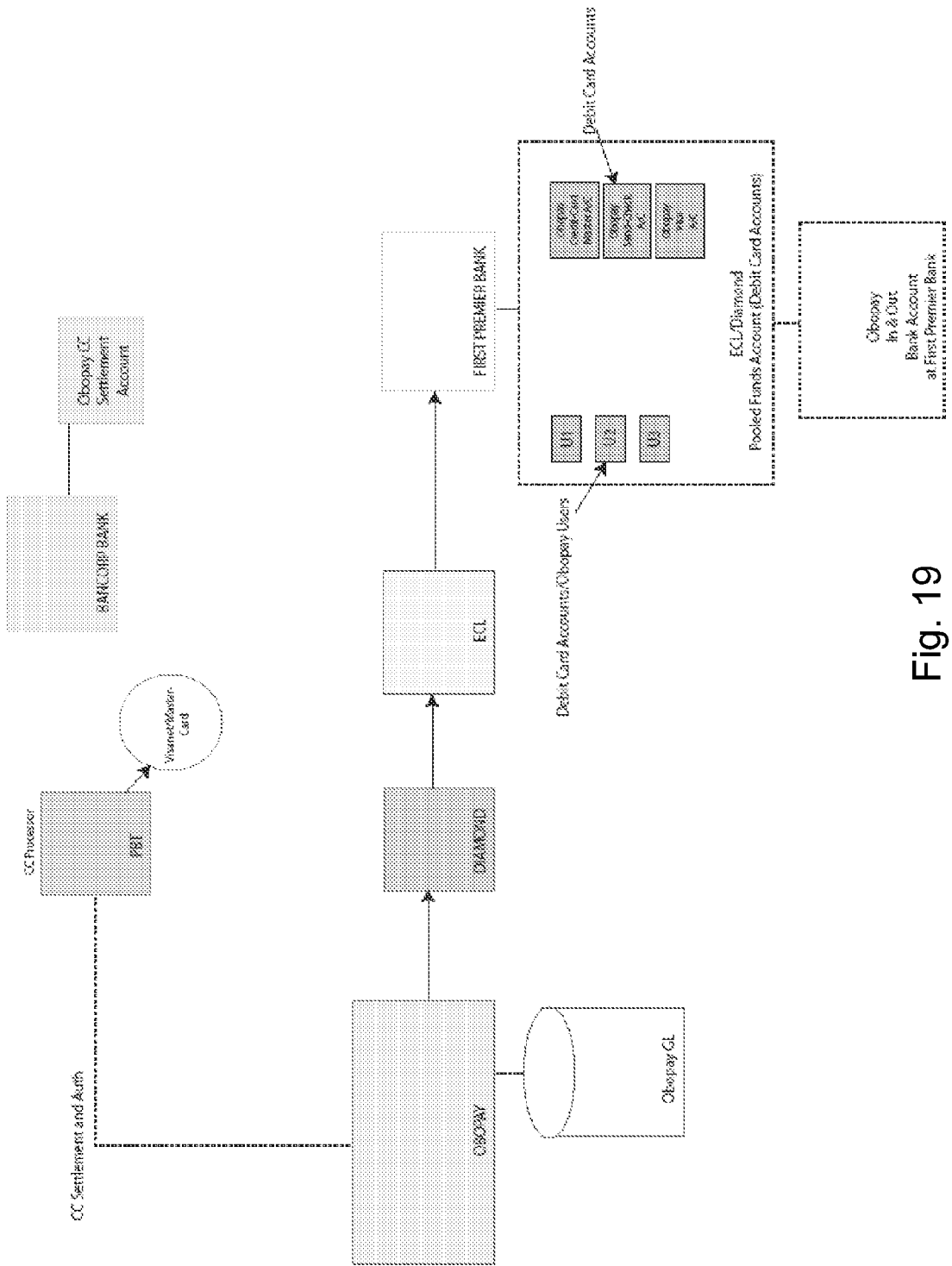
FIG. 19 shows overall system diagram of a specific embodiment of the invention.

FIG. 19 shows overall system diagram of a specific embodiment of the invention. This is a schematic view of a specific implementation of a mobile payment system (i.e., Obopay). As previously stated, Obopay is provided merely as an example to illustrate the features of the invention, and the invention should not limited to this example. Obopay's system has a debit-card backbone. A partner, Diamond Financial Products, is a partner. Through Diamond, Obopay issues debit cards and communicates with ECL and First Premiere Bank to give Obopay users the ability to send and receive money between debit cards. PBT (Pay By Touch) handles ACH transactions and credit card transactions. Bancorp Bank provides settlement accounts and has a relationship with PBT.

Figure 20:
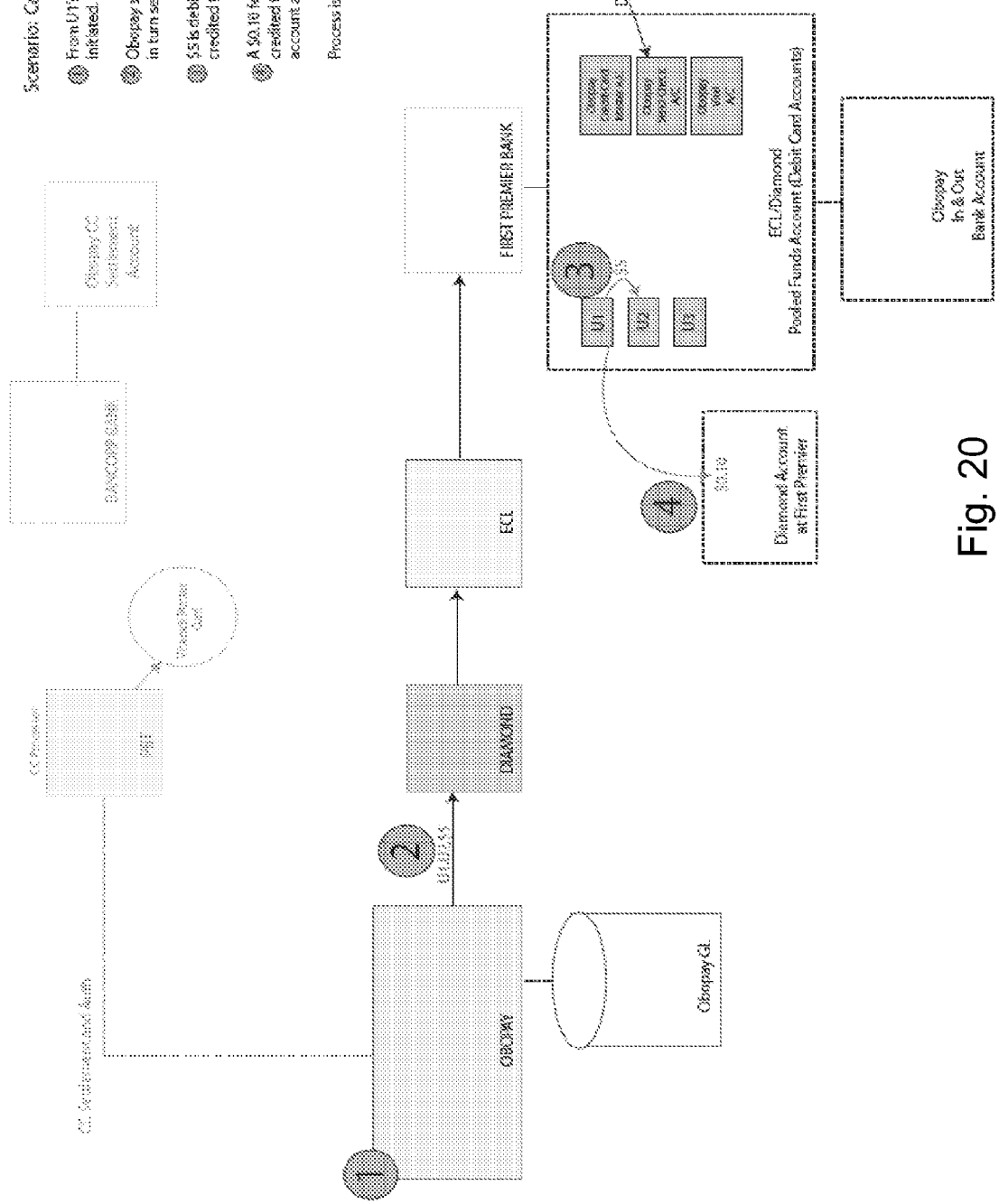
FIG. 20 shows a person-to-person payment between two individual card accounts.

FIG. 20 shows a person-to-person payment between two individual carded accounts. "Card" refers to an Obopay member who holds a Diamond Financial Products debit card. This is a "card user" or "carded user," which is in contrasted with a no-card user. A specific flow includes: (1) From U1's phone, a P2P payment of $5 to U2 is initiated. (2) Obopay sends the P2P request to Diamond (who in turn sends it to ECL and First Premier). (3) The amount $5 is debited from U1's debit card account and credited to U2's debit card account. (4) A $0.10 fee is deducted from U1's account and credited to a Diamond Financial Products bank account at First Premier Bank.

Figure 21:
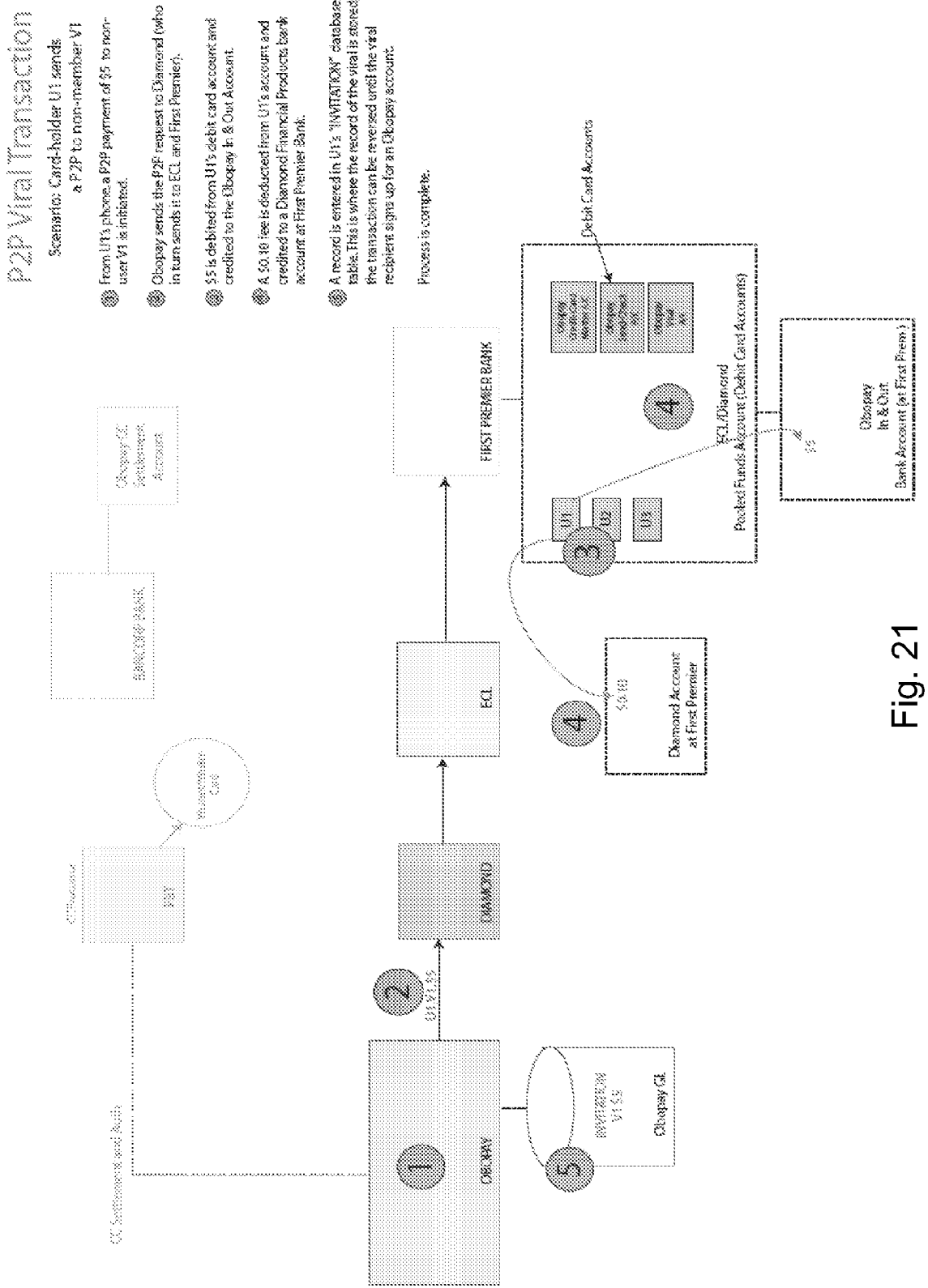
FIG. 21 shows a person-to-person payment between a card account and a nonmember account.

FIG. 21 shows a person-to-person payment between a card account and a nonmember account. A specific flow includes: (1) From U1's phone, a P2P payment of $5 to nonuser V1 is initiated. (2) Obopay sends the P2P request to Diamond (who in turn sends it to ECL and First Premier). (3) The amount $5 is debited from U1's debit card account and credited to the Obopay In & Out Account. (4) A $0.10 fee is deducted from U1's account and credited to a Diamond Financial Products bank account at First Premier Bank. (5) A record is entered in U1's "INVITATION" database table. This is where the record of the viral is stored; the transaction can be reversed until the viral recipient signs up for an Obopay account.

Figure 22:
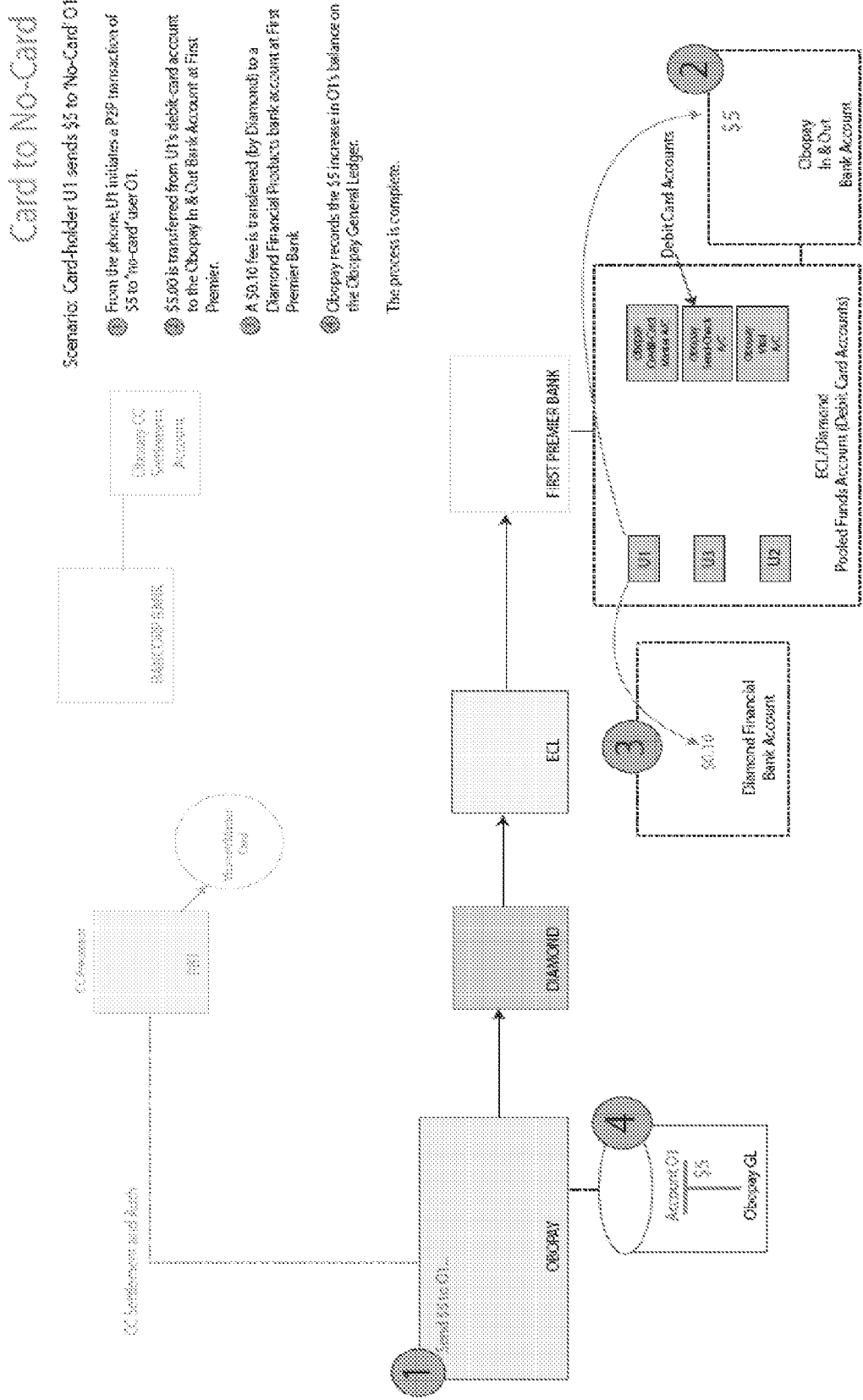
FIG. 22 shows a person-to-person payment between a card account and a no-card account.

FIG. 22 shows a person-to-person payment between a card account and a no-card account. A "no-card" user is an Obopay user who has not yet received or activated their debit card. In another embodiment of the invention, the debit card is not required. In a specific embodiment, there exists a state between the ordering of the card and the activation where the user can still send and receive money.

A specific flow includes: (1) From the phone, U1 initiates a P2P transaction of $5 to "no-card" user O1. (2) The amount $5.00 is transferred from U1's debit-card account to the Obopay In & Out Bank Account at First Premier. (3) A $0.10 fee is transferred (by Diamond) to a Diamond Financial Products bank account at First Premier Bank. (4) Obopay records the $5 increase in O1's balance on the Obopay General Ledger.

Figure 23:
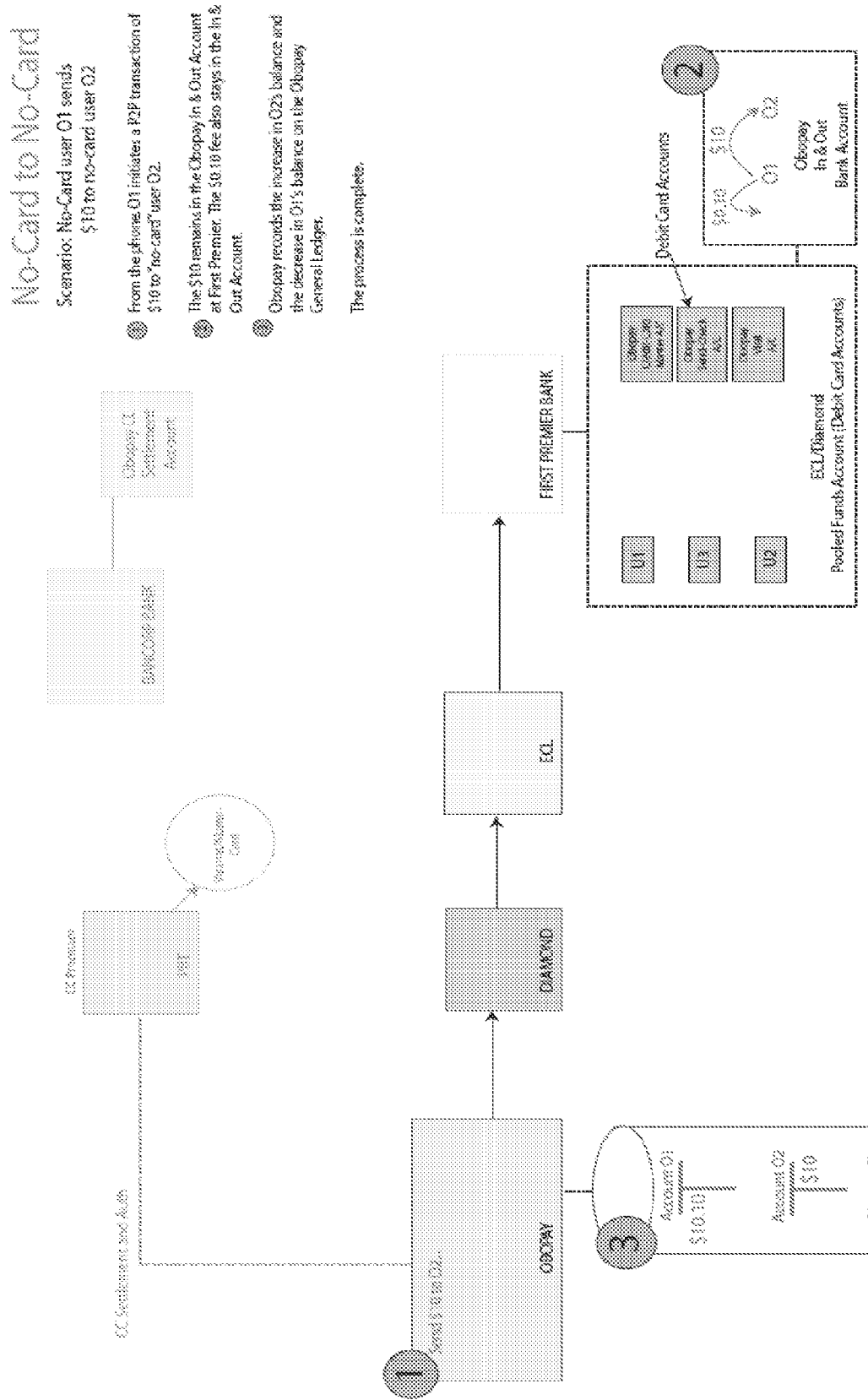
FIG. 23 shows a person-to-person payment for no-card account to no-card account.

FIG. 23 shows a person-to-person payment for no-card to no-card. A specific flow includes: (1)
From the phone, O1 initiates a P2P transaction of $10 to "no-card" user O2. (2) The $10 remains in the Obopay In & Out Account at First Premier. The $0.10 fee also stays in the In & Out Account. (3) Obopay records the increase in O2's balance and the decrease in O1's balance on the Obopay General Ledger.

Figure 24:
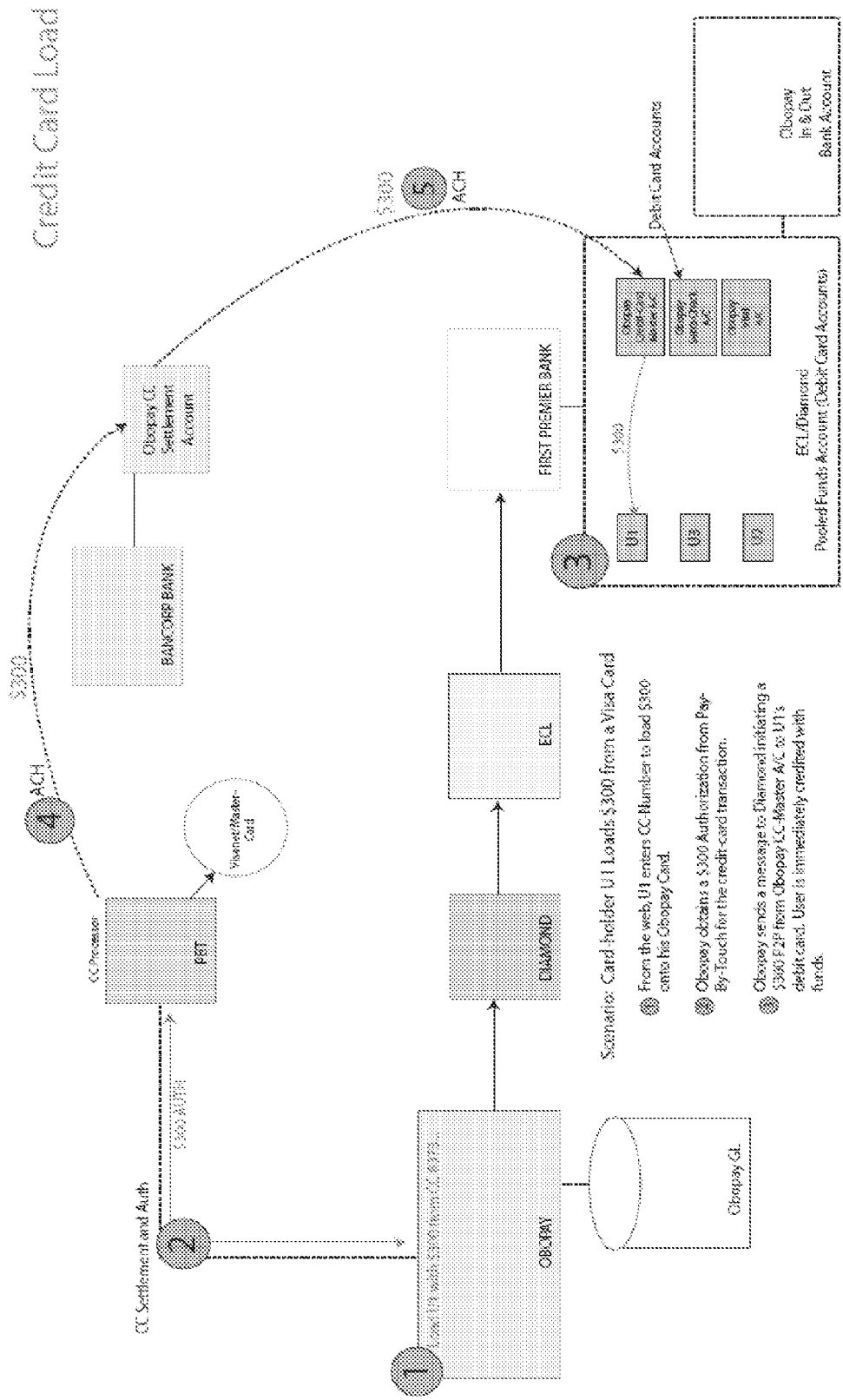
FIG. 24 shows a credit card load.

FIG. 24 shows a credit card load. A specific flow includes: (1) From the web, U1 enters CC-Number to load $300 onto his Obopay Card. (2) Obopay obtains a $300 Authorization from Pay-By-Touch for the credit-card transaction. (3) Obopay sends a message to Diamond initiating a $300 P2P from Obopay CC-Master A/C to U1's debit card. User is immediately credited with funds. (4) PBT settles credit card transaction and sends a $300 ACH to Obopay's settlement account at Bancorp Bank. (5) Obopay sends $300 ACH to Obopay CC Master A/C to replenish the funds.

Figure 25:
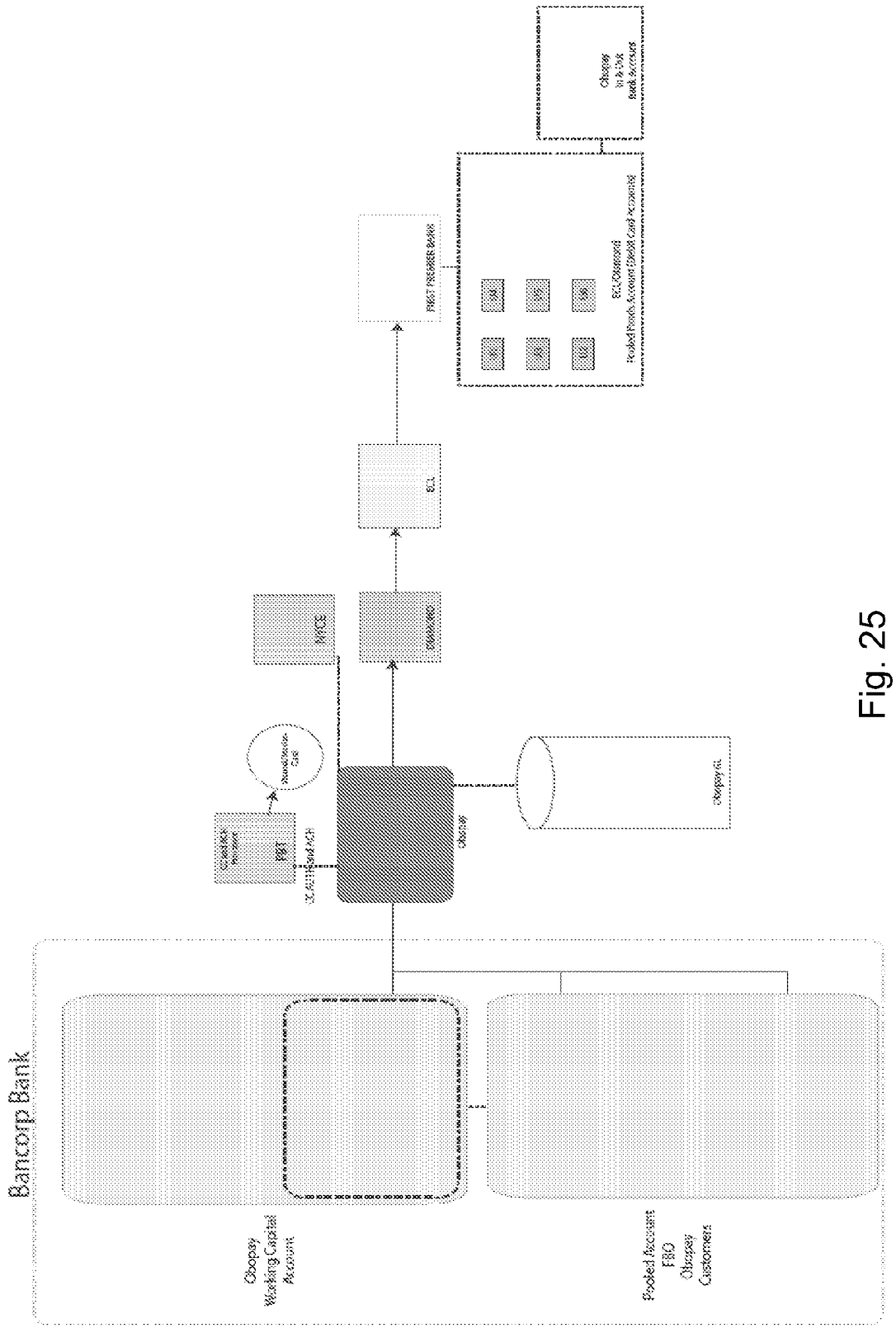
FIG. 25 shows overall system diagram of another specific embodiment of the invention.

FIG. 25 shows overall system diagram of another specific embodiment of the invention. The following flows 78 to 85 are related to the system implementation in FIG. 77. In this system implementation, users will not be required to register for a debit-card account. These users will be called "no-card" users, and will hold virtual accounts. The funds will be held in a bank account (for the benefit of Obopay users).

Figure 26:
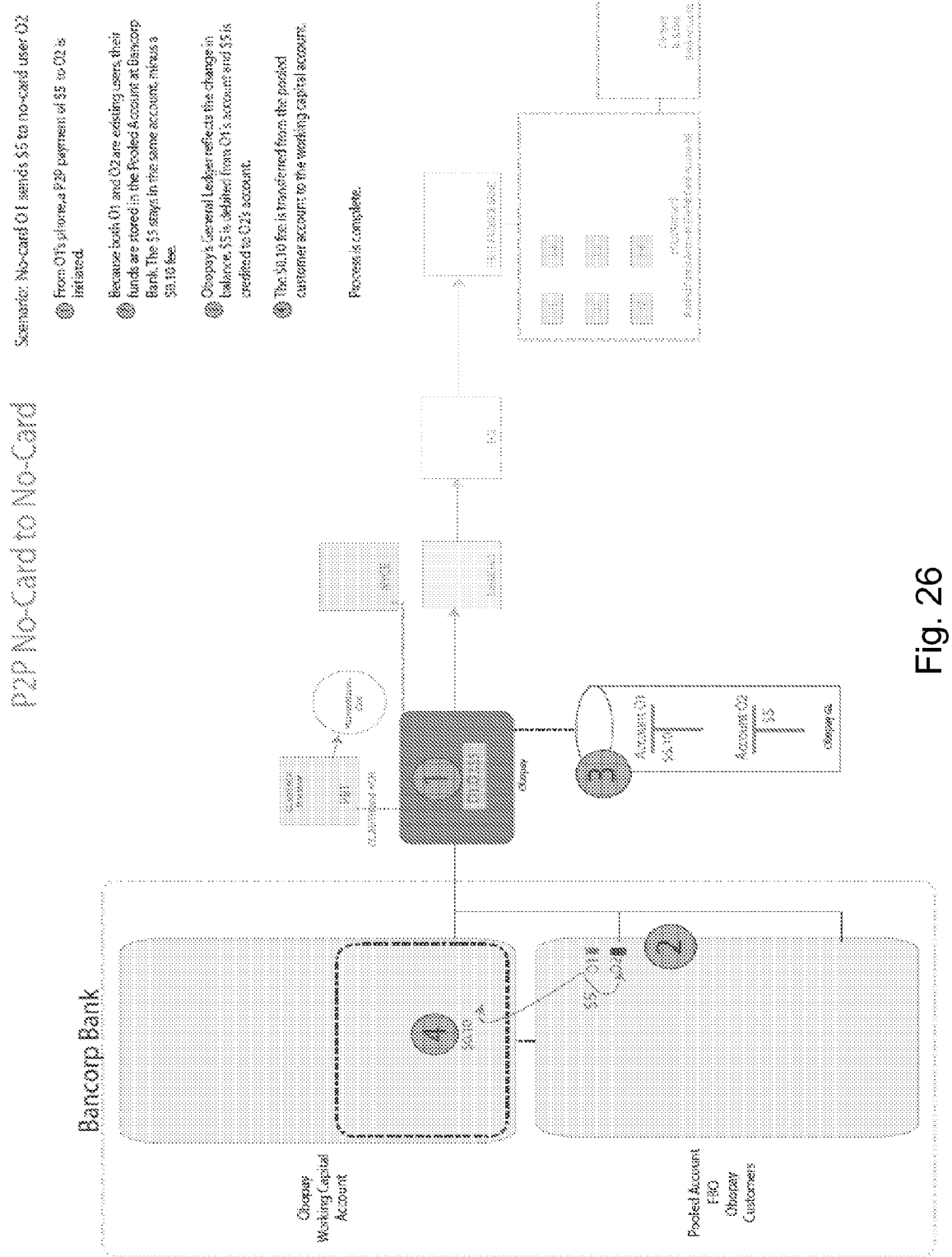
FIG. 26 shows a person-to-person payment between a no-card account and a no-card account.

FIG. 26 shows a person-to-person payment between a no-card account and a no-card account. A specific flow includes: (1) From O1's phone, a P2P payment of $5 to O2 is initiated. (2) Because both O1 and O2 are existing users, their funds are stored in the Pooled Account at Bancorp Bank. The $5 stays in the same account, minus a $0.10 fee. (3) Obopay's General Ledger reflects the change in balance. The amount $5 is debited from O1's account and $5 is credited to O2's account. (4) The $0.10 fee is transferred from the pooled customer account to the working capital account.

Figure 27:
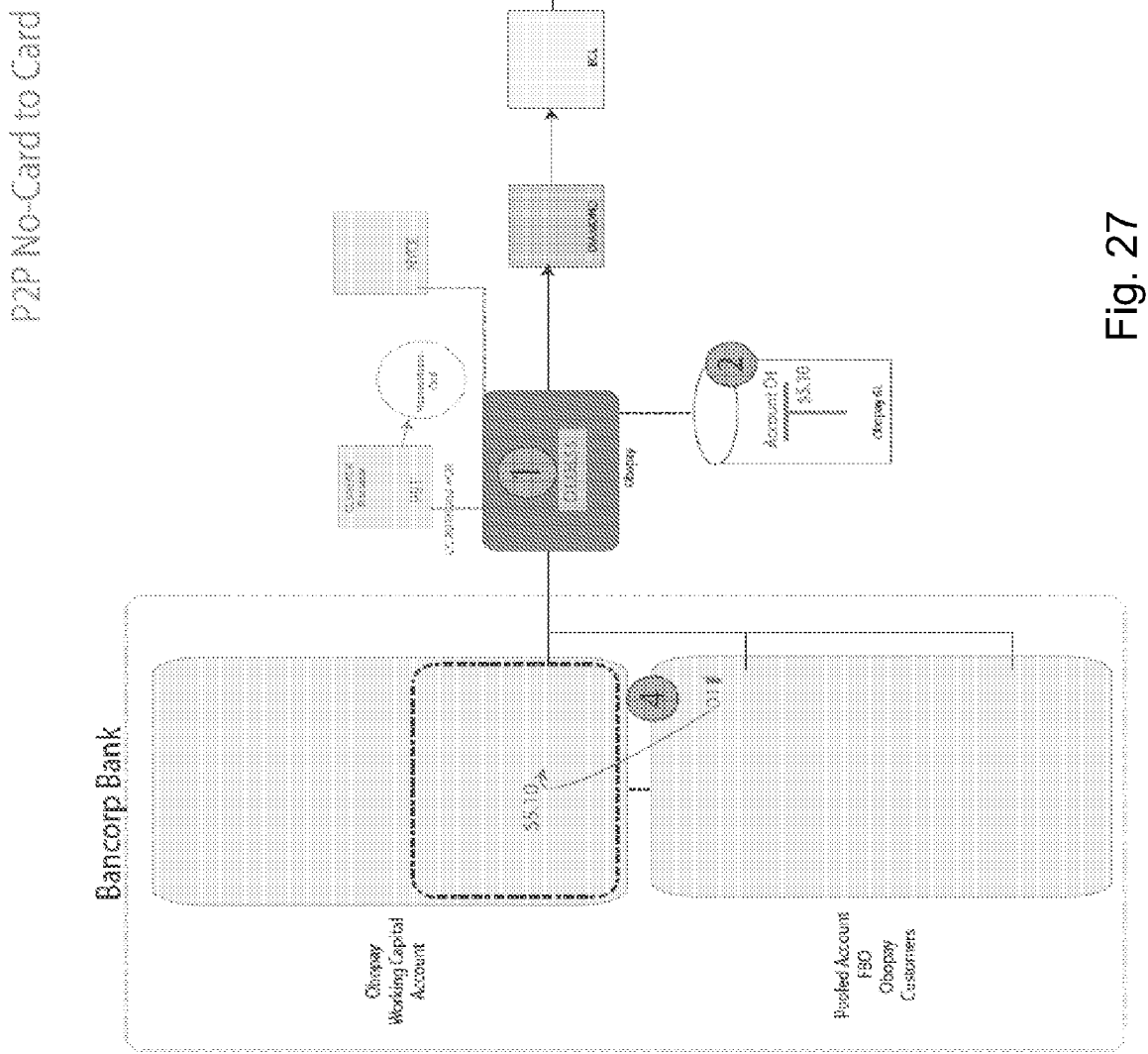
FIG. 27 shows person-to-person payment between a no-card account and a card account.

FIG. 27 shows person-to-person payment between a no-card account and a card account. A specific flow includes: (1) From O1's phone, a P2P payment of $5 to U6 is initiated. (2) User O1's account is debited $5.10. This change is reflected in Obopay's General Ledger. (3) Obopay (through communication to Diamond) initiates a P2P, transferring $5 from the First Premier In & Out account to debit-card U6. (4) In a night time batch, $5.10 (there is a 10-cent fee for sending money) is moved from the Obopay Pooled Account to the Obopay Working Capital Account at Bancorp.

Figure 28:
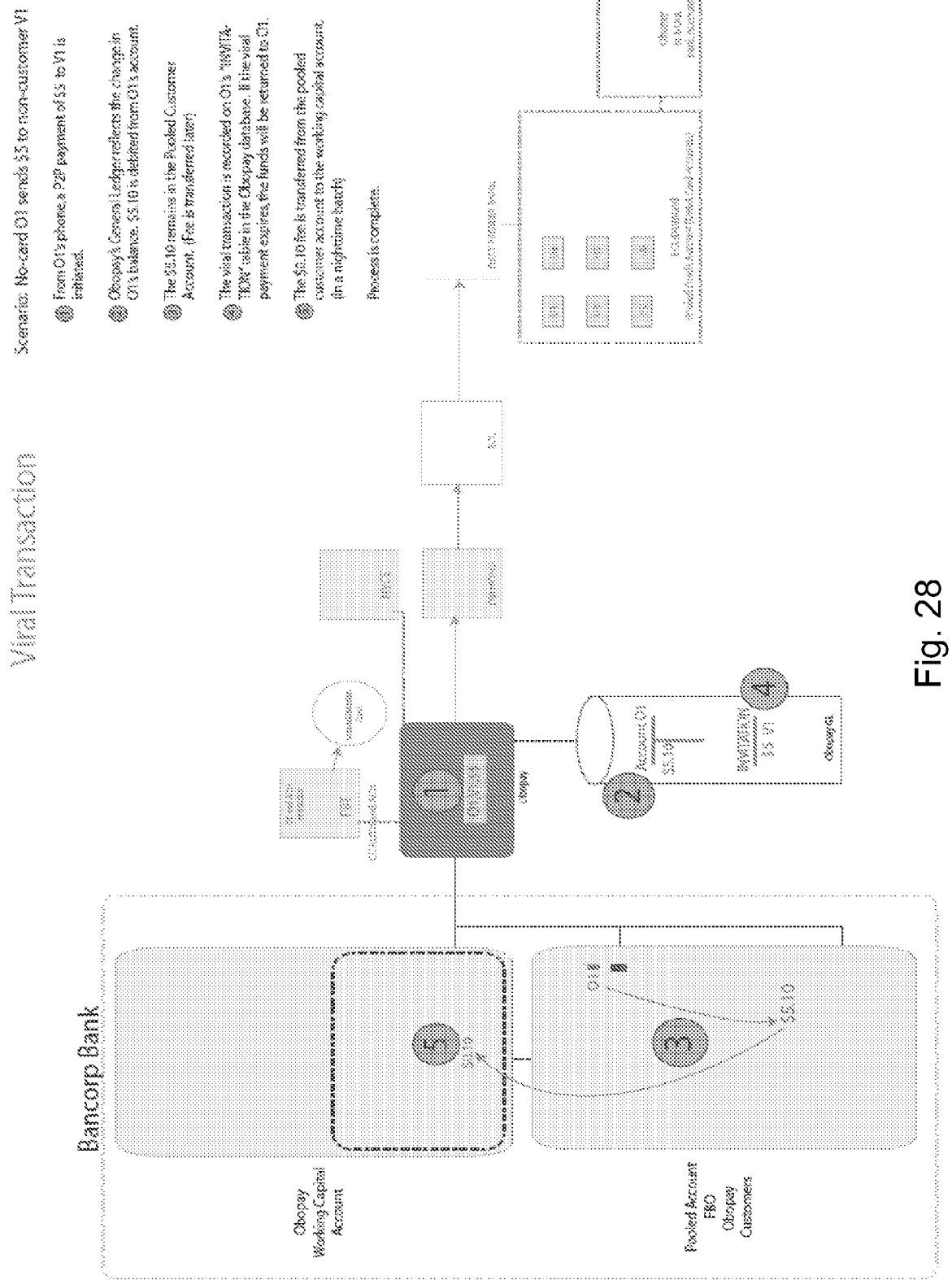
FIG. 28 shows person-to-person payment between for a viral transaction to a nonmember.

FIG. 28 shows person-to-person payment between for a viral transaction to a nonmember. A "viral" payment is one where an Obopay member, card or no card, sends a payment to a non-Obopay users phone number. A specific flow includes: (1) From O1's phone, a P2P payment of $5 to V1 is initiated. (2) Obopay's General Ledger reflects the change in O1's balance. $5.10 is debited from O1's account. (3) The $5.10 remains in the Pooled Customer Account. Fee is transferred later. (4) The viral transaction is recorded on O1's "INVITATION" table in the Obopay database. If the viral payment expires, the funds will be returned to O1. (5) The $0.10 fee is transferred from the pooled customer account to the working capital account. This may be done in a night time batch.

Figure 29:
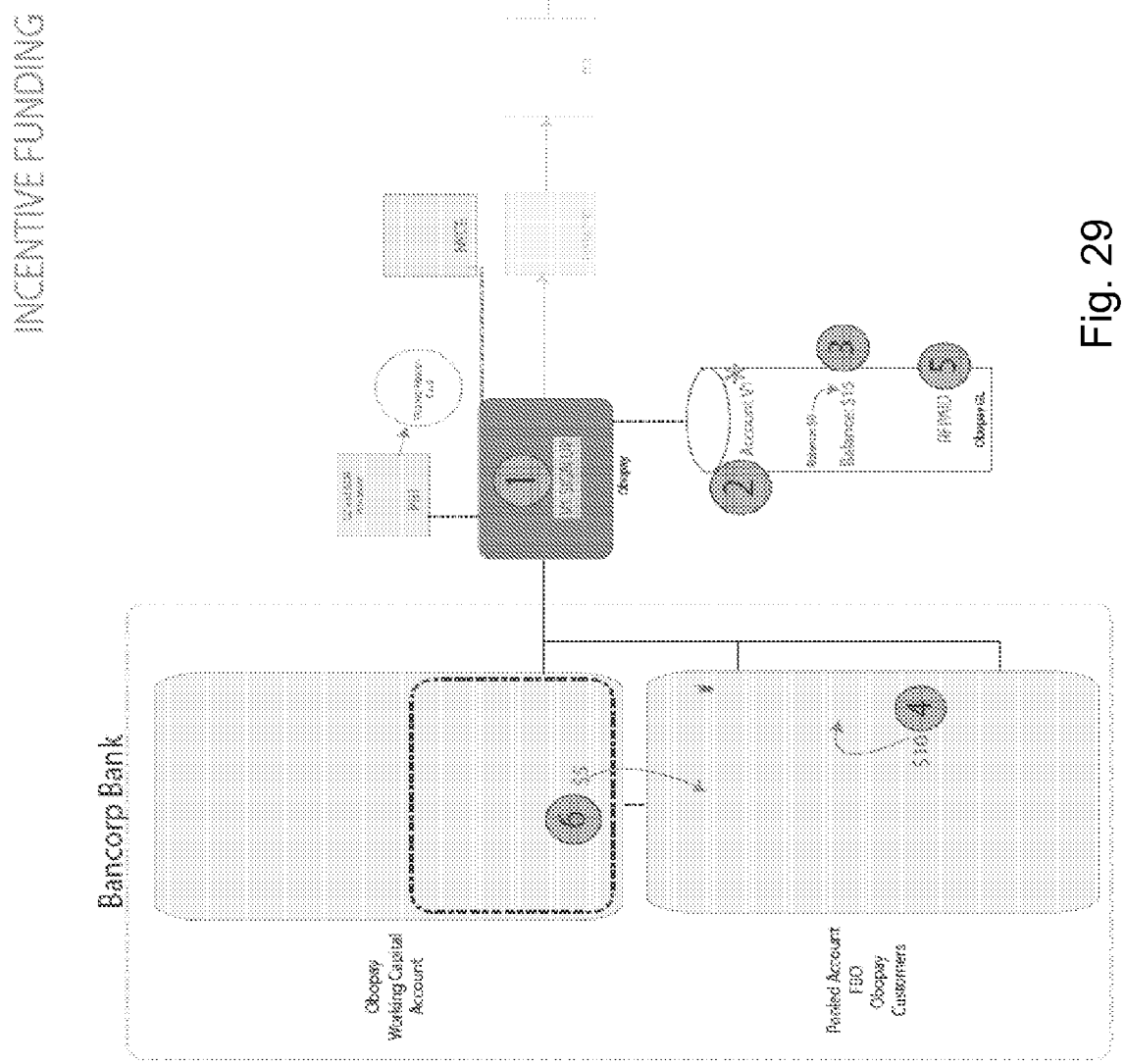
FIG. 29 shows incentive funding.

FIG. 29 shows incentive funding. Incentive funding occurs when new obopay users are given a sign up bonus of $5 or any other amount. When the user signs up, this $5 will be reflected in the balance. Also, any funds virally sent to the user will be transferred into their account. A pending viral payment occurs when a non-Obopay user is virally sent funds they are held in the Customer Pooled Account. The payment is tracked in the senders "Invitation Table," a section of their own data profile. Viral payments are only "pending," meaning the sender can cancel the payment.

A specific flow includes: (1) V1 (recipient of viral funds, nonuser) signs up for Obopay at Obopay.com. (2) Account is created in Obopay database. (3) Users balance in Obopay GL now reflects $5 bonus and $10 viral payment. (4) Funds virally sent to V1 ($10 sent to user before signup) remain in Customer Pooled Account. (5) Database profile for original sender of viral funds is updated to "RFPAID" (referral paid). (6) In a night time batch, $5 is transferred from Obopay w/c account to the Customer Pooled Account.

Figure 30:
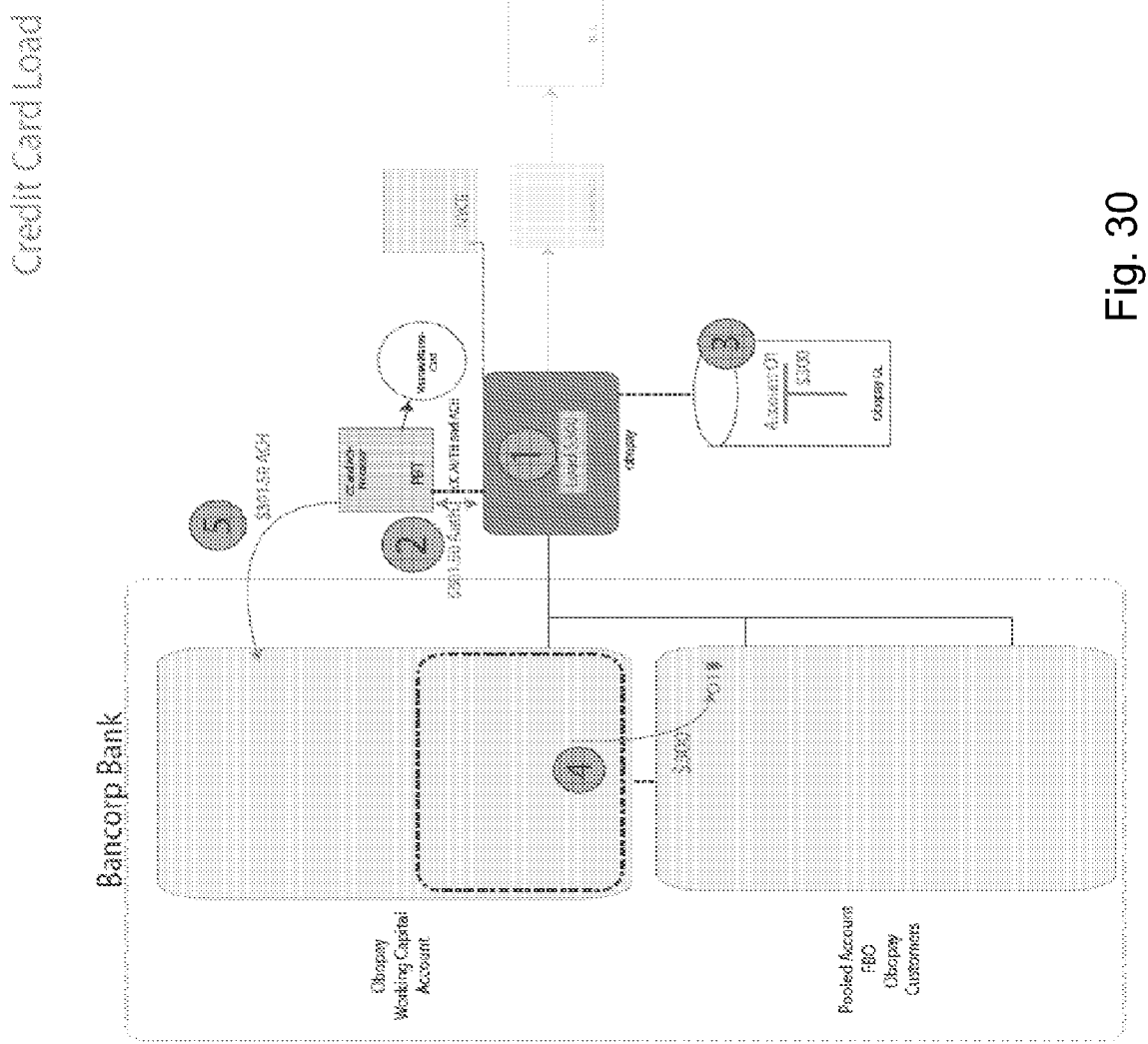
FIG. 30 shows credit card load.

FIG. 30 shows credit card load. Credit card load is the process of loading funds into a Obopay account via a credit card. The Obopay working capital account is a bank account at Bancorp bank (or any other banking partner). This account contains Obopay working capital and is funded with Obopay working capital. This account is also used as settlement account for NYCE, PBT, and others.

A specific flow includes: (1) Obopay user O1 goes to Obopay.com and initiates a $300 load from his Visa card to his Obopay account. (2) Obopay, using Pay-By-Touch as a processor, obtains a $301.50 authorization (including an approximate fee) for the credit card transaction. (3) The amount $300 is credited to O1's account in the Obopay GL. (4) Obopay transfers $300 from the Working Capital Account to the Customer Pooled Account. This may occur in a night time batch. (5) Pay-By-Touch settles the transaction and then initiates a $301.50 ACH to the Obopay Settlement Account at Bancorp Bank. This may occur in a next-day batch.

Figure 31:
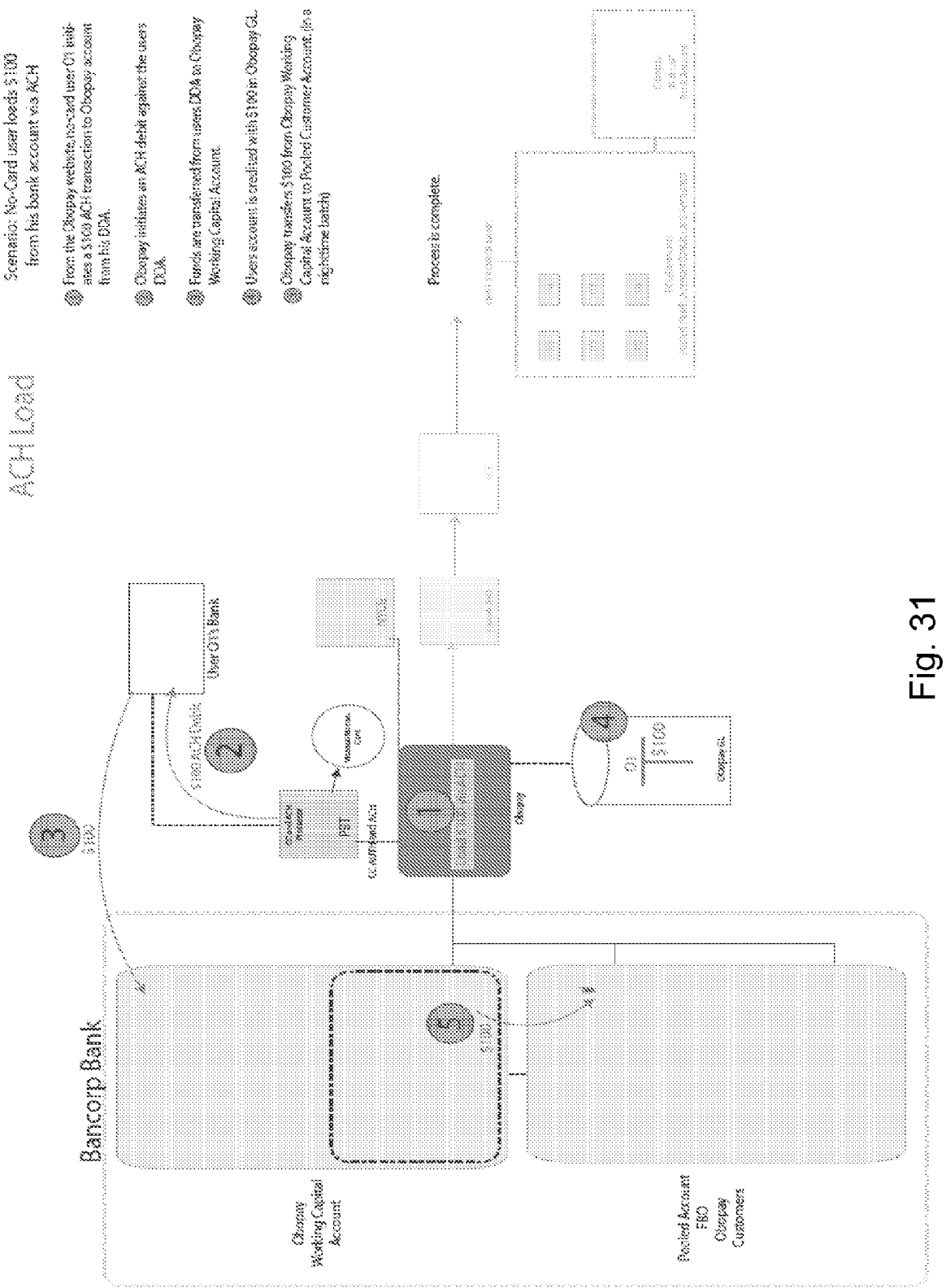
FIG. 31 shows ACH load.

FIG. 31 shows ACH load. A specific flow includes: (1) From the Obopay website, no-card user O1 initiates a $100 ACH transaction to Obopay account from his DDA. (2) Obopay initiates an ACH debit against the users DDA. (3) Funds are transferred from users DDA to Obopay Working Capital Account. (4) Users account is credited with $100 in Obopay GL. (5) Obopay transfers $100 from Obopay Working Capital Account to Pooled Customer Account. This may be done in a night time batch operation.

Figure 32:
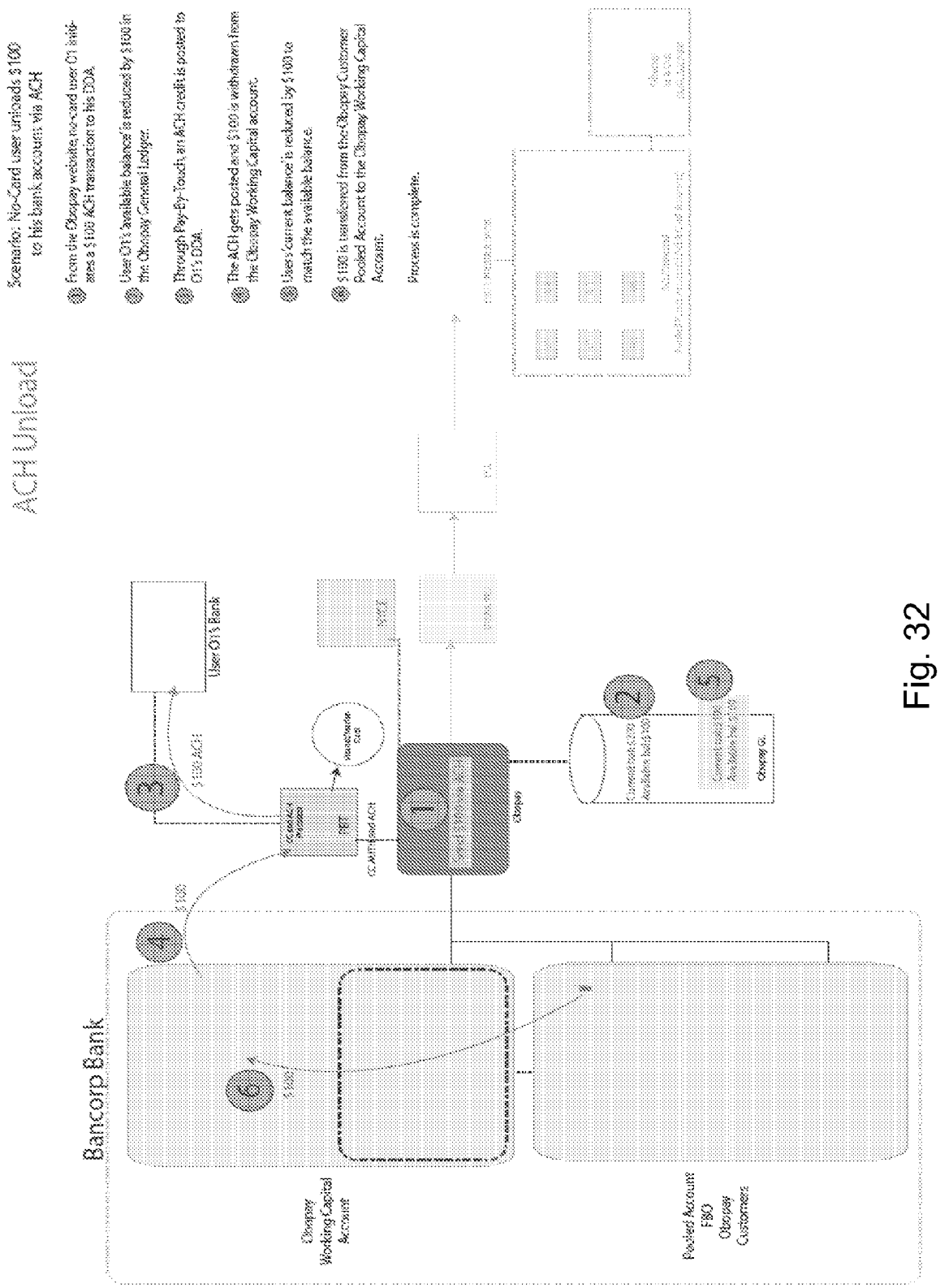
FIG. 32 shows ACH unload.

FIG. 32 shows ACH unload. A specific flow includes: (1) From the Obopay website, no-card user O1 initiates a $100 ACH transaction to his DDA. (2) User O1's "available balance" is reduced by $100 in the Obopay General Ledger. (3) Through Pay-By-Touch, an ACH credit is posted to O1's DDA. (4) The ACH gets posted and $100 is withdrawn from the Obopay Working Capital account. (5) Users "current balance" is reduced by $100 to match the available balance. (6) The $100 is transferred from the Obopay Customer Pooled Account to the Obopay Working Capital Account.

Figure 33:
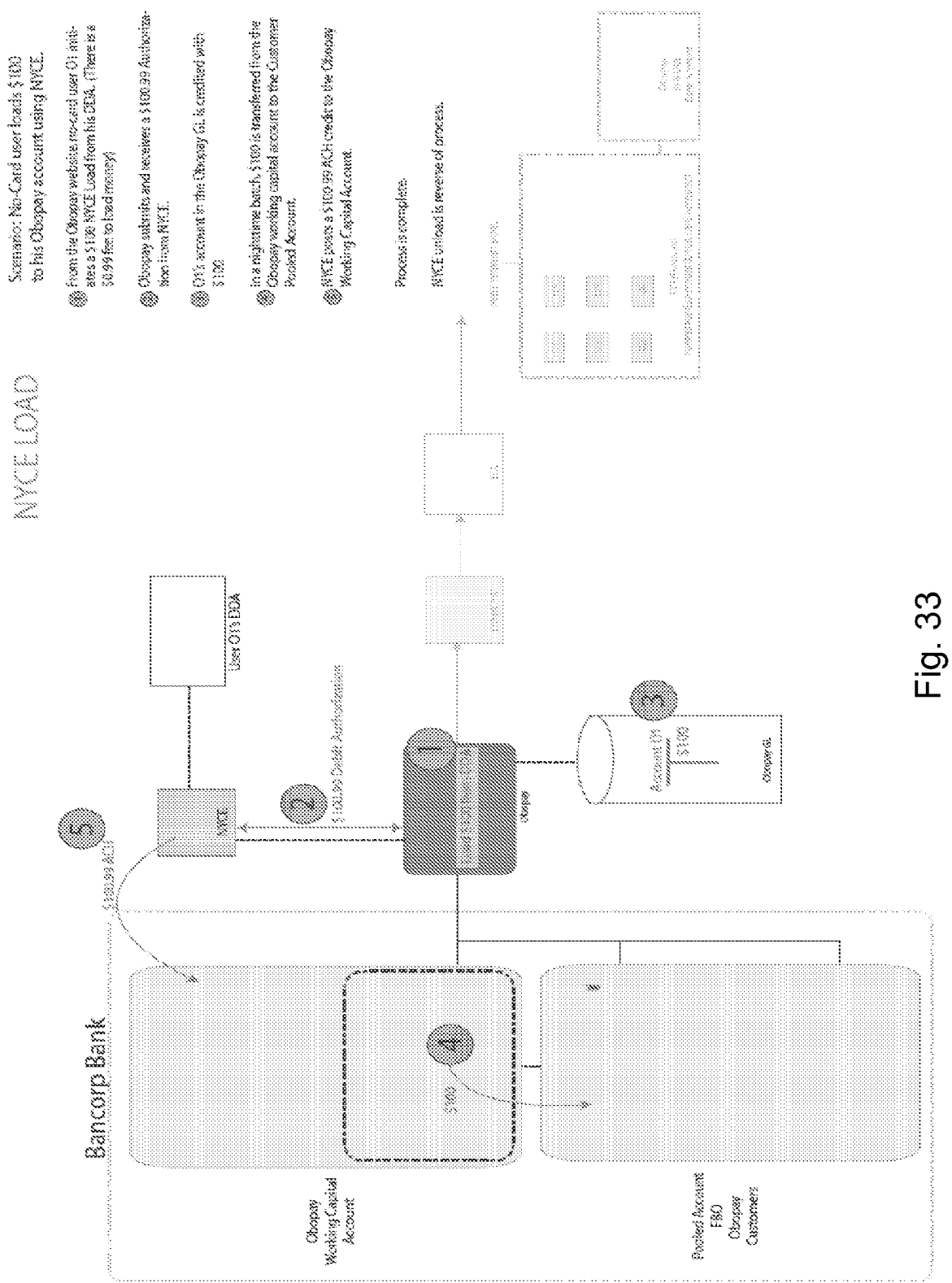
FIG. 33 shows an AIM load.
Figure 34:
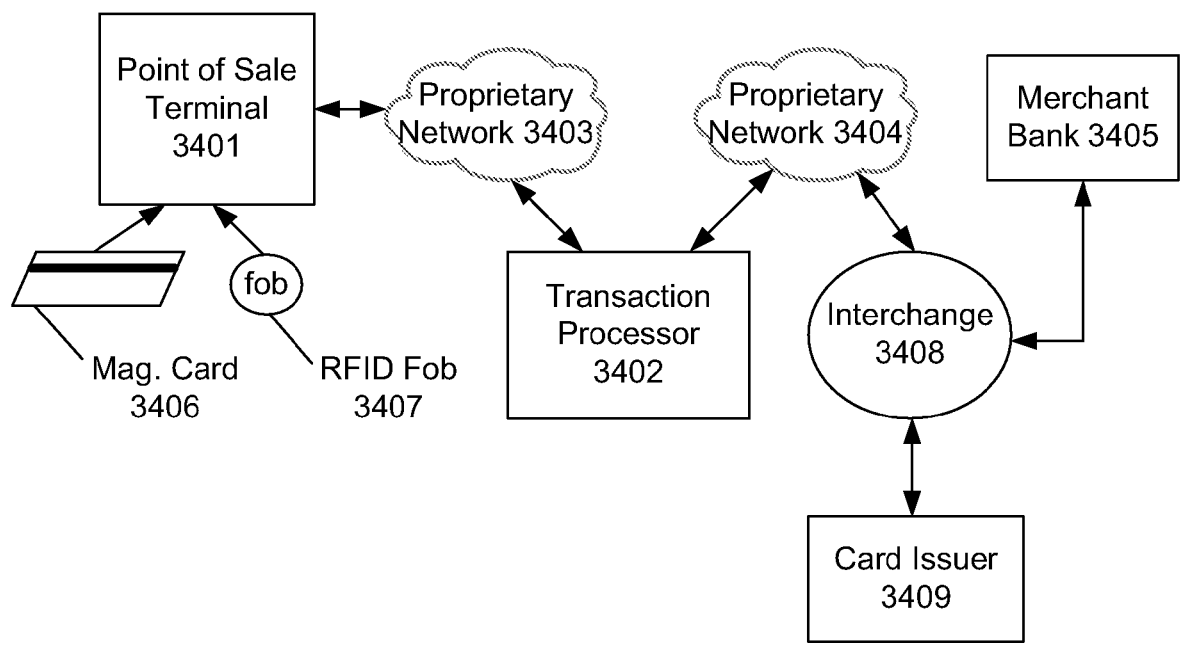
FIG. 34 shows a prior art environment for implementing a credit card transaction using the "closed" interchange network.

FIG. 33 shows an AIM load. The load may be through any AIM institution such as NYCE, PLUS, STAR, and others. In a specific implementation, the AIM load is a NYCE load. A specific flow includes: (1) From the Obopay website, no-card user O1 initiates a $100 NYCE Load from his DDA. (There is a $0.99 fee to load money.) (2) Obopay submits and receives a $100.99 Authorization from NYCE. (3) O1's account in the Obopay GL is credited with $100. (4) In a night time batch, $100 is transferred from the Obopay working capital account to the Customer Pooled Account. (5) NYCE posts a $100.99 ACH credit to the Obopay Working Capital Account.

Today's payment systems (i.e., credit and debit cards) have costs to both consumers and merchants. Consumers may be charged with yearly subscription fees. Merchants are charged heavily with interchange fees. What is needed is a payment system available to consumers and merchants which has no signup fees, no subscription fees, and no transaction fees for either the consumer or the merchant. Yet, at the same time, the "processor" which runs such a system must be compensated accordingly.

Closed Loop Payment Scheme

In an embodiment, the invention provides a method for operating the payment transfer infrastructure as a closed loop payment system. A closed-loop financial transaction system facilitates payments without the substantial payment charges associated with closed-loop financial systems and has a high level of security for the holder, the merchant and others involved in the financial transactions.

A closed loop payment system occurs where the components of the value transfer process take place under the control of the entity who owns the payment system. Because the owner controls the system, the underlying pricing is also under the control of the owner. In contrast, cash and checks are open payment systems where each participant sets their price for handling their piece of the transaction without a payment to a network operator.

Figure 35:
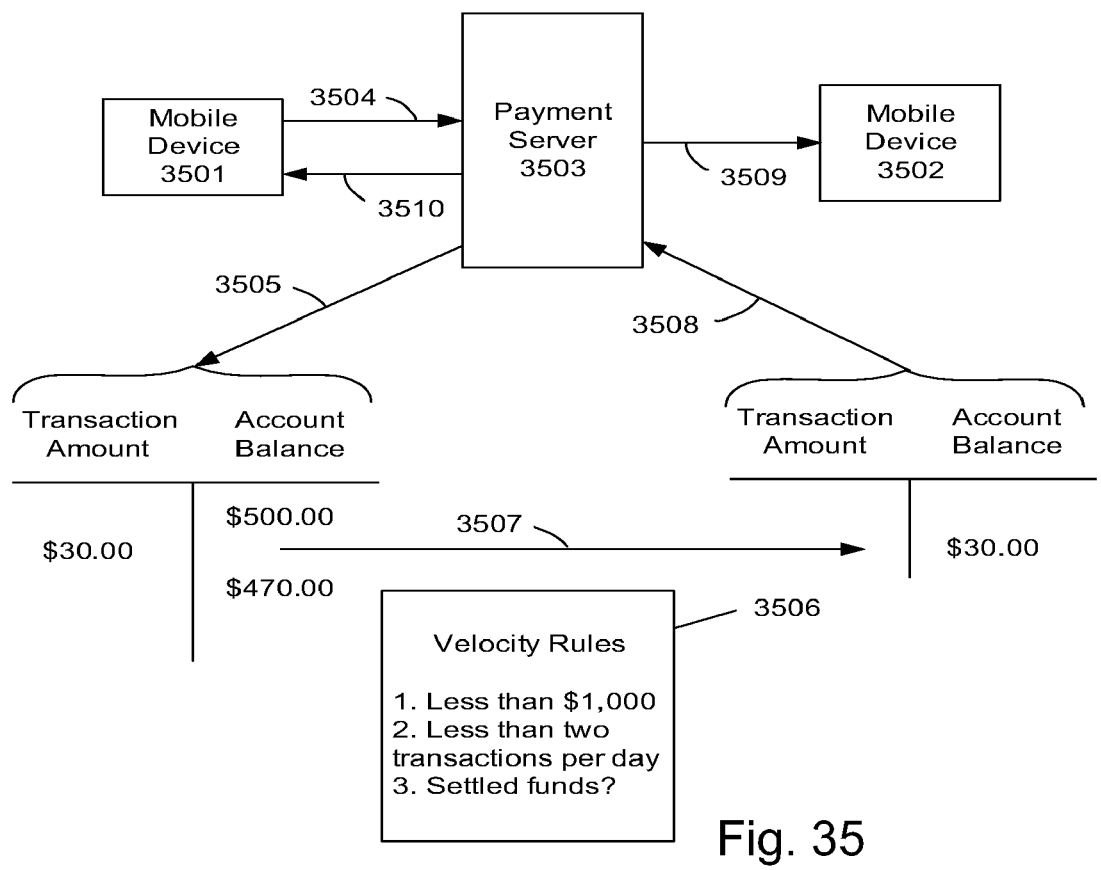
FIG. 35 shows a closed loop payment transaction system in accordance with an embodiment of the present invention.

FIG. 35 shows the transaction flow in a closed loop payment system. Specifically, when a payment is made from a mobile device 3501 to another mobile device 3502, the request for the transfer is passed to the payment server 3503. The request is indicated by reference arrow 3504. Server 3503 accesses the T-ledger for the account holder associated with mobile device 3501 (as indicated by reference arrow 3505) and transfers the specified amount to a payee T-ledger (as indicated by reference arrow 3507) if certain velocity rules are met as indicated at 3506. Once funds have been transferred to the payee, as indicated by 3508, server 3503 sends a notification message to the payee as indicated at 3509. Finally, the payer account holder receives a confirming message from server 3503 that the transaction has been completed. Preferably the entire closed loop system is owned by single entity. The system is primed or loaded by account holders who trade dollars for an account balance maintained on the payment server (see FIG. 3).

There are several advantages to a closed loop payment system. The primary advantage is that the owner of the system is able to control pricing to both the sender and receiver and there is an interest earnings opportunity on the funds loaded to the system. The payment system owner is able to earn interest on all funds in the system until they are converted or unloaded back to dollars. As more functions are added, the closed loop system becomes more profitable due to an increase in fees and balances.

The value propositions for the participating account holder include:

(1) Safety—the account holder's money is safely locked in mobile device instead of having to carry cash in a pocket or purse;

(2) Security—timely verification to see how much money is available in the account;

(3) Information—easy to obtain account activity and balance information;

(4) Convenient—the account holder may move money in seconds around the world or across a room.

The value propositions for the merchants include:

(1) Safety—no cash;

(2) Less handling cost—no counting cash receipts, no deposit slips, no adding machine tapes;

(3) Less transaction costs—lower fees than credit cards; and (4) Guaranteed funds—no returned checks.

Merchant partners have a unique opportunity to earn revenue for handling transactions directed to depositing funds to a prepaid debit account or for providing cash to an account holder. Commissions may be earned by the merchants when funds are added to an account.

The stand-alone closed loop payment system of the present invention is designed to integrate with a companion bank account. This account can be a preexisting account or, for unbanked users, accounts can be created or held in a pooled account with the partner bank.

The closed loop system maintains a user profile database that includes the account holder's name and demographic data, information used for underwriting the risk for each specific account holder and linked bank account information for accounts that will be used to load or unload funds from the account. The user profile database also requires a consumer facing and customer service facing website for collection of the enrollment data when accounts are opened.

The payment server maintains a "T" account record for each account holder. This account is a ledger that keeps track of each account holder's transactions and balances. In conjunction with the T account database, the payment server provides history and balance data through the mobile device as well as a consumer and customer service facing web site.

In order to get money into and out of the closed loop payment system, the present invention provides for three types of functions for different account holders.

Some account holders will already have a bank account with a bank that is not a partner. The system allows account holders to move funds to and from this bank account through the ACH system or through a direct integration with the account holder's DDA or through an integration through the AIM network. Due to the risk involved, the user will be subjected to risk controls that may include deferred availability of transferred funds (for example a transfer from your bank account on Monday may not be used until Thursday). This deferral time could be reduced with additional underwriting (running credit reports or obtaining financial statements). A reduction in deferral time may also occur due to the user having a good credit record with a partner carrier or guaranteeing payments with a credit card that is held in reserve. In general, this approach is not our first choice due to the risk involved unless there is a carrier involved that can deliver some underwriting data and enough customers to justify the additional underwriting.

Where the account holder enrolled as a result of a relationship with a partner bank, a real time connection to the Demand Deposit Accounting (checking account) system enables the account holder to obtain balances and post transactions to their account in real time.

In other instances, the account holder maintains an account with a bank (e.g., Bancorp Bank or First Premier Bank) that operates the bank but web sites, checks, and customer statements will carry an affinity branding. This approach will allow us to provide the affinity branding with a companion bank account (the account will be free to the user) in a tightly integrated environment.

The present invention relates to a closed-loop financial transaction service having low or no transaction fees and improved security. An embodiment of the present invention encompasses a method for fast, easy transfer of payments between any peer or between a consumer and merchant. An implementation of the method includes a mobile telephony device, cellular telephone (cell phone), or similar device as the mechanism to access an account such as a prefunded debit account and authorize transfer of funds from that account to another party. Additional embodiments of the present invention encompass a variety of partners that include mobile phone operators, nationally branded merchants, and financial service providers together with a payment platform that provides a fast, easy way to make payments by individuals using their cell phones or other telecommunication device.

Figure 36:
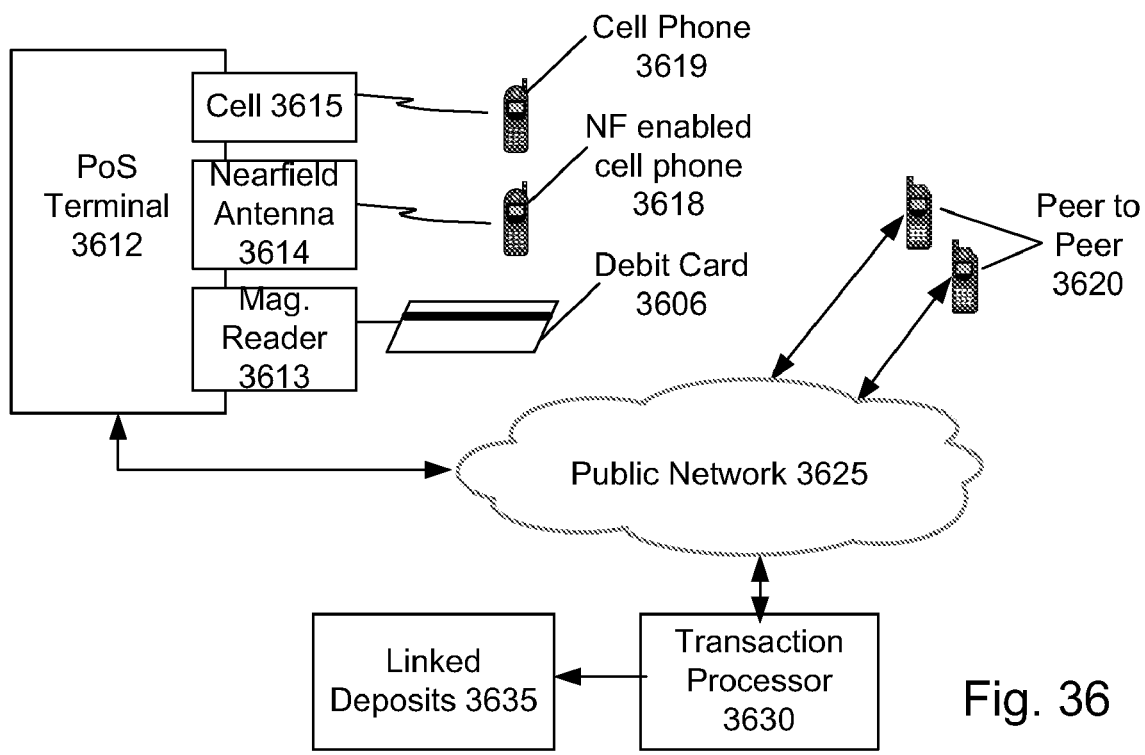
FIG. 36 shows the environment for implementing a closed-loop financial transaction system with low fees and improved security in accordance with an embodiment of the invention.

Refer now to FIG. 36, which shows a closed-loop financial transaction system in accordance with an embodiment of the present invention. In this transaction system, consumers and merchants, a group of two or more consumers or a group of two or more merchants may readily complete financial transactions quickly, securely for little or no transaction cost.

This closed-loop financial transaction system utilizes prefunded debit account and for this reason may comprise a point of sale (POS) terminal 3612 where traditional debit cards 3606 may be used as in the prior art system—by swiping the card at the magnetic reader 3613 associated with POS terminal 3612. Card 3606 provides a second view into the account holder's accounts.

In some embodiments, the POS terminal 3612 further includes a near field (F) antenna and circuitry 3614. NF antenna and circuitry 3614 detect passive devices such as a NF enabled cell phone, a Bluetooth enabled cell phone or other short range transmission device, such as RFID or bar codes, associated with cell phone 3618. Thus, when cell phone 3618 is in proximity to the POS terminal, account information is automatically to POS terminal. In yet other embodiments, the POS terminal 3612 includes a cell phone connection that establishes a connection with transaction processor 3630 which is also variously referred to as payment server or server, upon initiation of a transaction. It is to be understood that transaction processor 3630 includes one or more server farms or data centers capable of handling large volumes of simultaneous transactions. As is well understood in the art, such server farms are typically geographically dispersed and linked with the appropriate technology to maintain an accurate view of the real time status of all of the accounts. The POS terminal transfers the transaction amount directly from the POS terminal to the payment server for authorization by a cell phone connection 3615. The payment server 3630 calls the account holder's cell phone 3619 to confirm the transaction details. One skilled in the art will appreciate that POS terminal may include only one or two of the magnetic reader 3613, NF antenna and circuit 3614, and cell phone 3615. It will also be appreciated that POS terminal 3612 is usually associated with a merchant.

One considerable advantage of an embodiment of the present invention is that both cell phone 3618 or 3619 and the card 3606 share a common PIN. Thus, the account holder is not inconvenienced by having to recall multiple PINs.

In addition to consumer-to-merchant transactions, the present invention is flexible enough to implement true person-to-person financial transaction capabilities. Person-to-person devices 3620 each comprise a cell phone that is linked to an account and an account holder. When one of the peers 3620 desires to initiate a transaction request, such as to send a payment to another peer, the request, authorization and confirmation of the transaction are all sent between payment server 3630 and the peers 3620 over a public network. Advantageously, since one or more public networks are utilized, there is no interchange fee so cost to the participants can be either free or so cheap as to comprise a negligible percentage of the overall transactions conducted on the system, especially compared to the typical interchange fee.

As noted above, transaction requests are routed to a payment server 3630 over a public network. In one embodiment, the public network 3625 is the Internet. In another embodiment, the public network 3625 is the cellular telephone network. In yet another embodiment, the public network 3625 is a radio network and in yet another embodiment, it is the public switched telephone network or PSTN. The public network 3625 transfers the account holder transaction requests to the payment server 3630.

In an implementation, the connection over the public network 3625 is a secure link that relies on authenticated participants and encryption. Thus, for connections over the Internet, the connection protocol may be HTTPS and the link may be a virtual private network or VPN. Payment server 3630 is also connected to linked deposit accounts 3635 either over the public network 3625 (not illustrated) or over a proprietary ACH banking or financial network.

Figure 37:
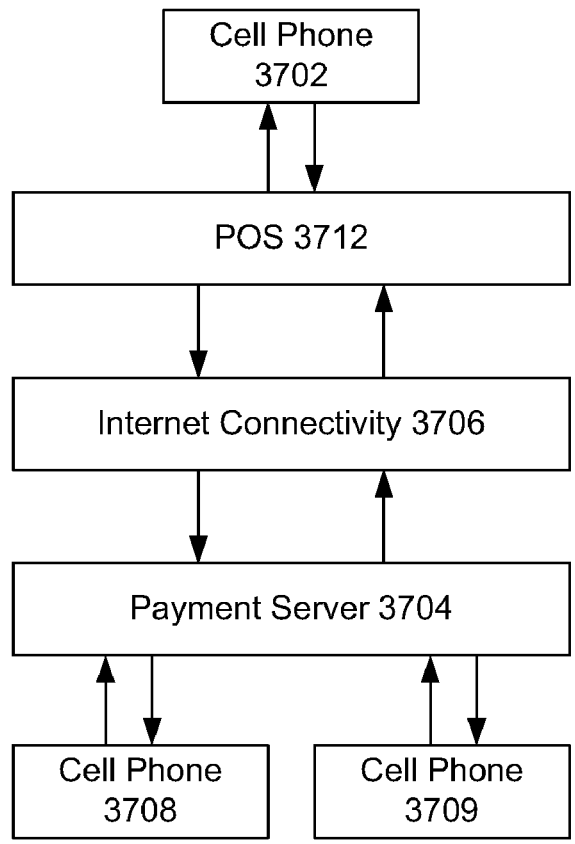
FIG. 37 is a block diagram of a closed-loop financial system in accordance with an embodiment of the invention.

FIG. 37 is a block diagram of a closed-loop financial system in accordance with an embodiment of the invention. More specifically, the simplicity of the present invention provides the ability to be ubiquitous and to provide great value to the account holders and merchants. As previously discussed, the present invention provides an inexpensive electronic financial transaction service for consumer-to-merchant transactions and for person-to-person transactions. This flexibility is provided in part by interfacing a consumer's cell phone 3702 to a POS terminal 3612. In one embodiment, the consumer may enter their telephone number on a keypad associated with the POS terminal and when the transaction total is available, the merchant can send a PAY REQUEST to cell phone 3702 by way of an Internet connection 3706 and payment server 3704. Payment server 3704 would call cell phone 3702 and request the consumer to authorize the transfer of funds. The consumer would then enter their PIN or other biometric identification and confirm the amount to authorize the payment. Payment server 3704 would transfer the funds from the consumer's prefunded debit account (plus any transaction fees) to the merchants account (less any transaction fees).

In alternative embodiments, cell phone 3702 includes a near-field communication (NFC) circuit, Bluetooth circuit or RFID circuit (not shown) that enables POS terminal 3712 to query and recover account information, such as the cell phone telephone number. In this embodiment, the merchant would automatically detect the account information and send the request to payment server 3704. The payment server 3704 would again call the cell phone 3702 to request the PIN or other biometric identification and payment authorization.

Person-to-person transactions eliminate the POS terminal from the process with each peer 3707 and 3708 contacting payment server 3704 directly to conclude the financial transaction.

Figure 38:
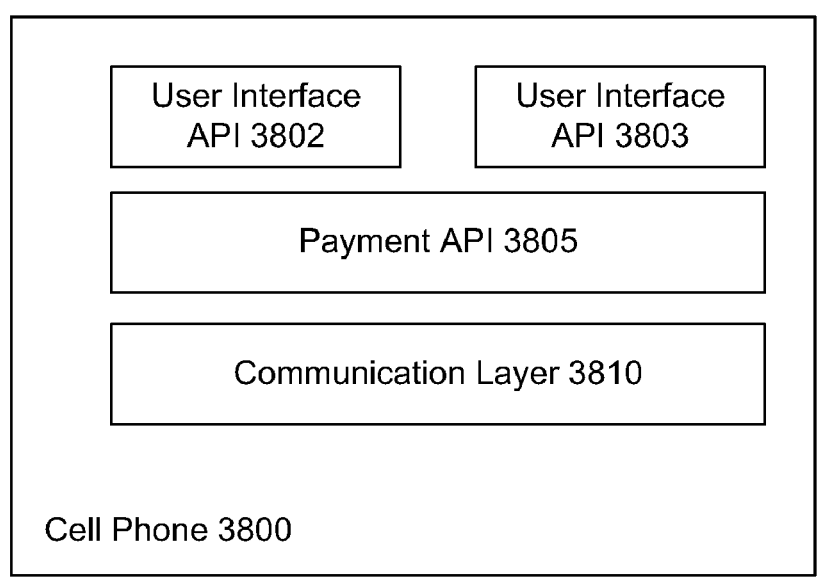
FIG. 38 is a block diagram of the mobile client application (MCA) in accordance with an embodiment of the invention.

FIG. 38 is a block diagram of the mobile client application (MCA) in accordance with an embodiment of the invention. The MCA resides on the cell phone 3802 and comprises user interface APIs 3802 and 3803 and a Payment API 3805. API 3802 provides the user screen images that guide an account holder through various financial transactions such as identifying the other party, the amount of the transaction, if any and the type of transactions that are available. API 3803 provides service providers or other value added partners (such as accounting or record keeping services) with a mechanism for accessing the payment API 3805 to acquire information to provide the value added services. The payment API 3805 provides, in one embodiment, the logic for implementing the present invention and for interfacing with the communication layer 3810 of the cell phone.

One method for operating a payment transfer infrastructure in accordance with an embodiment of the present invention is as a closed-loop payment system. A closed-loop payment system occurs where all of the components of the value transfer process take place under the control of the entity who owns the payment system. Because the owner controls the system, the underlying pricing is also under the control of the owner.

Figure 39:
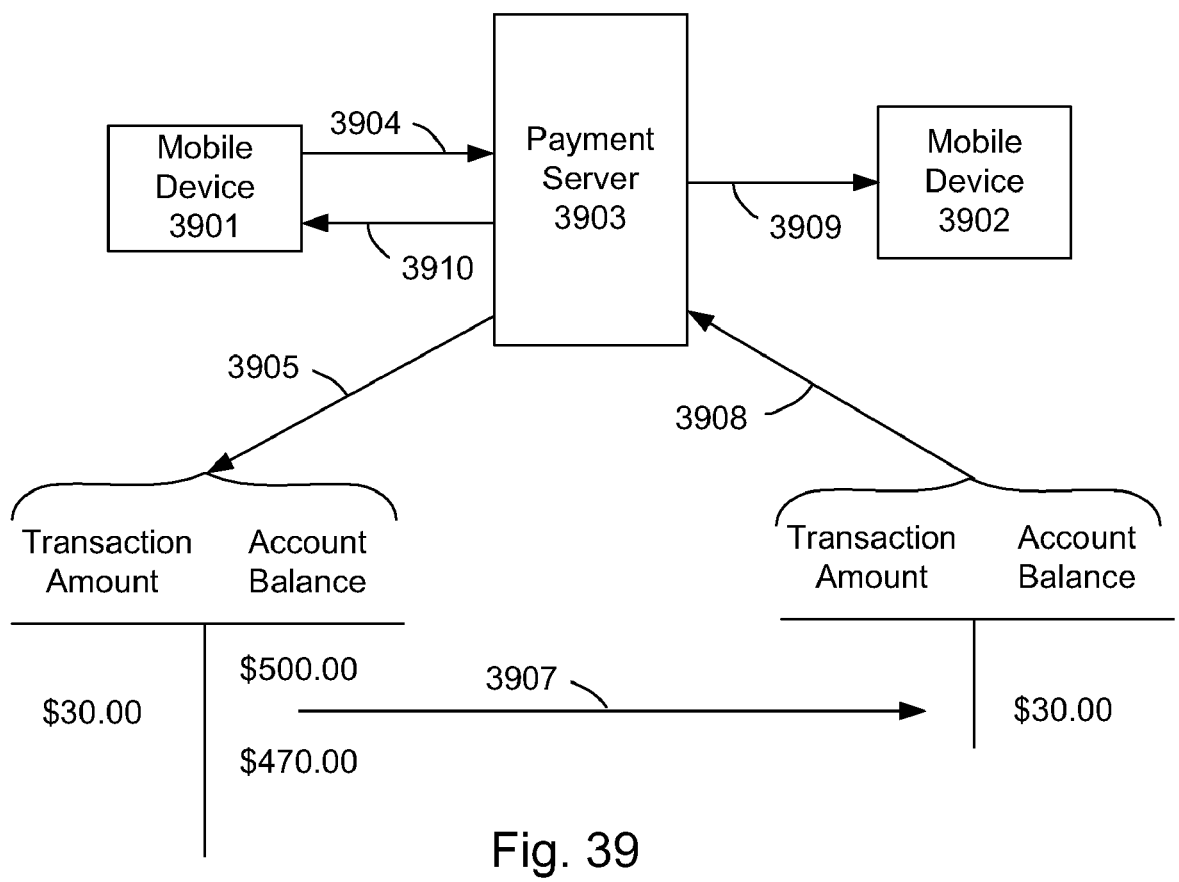
FIG. 39 shows a closed-loop payment transaction system in accordance with an embodiment of the present invention.

FIG. 39 shows the transaction flow in the closed-loop payment system shown in FIG. 36. Specifically, for a person-to-person transaction, when a payment is made from a mobile device 3901 to another mobile device 3901, the request for the transfer is passed to the payment server 3903. The request is indicated by reference arrow 3904. Server 3903 accesses the T-ledger for the account holder associated with mobile device 3901 (as indicated by reference arrow 3905) and transfers the specified amount to a payee T-ledger (as indicated by reference arrow 3907) if certain velocity rules are met as indicated at 3906. Once funds have been transferred to the payee, as indicated by 3908, server 3903 sends a notification message to the payee as indicated at 3909. Finally, the payer account holder receives a confirming message from server 3903 that the transaction has been completed. In an embodiment, the entire closed-loop system is owned by single entity. The system is primed or loaded by account holders who trade dollars for an account balance maintained on the payment server (see FIG. 36).

There are several advantages to a closed-loop payment system. The primary advantage is that the owner of the system is able to control pricing to both the sender and receiver and there is an interest earnings opportunity on the funds loaded to the system. The payment system owner is able to earn interest on all funds in the system until they are converted or unloaded back to dollars. As more functions are added, the closed-loop system becomes more profitable due to an increase in fees and balances.

The value propositions for the participating account holder include:

(1) Safety—the account holder's money is safely locked in mobile device instead of having to carry cash in a pocket or purse;

(2) Security—timely verification to see how much money is available in the account;

(3) Information—easy to obtain account activity and balance information;

(4) Convenient—the account holder may move money in seconds around the world or across a room.

The value propositions for the merchants include:

(1) Safety—no cash;

(2) Less handling cost—no counting cash receipts, no deposit slips, no adding machine tapes;

(3) Less transaction costs—lower fees than credit cards; and (4) Guaranteed funds—no returned checks.

Merchant partners have a unique opportunity to earn revenue for handling transactions directed to depositing funds to a prepaid debit account or for providing cash to an account holder. Merchants may earn commissions when funds are added to an account using their POS terminal.

The stand-alone closed-loop payment system of the present invention is designed to integrate with a companion bank account. This account can be a preexisting account or, for users that do not have an existing bank account, a partner bank may create an account.

The closed-loop system maintains a user profile database that includes the account holder's name and demographic data, information used for underwriting the risk for each specific account holder and linked bank account information for accounts that will be used to load or unload funds from the prepaid debit account. The user profile database also requires a consumer facing and customer service facing website for collection of the enrollment data when opening an account. Advantageously, the present closed-loop system interfaces with the credit card interchange system to access credit lines available under a credit card account.

The payment server maintains a "T" account record for each account holder. This account is a ledger that keeps track of each account holder's transactions and balances. In conjunction with the T account database, the payment server provides history and balance data through the mobile device as well as a consumer and customer service facing web site. The T account database is real time record that records transactions as they occur. This means that when a transaction occurs, the sender of funds can observe the balance in their account immediately decrease while the recipient can observer the instantaneous increase in their account balance. There is no ACH or other transfer related delay in moving funds between accounts.

In order to get money into and out of the closed-loop payment system, the present invention provides for three types of functions for different account holders.

Some account holders will already have a bank account with a bank that is not a partner. The system allows account holders to move funds to and from this bank account through the ACH system. Due to the risk involved, the user will be subjected to risk controls that may include deferred availability of transferred funds (for example a transfer from your bank account on Monday may not be used until Thursday). This deferral time could be reduced with additional underwriting (running credit reports or obtaining financial statements). A reduction in deferral time may also occur due to the user having a good credit record with a partner carrier or guaranteeing payments with a credit card that is held in reserve. In general, this approach is not intended to be a primary choice due to the risk involved with the transfer of funds from outside the closed-loop financial transaction system unless there is a carrier involved that can deliver some underwriting data and enough customers to justify the additional underwriting.

Where the account holder enrolled because of a relationship with a partner bank, a real time connection to the Demand Deposit Accounting (checking account savings or other account such as a money market account) system enables the account holder to obtain balances and post transactions to their account in real time.

In other instances, the account holder maintains an account with Bancorp Bank, or similar financial institution, which operates the bank but all web sites, checks and customer statements, will carry an affinity branding. This approach allows affinity branding with a companion bank account (the account will be free to the user) in a tightly integrated environment.

Figure 40:
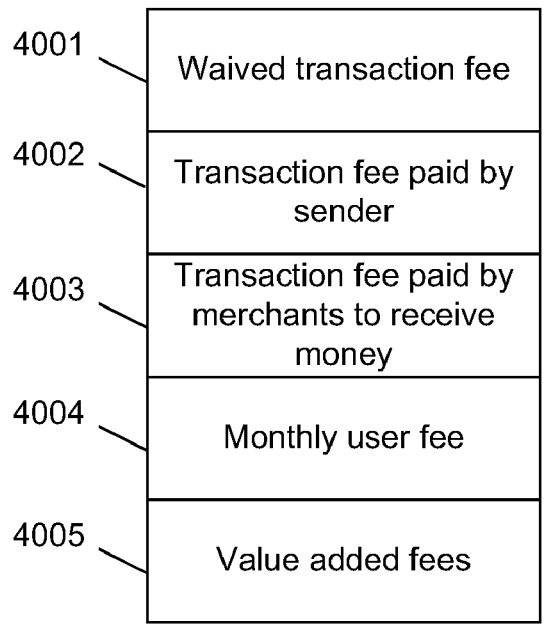
FIG. 40 shows an exemplary fee structure for the closed-loop financial system in accordance with an embodiment of the invention.

FIG. 40 shows an exemplary fee structure for the closed-loop financial system in accordance with an embodiment of the invention. It should be understood that the fee structure may vary and that the illustration presents a typical structure for generating the operating revenue. Due to the ubiquitous nature of the present invention, the transaction fees can be very low or free. Thus, as indicated at 4001, for transactions under a certain dollar amount, the transaction fee is waived. To illustrate, consider a financial transaction of $1 transferred on a person-to-person basis. There would be no transaction fee. While the dollar amount where a transaction fee may be charged can be set arbitrarily, typically the dollar amount will be an amount that is less than $25. Account holders would be entitled to an unlimited number of such transactions on a monthly basis.

For transaction fees over the selected maximum, the account holder sending (initiating a pay transaction) would incur certain fees as indicated at 4002. To illustrate, for transactions amounts that are between $50 and $100, the account holder would incur a transaction fee of $1.00, by way of example. For amounts over a selected amount (such as over $100) a higher fee may be charged or negotiated. These fees are considerably less than the per-transaction fee charged by credit card issuers. In an alternative embodiment, the transaction fee may be a nominal amount, such as a penny, $0.05, or $0.10, that is charged to the sender.

For transactions that involve a merchant, the merchant may optionally offer to pay the transaction fee that would otherwise be charged to the consumer as indicated at 4003. In addition, the merchant is charged an additional fee to receive funds. Again, the actual amount of the merchant transaction fee can vary but in one embodiment is a nominal 1 percent of the transaction amount.

A nominal monthly service charge is, in one embodiment, added to the billings for the cell phone user by the mobile service provider as indicated at 4004. The mobile service provider and the owner of the closed-loop financial transaction system of the present invention share the monthly service charge on a pro-rata basis.

A member-supported payment system is provided to consumers and merchants without sign-up fees, subscription fees, or transaction fees to either consumers or merchants. In a specific implementation, the member payment system is a mobile payment system where consumers may conduct transactions using a mobile device such as a mobile telephone, smartphone, personal digital assistant, or similar portable wireless handheld device. Merchants will make a refundable one-time contribution. These contributions are stored in a pooled trust account by the system and the float dividends or interest on these contributions will fund the system.

In a specific implementation, the member supported payment system (MSPS) provides a completely free payment system to consumers and merchants using the following principles:

1. No signup fees for consumers or merchants
2. No subscription fees for consumers or merchants
3. No transaction fees for consumers or merchants
4. A refundable one time merchant contribution is required.
5. The one time merchant contribution is pooled into an MSPS trust account
6. The MSPS trust account generates float dividends which provides the compensation for the MSPS processing company and system.
7. Consumers and merchants can load and unload from a pooled MSPS working account (separate from trust account).
8. Consumer available funds are prepaid and live within the pooled MSPS working account.
9. The MSPS system manages the "T" account (i.e., balance, debits, credits) for consumer and merchant accounts.

In an embodiment, the invention is a method including: receiving a plurality of merchant contributions to fund a member payment system; placing the merchant contributions into a pooled trust account, where merchants will not receive interest on their contributions; permitting a plurality of consumers to become registered users of the mobile payment without charge; permitting registered users to load or unload funds into a working account of the member payment system without charge; and permitting merchants to load or unload funds into the working account of the member payment system without charge, where interest on pooled trust account funds the member payment system.

Figure 41:
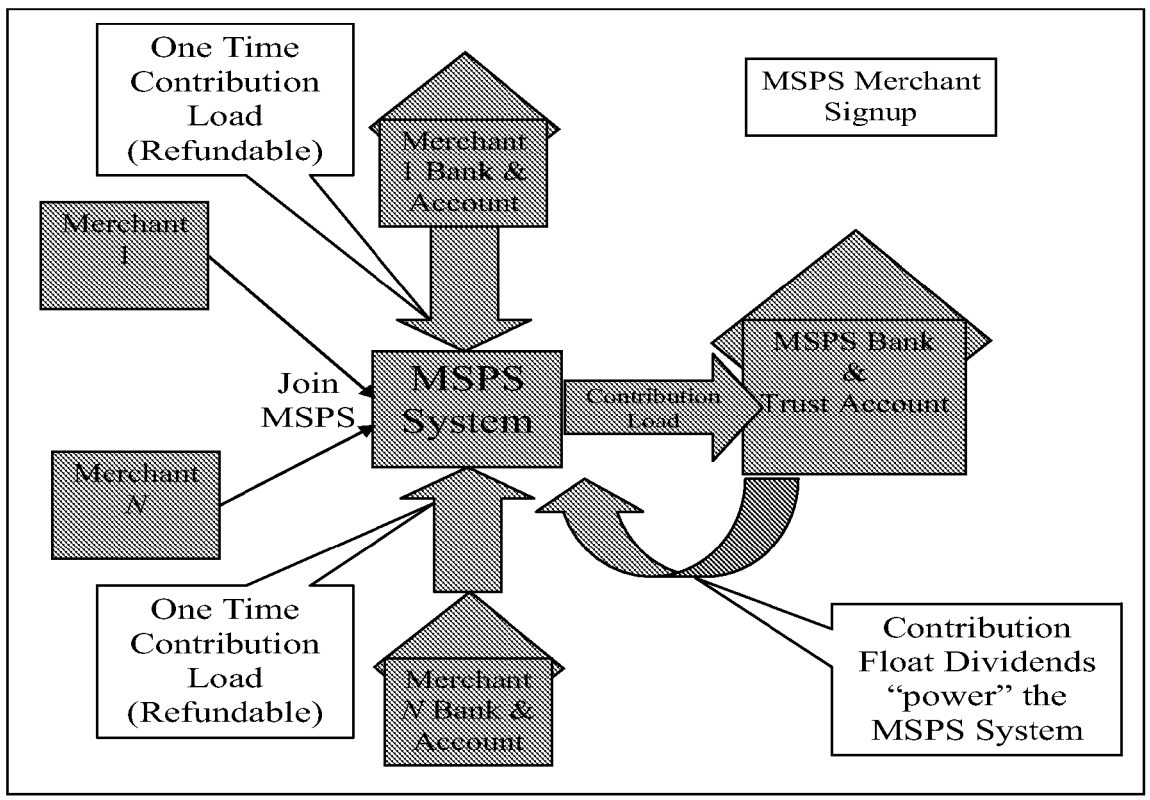
FIG. 41 shows a load trust operation in a member supported payment system implementation of the invention.

FIG. 41 shows a load trust operation in a member supported payment system implementation of the invention.

Figure 42:
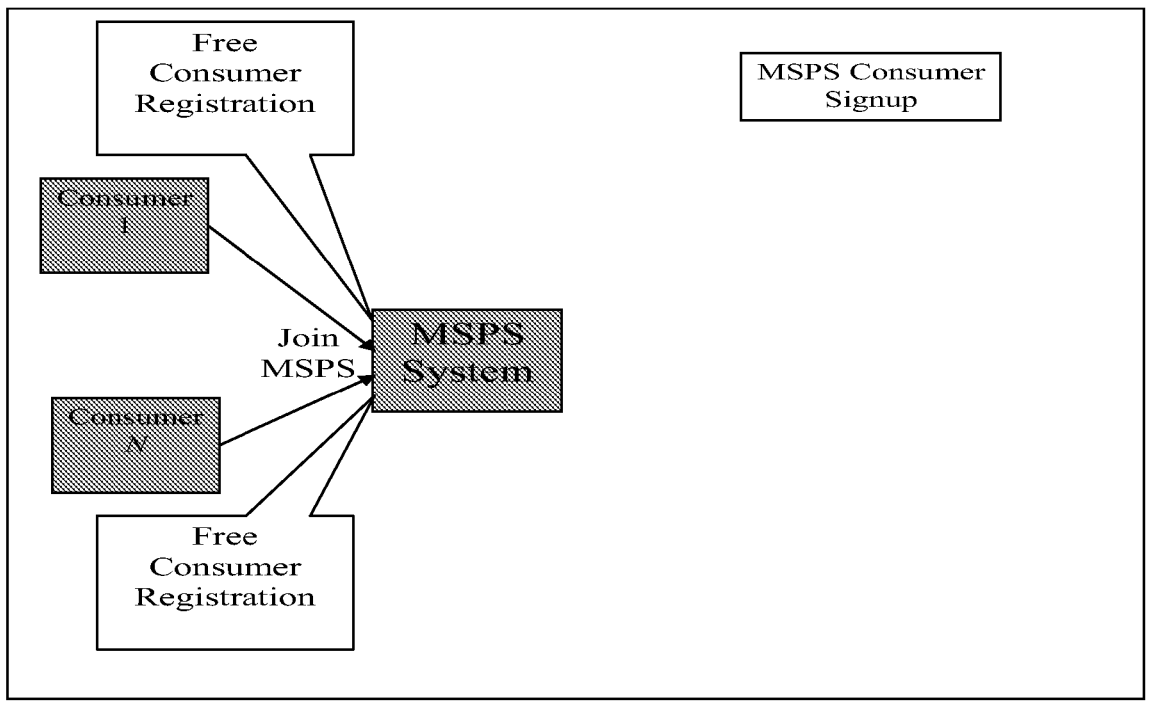
FIG. 42 shows a consumer registration in the member supported payment system.

FIG. 42 shows a consumer registration in the member supported payment system.

Figure 43:
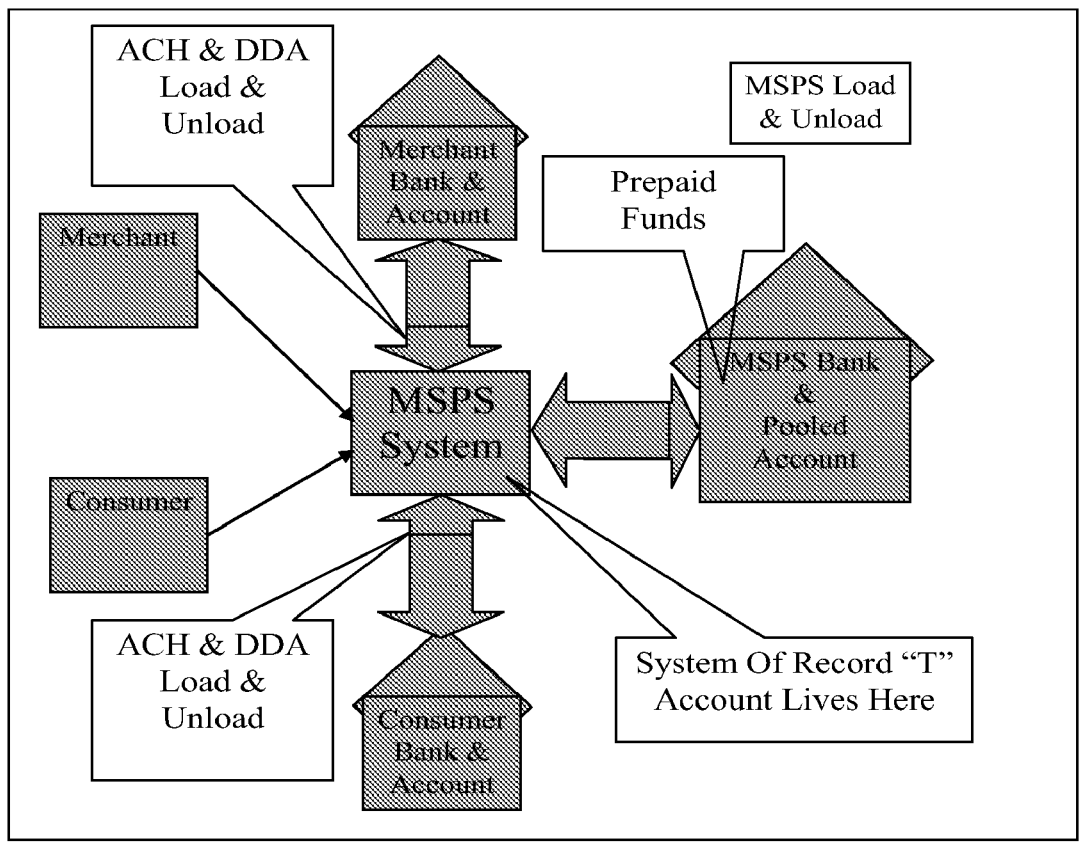
FIG. 43 shows load and unload operations in the member supported payment system.

FIG. 43 shows load and unload operations in the member supported payment system.

Figure 44:
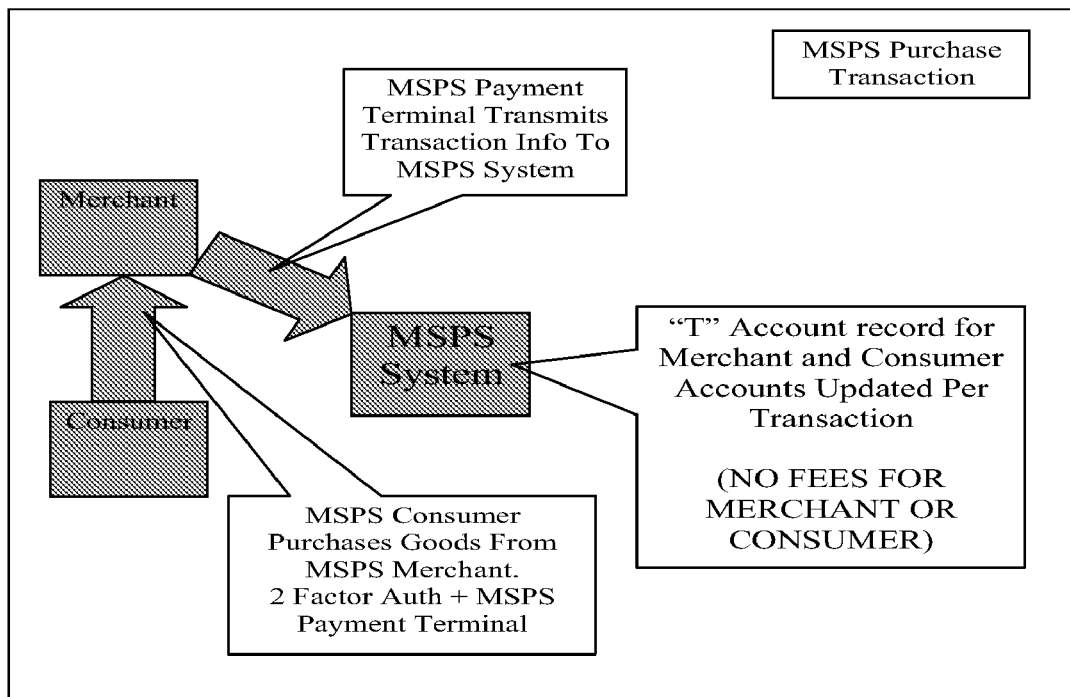
FIG. 44 shows a purchase transaction in the member supported payment system.

FIG. 44 shows a purchase transaction in the member supported payment system.

In an implementation, the merchant contribution may be a paid in installments over a period of time. Depending on the amount of the contribution, the merchant will have greater access or privileges in the system. For example, there may be set levels of contributions which correspond to a number of transactions a merchant will be entitled to without additional fee. Also, the merchant may make a subsequent contribution to increase the merchant's privileges.

In an implementation, the member payment system permits a registered user to request payment of money to another register user via a mobile phone. The member payment system may permit a registered user to request payment of money to a merchant via a mobile phone.

The member payment system may manage transactions records of the registered users. The member payment system manages transactions records of the merchants. The member payment system may manage transactions records of the registered users and merchants. This will reduce the costs to the merchants since they do not need to manage their own transactions records.

The contribution is refundable, so the merchant can decide later not to participate. For example, when a merchant requests a refund of the merchant's contribution to the member payment system, registered users will no longer be permitted to transfer money to the merchant.

Generally, the merchant is not charged a periodic recurring transaction fee for being a participant of the member payment system. The system is funded by the float on the pooled trust containing the merchant's contributions.

Registered users may load or unload funds by way of at least one of Automated Clearing House (ACH) or direct deposit account (DDA). In further implementations of the system, the registered users and merchants may be provided numerous additional ways to load and unload funds. For example, a registered user may choose to have the user's paycheck or a portion of the paycheck directly deposited into the system.

In an implementation, the method includes: permitting a registered user to authorize paying a merchant through the member payment system by using a two-factor authorization scheme. These two factors of authorization may include (1) what the person has (e.g., phone, card) and (2) what the person knows (e.g., PIN, mother's maiden name, challenge question). For example, the system may permit a registered user to authorize paying a merchant through the member payment system by using a mobile phone of the registered user and the user correctly entering a personal identification number or PIN.

Optionally, each registered user may also be provided a debit card. With the debit card, users may make charges without, for example, a mobile phone.

Virtual Pooled Accounts

Figure 45:
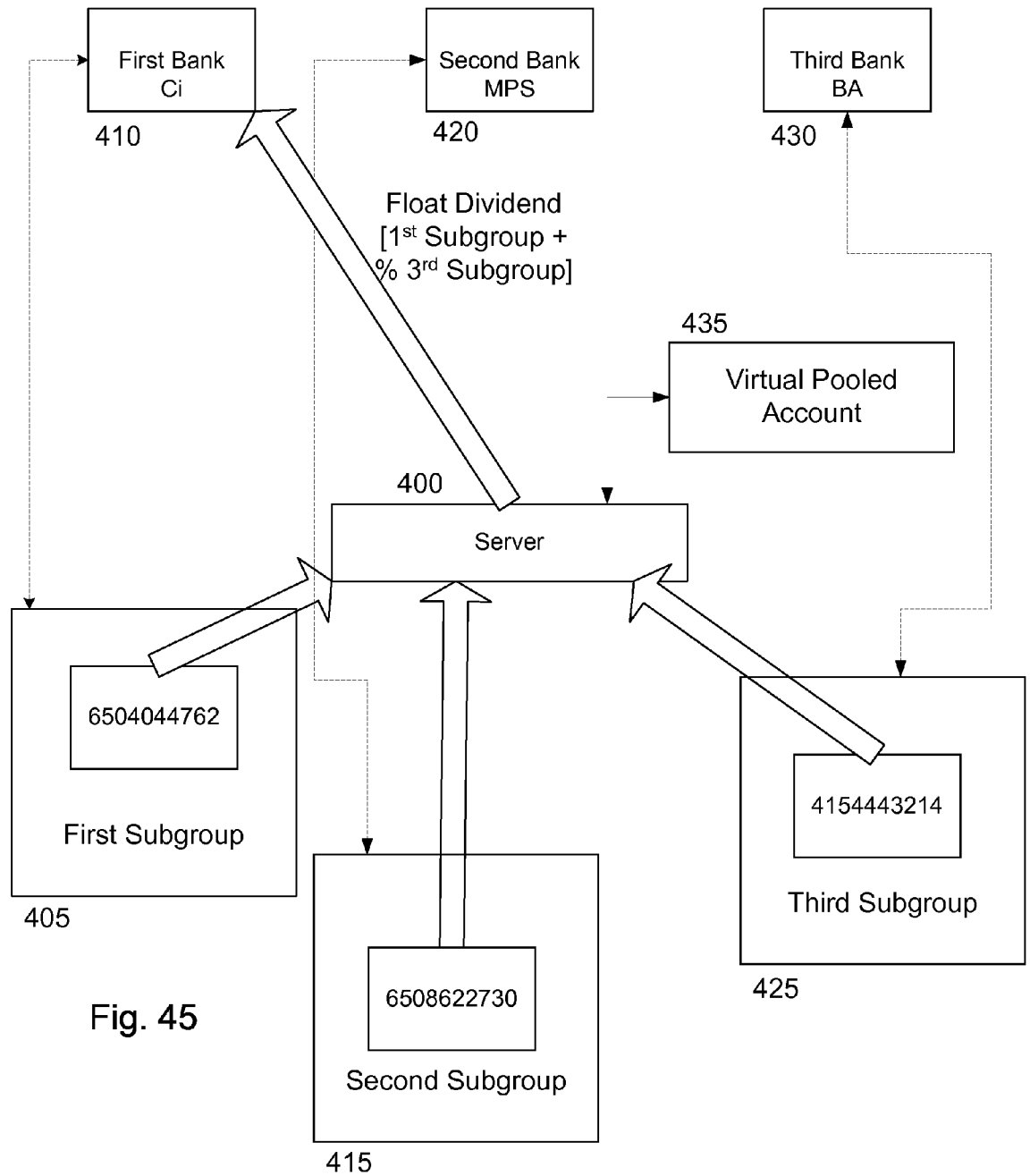
FIG. 45 shows a system using a virtual pooled account.

Referring to FIG. 45, in a specific implementation of the invention, to avoid keeping general ledgers for each bank, the mobile payment system will keep one general ledger for the virtual pooled account for each country. This reduces the settlement and operational costs of the system. Since money will be held in the virtual pooled account, the owner of the virtual pooled account (e.g., the mobile payment system service operator) will receive the float or interest on this money. The recipient of the float on the virtual pooled account may distribute some amounts to the partner banks (who are no longer receiving the float on their general ledgers).

A method of distributing the float funds is as follows:

(1) Accounts that are acquired by the partner bank will be recognized as coming from that bank. For example if bank Ci markets the mobile payment system service and recruits customer A then customer A for it's lifetime will be marked as "Recruited by Ci." For each user record (discussed elsewhere in this application), there may be a field indicating from which source that particular user was recruited from. Some examples of possible sources include the mobile payment service directly, partner bank, partner financial institution, and partner mobile phone provider.

At the end of each day the mobile payment system service will estimate the amount of funds held in the mobile payment system service accounts that are marked as recruited by each partner bank. Let's call this estimated amount to be X-Ci, X-BA, X-ING, where Ci, BA, and ING are examples of financial institutions or banks.

For example, in FIG. 45, member 6504044762 was recruited by first bank Ci while member 4154443214 was recruited by third bank BA. In this example, the members are identified by phone number. Examples of phone numbers for the United States include 4158675309 or 2128675309. In an implementation of the invention, the phone number format may be entered excluding the area code, such as 7762323 or 5550123. For example, this may used the situation the recipient is in the same area code as the sender. The system would fill in the additional area code digits automatically. As has been stated elsewhere in this application, members may be identified by other types of identifiers, such as instant messenger user name, e-mail address, social security number, driver's license number, account number, and others.

(2) Let's call the remainder Y. This is the estimated amount of funds to be held in mobile payment system service accounts that have not been marked as recruited. These are accounts that were recruited by mobile payment system service direct or nonbank partners. In FIG. 45, this is represented by phone number 6508622730 which is indicated as being recruited by second bank MSPS (the mobile payment system service provider).

(3) Each day, perhaps at a designated time, mobile payment system service will calculate the appropriate funds to be held in a partner bank. For example, it may be according to the following formula: X-partner bank plus a percentage of Y. The percentage will be negotiated at the time the bank partnership is established and will depend on the level of marketing spend. For example, for $C_i$, the mobile payment system service might put 10 percent of Y in the mobile payment system service account for $C_i$. The percentage may be any percentage such as 1, 2, 3, 4, 5, 6, 7, 8, 9, 10, 11, 12, 13, 14, 15, or others. The percentage may be a whole number or fractional number including 1.1, 1.2, 1.3, 1.5, less than 1, less than 2, less than 3, less than 6, and others.

This method is designed to avoid the cost of keeping multiple general ledgers and exact net settlement. It also will give the partner bank more than their fair share of mobile payment system service funds.

A virtual pooled account is used in operating a system having multiple financial partners. In a specific implementation, the system is a mobile banking system. Instead of maintaining separate general ledgers for each financial institution, the system will keep one general virtual pooled account. This will reduce the settlement and operational costs of the system. The owner of the virtual pooled account will receive the float on the virtual pooled account, and this float will be distributed to the multiple financial partners according to a formula.

In an embodiment, the invention is a method including: handling financial transactions of a group of users of a system, where the financial transactions may be specified through mobile phones and subgroups of the users are associated with a banking institution; processing financial transactions associated with a first banking institution via server 4500, where users in a first subgroup 4505 are associated with the first banking institution 4510; processing financial transactions associated with a second banking institution, where users in a second subgroup 4515 are associated with the second banking institution 4520; processing financial transactions associated with a third banking institution, where users in a third subgroup 4525 are associated with the third banking institution 4530; maintaining a virtual pooled account 4535 including funds for the first, second, and third subgroup users associated with the first, second, and third banking institutions; and distributing a first dividend to the first banking institution based on float for funds in the virtual pooled account for the first subgroup users plus a percentage of float on funds in the virtual pooled account for the third subgroup users.

In an implementation, the method includes distributing a second dividend to the second banking institution based on float for funds in the virtual pooled account for the second subgroup users plus a percentage of float on funds in the virtual pooled account for the third subgroup users. In an implementation, the method includes receiving an instruction from a first user in the first subgroup to transfer money to a second user in the second subgroup, where money is not transferred outside the virtual pooled account. The instruction may be wirelessly sent from a mobile phone via SMS messaging. The instruction may be wirelessly sent from a mobile phone using an application executing on the mobile phone.

The third banking institution may be a direct partner of the system. In an implementation, the method includes each user is associated with only one of the first, second, or third financial institutions. In an implementation, the method includes managing a system of record for virtual pooled account, where the system of record includes records of transactions for users in the first, second, and third subgroups. In an embodiment, the invention is a method including: handling financial transactions of a group of users of a system, where the financial transactions may be specified through mobile phones and subgroups of the users are associated with a banking institution; processing financial transactions associated with a first banking institution, where users in a first subgroup are associated with the first banking institution; processing financial transactions associated with a second banking institution, where users in a second subgroup are associated with the second banking institution; processing financial transactions users in a third subgroup that are associated with the system and not the first and second banking institutions; maintaining a virtual pooled account including funds for the first, second, and third subgroup users associated with the first and second banking institutions and the system; and distributing a first dividend to the first banking institution based on float for funds in the virtual pooled account for the first subgroup users plus a percentage of float on funds in the virtual pooled account for the third subgroup users.

In an implementation, the method includes distributing a second dividend to the second banking institution based on float for funds in the virtual pooled account for the second subgroup users plus a percentage of float on funds in the virtual pooled account for the third subgroup users. In an implementation, the method includes receiving an instruction from a first user in the first subgroup to transfer money to a second user in the second subgroup, where money is not transferred outside the virtual pooled account. The instruction may be wirelessly sent from a mobile phone via SMS messaging. The instruction may be wirelessly sent from a mobile phone using an application executing on the mobile phone. The instruction may be sent via an Internet browser.

In an implementation, each user is associated with only one of the first financial institution, second financial institution, or the system. In an implementation, the method includes receiving an instruction from a first user in the first subgroup to transfer money to a second user in the third subgroup, where money is not transferred outside the virtual pooled account. In an implementation, the method includes managing a system of record for virtual pooled account, where the system of record includes records of transactions for users in the first, second, and third subgroups.

Figure 46:
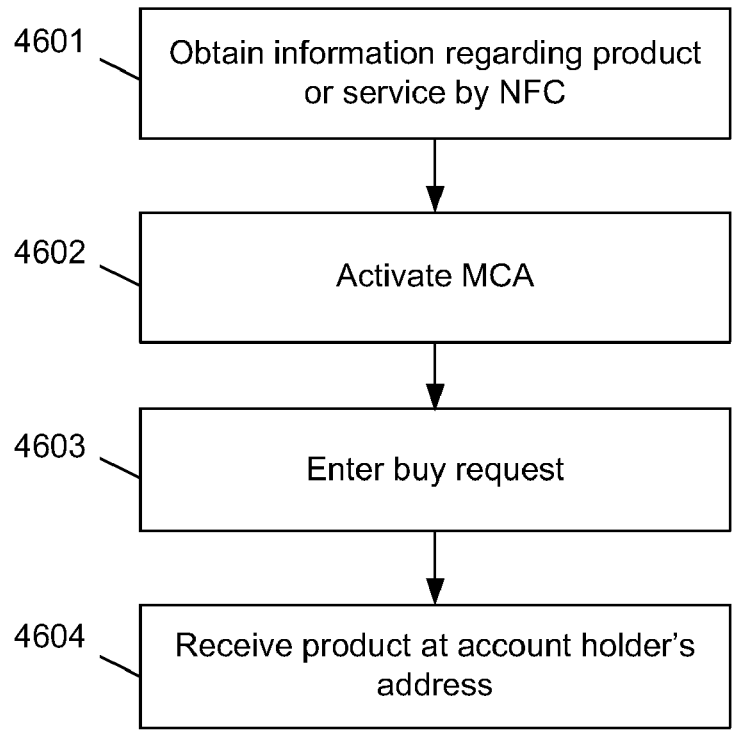
FIG. 46 shows a speed shopping feature in accordance with an embodiment of the present invention.

FIG. 46 shows a method for speed shopping in accordance with an embodiment of the present invention. In one embodiment, posters, newspaper advertisements, or television commercials include a mechanism for enabling a shopper to acquire specific details about a product that are displayed on the cell phone. This mechanism may include printed bar codes or a telephone number to dial in for information. In another embodiment, a near-field communication is utilized to initiate the connection between the shopper and a remote merchant as indicated at 4601. Initiating the connection activates the MCA so that if the shopper decides to make a purchase, the MCA is awake and a connection has been established as indicated at 4602. By selecting a Buy Request option, as indicated at 4603, the shopper can conclude a purchase transaction with the payment server handling the details such as "ship to" address and funds transfer. In a short period of time that could range from a few minutes to a couple of days, the product ordered will be delivered as indicated at 4604.

In another embodiment, the account holder has the option to select a "deliver to the current geographical location" rather than the account holder's billing address. This feature is of particular desirability when the account holder is traveling and desires to order from a room service menu but does not wish to speak to anyone. In this case, the menu would include a near-field communication device so the account holder would only need to select the Buy Request and the food would be delivered to the room where the account holder is located.

Figure 47:
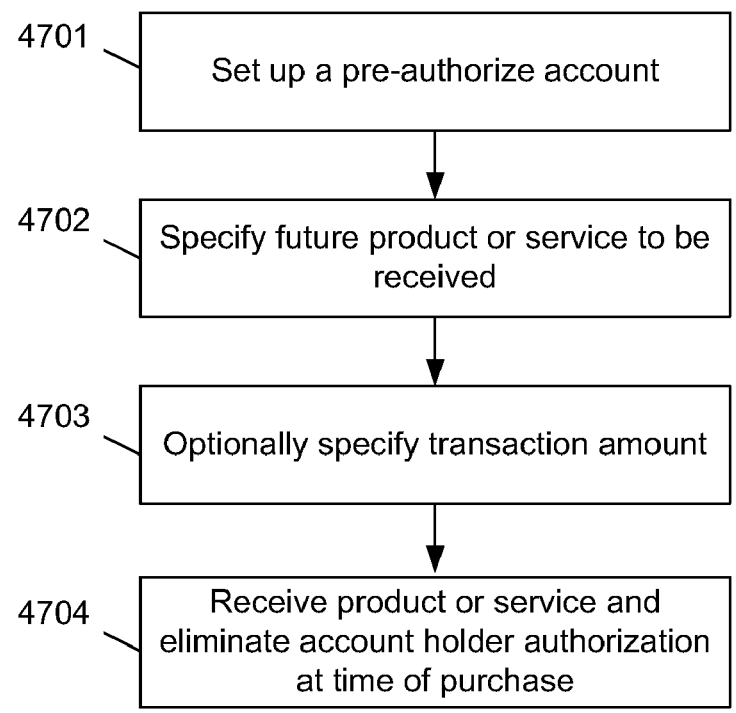
FIG. 47 shows another speed shopping feature in accordance with an embodiment of the present invention.

FIG. 47 shows yet another speed shopping features in accordance with an embodiment of the present invention. In this embodiment, an account holder expects a periodically occurring payment for a product or a service. To illustrate, consider the typical commuter who every morning stops to buy a newspaper before boarding a train for ride into the city. With the embodiment illustrated in FIG. 47, the account holder could set up a preauthorized account for such periodically occurring payments as indicated at 4701. The preauthorized account could include the type of product or service that can be obtained, as indicated at 4702, as well as the maximum allowable purchase amount to be preauthorized, as indicated at 4703. Thus, when the commuter picks up the paper, a near field antenna detects the account information on the phone and sends the transaction amount to the payment server which would send a confirmation back to the merchant without having to wait for the consumer to verify and specifically authorize the financial transaction as indicated at 4704. This feature is also an important method for speeding up the purchase process for time critical financial transactions, such as when a commuter wishes to pay for a subway ticket using their cell phone as they walk through a turnstile. The preauthorized amount may be deducted in real time or processed as a batch financial transaction, for example, on an hourly basis.

To minimize the verification processing time, the merchant may be notified of the preauthorization in advance of expected use. Upon receipt of the preauthorization, the telephone number may be placed on a "green list" which indicates that the merchant can accept payment without verification from the payment server. The green list is stored at POS terminals or is accessible to POS terminals from a local server rather than from the transaction server.

If a preauthorized account is depleted and the account holder has not timely replenished the account, the telephone number may be placed on a "red list" and prohibited from future use of the service. The red list may also be stored locally by the merchant at the POS or stored in a local server coupled to the POS equipment. If a telephone number is included in the red list, the merchant can accept an alternative form of payment. Alternatively, the server may deny the service and send a message suggesting that the account holder take this opportunity to recharge the account holder's account. The merchant may accept the recharge payment and collect the incentive fee for receiving the funds for recharging the account holder's account.

In order to speed up preauthorized purchases, in one embodiment, the cell phone includes an externally visible bar code that can be scanned at the POS to both initiate and conclude a transaction. Alternatively, the bar code may be displayed on the screen of the cell phone and scanned in at the POS. Because speed and convenience is so important for many daily purchases, the bar code, together with the locally cached green list, enables merchants to accept the purchase "on the fly" and then submit the transaction in a batch mode at selected intervals.

An advantage to the account holder is that if the cell phone is lost, the preauthorization can be quickly suspended either by accessing a web page to update the user profile or by calling customer service. If a phone is reported as missing, new green and red lists are immediately distributed to the affected merchants thereby limiting potential losses for the account holder and the merchant. Compare to the loss of a prepaid monthly transit pass that is lost—if lost, the entire value of the pass is also lost and the finder reaps the benefits of the find. Thus, the green and red lists are an effective tool in preventing fraud through theft of loss of the phone with respect to preauthorized accounts.

Since every cell phone in use today is not application equipped, the payment server adapts to the level of service available for each account holder. One method for communicating messages between cell phone devices is to transmit and receive using Short Message Service, which is also commonly referred to as "SMS text messaging" or simply SMS, because most mobile devices support SMS. SMS is a mechanism for delivering short messages over mobile networks. It is a store and forward way of transmitting messages to and from mobiles. The message (text only) from the sending mobile is stored in a server associated with SMS transport system which then forwards it to the destination mobile at a later time. This means that if the recipient is not available, the message is stored and sent later. Since SMS used signaling channel as opposed to dedicated channels, these messages can be sent/received simultaneously with the voice service over the mobile network. With the mobile networks based on all three cellular technologies, with GSM, CDMA, and TDMA supporting SMS, SMS is now a widely available mobile data service.

With SMS, an SMS aggregator routes the messages between the payment server and the account holder in real time and the funds are immediately available for use by the recipient. If the financial transaction includes another party, the server also uses SMS to communicate with the other party in real time again using the SMS aggregator. SMS is a particularly important mechanism when a nonaccount holder is the recipient of a payment transfer from an account holder. A problem for the nonaccount holder is the lack of the MCA embedded in their phone so SMS is a mechanism for communicating with the nonaccount holder. The MCA manages and inserts a transaction number that includes idempotent keys that make the transaction number unique for data services SMS, HTTP, and HTTPS protocol messages but there is no transaction number when using manual SMS.

An SMS mobile financial transaction system avoids the expense and problems associated with having a special chip (i.e., an integrated circuit device) added solely to support and enable financial functionality of a device. Adding additional components to a cell phone or other mobile device increases costs to the manufacture and support in the field. Costs are further increased if use of the chip requires licensing fees or other proprietary fees. Further, adding a chip to the cell phone increases power consumption and degrades battery life—both having negative consequences for mobile devices such as cell phones.

While SMS text messaging works well with most all types of cell devices and certain other types of mobile communication devices, such as portable digital assistants or PDAs, SMS exposes unencrypted passwords or personal identification numbers (PINs) as well as balance information or details about the most recent transaction. Since anyone in possession of the phone can read the SMS message file and immediately know how to access the account of another, the present invention. Accordingly, in one embodiment, the present invention provides for the initiation of the financial transaction by way of SMS text message with a portion of the transaction concluded over a voice channel.

Figure 48:
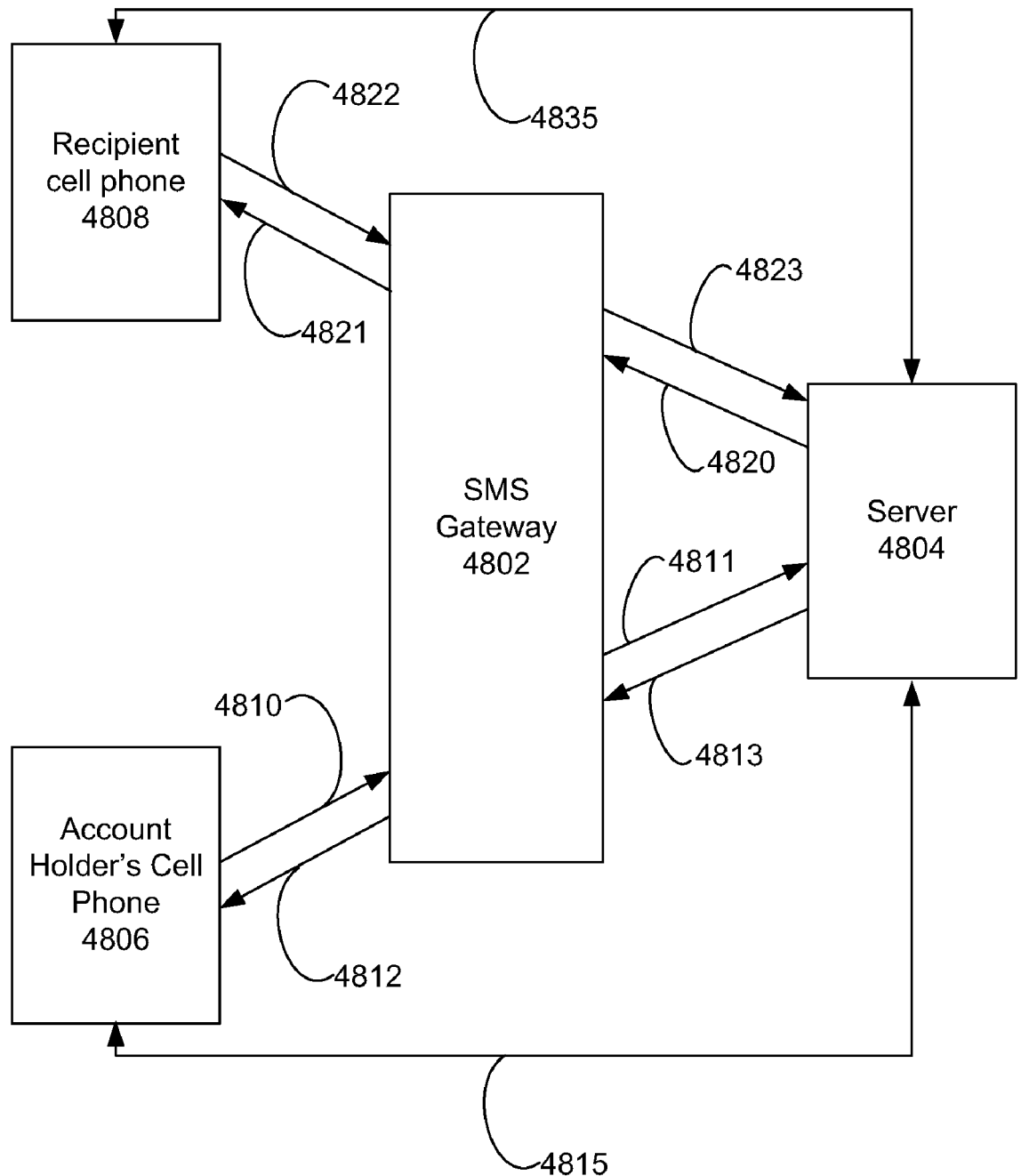
FIG. 48 is a system level illustration of a financial transaction carried out by at least one SMS messaging mechanism in accordance with an embodiment of the present invention.

FIG. 48 is a system level illustration of a financial transaction carried out by at least one SMS messaging mechanism in accordance with an embodiment of the present invention. This transaction method is used where neither cell phone is Internet enabled. Further, neither cell phone lack an embedded MCA so SMS messaging is relied to handle the transaction. One skilled in the art will appreciate that if one of the phones were Internet enabled and had installed the MCA, then its side of the transaction would occur over a HTTPS link and communication with the other phone would be by way of SMS messaging. It is to be understood that HTTPS refers to Hypertext Transfer Protocol over Secure Socket Layer, or HTTP over SSL and that the link is an Internet link. It will be further appreciated that the Internet connection provides a much richer user interface, is more secure and is easier to initiate and conclude a financial transaction. When HTTPS is not available, the MCA may adapt the transaction to use the HTTP protocol, a less secure transport mechanism. In this instance, the account may invoke software encryption before inserting the transaction information before sending it to the server.

If an Internet connection is not available, the use of the SMS (or Short Message Service) messages is used in one embodiment. In one embodiment, the mobile client application utilizes the data services function to send binary SMS messages. In another embodiment where the mobile client application is not available, plain text SMS messages are used to conduct financial transactions with special arrangements being taken to protect the integrity of the PIN. It will be yet further appreciated that the lack of the mobile client application further limits the user interface capabilities so the user may derive limited satisfaction from the present invention but would, however, otherwise enjoy the full features and benefits of the present financial transaction system.

With the present invention, the mobile client application selects the mode to transmit the financial transaction to server 4804 (also referred to as the transaction processor). For example, if an Internet connection is available, the transaction is conducted using a HTTPS link, which is a web protocol that encrypts and decrypts user page requests as well as the pages that are returned by server 4804. To use the Internet, the account holder merely enters in the transaction details onto a web page and selects "send" to initiate the transaction. If another party involved and that party has a web enabled device, the transaction details are provided on a web page. In this embodiment, server 4804 functions as a web server.

Typically, not all account holders have an Internet enabled cell phone or device. Therefore, the present invention provides for other methods to conduct financial transactions from the cell phone. Such methods include the use of SMS data services, SMS plain text (both of which may employ a voice channel to transmit the PIN) or voice channel only.

For an SMS capable cell phone, the account holder transmits an SMS message over SMS gateway 4802 to server 4804 to initiate a transaction from their cell phone 4806 as indicated by flow arrow 4810. Gateway 4802 relays the SMS message to server 4804 as indicated by flow arrow 4811. Upon receipt of the SMS message, server 4804 takes the specified action requested in the message and sends a reply SMS message to gateway 4802 as indicated by flow arrow 4812. Gateway 4802 relays the reply SMS message to cell phone 4806 as indicated by flow arrow 4813. This sequence of events may proceed for several iterations until a financial transaction is completed. SMS messages may be carried between phones and gateway 4802 by any circuit-switched or packet-switched network.

In some embodiments, a voice communication channel is established as indicted by voice channels 4815 and 4835. When an initial SMS message is received from phone 4806, server 4804 may open up voice channel 4815 by dialing the telephone number associated with the account. One instance where voice channel 4815 is used is to obtain a PIN (received as either DIMF or voice data) to complete the verification process and authenticate the user as the account holder in response to an SMS message. DIMF refers to dual tone multifrequency, the signal a telephone company receives when a telephone's touch keys are pressed.

The initial SMS message starts with a key word that provides the type of transaction requested—PAY, REQUEST PAYMENT, BALANCE, TRANSFER, or HELP. Where the SMS message contains the key word that indicates a desire to transfer funds from one account holder to another, the key word would be either pay or request payment. After the key word, the amount is entered with or without a decimal point. After the amount, the target telephone number (or short code, e-mail address, or other identifying information) is entered. This information may be automatically obtained from the telephone directory of the mobile device. After the telephone number, the account holder may enter in a message in a message field for display to the other party. In some circumstances, this message may be a null message. In some embodiments, the account holder may also enter a supplemental message for record keeping purposes. A special code in the message field delineates the supplemental message to indicate that the text following the special code is private and not to be forwarded. Examples of representative special code may be */*/ or /-/ or other unique user-defined codes.

Once the SMS message is sent to the server, the PIN is entered by the account holder and sent through a voice channel connection to the server to verify the SMS message. The PIN is entered in via the keyboard and may be any alphanumeric code. The PIN is then sent to the payment sever as a DIMF encoded message.

At the server, the server receives the SMS message via the SMS text message communication path and the PIN through the voice channel. The call to the server may be made by the account holder or it may be initiated as a "call back" feature by the payment server in response to receipt of the SMS message. It is desirable that the PIN be sent as a DIMF encoded message to maintain security although in other embodiments, the PIN may be spoken by the account holder and converted by a interactive voice recognition software module operating on the payment server or another server (not shown) dedicated to the handling voice calls.

To illustrate, consider the process that occurs when account holder using cell phone 4506 requests an account balance using an SMS message addressed to server 4504. The SMS message is formatted by the user to include the type of financial transaction requested, that is, BALANCE (an acceptable short form of the request may be BAL or simply B), and the telephone number associated with their account, for example, 4088675309 (e.g., Jenny's phone number). Alternatively, the account number may be determined by using the Caller ID.

Figure 54:
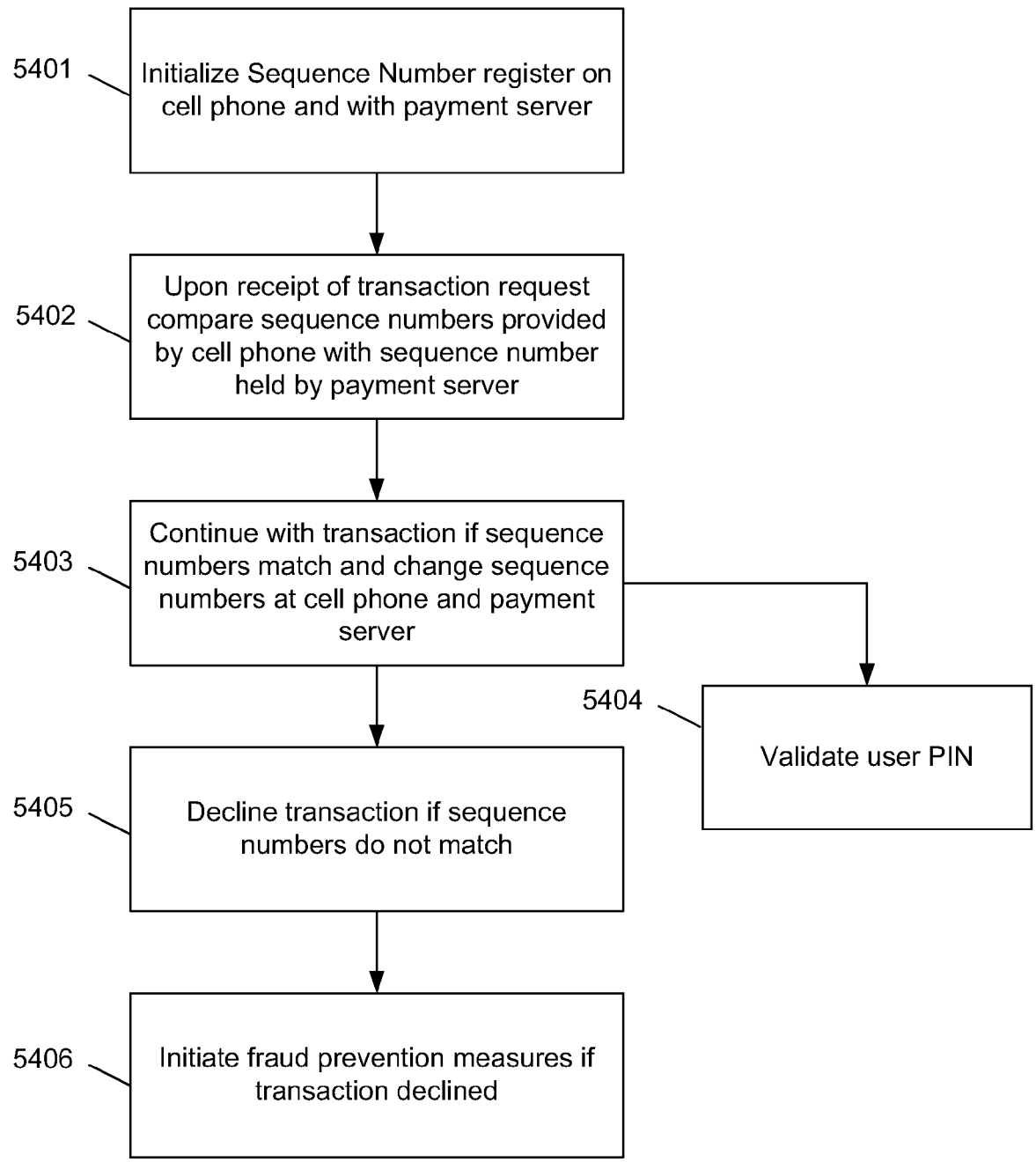
FIGS. 54, 55, and 56 show a method for preventing fraud and multiple duplicate transaction requests in accordance with embodiments of the present invention.
Figure 55:
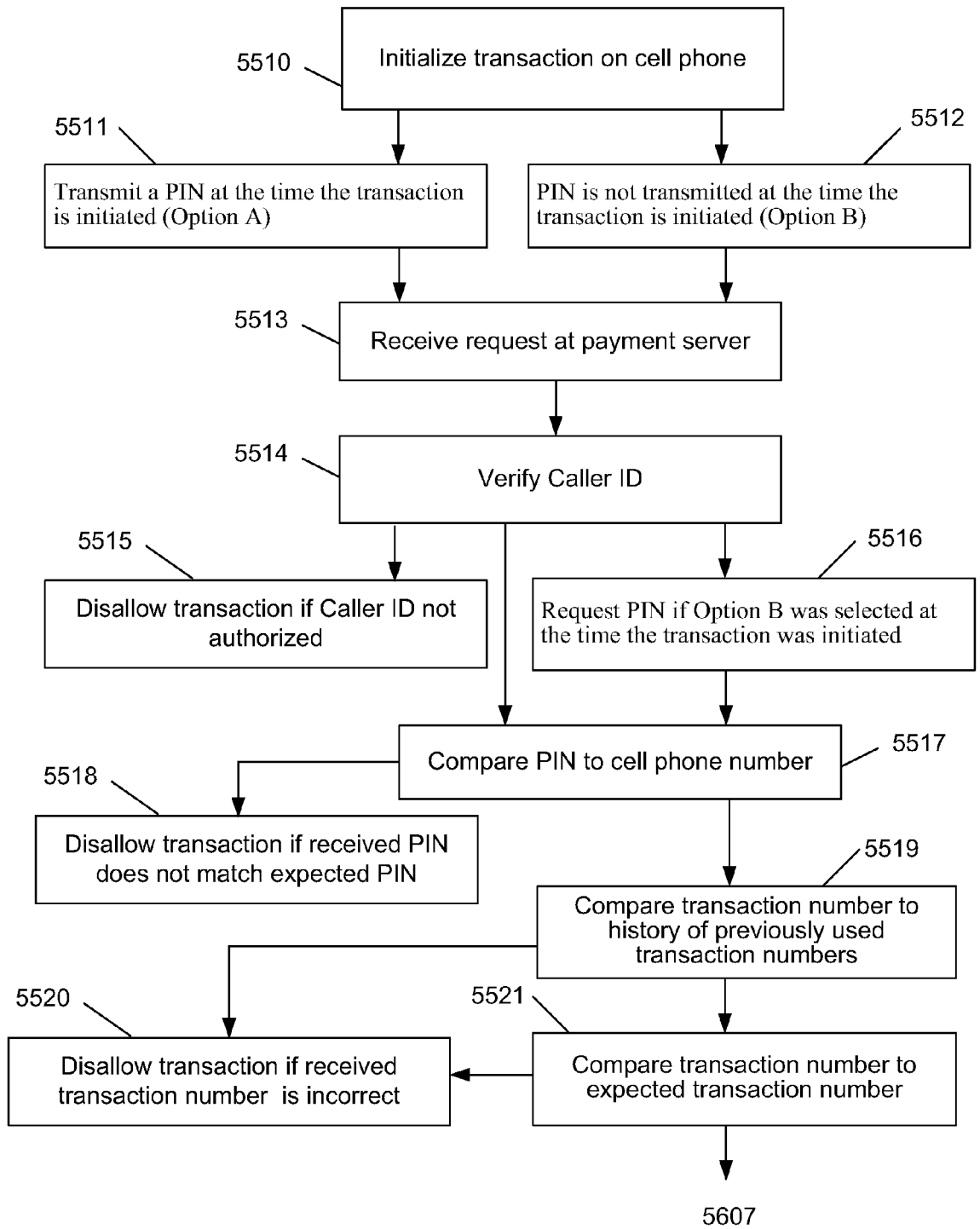
Figure 56:
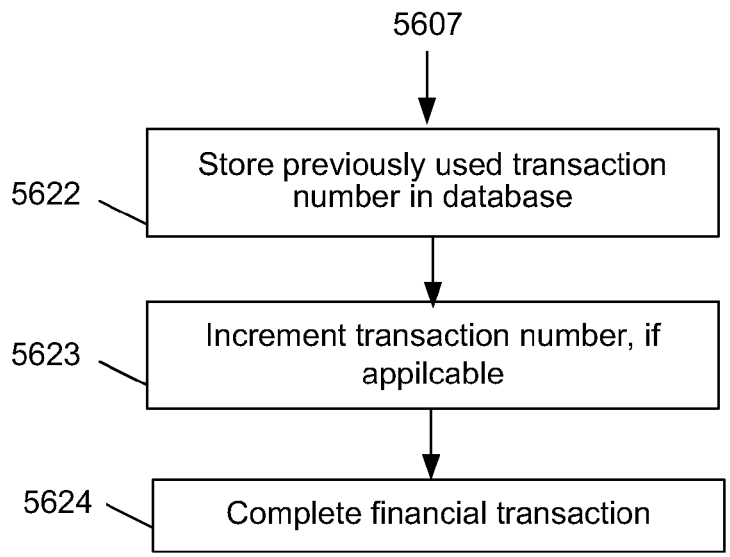

When server 4804 receives the SMS message, it initially checks the sequence or transaction number (see for example, FIGS. 54, 55, and 56). If the sequence number is correct, server 4804 dials the telephone number associated with the account and requests the user to enter a PIN. In other embodiments, the PIN is included in the original SMS message so there is no need to call the account holder for verification. If the cell phone 4806 is sufficient configured with an mobile client application, it is possible to encrypt the password before including it in the SMS message. The mobile client application will use data services. The downside of using the SMS message to transport the PIN is that this secret number will be visible to anyone who has access to the phone and could lead to unauthorized use by a nonaccount holder.

If the PIN is correct, server 4804 handles the requested transaction. The user may elect to receive the requested information by voice response over voice channel 4815 or by return SMS message in which case server sends a message with the balance amount to gateway 4802 which in turn forwards it on to cell phone 4806.

In other financial transactions, there are two cell phones 4806 and 4808 involved. These types of financial transactions typically have an account holder transfer funds to a recipient who may be an account holder associated with cell phone 4808. In other transactions, the recipient is a nonaccount holder.

As with the BAL request, a request to PAY the user of cell phone 4808 is initiated by using an SMS message addressed to server 4804. The SMS message is formatted to include the type of financial transaction requested, that is, PAY and the recipient's telephone number (e.g., 2127875466), and the telephone number associated with their account, again for example, 4088675309. If the account holder's phone supports the mobile client application, then all SMS messages exchanged between cell phone 4806 and server 4804 may be encrypted for added security.

When server 4804 receives the SMS message, it initially checks the sequence or transaction number (if available) and proceeds only if the sequence number is correct or is indicated as unavailable in the account record maintained by the server. Server 4804 then receives and determines if the PIN is correct. If both the sequence number and the PIN are correct, server 4804 handles the requested transaction by debiting the account associated with the account holder (see e.g., FIG. 43) and sending a confirmation SMS message to the account holder over gateway 4802.

If recipient 4808 is an account holder, server 4802 also sends a confirmation message confirming receipt of the funds. If the cell phone is a mobile PDA or other IP enabled device, the message is sent by HTTPS and may be encrypted to ensure security. Encryption may be by any known method.

If recipient 4808 is an account holder with the mobile client application installed, the mobile client application may encrypt its messages before sending it to server 4804 and receive encrypted messaged from server 4804.

If recipient 4808 is an account holder but the cell phone does not support the downloading and execution of the mobile client application on the cell phone, then the messages from server 4804 will be in plain text. A downside of using the plain text SMS message to transport the PIN is that this secret number will be visible to anyone who subsequently gains access to the phone. This could lead to unauthorized use by a nonaccount holder unless the account holder takes the time to delete the SMS messages from their cell phone's mailbox. If recipient 4808 is not an account holder, then the SMS messages will also be a plain text message.

While SMS text messaging works well with cell phones and certain other types of mobile communication devices, such as portable digital assistants or PDAs, SMS exposes unencrypted passwords or personal identification numbers (PINs) as well as balance information or confidential details about the most recent transaction. Since anyone in possession of the phone can read the SMS message file and immediately know how to access the account of another and the other confidential information, it is best to avoid using public SMS messages to transmit the PIN.

Thus, for the mobile device issued by a partner service provider, it is desirable that the mobile devices include the mobile client application as a preexisting software module. Alternatively, the mobile client application is preferably downloadable from the service provider to cell phones that were not originally equipped with the mobile client application. The mobile client application enables significant enhancements to the use of the financial transaction system. The mobile client application is invoked, either directly by the account holder or in response to activation of the SMS text messaging feature on the mobile device.

The following is a detailed description illustrating use of SMS text messaging to provide account holders access to the payment server from any SMS capable mobile phone or other SMS enabled device in an embodiment where the mobile client application is available.

In operation, the account holder sends a text message to server 4804 using the existing text message capability on their phone. The functionality includes Pay, Request Pay, Balance, History, and Help invoked by using any of these features as a keyword. The account holder enters the keyword together with additional information in the body of the text message to construct a command that is then sent to the server. Access to the server may be by way of a toll free telephone number, a short code or an e-mail address, all of which identify the server to the SMS gateway. An example of a short code is 62729 which is used as the target phone number for their text message commands to the payment server. An example of an e-mail address is sms@obopay.com, which is the e-mail target for SMS text message commands sent to the server.

To send a payment to another person or a merchant using the SMS method, the account holder would enter the command string shown in table C.

TABLE C

| Keyword | PIN | Target mobile # | Amount | Messages (optional) |
|---|---|---|---|---|
| pay | ### | ########## | #.## | Abcd |

Each item should have a space between it and the previous item. In one implementation, the keyword is not case sensitive. The mobile number should include area code plus mobile number with no spaces present in the mobile number. The account holder may enter a leading 1 or not on the phone number. A dollar sign is not required to be entered with the amount, but should be allowed. The user may optionally include a message with their payment. The MCA encrypts the message and sends as a data services SMS message in binary rather than plain text.

In an alternative example, the PIN is sent in a second message by way of a voice call. To send a payment to another person or a merchant using the combined SMS plus voice channel method, the account holder would enter the command string shown in table D.

TABLE D

| Keyword | Target mobile # | Amount | Messages (optional) |
|---------|-----------------|--------|---------------------|
| pay | ########## | #.## | Abcd |

Upon receipt of the SMS message, server 4804 calls the cell phone associated with the SMS message to establish a voice channel to acquire the PIN. The PIN is sent to server 4104 over the voice communication channel 4815—that is, the cellular network. In alternative embodiments, the PIN is sent over the Internet or POTS.

When a request for payment is made to an account holder using either the SMS method or the combined SMS plus voice method, they may either accept or decline the request using the manual SMS text messaging system.

On the server side, one or more data centers would have systems for processing the financial transactions. Each data centers would contain a combination of PBX/ACD/VRU technology to allow multiple simultaneous call processing. The VRU technology can be used to provide programmable inbound and outbound DIMF support. The VRU can be connected to an enterprise J2EE system which represent the actual business logic and system of record for the financial transactions. The J2EE system can then integrate with actual banks for settlement of the transactions.

Advantageously, the mobile client application determines a preferred or best method for sending the PIN such as by application SMS (data services) where the SMS message is encrypted and converted to binary (i.e., the message is not transmitted in plain text) or by voice channel using DIMF to maintain security. In other embodiments, the PIN may be spoken by the account holder and converted by an interactive voice recognition software module operating on the server or another server (not shown) dedicated to handling voice calls.

In one alternative embodiment, the PIN is encrypted by the mobile client application and included in a subsequent SMS message that is sent to server 4804. Server 4804 correlates the messages by matching the telephone number and the time each message was sent. If the PIN was sent in a message that was distant in time compared to the SMS message, the transaction may be rejected. If only one of the two messages is received, the transaction may be rejected. If, however, both the SMS message with the financial transaction details (minimum of at a keyword) and the PIN code are timely received and are verified, then the financial transaction proceeds.

In an alternative embodiment, when a voice channel is available, the mobile client application may invoke a module to encode the PIN into DIMF form. The DIMF is then sent by the MCA to the payment server along a voice channel connection established by the mobile client application. The module may be a Java API that generates the appropriate tones based on keypad input. DIMF refers to dual tone multifrequency, the signal a telephone company receives when a telephone's touch keys are pressed.

In yet another alternative embodiment, the mobile client application provides a user interface (UI) on the display screen of the mobile device to guide the account holder for concluding the financial transaction. In this embodiment, the account holder is guided through the process of constructing the SMS text message by the automatic insertion of the keyword, amount, target telephone number, password, and messages, if any.

In yet another alternative embodiment, the SMS message may include the keyword, the amount, the target telephone number, and the password. A shortcoming of this implementation is that the password would be visible to anyone controlling the mobile device. However, the present invention manages this problem by sending a message to the account holder to delete the sent message from the SMS log folder on the account holder's phone. The message may also suggest that the account holder to turn off message logging outgoing SMS messages when conducing financial transactions using the SMS feature in the future.

Rather than use plain text SMS messages, the present invention also contemplates an embodiment using a JAVA APIs downloaded to the cell phone to conduct the financial transactions. The JAVA APIs generate user interface screens to guide the user in preparing the transaction request. The message format is similar to that illustrated in table C or table D.

Once the account holder has completed the transaction request, the user selects a SEND option presented on the user interface. The JAVA APIs initiates a voice call using the cellular telephone connection to access an interactive voice recognition (IVR) module or DIMF interface on server 4804. When the DIMF interface picks up the call, the JAVA APIs transmit the transaction request using DIMF tones. The JAVA APIs may also use a form of encryption so that the DIMF tones are not easily decipherable should they be surreptitiously recorded. When the IVR provides a response to the transaction request, the response is also encrypted and then encoded using DIMF and transmitted over the voice channel back to the appropriate party. Due to the increased security aspects of the JAVA APIs, this embodiment is compared to sending plain text SMS.

Therefore, communication can be by way of a voice channel and DIMF tones. This provides a further communications channel (in addition to SMS, data services or application SMS, HTTP, and HTTPS) to perform transactions. By having many communications channels, this provides greater reliability in the system because any channel may be used when other channels are not available.

Figure 49:
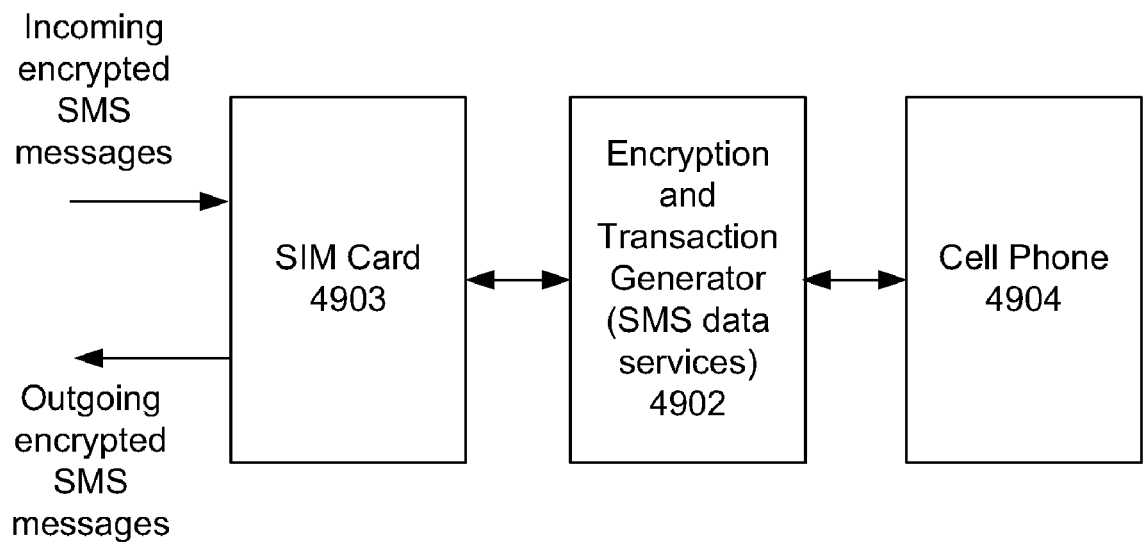
FIG. 49 shows a method for securing SMS based financial transactions in accordance with an embodiment of the present invention.

FIG. 49 shows a method for securing SMS based financial transactions in accordance with an embodiment of the present invention. More specifically, for mobile devices such as GSM cell phones, installing a MSA on the phone involves the physical insertion of a small circuit board, referred to as the encryption and transaction number generator or simply as generator, 4902 to intercept SMS message traffic.

Generator 4902 comprises an electrical circuit that is inserted into the phone electrically connected to SIM card 4903. In one embodiment, generator 4902 is a sleeve that is inserted around SIM card 4903. Alternatively, generator 4902 is a shim that is interposed between the cell phone's transmitting module 4904 and SIM card 4903. SIM card 4903 is the Subscriber Identity Module card, which is an electronic card that is inserted into a cell phone or other GSM, GPRS, or 3G based mobile device and identifies the subscriber to the network.

Although SIM cards are most widely used in GSM systems, compatible modules are also used for UMTS UEs (USIM) and IDEN phones. SIM card 4903 contains the personal identification number of the subscriber, information such as the user's phone number, phone book, SMS messages as well as other information related to the subscriber.

Generator 4902 intercepts incoming SMS messages looking for messages from server 1004 (see FIG. 48). When generator 4902 detects an SMS message sent by server 4804, it functions in the manner of the mobile client application by decrypting the SMS data service message and presenting a plain text message for the account holder.

Generator 4902 also intercepts outgoing SMS messages that are targeted to server 4804. Again, generator 4903 functions to provide the services of the mobile client application by adding a transaction number to each transaction and encrypts the SMS message. Because generator 4902 contains an embedded software module, it can send the SMS message as a data service SMS message rather than plain text.

Generator 4902 is intended to be sold or otherwise provided as a separate component allowing non-MCA equipped cell phones to reap the advantages of having the mobile client application resident on the cell phone. In other embodiments, SIM 4903 includes the generator 4902 as an on-board circuit and is provided to the user by the cell phone's service provider.

Figure 50:
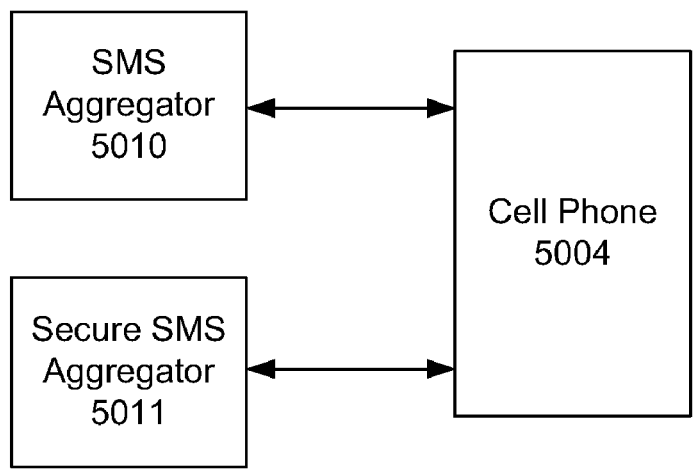
FIG. 50 shows use of a secure SMS aggregation server in accordance with one embodiment of the present invention.

FIG. 50 shows use of a secure SMS aggregation server in accordance with one embodiment of the present invention where generator 4902 also redirects outgoing SMS messages to a secure SMS aggregation server 5011 rather than to the service provider's standard SMS server. Sending SMS messages containing financial transaction information to the secure SMS aggregation server minimizes the opportunity for data theft, reduces the occurrence of delayed or lost messages due to over loading at the SMS server 5010 and improves overall control over the messaging delivery system.

Figure 51:
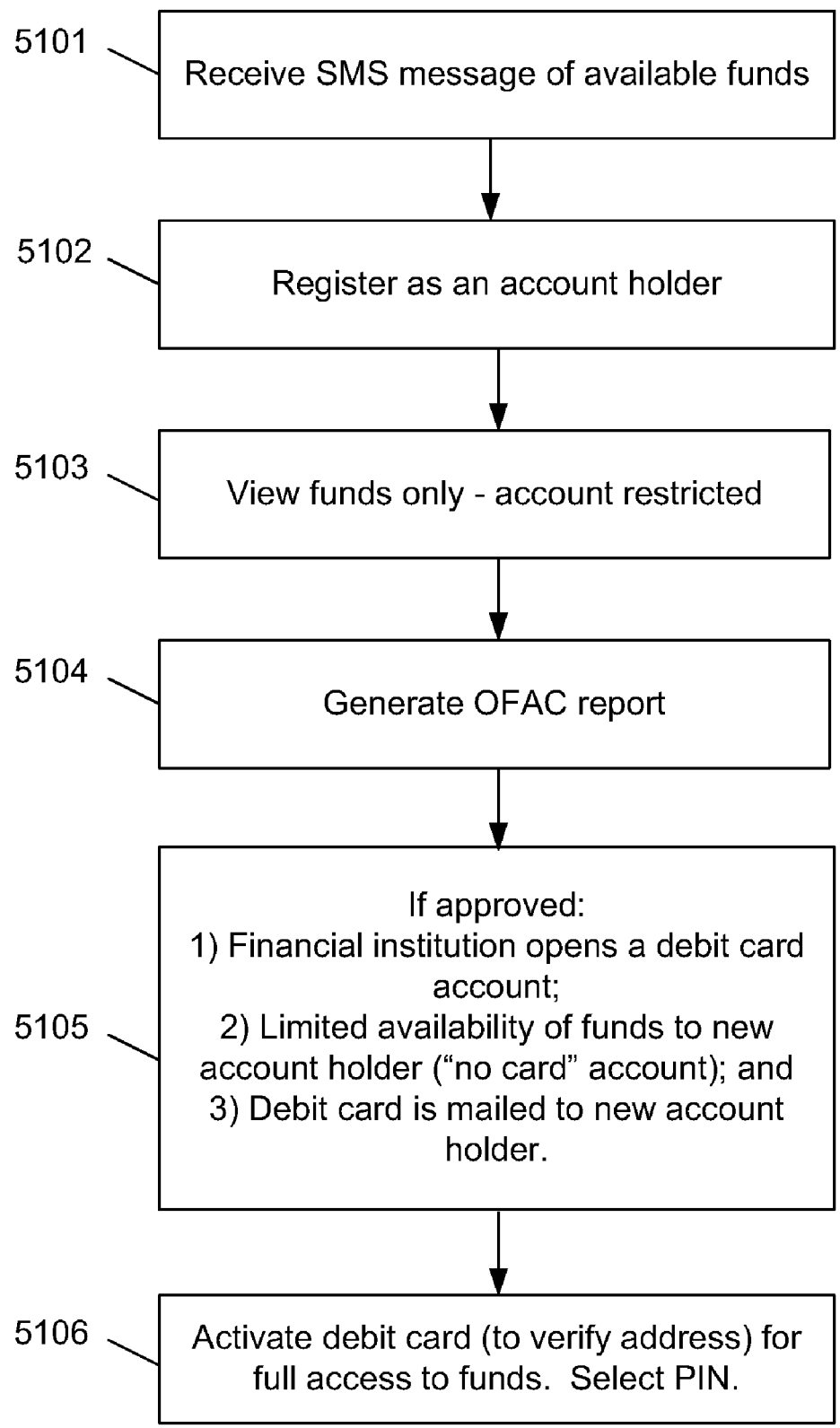
FIG. 51 shows a registration process for a new account holder in accordance with an embodiment of the present invention.

Refer now to FIG. 51 which shows a registration process for a new account holder in accordance with an embodiment of the present invention. When the recipient of funds is not already an account holder, one embodiment of the present invention invokes a viral form of new customer acquisition where the existing account holders bring in new account holders by simply sending funds to nonaccount recipients. The nonaccount recipient receives an SMS message stating that they have funds available and inviting them to register access to the funds as indicated at 5101. A web address is provided.

Registration may occur at any bank partner or on-line at a web page accessed over the Internet as indicated at 5102. The registration process enables the recipient to open a prefunded (using the transferred funds) debit account. This process is similar to opening any other bank account except there is no minimum account balance so even individuals who do not qualify for a checking or savings account at a bank may participate.

Once registered, the new account holder has a "no card" restricted account as indicated at 5103. At this stage (phase I), the new account holder has the ability to view the funds in their prepaid debit account in real time. However, due to banking regulations, the new account holder's account access to the funds are restricted pending completion of a OFAC report as indicated at 5104. "OFAC" refers to the Office of Foreign Assets Control of the United States Department of the Treasury that administers and enforces economic and trade sanctions based on U.S. foreign policy and national security goals against targeted foreign countries, terrorists, unapproved international narcotics traffickers, and those engaged in activities related to the unapproved proliferation of weapons of mass destruction.

Reviewing the account holder against a suspect lists is an essential step in the OFAC compliance program. If an account holder's is flagged as a potential match with the OFAC list, an investigation is initiated to determine if it is, in fact, a true match. Until resolved the funds are not released. Commercially available software packages are available for the compliance check. The compliance check can also identify duplicate customer records, establish links between individuals and corporations for traditional and nontraditional householding, create a multifunction "Household" key to track changes over time, and establish rules-based processing to resolve duplicates, and create links and households.

Once the OFAC compliance is complete (a process that typically takes about 24 hours) and no adverse links identified, the account holder becomes a "no card" account, which means the financial institution can open a prefunded debit card account and order a plastic debit card sent the new account holder as indicated at 5105. However, at this stage (phase II), the new no-card account holder has only limited availability of the funds. For example, the new account holder may transfer funds to other individuals using the financial transaction system of the present invention but because of additional governmental restrictions, funds may not be withdrawn or transferred to a merchant.

At a back end processing portion of a system of the invention, a pooled holding account holds transferred funds if the recipient is not already an account holder. A ledger entry identifies (see FIG. 39) funds attributed to each phone number. These funds can be transferred to other accounts by the recipient if they register for an account. Because individuals cannot be compelled to register for an account, it is possible for the recipient to proactively refuse the funds or simply fail to respond. In such instances, the funds are returned to the account holder that initiated the transaction after the transaction window has expired (the transaction window may be a selected duration such as 30 days or 60 days) or immediately upon a proactive refusal. The transaction server may send periodic reminder messages to both the sender of the funds and the recipient. In other instances, the sender of the funds can stop payment if the recipient has not registered to gain access to the funds. This feature is important where the parties agree to cancel the electronic transfer and conclude the transaction in another manner—for example, using cash.

If funds for all account holders are held in the pooled account, then when a new account goes "live" the new account holder has full and immediate access to the funds. If funds are held in separate accounts for each account holder, the funds are transferred from the holding account to the account holder's account when the account goes live. There may be some delay for the funds to appear in the individual account.

Once the account is opened and compliance checks passed, the financial institution requests a plastic debit card to be sent to the address of record for the new account holder. When the card arrives, the account holder calls a toll-free telephone number to confirm receipt. The confirming telephone call also indicates that the address for the account holder is correct.

During this call, the account holder also selects their PIN. The PIN is linked to both the card and to the telephone number of the account holder's mobile phone. Further the account number on the plastic debit card and the phone are locked together. The card may be used to withdraw cash from the account or to deposit cash into the account using any banking AIM. It may also be used at any merchant location where a POS device accepts credit and bank cards. At this stage (phase III), the account holder's account is fully enabled for use.

Figure 52:
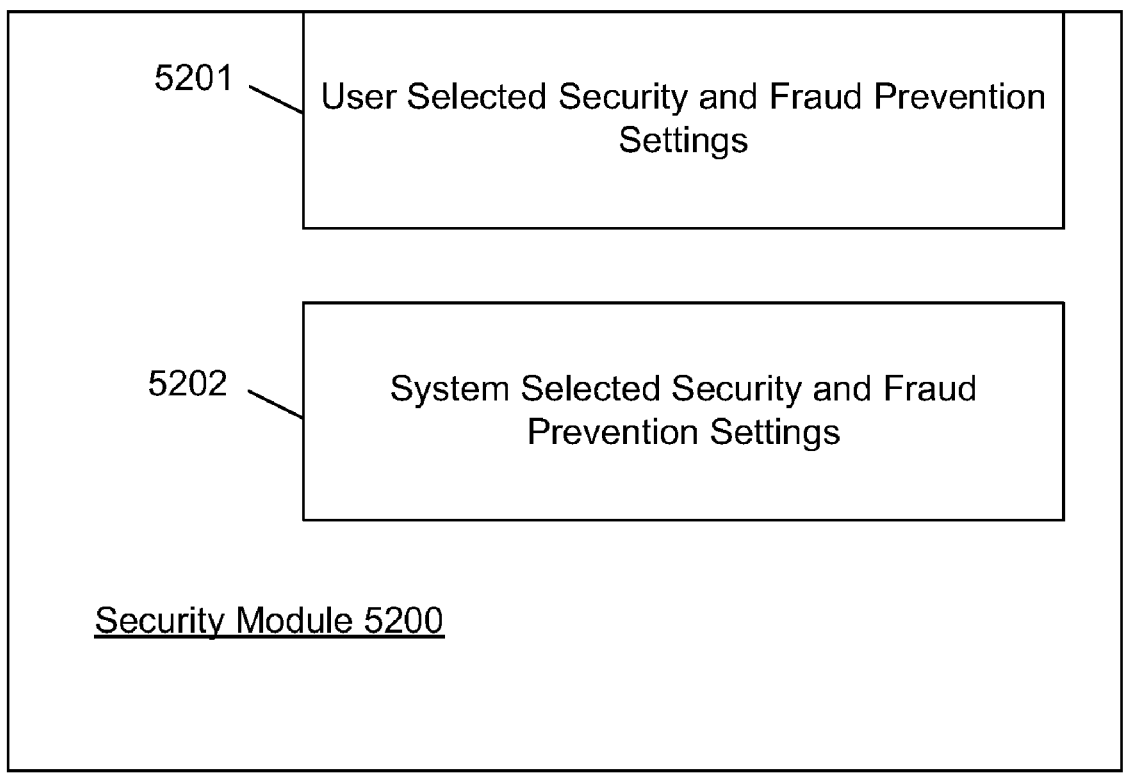
FIG. 52 shows a tiered fraud detection system in accordance with an embodiment of the present invention.

Refer now to FIG. 52 where a tiered fraud detection system 5200 is illustrated as part of transaction processor 3630. The first tier of the tiered system 5200 includes a rules based engine and user selected components 5201. The second tier of the tiered system 5202 includes proprietary components that are not accessible or visible to the account holders.

User selected components include, for example, the ability of the account holder to customize security for their account.

Account holders may link several the cell phone number for family members that are authorized to access the prepaid account. For each designated phone number, the account holder may specify maximum spending limits on a daily, weekly, or monthly basis. The account holder may exclude certain merchants, account numbers or telephone numbers by creating a personal "black list" for the designated excluded parties.

A specific black list implementation allows the account holder to designate wild card exclusions such as blocking transfer of funds to any phone having a particular area code or to any "900" or foreign number. The account holder may create a separate personal black list for an authorized user. This feature is particularly useful to control improper spending by cell phone equipped children. Any number of numbers or accounts may be included on the black list.

Conversely, the account holder may also specify certain merchants or telephone numbers that may be included in a financial transaction that involves one of the authorized users. All other merchants and telephone numbers may be optionally deemed to be on the personal black list. Again, this feature is particularly useful to control the spending of children by allowing purchases for transit, lunch, and school supplies but not for magazines or other novelties.

In addition to specifying the personal black list and white list, the account holder can also preauthorize purchases at each of the merchants appearing on the white list while setting a per transaction limit on the other numbers on the white list.

The account holder may customize a rules based fraud detection mechanism which is also implemented at the first tier.

The account holder may also specify the maximum amount for each transaction and the number of transactions that may be processed on a cell phone in a selected period. The account holder may also specify the maximum amount of funds that are to be deposited and retained in the prepaid debit account. The transaction processor 3630 sweeps excess funds to another designated account, such as a personal savings account, on a daily basis.

The second tier of the tiered system 5202 includes proprietary components that are not accessible or visible to the account holders. For example, the second tier 5202 includes a maximum spending limit based on historical averages, geographical verification, the historical number of daily transactions. Other rules based fraud detection and transaction frequency (velocity) control mechanisms are also implemented here as well.

A fraud and risk rules engine (not shown) controls risks by applying spending limits and determining the acceptability of requested transactions from a risk perspective. Such fraud detection systems are known and are often used to monitor for fraud when credit cards are used. The information collected for each financial transaction may be mined for use by merchant and consumer value added applications, by business monitoring applications, by system operations applications and security monitoring applications as well.

Figure 53:
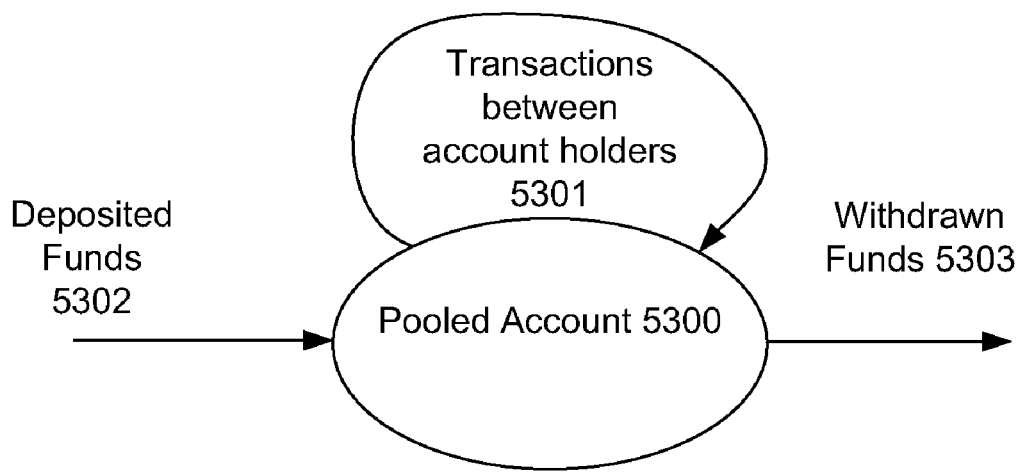
FIG. 53 shows a pooled account structure in accordance with an embodiment of the present invention.

Refer now to FIG. 53, which shows a pooled account embodiment to minimize ACH and credit card interchange fees. Rather than maintain a separate prepaid debit account for each account holder, the present embodiment utilizes a pooled prepaid debit account 5300. When transactions occur between account holders as indicated at 5301, money is retained in the pooled account 5300 but is moved from one account holder's account to the other account holder's account. The transfer is immediate and does not incur any transaction fees for the system operator. For this reason, the account holder may be charged little or nothing for a transaction fee.

At times, account holders may add funds to the pooled account as indicated at 5302. Such funds may be deposited at a partner merchant that has agreed to accept funds from account holders which are then deposited into the pooled account. Alternatively, the account holder may utilize their plastic debit card at an AIM to deposit cash or checks, on the Internet by making an account transfer by telephone, or automatically as specified on the user profile page associated with each account.

At other times, account holders may transfer funds out of the pooled account as indicated at 5303. The new account holder may withdraw such funds when they do not wish to retain a balance in their prepaid debit account.

In this embodiment, the system operator is an account aggregator and becomes the system of record in terms of risk and risk control. The system operator is also responsible for performing the OFAC compliance check. The system operator may be a bank, a financial institution, or may subcontract the pooled account management to another bank.

In an embodiment, near-field communication is used to communicate between mobile devices to conclude financial transactions using the infrastructure of the present invention. In yet another embodiment, near-field communication is used to communicate from a mobile device to a POS terminal to conclude financial transactions.

Security and Fraud Prevention

Security and fraud prevention are important issues for the payments industry and are a continuing source of problems. The mobile payment transfer infrastructure and method of operation, in accordance with the present invention, are effective tools in addressing these problems. Specifically, the use of the mobile device to conduct financial transactions allows for a real time transaction that uses funds that are guaranteed to be available. The receiving party may verify the validity of the entity holding the funds and that the account has a sufficient balance to conclude the transaction. Advantageously, the account information (credit card number, debit card number or other account at a financial institution) need not be provided to conclude the transaction.

On the sending side of the transaction, the sending party uses a PIN code to identify the person with the phone. This authentication provides a high level of security because the payment server is able to identify the mobile device using caller ID and the person using the mobile device is identified by a PIN. Advantageously, the transferred in a secured manner and is not stored in the mobile device in a visible form.

Additionally, the transaction may be identified by a unique sequence number that is determined by the mobile client application and is sent as part of the command stream to the payment server. At the payment server, a history of used sequence numbers is maintained, so transactions with previously used sequence numbers will not be processed. After each transaction and before the next transaction, the mobile device updates the sequence number with a new sequence number. For example, the new sequence may be the old sequence number incremented by 1. In an alternative implementation, the sequence numbers may be any number, including a random number. Furthermore, an algorithm may be used that creates a predicable sequence of numbers. This sequence of numbers may be generated using a seed created from a hash function on information such as the telephone number, time of day, or other. At the time of initialization, the payment server is provided the initial sequence number and know the algorithm and see, so it can predict what sequence number should next. If the sequence number is not correct, then the server rejects the transaction. This can help prevent spoof attacks.

The sequence number helps prevent fraud and also avoids duplication of financial transactions, which may be due to communications protocol where transaction information is sent multiple times. This is similar to the situation where a fax machine tries to send a fax again if it has not received a proper acknowledgement.

If SMS messages are used to complete a transaction, the authorization PIN is preferably a verbal code that is spoken into the mobile device and transmitted to the payment server for authentication using voice recognition software.

Merchant transactions are preferably structured to use an active authorization where the account holder's phone rings with a message to approve the dollar amount transferred. Credit cards and checks can not operate with this level of interaction.

Additional security is provided by the use of the PIN code to activate the mobile client application. In this embodiment, the PIN code occurs in a first instance to open the mobile client application and initiate its operation. The same PIN code or, preferably, a separate PIN code is used for authorization of transactions over the network. This dual PIN code process is not available on credit cards, checks or even smart cards.

When fraud is detected, the mobile device may be disabled and prevented from using the network to access the account. In general mobile devices have several key attributes that facilitate future security safeguards. Most if not all of these attributes do not exist on cards. Specifically, the mobile devices include an independent source of power to run physical devices, such as special purpose chips, and a secure case or housing that may house devices like smart chips. Mobile devices allow communication by voice and by data over the cellular network or over the Internet so voice verification and a PIN may be used in combination, or separately, to identify an account holder. Transactions may be initiated and verified by use of voice recognition technology and by data entered through a keyboard. In other embodiments, visual communication is provided through the use of a camera.

Another level of security is provided by the use of location technology, such as a geo-positioning system or GPS may determine the physical location of the device. Thus, if the account holder is using the payment service in an atypical location (such as when they are on vacation), the account user may be authenticated by asking for the PIN to be re-entered. Another advantage of the location technology is that the services made available to the account holder can be adjusted based on where they are located. For example, discounts or special promotions may be sent along with the confirmation for a transaction whenever the location of the account holder matches that of the merchant. In other embodiments, if the account holder is in the area of a merchant that is offering a special discount, a promotional message could be sent to the account holder if authorized by their profile maintained by the payment server.

FIG. 54 shows a mechanism and method for preventing fraud and multiple duplicate transaction requests in accordance with an embodiment of the present invention. The fraud prevention mechanism includes the storage of a sequence number in a register on each cell phone and at the payment server. Typically, as indicated at 5401, the sequence number is initialized when the cell phone payment service is activated. At the same time, the same sequence number is initialized at the payment server and stored in a database with the account holder's other information.

Upon receipt of a transaction request, as indicated at 5402, the payment server receives a sequence number from the cell phone and compares it with the sequence number held by payment server. If the sequence numbers match, as indicated at 5403, then the payment server authorizes the transaction to continue. The sequence numbers at both the cell phone and payment server are then updated to a new sequence number. This security mechanism is used to prevent spoofing attacks or cloned phones. The user is then requested to enter their PIN as indicated at 5405. By coupling the use of the sequence number with the PIN and the cell phone number, there is a three-level security blanket that authenticates the user (PIN), the phone number (detected by caller ID and linked to a specific account) and the sequence number to validate the transaction (prevents an intruder from at emptying to capture a transaction and then resubmit duplicate requests for a transaction). The sequence number is also used to discriminate multiple attempts of the SMS system to deliver a transaction message from valid multiple transactions.

If the sequence numbers do not match, the payment server declines the transaction request, as indicated at 5406, and fraud prevention measures are activated, as indicated at 5407. By way of examples, when the sequence numbers do not match, the account may be frozen until a customer service representative can determine the cause of the mismatched sequence numbers. This may necessitate a phone call the account holder to see if they are still in possession of their phone and whether they had authorized the attempted transaction.

FIG. 55 shows another embodiment of the mechanism and method for preventing fraud and multiple duplicate transaction requests in accordance with an embodiment of the present invention.

At 5510 a user (i.e., an account holder) initiates a financial transaction on a mobile telephony device (e.g., a mobile phone). At 5511, the user transmits a PIN at the time the transaction is initiated (Option A). Alternatively, as indicated at 5512, the user does not transmit a PIN at time the transaction is initiated (Option B).

At 5513, the payment server receives the request from the mobile device to start the financial transaction. The server checks the caller identification (caller ID) number transmitted by mobile device to see whether mobile device is an authorized user of the system at 5514. If caller ID is not enabled on the phone, disallow the transaction as indicated at 5915. An error message may be shown to indicate the transaction was disallowed because caller ID not enabled. User can retry the request after enabling caller ID.

If option B was selected, the server must then send a request to the mobile device requesting the user to transmit a PIN, as indicated at 5516. This PIN may be transmitted via a keypad of the mobile device or voice (e.g., to an interactive voice response (IVR) unit of the server).

Once the Caller ID is validated, the server then checks the PIN transmitted from mobile device against PIN recorded in system to verify that the PIN matches the expected phone number as indicated, at 5517. If and only if the PIN matches, will the server allow the transaction to proceed. If the PIN does not match, then the transaction is disallowed, as indicated at 5518.

The server then receives a transaction number (also referred to as a sequence number) for the financial transaction from the mobile device. The transaction number may be sent at the time the transaction is initiated or later as part of the information transfer between the mobile device and the server. The transaction number includes idemopotent keys that make it unique.

The server also checks the present transaction number from the mobile device against a listing of transaction numbers already previously used as indicated at 5519. This listing is stored in a database associated with the server. If the present sequence number matches any of the previously used sequence numbers, the user is not authenticated and the transaction will be disallowed, as indicated at 5520. This verification step is useful in preventing multiple copies of a message from being treated as a new and independent message. It also prevents hacker attacks where an hacker has intercepted a message and is attempting to resubmit an old transaction.

In some embodiment, the server also checks the transaction number as received from the mobile device against an expected transaction number stored at the server as indicated at 5521. If the sequence numbers do not match, the user is not authenticated and the transaction will be disallowed as indicated at 5520.

If the sequence number from the phone matches the sequence number stored on the server or is a number not previously used, the user is authenticated and the financial transaction will be allowed to proceed. In some embodiments, the server only performs the transaction number verification as indicated at 5519. In other embodiments, the server only performs the transaction number verification as indicated at 5521. In other embodiments, the server only performs the transaction number verification as indicated at 5519 and at 5521. As long as the server determines that the sequence number from the phone has not been used before or is the expected sequence number, or both, the transaction will be allowed. The sequence number may also be used as a unique transaction identifier. Step 5521 connects to a step 5622 via a link 5607.

The server also stores the previous sequence number is stored or otherwise indicated at the server as a sequence number that has been used, as indicated at 5622. These previously used sequence numbers may be stored in a database on the server. If the server maintains an expected sequence number, the sequence number at the phone and server are incremented in preparation for the next transaction as indicated at 5623. The server then proceeds with completing the financial transaction, as indicated at 5624.

A three-factor authentication technique authenticates based on the following factors:

(1) Check caller ID
(2) Check PIN or personal identification number
(3) Check transaction number The above validation method presents some authentication steps in a specific order. An implementation of the invention performs the steps in the given order. However, in other implementations of the invention, they may be other steps includes or some steps may be omitted, or the order of the steps may be different from above. For example, the caller ID, PIN, and transaction can order independent. Therefore, in an embodiment, the PIN may be checked before the caller ID. In another embodiment, the transaction number may be checked before the PIN. Furthermore, some steps above may be performed at the same time on different processors or processor cores in a parallel processing implementation.

In an implementation, a system of the invention may omit one or more of the authentication techniques listed above. For example, the caller ID may not be authenticated, so then a two-factor authentication approach will be used.

A traditional model for two-factor authentication is based on (1) what you have and (2) what you know. A first factor is something a user has such as a mobile phone, personal digital assistant, smartphone, or plastic card. A second factor is something the user knows such as a personal identification number (PIN), mother's maiden name, street address, social security number, driver's license number, or home phone number.

Whether a three-factor or two-factor authentication is used may depend on the communication channel used by the mobile device and server. For example, when SMS or data services SMS is used, caller ID is available and a three-factor authentication may be used. However, when HTTP or HTTPS is used, caller ID is typically not available and a three-factor authentication will not be used. There may be additional factors used to authenticate an account holder or user, so the technique may have more then three factors. Further the third factor of authentication may be managed by client side and server side software components.

Exemplary Three-Factor Authentication Flow (1) Initiate a financial transaction on a mobile telephony device (e.g., mobile phone)
(2a) (Option A) Transmit a PIN at the time step 1 occurs.
(2b) (Option B) Do not transmit a PIN at time step 1 occurs.
(3) At a server, receive the request from the mobile device to start the financial transaction.
(4) At server, check the caller identification (caller ID) transmitted by mobile device to see whether mobile device is an authorized user of the system. If caller ID is not enabled on the phone, disallow the transaction. Show error message indicating transaction was disallowed because caller ID not enabled. User can retry the request after enabling caller ID.
(5) If option A, once caller ID is validated, proceed to step 6. If option B, once caller ID is validated, the server sends a request to the mobile device for the user to transmit a PIN. This PIN may be transmitted via a keypad of the mobile device or voice (e.g., to an interactive voice response (IVR) unit of the server).
(6) Caller ID has validated, so check PIN transmitted from mobile device against PIN recorded in system. If PIN matches, go to step 7.
(7) Receive a transaction number or sequence number for the financial transaction from the mobile device. This transaction number may be sent at the time step 1 occurs, or may be sent later in the information transfer between the mobile device and the server. Proceed to 8a (option C) or 8b (option D) below.
(8a) (Option C) Check the sequence number from the mobile device against a sequence number stored at the server. If the sequence numbers do not match, the user is not authenticated and the transaction will be disallowed.
(8b) (Option D) Check the present sequence number from the mobile device against a listing or database of sequence number already previous used which is stored at the server. If the present sequence number matches any of the previously used sequence numbers, the user is not authenticated and the transaction will be disallowed.
(9) If the sequence number from the phone matches the sequence number stored on the server (for option C) or is a number not previously used (for option D), the user is authenticated and the financial transaction will be allowed to proceed. For option D, in other words, as long as server determines that the sequence number from the phone has not been used before, the transaction will be allowed.
(10a) If option C, the sequence number at the phone and server are incremented in preparation for the next transaction.
(10b) If option D, the sequence number at the phone is incremented to the next sequence number. The previous sequence number is stored or otherwise indicated at the server as a sequence number that has been used. These previously used sequence numbers may be stored in a database on the server.

Various Implementations of Transaction or Sequence Number Authentication (1) On initialization of service, use an initial transaction number value stored at both the mobile device and server. The initial transaction number may be (1a) or (1b).

(1a) The initial transaction number may be an integer number, such as 0, 1, 2, 3, 4, 5, 6, 7, 8, 9, 10, or other numbers.

(1b) The initial transaction number may be a random number, such as generated by a pseudorandom number generator and a given seed. This seed may be a hash code based on a property or characteristic of the device. For example, the seed may be based on the telephone number, serial number of the device, property or stored value in an integrated circuit of the device, or real time clock value.

(2) When the user uses an application where transaction number authentication is used, the transaction number value will be changed from the initial or previous transaction number value to the next in sequence. The sequence may be any series, mathematical, pseudorandom, or other. The sequence may be finite, infinite, or repeating series. If a repeating series, the number of transaction numbers in the series before it repeats may be based on a number of binary bits used to represent the transaction number.

(2a) For example, the sequence may be arithmetic or geometric. For an example of an arithmetic series, a transaction number may be an incremented by 1 or any other value (or decremented by 1 or any other value) to obtain the next transaction number is sequence. If the transaction number is represented using eight binary bits, the sequence will repeat every 256 numbers. If the transaction number is represented using sixteen binary bits, the sequence will repeat every 65536 numbers. Therefore, the more number of bits that are used the longer the sequence.

(2b) The sequence may be pseudorandom generated by a pseudorandom number generator. The sequence of pseudorandom numbers will be based on the starting seed value. The pseudorandom number may be represented using a floating point number. The floating point number may be stored using a binary floating point representation.

(3) After each transaction, the mobile device and server (where the transaction number of the mobile device will be authenticated against) both generate the next transaction number in sequence according to the same algorithm. If the mobile device uses an arithmetic series, the server will use an arithmetic series. If the mobile device uses a pseudorandom number series, the server will use a pseudorandom number series. The same seed used by the mobile device will be used by the server. Depending on the particular implementation, this seed may be transmitted from the device to the server, or vice versa, or independently determined.

(4) The mobile device and server will each store respective transaction numbers. The transaction number on mobile device may be referred to as a mobile device transaction number. The transaction number on the server may be referred to as the server transaction number.

(5) When a transaction occurs, the server will compare its stored transaction number against the one stored on the mobile device. If the transaction numbers match, an authentication occurs and the transaction will be allowed to proceed. Otherwise, the transaction will be disallowed.

(6) After a transaction is allowed, the transaction numbers will be advanced to the next in sequence at both the mobile device and server.

These techniques of using a transaction number to authenticate the mobile device help prevent fraud, duplicate transactions, and other undesirable circumstances. There are many variations of the specific implementations of transaction number authentication, and any of these variations may be used, and in any combination with the above described approaches. For example, instead of checking whether a transaction number from a mobile device matches a corresponding number at the server, the authentication technique may check whether the transaction number (a) does not match a corresponding number at the server or (b) does not match a previously used number at the server (as previously described in this application).

Figure 57:
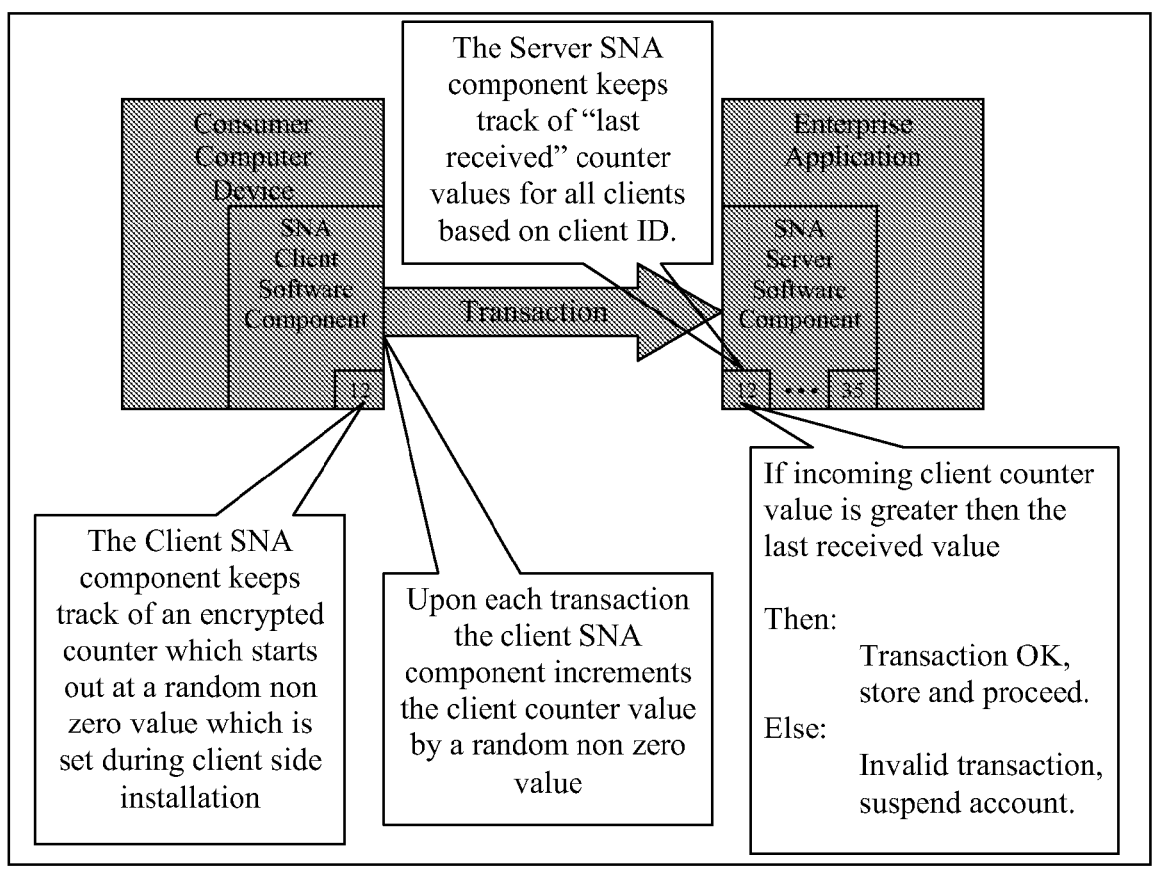
FIG. 57 shows an example of sequence number authentication.

FIG. 57 shows an example of sequence number authentication. There is a consumer computer device (e.g., telephony device, smartphone, or portable computer) and an enterprise application. On the consumer computer device is a sequence number authentication (SNA) client software component. The enterprise application includes a sequence number authentication server software component. These components handle the authentication when the consumer device sends a transaction to the server. This authentication may be the third factor in a three-factor authentication approach.

In a particular implementation, the client sequence number authentication component keeps track of an encrypted counter which starts out at a random nonzero value which is set during client side installation. Upon each transaction, the client SNA component increments the client counter value by a random nonzero value. The server sequence number authentication component keeps track of the "last received" counter values for clients based on client identifier. If the incoming client counter value is greater then the last received value, then transaction is accepted. The counter value is stored and the transaction is acted upon. Otherwise, if the counter value is not greater than the last received value, the transaction is invalid and the account may be suspended. This implementation is merely one of there are many possible variations of sequence number authentication.

Figure 58:
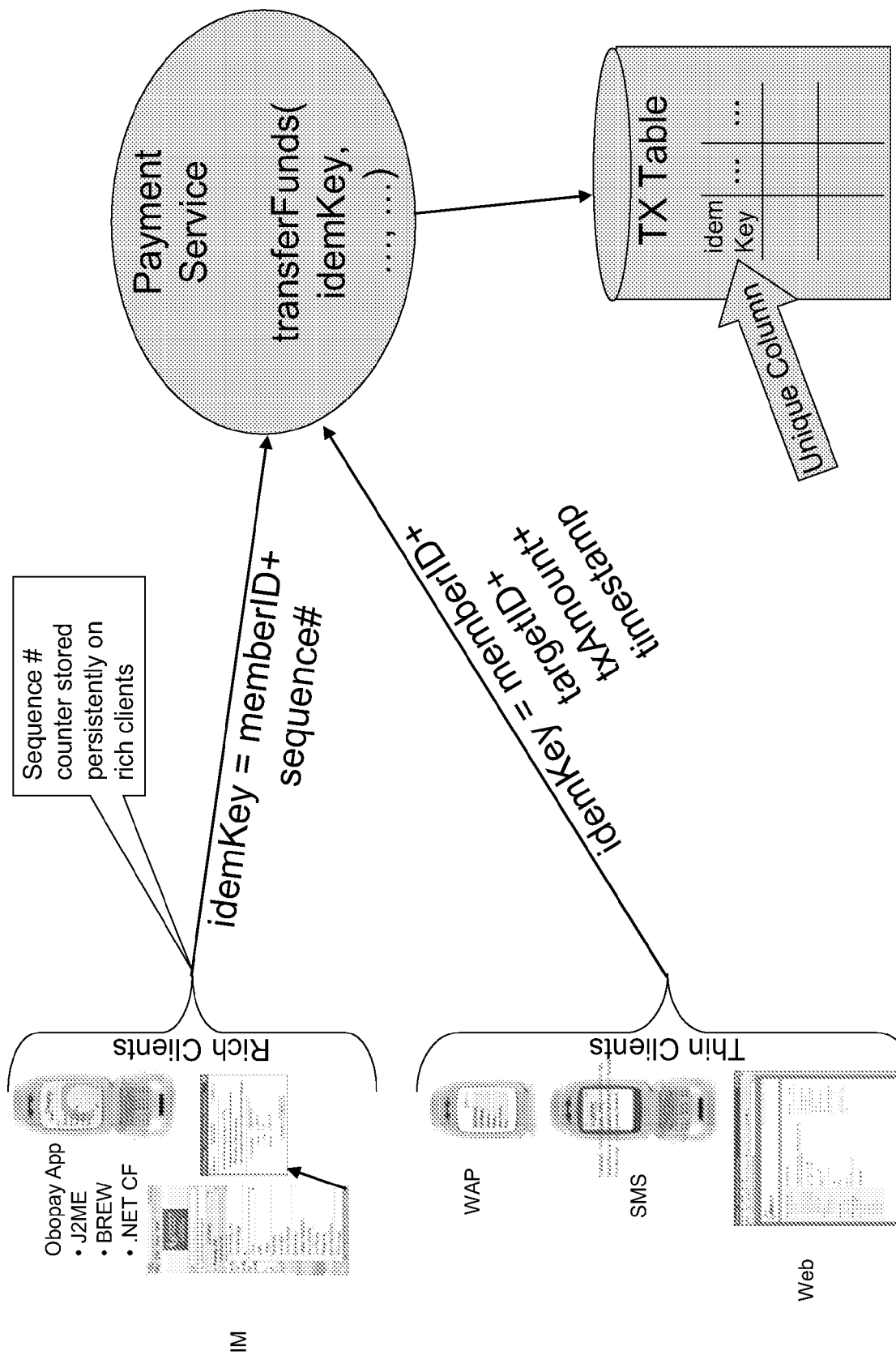
FIG. 58 shows another example of sequence number authentication.

FIG. 58 shows another example of sequence number authentication. In this specific technique, depending on the client from which the transaction is originating, a different type of sequence number is used and sent to the mobile payment service server. For example, a rich client or a thin client may be used.

Examples of a rich client include an application or program running on a mobile phone, smartphone, portable computer, or other electronic device. The application or part of an application may be written in a programming language such as J2ME, BREW, or .NET CF. The application may be a specific application for mobile payments. An example of such a program and accompanying user screens is described elsewhere in this application. Or the functionality may be part of another program, such as an instant messenger program, real-time Internet chat program, file transfer program, music player program, video player program, file sharing program, bill paying service interface program, or bill splitting program.

For example, when using an instant messenger program (e.g., AOL Instant Messenger (AIM), ICQ, Yahoo! Messenger, Microsoft Windows Live Messenger, Google Talk, or Skype), there will be an option to send another user a payment. The option to send a payment may be accessible using a right click of a mouse or though a pull-down or cascading menu. The recipient may be identified through user name, member name, phone number, member number, account number, or another identifier. The payment will be processed through the mobile payment service server.

Examples of a thin client include a Web browser application, phone or other device with SMS text messaging, phone or other device with a WAP browser, or terminal emulation program.

In a specific implementation of the invention when using a rich client, a stored sequence number will be stored persistently in a counter in the rich client. This stored sequence number may follow any arbitrary sequence such as sequential integer or binary counter (e.g., 1, 2, 3, 4, and so forth), a random sequence based on a known starting seed value, or sequence according to an equation, formula, or rule. The stored sequence number may be stored, for example, in flash memory, electrically erasable (EA2) memory, nonvolatile memory, battery-backed memory, hard drive, or other memory.

With each transaction, an idempotence key (called a sequence number in other implementations of the invention) is sent to the mobile payment system. For a rich client, the key will include a combination of member ID and the stored sequence number. This stored sequence number may be the next unused stored sequence number. When the mobile payment system receives the rich client's idempotence key, the transaction is stored in a transaction table along with this idempotence key. In the transaction table, each idempotence key will be expected to be unique. So, if the mobile payment system receives another transaction with a previously received idempotence key, the transaction may be disregarded since it is likely a duplicate transaction or a security problem.

In a specific implementation, the user's account may be flagged with a potential security violation for person to investigate. If a user has a number of such violations or a number of such violations over a particular period of time, then the account may be automatically suspended for pending investigation.

In a specific implementation of the invention when using a thin client, the idempotence key will include member ID, target ID, transaction amount, and time (or time stamp). The mobile payment system will receive this idempotence key and handle similarly to the situation when receiving a rich client idempotence key.

Therefore, a mobile payment system of the invention may work with different types of clients and each type of client may send different types of idempotence keys or sequence numbers. This embodiment has two different types of idempotence keys, but in other embodiments, there may be any number of idempotence or sequence number key types. For example, there may be three, four, five, six, seven, eight, or more key types.

A technique is used to ensure the authenticity of a wireless transmission source which is requesting a transaction to be performed by a system. The transaction may be a person-to-person money transfer or other value exchange transaction. The wireless transmission source may be a mobile phone or other similar device. The wireless transmission source transmits a key with the transaction request. The system will determine the authenticity of the transmission based on the transmitted key. If the transmission is determined to be authentic, the transaction will be acted upon. Various approaches for determining authenticity are discussed. The technique may also be used to prevent acting upon duplicate transmissions.

In an embodiment, the invention is a method including receiving an electronic request for a value exchange transaction, wirelessly transmitted from a user device; receiving with the electronic request a transmitted key associated with the electronic request; and determining whether the transmitted key exists in a transactions table. If the transmitted key is not in the transactions table, the transmission will be considered authentic. Therefore, the transmitted key and value exchange transaction are input into the transaction table, and the value exchange transaction is processed by the system. If the transmitted key is in the transactions table, the transmission is not considered authentic (or may be a duplicate transmission). Therefore, t the value exchange transaction is not acted on by the system. The user device may be a mobile phone.

In an implementation, the transmitted key includes an electronic identifier identifying a user that requested the value exchange transaction and a sequence number. The sequence number is stored at the user device and advanced to a next number in sequence before a next value exchange transaction is transmitted by the user device. Then each valid transmission should have a different or unique sequence number.

The sequence number may be stored in a nonvolatile or otherwise persistent memory at the user device, such as flash, electrically erasable (EA2) memory, magnetic storage, or battery-backed memory. This will ensure each transmission will have a unique value.

The transmitted key may include a pseudorandom number, such as generated using a pseudorandom number generator using a particular seed value. The seed value will change each time a new pseudorandom number is generated, so a sequence of pseudorandom numbers will be generated.

In an implementation, the transmitted key includes a first electronic identifier identifying a user that requested the value exchange transaction, a second electronic identifier identifying a user that is a target of the value exchange transaction, a value amount of the value exchange transaction, and a time associated with the value exchange transaction.

In an implementation, the value exchange transaction may be sending money from a first user associated with the user device to a second user associated with another user device. For example, the first user may request payment of a certain amount of money from the first user's account to the second user.

The transmitted key is not displayed on the user device, so it will not be known to the user. This may be useful to prevent people who try to "clone" another user's account and using money in another user's account. If the transmitted key is displayed, another user may be able to more easily determine the next number in sequence, the function or equation being used to generate the keys, or other information that may help reverse engineering of the key. In a further implementation, the transmitted key is encrypted to make it for difficult to intercept the wireless transmission of the key.

The electronic request may be made via SMS text messaging service of the user device. The key may also be transmitted using the SMS text messaging service When using different types of clients or programs, the transmitted key may be generated or obtained differently, such as by different functions. For example, the key may include different information. The key may include first information when the user device sends the electronic request using a first application client and the transmitted key comprises first information when the user device sends the electronic request using a first application client, which is different from the first application client. Examples of first information may be a key including a sequence number that is persistently stored. Examples of second information may be a key including a time or time stamp.

A first application client may be a rich client, such as a dedicated value exchange transaction service application executing on the user device (e.g., written in J2ME, BREW, or .NET CF) or instant messenger application. A second application client may be thin client such as an SMS messaging application on the user device, WAP browser on the user device, or Web browser on the user device. When sending the request from the rich client, there may be persistent stored value (such as stored counter) and this is used in the key. However, when sending the request from a thin client, there may not be a persistent stored value and a time or timestamp may be used in the key instead. The system will be able to handle receiving different keys or different key types.

If the transmitted key is in the transactions table, this means the transmission was possibly sent previously or someone is trying to break into the system. The account of the user may be suspended and the matter investigated further. This will prevent further illegal transactions on the user's account.

Further, processing the value exchange transaction may include generating a transaction identifier number for the value exchange transaction. This transaction identifier number will be generated by the system processing the request. An electronic message may be sent to the user device including the transaction identifier number. The transaction identifier number may be viewable on the user device. This allows the user to have a reference number for the transaction, so the user may discuss or inquire about the transaction directly with a customer service representation. This transaction identifier may be completely unrelated to the authentication key (which is generated at the user device). The transaction identifier may be generated by a banking partner handling the transaction. In an alternative implementation, the key may be used in generating or creating the transaction identifier.

In an embodiment, the invention is a method including receiving an electronic request for a value exchange transaction, wirelessly transmitted from a user device; receiving a transmitted key associated with the electronic request; generating an expected key; comparing the transmitted key to the expected key; and if the transmitted key matches the expected key, processing the value exchange transaction. The value exchange transaction may be sending money from a first user associated with the user device to a second user associated with another user device, where the user devices a mobile phones.

Generating the expected key may include evaluating a function or equation using a seed value stored for a user account associated with the value exchange transaction. Further, the user account may also store information about the particular function or equation to use to generate the expected key. For example, some users may use one particular function to generate a key while other users use other functions. Different starting seeds are used for different users, and after each use, a new seed will be created for generating of the next key. In other words, the method further includes after evaluating the function, determining a next seed value in sequence and replacing the seed value stored for the user account with the next seed value in sequence.

For example, the user device has a counter that counts in a particular sequence and generates keys in this sequence using a particular function (e.g., pseudorandom number generator). On the server or system side, the server will know the expected key because it is stored in the user's profile and will also know the function to use to generate the key. If the expected key matches the transmitted key, then the user's request is authenticated. As stated above, the function or equation used may vary or change per user or device, or even per use. The identification of which function or equation to use to generate the expected key will be stored someone in the system such as in a user's profile.

In particular, the invention may include: retrieving from a user profile associated with the value exchange transaction a seed value; retrieving from the user profile information on a function according to which the transmitted key was generated; and evaluating the function using the seed value. As discussed above, a method of the invention may or may not include different function. In such as case, function information would not need to be stored in the profile.

If the transmitted key does not match the expected key, the value exchange transaction will not be acted upon. A user account associated with the value exchange transaction may be suspended to prevent further transfers of money since a security violation has occurred. The account may be flagged (e.g., display on a screen, sending an e-mail, sending an instant message) to a system administrator, who can investigate further. Or an automated e-mail may be sent the user to contact customer service because a security violation has occurred for the user's account.

Processing the value exchange transaction may include: generating a transaction identifier number, different from the expected key, for the value exchange transaction and sending an electronic message to the user device including the transaction identifier number, where the transaction identifier number is displayed on the user device.

Payment System Infrastructure—Mobile Client Application (MCA)

In one embodiment, the MCA is based on the Java 2 Platform, Enterprise Edition (J2EE), and boasts a simple, intuitive interface. As a result, account holders enter their request data-such as amount, phone number, or other account identity information such as an e-mail address or instant messenger ID of the receiving account, and PIN. Designed to be flexible and easy to configure, the MCA has different versions for different languages and is designed to run under Java 2 Mobile Edition (J2ME), dot Net (.NET) as well as WAP, BREW, Symbian, and SIM Toolkit or other mobile protocols and may be ported to platforms such as cell devices, PDAs or other mobile electronic devices. Java, .Net, Brew, Symbian and Sim Toolkit are believed to be trademarks of their respective owners. MCA is also available for phone operating system, including Nokia, Motorola, Samsung, Sanyo, and other common brands. Advantageously, no special semiconductor device or "chip" on the mobile device is required to perform secure, cost effective, and mobile financial transactions.

To initiate operation, account holders install (or have installed) the MCA on their mobile phone. Application provisioning can be conducted in the following ways:

(1) Over the Air Provisioning using a WAP push, the payment server sends a message to the account holder to start the application download. Alternatively, the account holder can use a WAP pull to send a message to the payment server to initiate the process;

(2) Proximity Provisioning at customer service centers, partner merchant locations, or mobile service providers may install the MCA via Bluetooth, infrared, or other near field wireless connection;

(3) Internet Downloading where account holders may download the program over the Internet and install it through a USB port—or even download the program from one phone to another; or (4) On a SIM card where account holders may purchase devices with the MCA already installed on the SIM card.

In an example scenario, a user has a mobile device equipped with near field communication capability. The user may see a product or item he wants to purchase. The use puts the user's mobile device in proximity with a near field communication device associated with the product or item. Then the display of the mobile device inquires whether the user will approve a transaction to purchase the product or item. If the user approves, the transaction is processed. The user will receive the item, such as picking up from a delivery point, or the item may be delivered to the user's mailing address. The user may be prompted for a PIN or challenge question to verify that they have approved the transaction.

An aspect of the invention is a mobile payment system or service. This application discusses many specific embodiments and implementations of individual components and elements, variations and modifications of these, and combinations of these. A system of the invention may include any of the variations or specific implementations discussed, singly or in any combination. In this application, an example of a specific implementation of a mobile payment system is provided, and this specific implementation is the Obopay system. The Obopay system is merely one implementation of a mobile payment system and is discussed to describe more easily various aspects of the invention. The invention encompasses many mobile payment system implementations and is not limited to the specific implementations described.

Mobile Application Processes Mobile Client Application (MCA)

The mobile client application allows people to pay friends, shop, and transfer funds by their mobile device. An account holder can access the mobile client application to send money or request money from anyone with a mobile device that supports text messaging or mobile Internet capabilities. They can also see the balance and history of their account in real-time.

The mobile client application supports the following features: Pay, Balance, History, Request Pay, Refer or Invite, Add Money (i.e., Load), Settings, Help. MCA can be used to send money from an account holder's account to any mobile subscriber whose device supports text messaging. The account holder sending the money needs to be an account holder; however the person or merchant to whom they are sending the money does not.

The financial transaction may be initiated by either the payer or the payee. If the payer initiates the transaction, the MCA is used to initiate the transaction. To use MCA to send money from a prepaid debit account the account holder will go through a sequence of steps:

(1) Open MCA on the account holder's mobile device. This will take the account holder to a splash screen which displays a logo and tag line. The account holder then presses "enter" to continue. This will bring the account holder to the main menu screen which displays a menu of the features of MCA including Pay, Balance, History, Request Pay, Refer or Invite, Add Money (i.e., Load), Settings, and Help.

(2) The account holder then selects the Pay option to send a payment. This will take the account holder to the Pay screen where the account holder will enter the telephone number to which they want to send their payment.

(3) To select a phone number in the account holder's phone book, the account holder will select options (from the lower left soft key on the mobile device), and then find (from the options menu) which will bring up the account holder's existing phone address book and allow them to select a name in it. Optionally, the account holder may enter the phone number directly from the keypad. In another embodiment, the account holder enters a short code to identify a desired merchant payee. Once the account holder has entered the mobile number they will select OK.

(4) This will bring them to the amount screen where the account holder will enter the amount that they want to pay. Depending on the payee's profile, at tip screen may appear that offers the account holder the opportunity to add a gratuity to the amount they want to pay.

(5) When the account holder selects OK they will be brought to the message screen where they can add a message to their transaction. This message may be a text, audio or video attachment. If the account holder does not want to add a message they can simply click OK before writing a message and no message will be added to their transaction. If the transmission network has limited bandwidth, the account holder may be restricted in the type and duration of the message. If the receiving party to the transaction does not have a mobile device capable of handling video or audio messages, the message may be stored on the server for a short period to allow subsequent retrieval via the Internet.

(6) Once the account holder selects OK they will be brought to the PIN screen where they will enter their PIN and select OK. When entering the PIN, the alphanumeric characters do not appear on the screen but rather a pseudo-character is displayed instead. Also, the PIN cannot be found in a message log or other logs on the mobile device. If another person were to have access to the mobile device, they would not be able to determine the PIN.

This will bring the account holder to the confirmation screen which will show them the following information:

Pay To: (Target Phone Number)

Amount:

Any relevant Transaction Fees:

Message (if they have left one)

Once the account holder selects OK they will be taken to a screen with the following information:

Payer

If the target payee has an existing Account holder

Message

Paid To: (Target phone number)

Amount

Date: mm/dd/yyyy hh:mm

Trans: xxxx

If the target payee does not have an existing account, then a message such as: Note: The recipient you paid is not a registered account holder. The recipient has been sent a message with instructions on how to receive the payment.

Message

Paid To: (Target phone number)

Amount

Date: mm/dd/yyyy hh:mm

Trans: xxxx

Payee:

If the target payee is an existing account holder, the payee will receive a message that they have a new item added to their account. When they open the item they will see a transaction receipt with the following information:

Date: mm/dd/yyyy hh:mm

Amount:

From: (payer phone number)

If the target payee does not yet have an existing account, the payee will receive a text message that says "you've got cash," and that instructs them to go to a web site, such as www.obopay.com to become an account holder and receive their cash. The process for new account holder registration is detailed later in this document.

If the financial transaction is initiated by the payee, the MCA is used to initiate the transaction by requesting payment from the payer. An example of a payee initiated transaction is where a pizza delivery service dials the number of the person who ordered the pizza just prior to when the pizza is delivered. When the mobile device is answered, the account holder is given the opportunity to make the payment via the mobile payment infrastructure of the present invention.

To use MCA to request money from an account the account holder goes through a similar sequence of steps:

(1) Open MCA on the account holder's mobile device. This will take the account holder to a splash screen which displays a logo and tag line. The account holder then presses "enter" to continue. This will bring the account holder to the main menu screen which displays a menu of the features of MCA including Pay, Balance, History, Request Pay, Refer or Invite, Add Money, Settings and Help.

(2) The account holder then selects the Request option to request a payment and will enter the telephone number to which they want to send their request.

(3) To select a phone number in the account holder's phone book, the account holder will select options (from the lower left soft key on the mobile device), and then find (from the options menu) which will bring up the account holder's existing phone address book and allow them to select a name in it. This address book may correspond, by way of illustration, to a list of telephone numbers for account holders who have requested a pizza delivery. As part of the request, the delivery person may append a tip screen that offers the account holder the opportunity to add a gratuity to the amount they want to pay.

(4) When the payee selects OK they will be brought to the message screen where they can add a message to their transaction. In one embodiment, this message can be a text, audio or video attachment. If the payee does not want to add a message they can simply click OK before writing a message and no message will be added to their transaction.

(5) Once the account holder selects OK they will be brought to the PIN screen where they will enter their PIN, optionally entering a tip and selecting OK. The request will be sent to the payer who has the option to approve the transaction by entering their PIN and pressing OK. As noted above, the PIN is maintained in a confidential and safe so unauthorized people cannot determine the PIN merely by gaining unauthorized access to the mobile device.

The payment will be initially processed and the payee will receive notification of the payment. If there are no problems with the transaction, the account holder will not receive any further notifications. If any problems do arise with the payment (i.e., insufficient funds) both the account holder and the target payee will be notified. Notification regarding any problems with the payment will promptly occur after the payment is sent so that the parties can confirm the transaction.

The MCA can also be used to by an Account holder to check the current balance of their prepaid debit account from their mobile device. To use MCA to check their balance the account holder will go through the following steps:

(1) Open MCA on the account holder's phone;

(2) This will take the account holder to the splash screen which displays the logo and tag line. The account holder will press enter to continue.

This will bring the account holder to the main menu screen which displays a menu of the features of MCA including Pay, Balance, History, Request Pay, Settings, and Help. The account holder will select Balance to check their balance.

This will bring the account holder to the PIN screen where they will enter their PIN and select OK.

This will bring the account holder to the balance screen which will provide them with the following information:

Date: MM/DD/YYYY HH:MM

Balance:

When the account holder selects OK they will be brought back to the main menu screen.

The MCA can be used to by an account holder to view the history of their last n, where n is an integer number (such as, 3 or 5, by way of example), transactions and the current balance of their prepaid debit account from their mobile device. To use MCA to check their history the account holder will go through the following steps:

(1) Open MCA on the account holder's mobile device. This will take the account holder to the splash screen which displays the logo and tag line. The account holder then presses enter to continue.

(2) This will bring the account holder to the main menu screen which displays a menu of the features of MCA including Pay, Balance, History, Request Pay, Settings, and Help. The account holder will select History to view their history.

(3) This will bring the account holder to the PIN screen where they will enter their PIN and select OK.

(4) This will bring the account holder the history screen which will provide them with the following information:

Data of transaction and amount of transaction: MM/DD (+/−)$.$$

The account holder will be able to select any one of the transactions listed to get more information on that specific transaction. To do this, they scroll over the specific transaction that they want to view and select it. This will bring them to a screen with the following information:

Date: MM/DD/YYYY HH:MM:SS

Amount: (+/−)$.$$

To: (Phone Number of payee or payer)

Message: (if available)

The account holder then selects OK to go back to the history screen. From here they can view another transaction or go back to the main menu screen.

Further, the account holder may link their account with accounting application software such that each transaction is recorded in a database for use in budgeting, planning, record keeping or for tax purposes. In this embodiment, the account holder can add a second message that designates the payment, whether sent or received, according to the nature of the financial transaction. For example, when the account holder buys a meal while on a business trip, the second message may indicate that the transaction is a tax deductible, reimbursable expense. The charge is recorded by the accounting application software. The accounting application software may be provided by the server platform (See FIG. 3) or by a software provider partner. The accounting application software may be a value added option where the account holder may pay a monthly charge to access.

When the account holder selects the back soft-key they will be brought back to the main menu screen.

As noted above, the MCA can be used to request money by an account holder from any other account holder's account. Both the account holder requesting the money and the account holder that they are requesting money from, should be account holders. In another implementation of the invention, the service allows request pay transaction to nonservice members (i.e., viral request pay). To use MCA to request a payment from an account holder, the requesting account holder will go through the following steps. Open MCA on the requesting account holder's mobile device. This will take the account holder to the splash screen which displays the logo and tag line. The account holder presses enter to continue. This will bring the account holder to the main menu screen which displays a menu of the features of MCA including Pay, Balance, History, Request Pay, Refer or Invite, Settings, and Help.

The account holder will select Request Pay to request a payment. This will take the account holder to the Send to screen where the account holder will enter the mobile phone number of where they want to send their payment request. To select a phone number in the account holder's phone book the account holder will select options (from the lower left soft key on the mobile device), and then find (from the options menu) which will bring up the account holder's existing phone address book and allow them to select a name in it. Once the account holder entered the mobile number they will select OK.

This will bring them to the amount screen where the account holder will enter the amount that they want to pay. The requesting account holder selects whether or not they want to request a TIP (i.e., the ability for the requester to add an amount in addition to the amount that they are requesting). When the account holder selects OK they will be brought to the message screen where they can add a text or audio or video message to their transaction. If the account holder does not want to add a message they can click OK before writing a message and no message will be added to their transaction.

Once the account holder selects OK they will be brought to the PIN screen where they will enter their PIN and select OK. This will bring the account holder to the confirmation screen which will show them the following information:

Send To: (Target Phone Number)
Amount:
Tip Request (On/off)
Any relevant Transaction Fees:
Message (if they have left one)

Once the account holder selects OK they will be taken to a screen with the following information:

Requester
Message
Sent To: (Target phone number)
Amount
Date: mm/dd/yyyy hh:mm
Trans: xxxx
Requestee:

The Requestee will receive a message that they have a new item from the payment server. When the account holder opens the item it will open the MCA and will take the account holder to the splash screen which displays the logo and tag line. The account holder presses enter to continue. Then the account holder will be taken to the pay request where they will see the following information.

Message (if applicable)
Pay to (requester phone number)
Amount
Date: mm/dd/yyyy hh:mm:
Transaction ID The Payee will be able to either accept or decline the request for payment. If the payee accepts the request they will select the 'accept' soft key. If the payee accepts the request and a TIP request has been set by the requesting account holder accepting the request will bring the payee to a TIP amount screen where they can add a TIP. Once the input the TIP and select OK the account holder will be brought to the PIN screen. Once the payee enters their PIN and selects OK they will be brought to the confirmation screen. The confirmation screen includes the following information:

Pay To (pay requestor phone number)
Amount
TIP (if applicable)

Once the payee selects OK the transaction will be processed and the payee will be taken to a screen with the following information:

Sent to: (Pay requestor phone number)
Amount
Balance:
Date" MM/DD/YYYY HH:MM
Trans: (Transaction ID)

Once the Payee selects OK they will return to the Main Menu.

If the Payee declines the request they will select the decline soft key. The pay requestor will receive a notification regarding whether their payment request was accepted or declined. The notification will include the following information:

Message: (if applicable)
From: (payee phone number)
Amount:
Date: MM/DD/YYYY HH:MM:SS
Trans:

The account holder may change default settings that are account holder configurable. Currently this includes changing the protocol (i.e., SMS or HTTP) that they use to send and receive payment information between their mobile device and the server. This may also include other account holder configurable information in future versions of the application. To change the setting on their MCA, the account holder would go through the following steps: Open MCA on the account holder's mobile device.

This will take the account holder to the splash screen which displays the logo and tag line. The account holder presses enter to continue. This will bring the account holder to the main menu screen which displays a menu of the features of MCA including Pay, Balance, History, Request Pay, Refer or Invite, Settings, and Help.

The account holder will select Settings to change their settings. This will bring them to the settings screen where they can select the setting that they want to modify. Currently their only option is protocol. When the account holder selects protocol they will be brought to the protocol screen. The account holder will be able to select either HTTP or SMS on the protocol screen. By default their application is set to HTTP. To return to the protocol screen the account holder will need to select the back soft key. To return to the main menu the account holder will need to select the back soft key.

The account holder will be able the view a Help screen from MCA. This will include a brief description of the application and instructions on where the account holder can go to get more help. To view the Help section of MCA, the account holder would go through the following steps. Open MCA on the account holder's mobile device. This will take the account holder to the splash screen which displays the logo and tag line. The account holder will need to press enter to continue This will bring the account holder to the main menu screen which displays a menu of the features of MCA including Pay, Balance, History, Request Pay, Settings and Help. The account holder will select Help to view Help. This will bring them to the main Help screen which will provide them with the links to the following:

A brief description of MCA, such as:

Obopay lets you send money, make purchases, and ask for payments using your phone. Also use your debit card to make purchases and to withdraw cash. More:

Link to Features page that displays, for example:

You will be asked to enter an account holder's phone number, an amount, and your PIN when doing the following. More:

Pay that displays, for example:

Use Obopay pay feature to send money to anyone with a mobile or VoIP phone. If they don't already have a prepaid debit account, they will be directed to a web site to create one. To cancel a payment, go to obopay.com for info.

Balance that displays for example:

Use balance to get amount available in your account.

History that displays for example:

Use history to get recent transactions and available balance. Select one to get details.

Request Payment that displays for example:

Use request payment to ask a mobile phone account holder for money. Adding message and asking for a tip are optional.

Link to help page on Entering Info that displays for example:

Phone numbers—when selecting Pay or Request Payment, enter the phone number with area code. No dashes or spaces.

Amounts that displays for example:

Between $0.01-$9999.99. No need to add decimal points-add zeros for dollar amounts Your PIN that displays for example:

Your PIN was provided when you activated your account. If you've forgotten it, call 888-8OBOPAY Link to help page on Shortcuts Back: returns to previous screen.

Clear: erases the last character typed.

Contacts: accesses your address book.

Exit: closes the application.

Link to help page on FAQs

Security

Obopay provides secure transactions through encrypting transactions at the network layer, the application layer and the transaction layer. For more information visit www.obopay.com Data (Internet) plan You do not need a data plan to use Obopay. However, you will need a data plan to download Obopay to a new phone. Also a data plan can optimize the performance of the Obopay service.

Cost?

Withdraw money?

Use your debit card at any AIM that accepts a credit card Or request a check from Obopay at www.obopay.com Cancel transaction To cancel a transaction to a non-Account holder go to www.obopay.com/help and select cancel payment. Payments to account holders can only be canceled if the transaction was unauthorized (fraud).

To cancel an unauthorized transaction call 888-8OBOPAY

Add money?

Go to www.obopay.com and select the load account button

Forgot PIN.

If you've forgotten it, call 888-8OBOPAY

Link to help page on Support For more info, go to obopay.com or call 888-8OBOPAY Link to help page on About software version File size:

Advantageously, the MCA enables account holders to create an off-line profile that can be configured to auto respond when their mobile device is turned off or out of range. For example, the account holder could configure their account to auto accept money deposits or auto accept withdrawals from specified account holders. If the account holder's mobile device is turned on, any offline transactions could be retrieved by calling into the payment server for a balance inquiry or a history request. In other alternatives, the account holder could specify that account information be delivered by SMS or voice-mail.

Wire Protocol

MCA and Platform wire protocol

Overview

Figure 59:
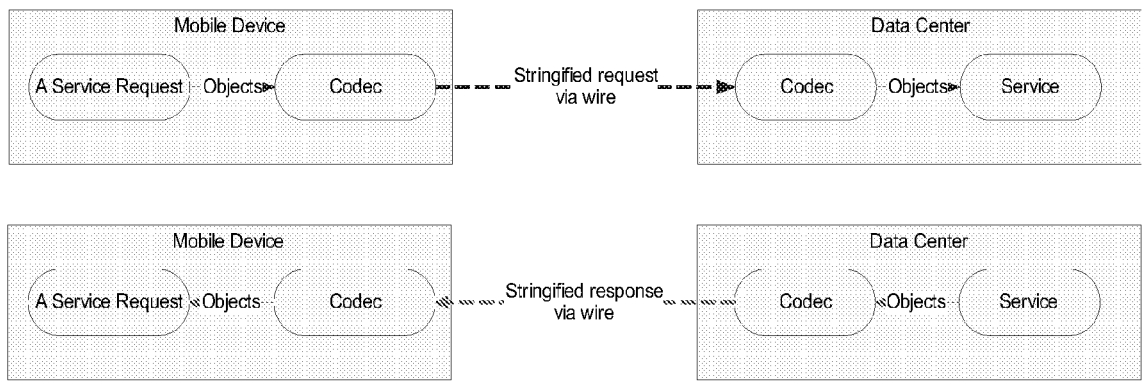
FIG. 59 shows the wire protocol that specifies the format of serialized data passed between devices and data center in accordance with an embodiment of the invention.

The MCA and Platform wire protocol is used in conjunction with MCAP codec to serialize/deserialize data for communication between various devices running MCAs and the data center hosting J2EE-based services. MCA and Platform wire protocol specifies the format of serialized data passed between devices and data center. MCAP codec is the component on mobile devices and the data center handles serialization and deserialization according to MCA and platform wire protocol specifications. FIG. 59 shows a straightforward illustration of the basic concepts.

The following shows service requests from the mobile device and sample wire representations.

A service request is initiated by the mobile device is the PaymentService.payP2P call. This function performs account holder to account holder payment, the java method signature is:

```
public PaymentSummary payP2P(
    String srcDevKey,
    String srcPin,
    String tgtDevKey,
    String transactionAmount,
    String paymentMemo) throws Exception;
```

Everything other than a return value is explained in the diagram. On the response, the return value is included in addition to the overhead, the return value string starts with an object type code (9 in this case, translate to CommonPaymentSummary), non-null attributes of the return value follows, for example, attribute #1—paymentAmount—has a value of $1.27, etc.

Figure 60:
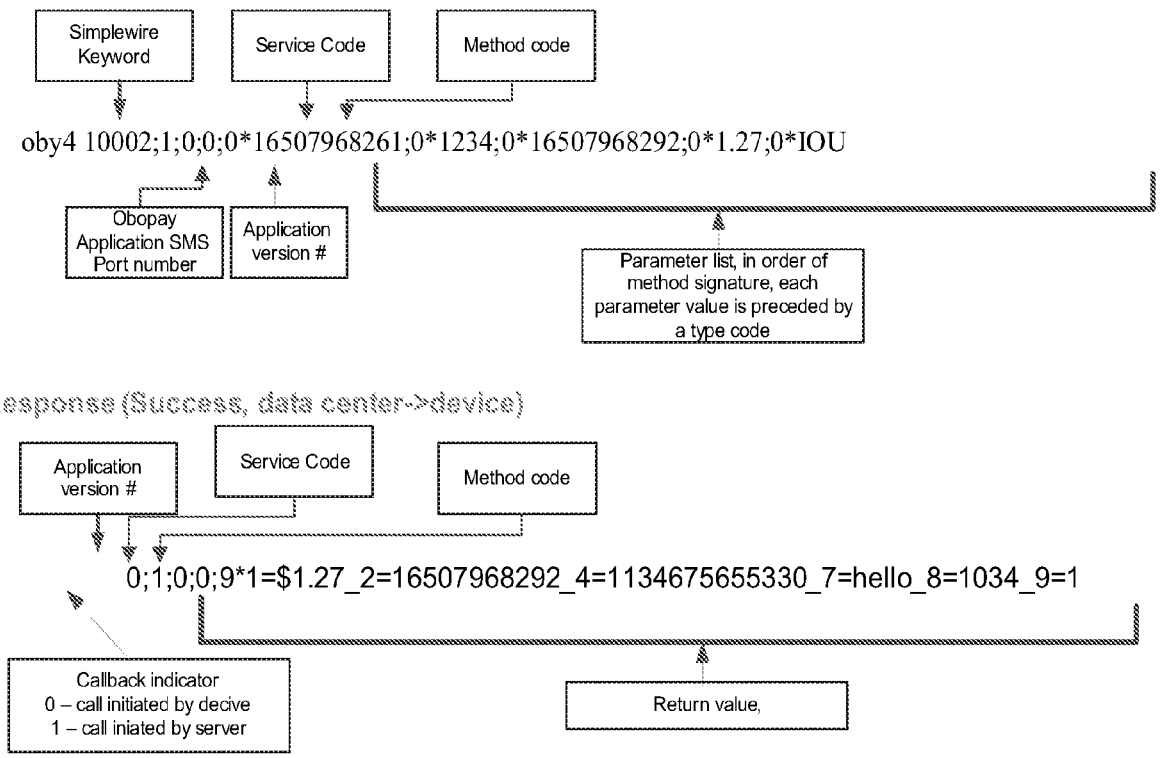
FIG. 60 shows a successful invocation of the service call in accordance with an embodiment of the invention.

Refer now to FIG. 60 which is an example that shows a successful invocation of the service call by invoking the PaymentService.retrieveBalance call. This call retrieves the account balance for an account.

```
public BalanceSummary retrieveBalance(
    String devKey,
    String pin) throws Exception;
```

The request part is no different from the previous example, but the response now represents an exception being thrown as a result of the service call. Object type 6 represents a return value of type EWPBusinessException, its attributes are explained in FIG. 61.

Another service request from the mobile device and sample wire representations is the PaymentService.retrieveHistory call. As the name indicates, this function retrieves the transaction history of an account.

```
public TransactionSummary[ ] retrieveHistory(
    String devKey,
    String pin) throws Exception;
```

FIG. 62 demonstrates a successful invocation, the only notable here is that the return value's "object type" (10) is now followed by an array indicator "<", this means that the return value is an array of objects of type 10, which means CommonTransactionSummary.

Another device-initiated service request is the requestPay function that is used to request a payment from another member.

```
public PayRequestSummary requestPay(
                    String srcDevKey,
                    String srcPin,
                    String tgtDevKey,
                    String transactionAmount,
                    Boolean tipRequest,
                    String memoText) throws Exception;
```

The payRequestPay function is used in response to the requestPay call, this call approves the payment requested.

```
public PayRequestSummary payRequestPay(
                    String payerDevKey,
                    String payerPin,
                    String tgtDevKey,
                    String paymentAmount,
                    String tipAmount,
                    Boolean acceptRequest,
                    String transactionRef,
                    String memoText) throws Exception;
```

Another function is the RegistrationService.whoAmI function that establishes service with the data center and is called when the application is invoked for the first time.

public String whoAmI (String deviceNumber) throws Exception;

Another category of requests are those sent by the server, the characteristics of these requests are that (1) they are currently only sent by SMS; (2) they are usually notifications of events from the server to the devices; (3) there are no synchronous responses for such requests.

To be consistent with MCA and platform architecture that handles device-initiated calls, the present invention has implemented the handler of such notifications on the device as "device services" with the same ServiceProxy signatures when methods on these "device services" are invoked from the server side. The codec and wire protocol are exactly the same as those requests initiated by the device. Here's a list of currently available "device services" and their methods:

J2ME Payment Service

P2pNotify—notifies target of p2p of the payment requestPay—notifies member of a requestPay request.

notifyRequestPayReceived—notifies target of the request pay operation of receipt of request pay payment.

cancelViralNotify—notifies viral target of cancellation of viral payment

Technical Overview of MCAP

Other device services may be readily defined and added to the MCA and are deemed to be based on the engineering considerations of a particular embodiment.

The high level design of MCA & Platform (MCAP), as well as the user interface (UI) storyboards, is now discussed and presents a complete set of mobile features that are expected and required by MCAP. The MCAP is basically a "mobile wallet" or "pay by phone" consumer/mobile-merchant application. The user interface of the MCAP is simple in that it only requires step-by-step entering of request data (such as amount, PIN, etc.) and then displaying of response data. By way of illustration and comparison, the user interface of the MCAP does not require the graphical complexities of a mobile game application.

Preferably the MCAP is written in a language that is easily ported to run on as many mobile devices as possible. However, the MCAP infrastructure expects certain functionality to be present on the mobile device. For example, the ability to display entry fields and capture account holder inputs is required. The ability to utilize the data services of the mobile device via programmatic HTTPS API invocations is also required if the ability to utilize the SMS text services of the mobile device via programmatic SMS API invocations is not available.

The ability to utilize the persistent data services of the mobile device via programmatic API invocations. For example, the ability to store data persistently on the SIM card or other nontransient memory is an optional functionality. Similarly, the ability to intercept inbound messages to the mobile device and "awaken" the MCAP for processing is also optional. This functionality provides, for example, the ability to intercept an inbound SMS message (on a specific port) and handle it by the MCAP. The ability to programmatically integrate with the "address book" of the mobile device such that a specific entry field can be "linked" to the address book is also optional. The ability to programmatically notify the mobile device account holder of notable events via sound, vibration, or light is optional.

Preferably, MCAP is modularized such that it is easily implemented on J2ME and proven on .NET as well as J2ME, BREW, Symbian, and .NET CF (Previously Windows Mobile)

Figure 63:
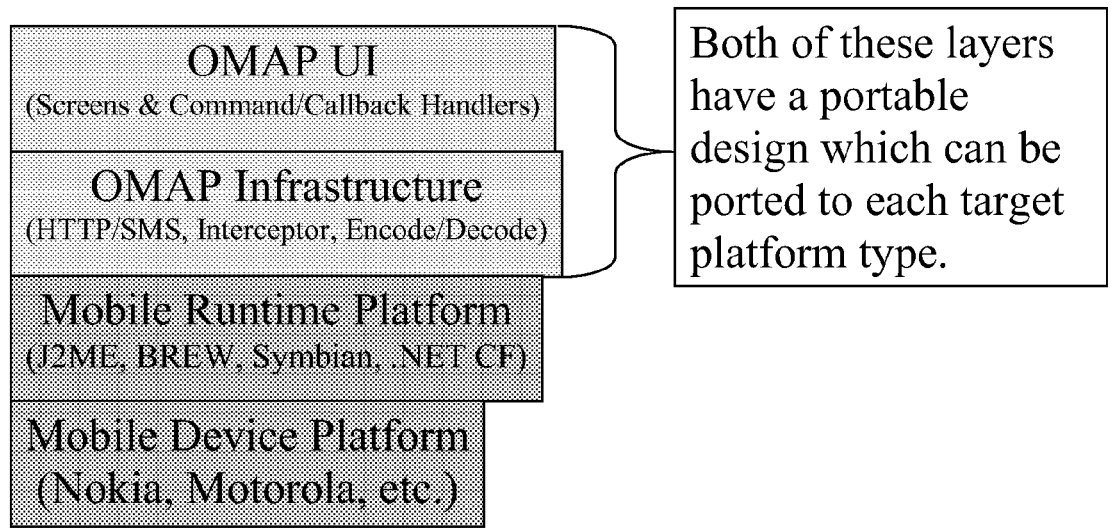
FIG. 63 shows High Level OMAP Design Layers for a mobile device in accordance with an embodiment of the invention.

FIG. 63 shows the High Level OMAP Design Layers for a mobile device.

Figure 64:
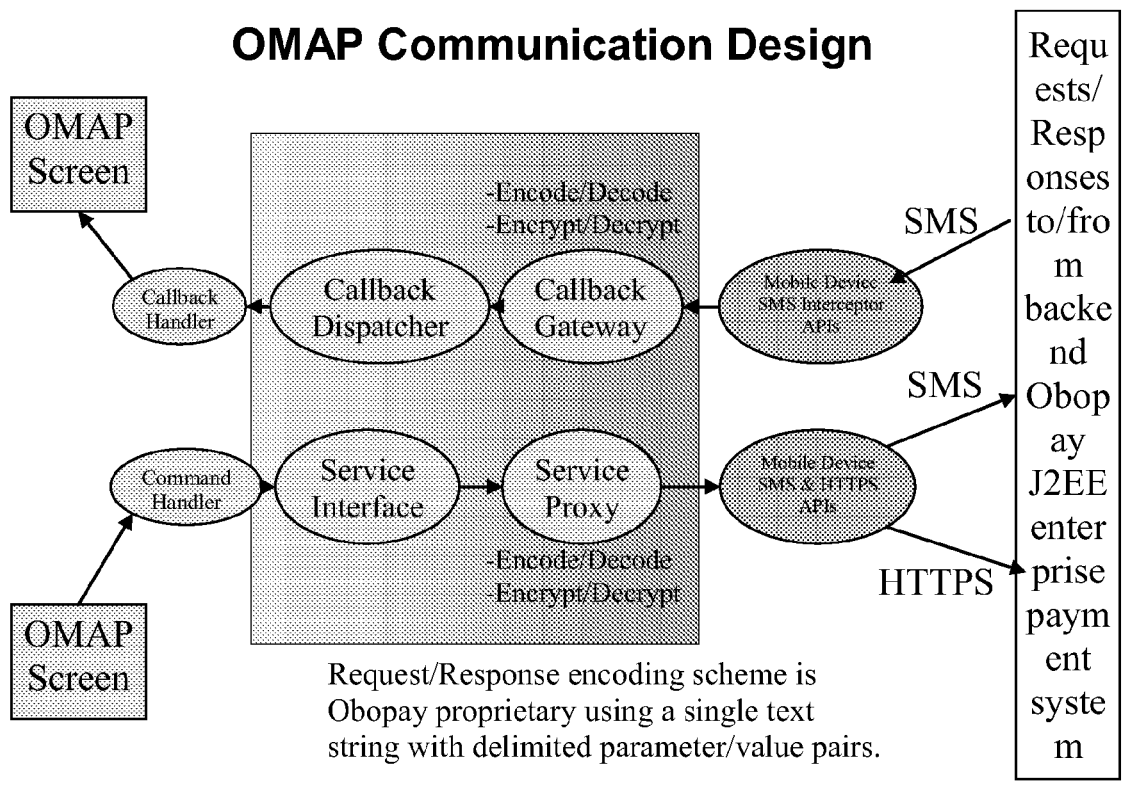
FIG. 64 is a state diagram that shows the OMAP Communication Design in accordance with an embodiment of the invention.

FIG. 64 is a flow diagram that shows the OMAP Communication Design and the Request/Response encoding scheme that uses a single text string with delimited parameter/value pairs.

Figure 65:
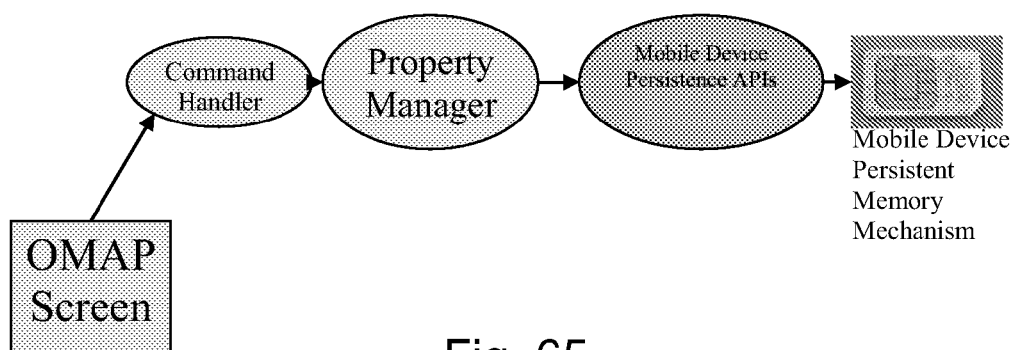
FIG. 65 is a state diagram that shows OMAP Persistence Design in accordance with an embodiment of the invention and state diagram that shows the OMAP User Notification Design in accordance with an embodiment of the invention.

FIG. 65 shows OMAP Persistence Design utilizing the mobile device persistent memory mechanism and a state diagram that shows the OMAP User Notification Design.

Figure 66:
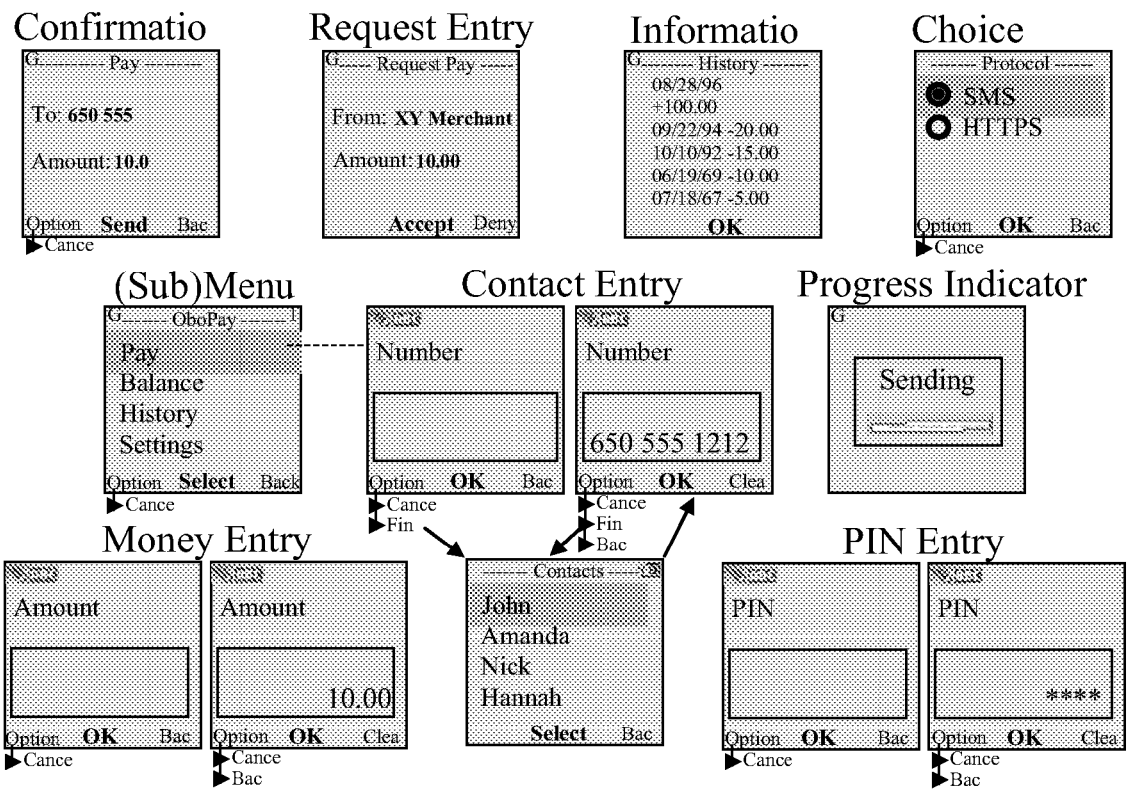
FIG. 66 shows the OMAP Screen Palette in accordance with an embodiment of the invention.

FIG. 66 shows the OMAP Screen Palette for an embodiment.

Figure 67:
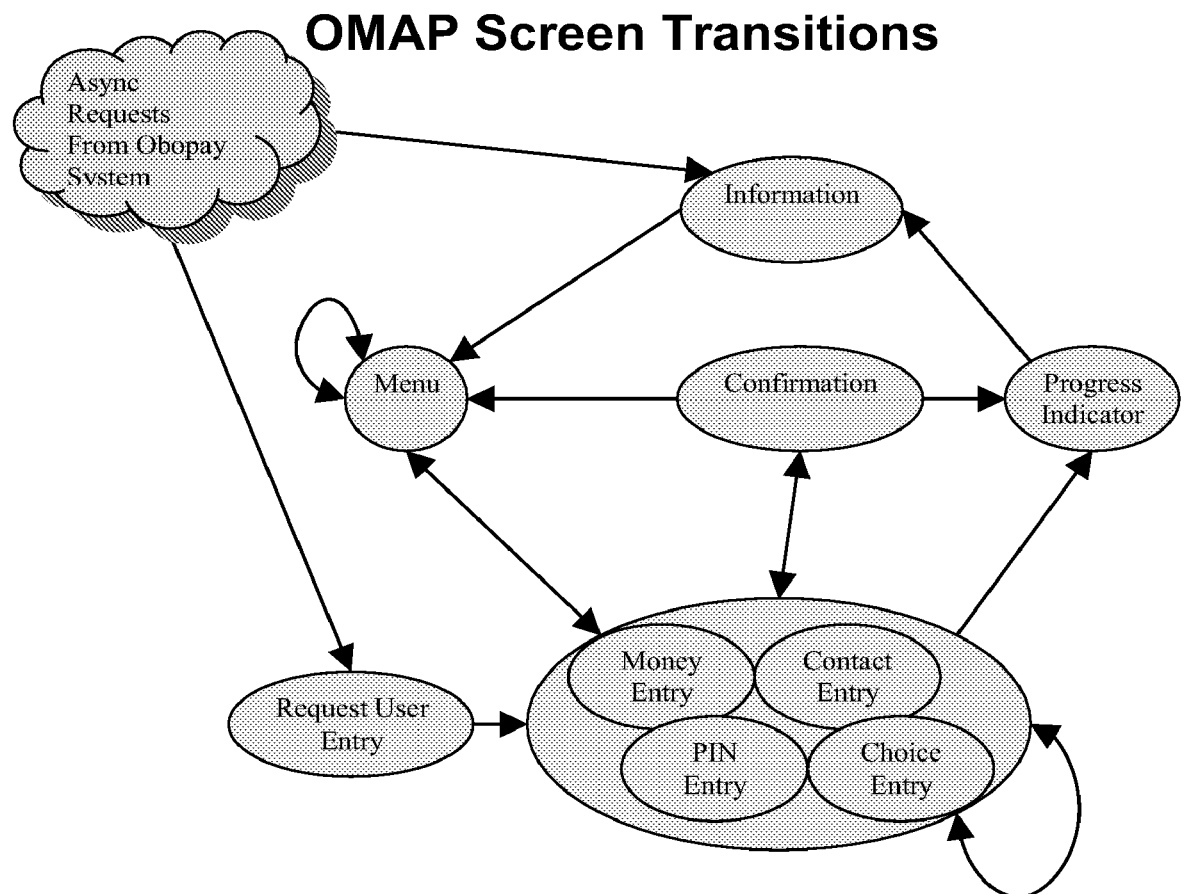
FIG. 67 is a state diagram that shows OMAP Screen Transitions in accordance with an embodiment of the invention.

FIG. 67 is a state diagram that shows OMAP Screen Transitions.

Figure 68:
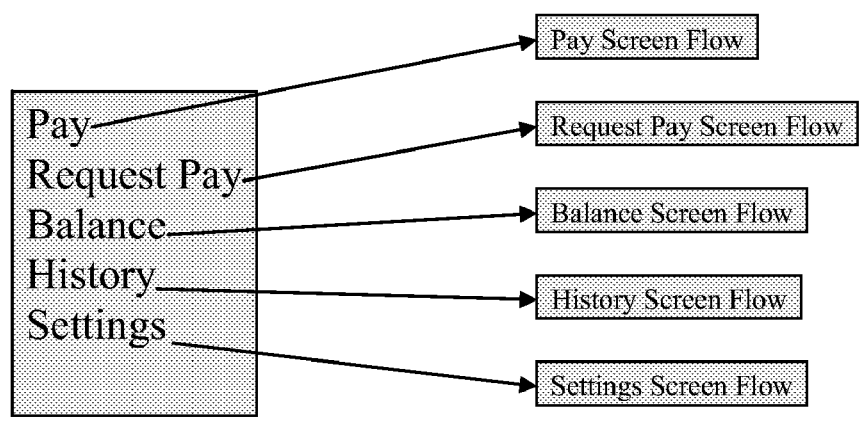
FIG. 68 shows the layout for the OMAP Main Menu in accordance with an embodiment of the invention.

FIG. 68 shows a layout for the OMAP Main Menu.

Figure 69:
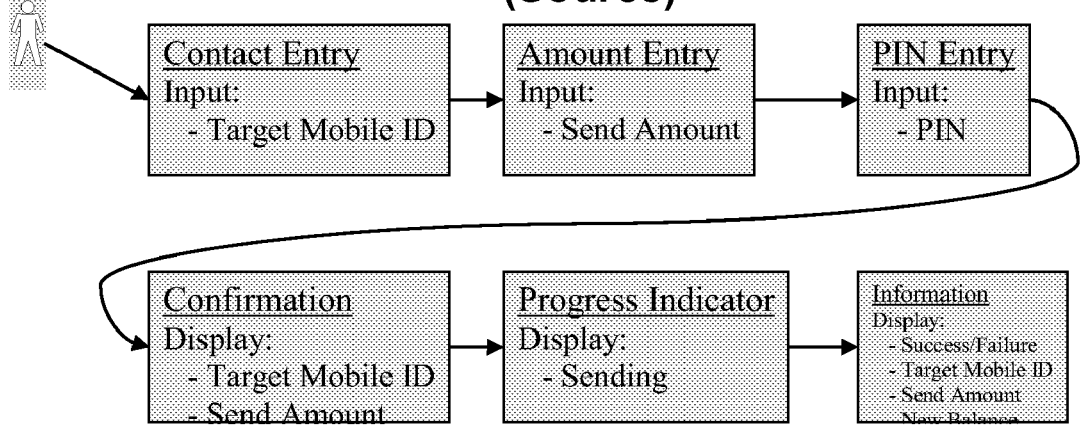
FIG. 69 shows the OMAP Pay Screen Flow from the source perspective in accordance with an embodiment of the invention.

FIG. 69 shows the OMAP Pay Screen Flow from the source perspective. In other embodiments of the invention, the "pay money" feature may be called "send money" instead.

Figure 70:
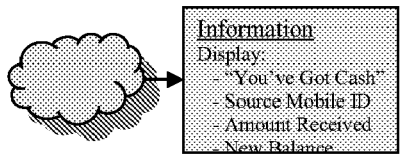
FIG. 70 shows OMAP Pay Screen Flow from the target perspective in accordance with an embodiment of the invention.

FIG. 70 shows the OMAP Pay Screen Flow from the target perspective.

Figure 71:
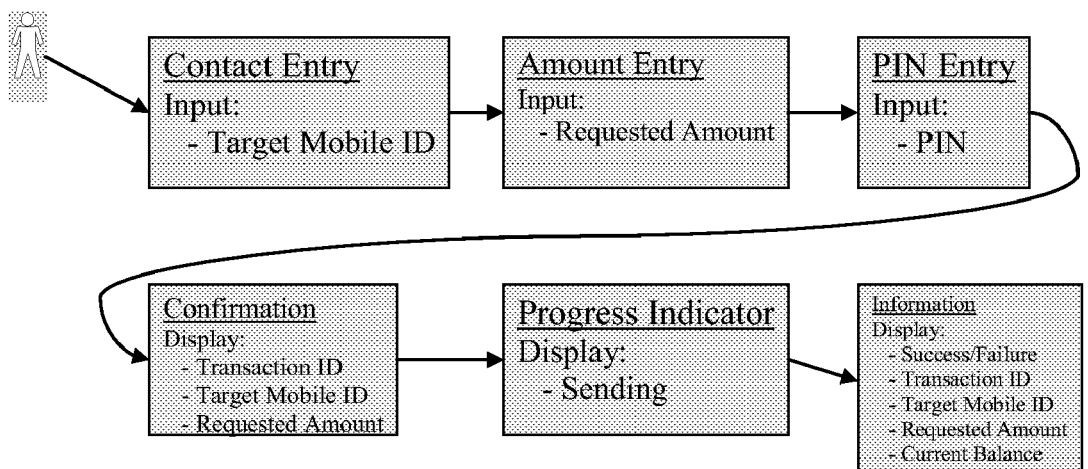
FIG. 71 shows the OMAP Request Pay Screen Flow from the Source-Request perspective in accordance with an embodiment of the invention.

FIG. 71 shows the OMAP Request Pay Screen Flow from the Source-Request perspective. In other embodiments of the invention, the "request pay" feature may be called "get money" instead.

Figure 72:
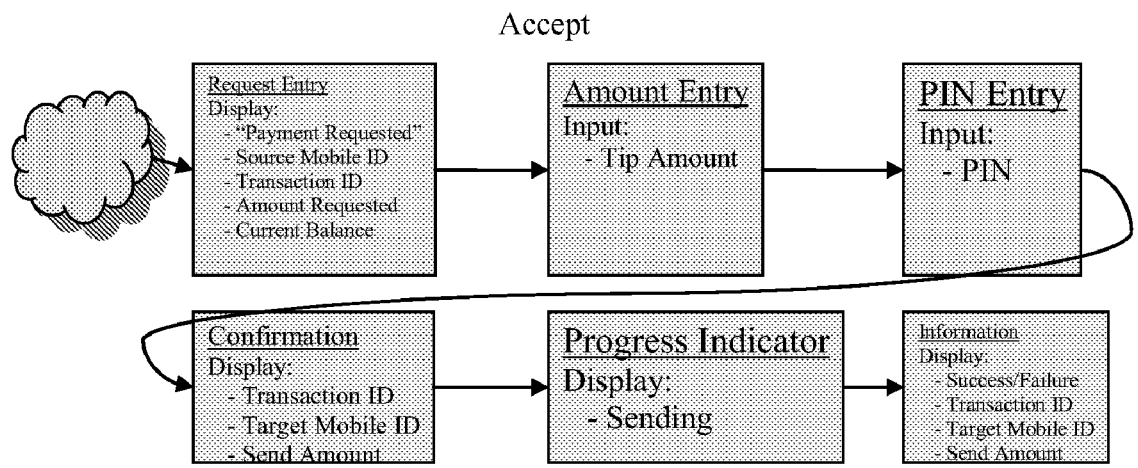
FIG. 72 shows the OMAP Request Pay Screen Flow from the Target-Accept perspective in accordance with an embodiment of the invention.

FIG. 72 shows the OMAP Request Pay Screen Flow from the Target-Accept perspective.

Figure 73:
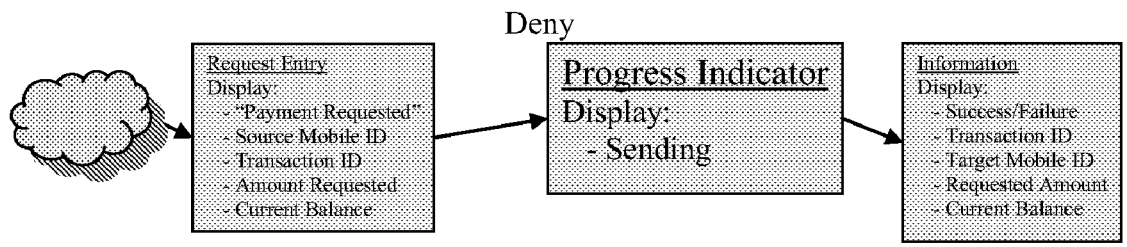
FIG. 73 shows the OMAP Request Pay Screen Flow where the target denies a request in accordance with an embodiment of the invention.

FIG. 73 shows the OMAP Request Pay Screen Flow where the target denies a request.

Figure 74:
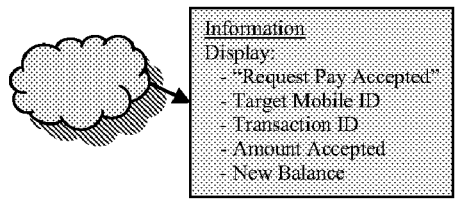
FIG. 74 shows the OMAP Request Pay Screen Flow where both the Source and Target accept a request in accordance with an embodiment of the invention.

FIG. 74 shows the OMAP Request Pay Screen Flow where both the Source and Target accept a request.

Figure 75:
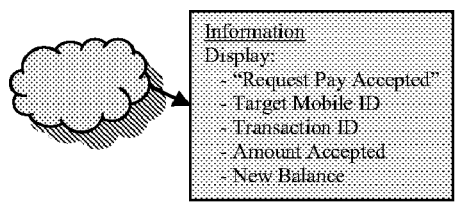
FIG. 75 shows the OMAP Request Pay Screen Flow where both the Source and Target deny a request in accordance with an embodiment of the invention.

FIG. 75 shows OMAP Request Pay Screen Flow where both the Source and Target deny a request.

Figure 76:
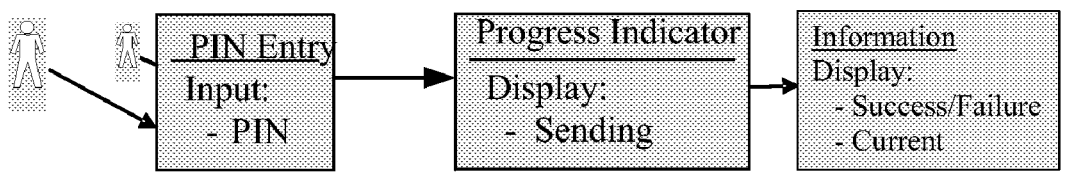
FIG. 76 shows the OMAP Balance Screen Flow in accordance with an embodiment of the invention.

FIG. 76 shows the OMAP Balance Screen Flow.

Figure 77:
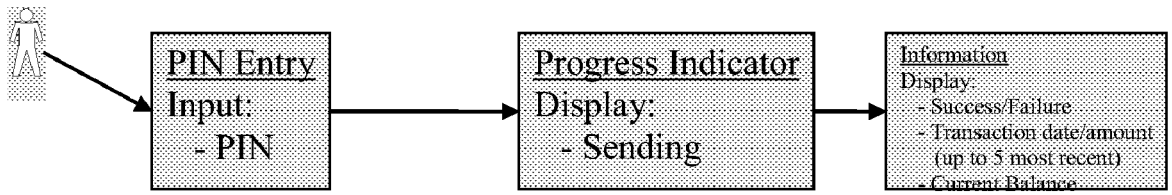
FIG. 77 shows the OMAP History Screen Flow in accordance with an embodiment of the invention.

FIG. 77 shows the OMAP History Screen Flow.

Figure 78:
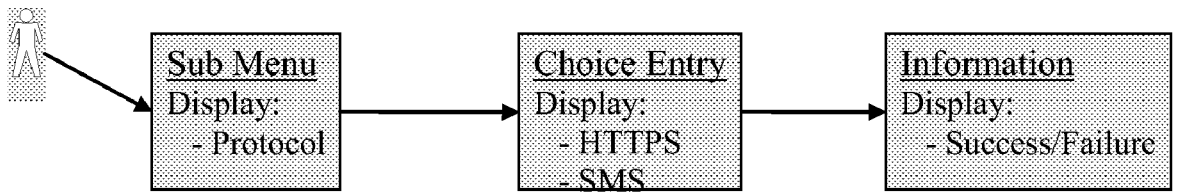
FIG. 78 shows the OMAP Settings Screen Flow at the source in accordance with an embodiment of the invention.

FIG. 78 shows the OMAP Settings Screen Flow at the source.

Figure 79:
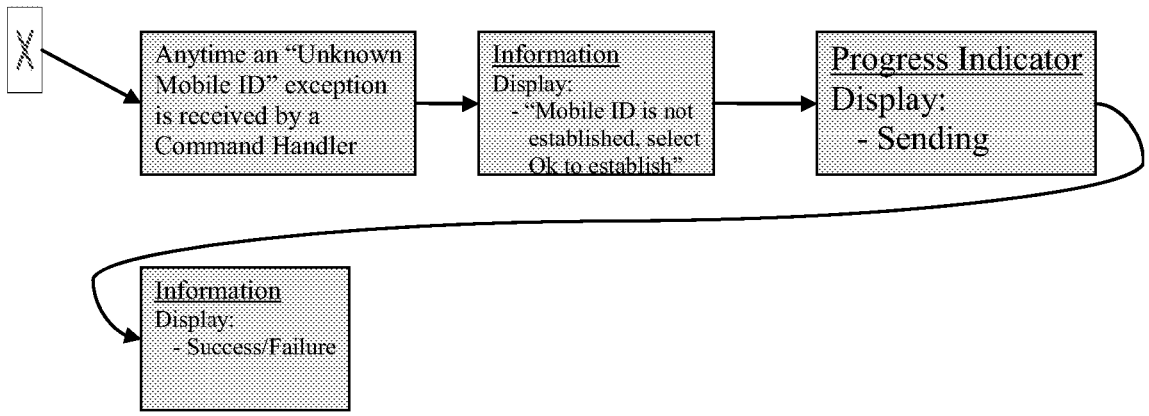
FIG. 79 shows the screen flow for the OMAP for an Unknown Mobile ID in accordance with an embodiment of the invention.
Figure 80:
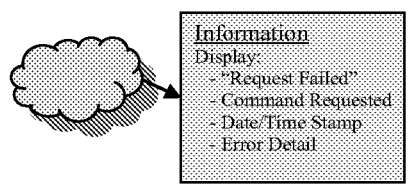
FIG. 80 shows the OMAP System Exception Screen Flow where a request fails in accordance with an embodiment of the invention.
Figure 83:
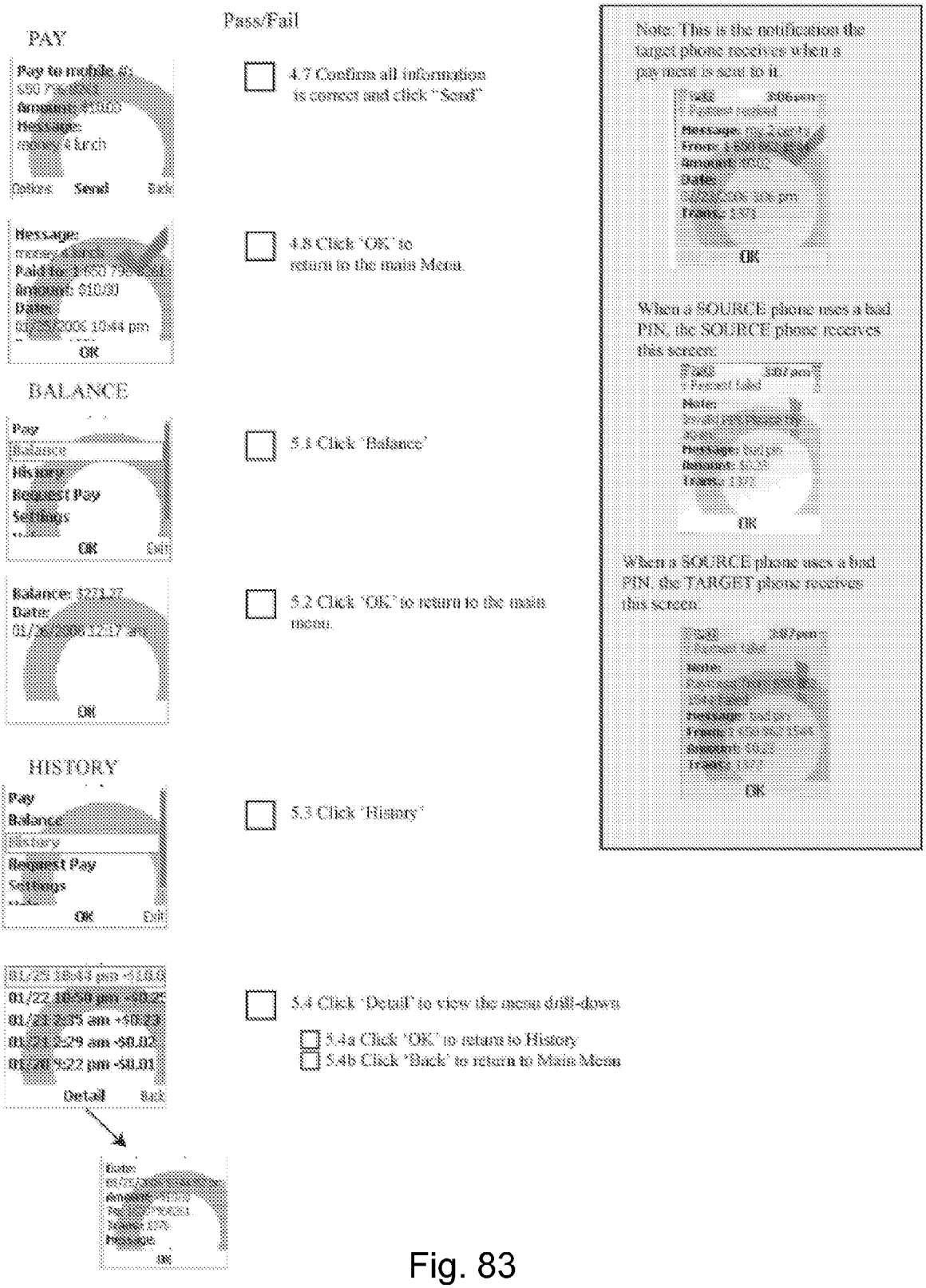
Figure 85:

FIGS. 79 and 80 show the OMAP System Screen Flows. Specifically, FIG. 79 shows the screen flow for the OMAP for an Unknown Mobile ID. FIG. 80 shows the OMAP System Exception Screen Flow where a request fails.

FIGS. 81 to 86 show user screens and flows for a mobile phone application for performing person-to-person payments. In an implementation, this application is a standalone application that runs on a mobile phone that enables users to send payments to other users, request payment from other users, check balance information, check transaction history, and perform other functions.

The user can change settings such as the font size (e.g., small, medium, or large). A protocol for communicating with the system may be selected, such as HTTPS, HTTP, or SMS. The user may request that there is a sound or light, or both, notification when receiving a payment. There is a tip toggle so the user can have a tip screen show or not show on the target (or recipient's phone) for a request pay. Then the recipient may send more money than the user requested in the request pay.

There is a contacts menu where a user can save and choose contacts to pay or request pay from. There is a message or memo field where a user can enter a message along with the send payment or request payment request. For example, the user may tell the target, "money 4 lunch." There is a screen where the user can input the user's pin. The pin will not be displayed, but instead asterisks, blanks, or another character will be displayed instead. There may be a screen to list the entire transaction and gives the user an opportunity to confirm the transaction before sending. If there is an error, the sure may select to edit the transaction before sending.

The application may further include a help or brief user's guide to assist the user and answer the user's question regarding use of the system.

Financial Services API

The interface between mobile devices and Electronic Wallet Platform (EWP) Service Proxy includes service components such as the Payment Service and the Registration Service and its high-level hierarchy of Exception objects. The business data transport classes that are returned from the service calls are also described.

Payment Service

This business service is defined and implemented according to an application service infrastructure definition for the EWP. Payment Service comprises pass-through method calls to a partner bank system. The partner bank manages the official system of records, payment processing, and account and member information. Data managed within the EWP that is beyond what is necessary for integrating with the partner bank is for internal use only.

Package:
com.ewp.services
Class:
public interface PaymentServiceInterface
public class PaymentServiceImplemenation implements PaymentServiceInterface The application programming interfaces (APIs) defined for this service are:

payP2P—executes a account holder-to-account holder (p2p) transaction between two consumer members retrieveBalancee—retrieves the available balance for the specified account retrieveHistory—retrieves the last five transaction records for the specified account, including a sixth line that shows the available balance requestPay—first step of a two-part interaction where a member requests payment from another member payRequestPay—second step of a two-part interaction where the recipient of the request for payment either makes the payment or declines to make the payment Details are provided in the following sub-sections. Note that any monetary values returned will be presented as a java.lang.String type with the following format <monetary symbol><dollars>.<cents>. For instance, twenty dollars and fifty-five cents in US dollars has the "$20.55" String representation.

Method signature: payP2P

This method supports a call from a mobile device to make a payment to another member who has an account associated with a mobile device number. The transaction result is sent to the invoking member's mobile phone. In addition, a notification for receipt of money is sent to the recipient.

```
public PaymentSummary payP2P (
    String srcDevKey,
    String srcPin,
    String tgtDevKey,
    String transactionAmount,
    String paymentMemo)
    throws Exception
```

Input Parameters:

srcDevKey•String value that is usually the phone number of the account initiating the payment srcPin•String value that is the PIN for the account making the request tgtDevKey•String value that is usually the phone number of the account receiving the payment transactionAmount•String value that is the amount of payment to make to the receiving account.

paymentMemo•String that is a short note from the payer to the payment recipient.

Return Type Object:

PaymentSummary•container object that includes the target account number, payment amount, and available balance data. See PaymentSummary class description for more information.

Method signature: retrieveBalance

This method supports a call from a mobile device to get the member's current account balance. The result is sent to the invoking member's mobile phone.

```
public BalanceSummary retrieveBalance (
    String devKey,
    String pin)
    throws Exception
```

Input Parameters:

devKey•String value that is usually the phone number of the account that is requesting its balance pin•String value that is the PIN for the account making the request Return Type Object:

BalanceSummary•container object that includes the available balance data. See BalanceSummary class description for more information.

Method signature: retrieveHistory

This method supports a call from a mobile device to retrieve the member's five most recent transactions and includes the current account balance in its history display. The result is sent to the invoking member's mobile phone.

```
public TransactionSummary[ ] retrieveHistory (
    String devKey,
    String pin)
    throws Exception
```

Input Parameters:

devKey•String value that is usually the phone number of the account that is requesting its transaction history pin. String value that is the PIN for the account making the request Return Type Object:

TransactionSummary [ ]•an array of container objects that each includes the amount value, debit/credit/balance key, and timestamp of the transaction data. See TransactionSummary class description for more information.

Method signature: payRequestPay

This method supports a call from a mobile device to either accept or decline a request for payment. The transaction result is sent to the paying member's mobile phone. In addition, a notification for receipt of money is sent to the recipient.

```
public PayRequestSummary payRequestPayMobile(
    String payerDevKey,
    String payerPin,
    String tgtDevKey,
    String paymentAmount,
    String tipAmount,
    Boolean acceptRequest,
    String transactionRef,
    String requestText,
    String memoText)
    throws Exception
```

Input Parameters:

payerDevKey•String value that is usually the phone number of the account fulfilling the request for payment (same as source for payP2P)

payerPin•String value that is the PIN for the account fulfilling the request for payment tgtDevKey. String value that is either the phone number of the account receiving the payment or a reference key used to identify a JNDI connection key to a device associated with the account receiving the payment paymentAmount•String value that is the amount of payment to make to the receiving account.

tipAmount•String value that is the amount of tip payment to add to the transaction total acceptRequest•Boolean value that indicates whether or not the request for payment was accepted (true=accepted)

transactionRef•String value that is the transaction reference number from the original request for payment requestText•String that is the short note from the account holder requesting the payment to the account holder making the payment.

memoText•String that is a short note from the payer to the payment recipient.

Return Type Object:

PayRequestSummary•container object that includes the transaction reference number, target account number, payment amount, and available balance data. See PayRequest-Summary class description for more information.

Method signature: requestPay

This method invokes a device service method to notify the target member about a request for payment from another member.

```
public PayRequestSummary requestPay(
    String srcDevKey,
    String srcPin,
    String tgtDevKey,
    String transactionAmount,
    Boolean tipRequest,
    String requestText)
    throws Exception
```

Input Parameters:

srcDevKey•String value that is either the phone number of the account initiating the request for payment request or a key reference used to identify a JNDI connection key to a device associated with the account making the request for payment srcPin•String value that is the PIN for the account making the request tgtDevKey•String value that is usually the phone number of the account who should receive the request for payment notification transactionAmount•String value that is the amount of payment requested.

tipRequest•Boolean value that indicates whether or not to present a tip request screen to the request recipient.

requestText•String that is a short note from the payment requester to the account holder making the payment.

Return Type Object:

PayRequestSummary•container object that includes the transaction reference number, target account number, payment amount, and available balance data. See PayRequest-Summary class description for more information.

Registration Service

This business service is defined and implemented according to the Application Service infrastructure definition for the EWP. The Registration Service provides methods to be used for web service calls from the partner bank system back to the EWP system. While the partner bank maintains the official account and member information, EWP needs to know the mapping between a member's prepaid debit card number and the member's mobile phone number. This data, and potentially more, will be persisted in the EWP system.

Package:

com.ewp.services

Class:

public interface RegistrationServiceInterface public class RegistrationServiceImplemenation implements paymentServiceInterface The application programming interfaces (APIs) defined for this service are:

addRegistrationInfo—creates data records pertaining to an account

Details are provided in the following sub-section.

Method signature: addRegistrationInfo

This method persists the device number as an Account data record. If more information is available, such as member name, then the method will also persist the additional information. References between data objects will be made as necessary. The method returns a container object that indicates the registration status of the account.

```
public ArrayList addRegistrationInfo(
    ArrayList regContainerList,
    String dsName)
    throws Throwable
```

Input Parameters:

regContainerList•RegistrationContainer container object that minimally contains the phone associated with an account.

Return Type Object:
ArrayList of RegistrationContainer objects•a list of container objects containing information that should have been persisted.

Transfer Objects

Each of the transfer objects described in this section provides getters and setters for each of its class attributes and a default constructor. The objects in this section implement the java.io.Serializable interface and a TransferInterface interface, which is a place-holder for potential common interface needs as well as providing a base type.

BalanceSummary

The container object returned from the paymentServiceInterface.retrieveBalanceMobile( ) API. Package:
com.ewp.transferobjects
Class:
public class BalanceSummary
implements TransferInterface, Serializable
Attributes:
currentBalanceAmount•String value that is the monetary amount of funds currently available for use
errorCode•String value that indicates the nature of the error; set only if status=0
status•String value that indicates whether or not an error occurred during service execution: 1=OK, 0=Error
requestDate•String value that is the audit time stamp for the balance request PaymentSummary The container object returned from the PaymentServiceInterface.payP2PMobile( ) API. This object is also passed in notification callbacks to the mobile device interface with values for display.
Package:
com.ewp.transferobjects
Class:
public class PaymentSummary
implements TransferInterface, Serializable
Attributes:
newBalanceAmount•String value that is the monetary amount of funds currently available for use.
paymentAmount•String value that is the monetary amount of funds paid
sourceDeviceKey•String value that is the phone number of the account that made the payment
targetBalanceAmount•String value that is the monetary amount of funds currently available for use in the target account
targetDeviceKey•String value that is the phone number of the account to whom the payment was made
errorCode•String value that indicates the nature of the error; set only if status=0
status•String value that indicates whether or not an error occurred during service execution: 1=OK, 0=Error
requestDate•String value that is the transaction time stamp for the payment request TransactionSummary The container object returned from the PaymentServiceInterface.retrieveHistoryMobile( ) API. Package:
com.ewp.transferobjects
Class:
public class TransactionSummary
implements TransferInterface, Serializable
Attributes:
transactionDate•String value that is a coordinated universal time (UTC) value represented by milliseconds since midnight Jan. 1, 1970. The date is that of the initial transaction.
settleDate•String value that is a coordinated universal time (UTC) value represented by milliseconds since midnight Jan. 1, 1970. The date is that of when the transaction was settled/completed.
transactionAmount•String value that is monetary amount of the specific transaction
transactionKey•String value that indicates whether the transaction amount represents a credit ("+"), debit ("−"), or balance ("balance").
transactionType•String value that indicates the type of transaction: P2P, POS, AIM, LOAD, BAL
locationName•String value that identifies where the transaction occurred, for instance, a store ID or an AIM ID.
errorCode•String value that indicates the nature of the error; set only if status=0
status•String value that indicates whether or not an error occurred during service execution: 1=OK, 0=Error PayRequestSummary A container object passed in notification callbacks to the mobile device interface with values for display. Package:
com.ewp.transferobjects
Class:
public class PayRequestSummary
implements TransferInterface, Serializable
Attributes:
acceptRequest•Boolean value that indicates whether or not the request for pay is accepted. Value of TRUE means to process a p2p payment.
paymentAmount•String value that is the monetary amount of funds to be paid
payerBalanceAmount•String value that is the monetary amount of funds currently available for use
payerDeviceKey•String value that is the phone number of the account from whom a payment is requested
requesterDeviceKey•String value that is the phone number of the account making the payment request and to whom a payment will be made
targetBalanceAmount•String value that is the monetary amount of funds currently available for use in the target account
transactionRef•String value that is the server-generated transaction reference number
errorCode•String value that indicates the nature of the error; set only if status=0
status•String value that indicates whether or not an error occurred during service execution: 1=OK, 0=Error
requestDate•String value that is the transaction time stamp for the payment request
tipRequest•Boolean value that indicates whether or not a tip amount should be requested from the payee Exception Classes EWPServiceException The base exception class defined for the EWP System. All exceptions thrown from the Services will inherit from this base class or one of its subclasses. Package:
com.ewp.core.exceptions
Class:
public class EWPException extends Throwable
Attributes:
errorCode•String value that identifies a unique error code in the EWP system. This code will be defined as a Java constant. It will be used in message.property files to identify localization strings.
errorText•String value of the error message that is logged in the EWP system log.

InternalException

This exception represents all system and service errors which occur that should be kept internal to the EWP system. The origin of these errors are typically not propagated back to the client application. Package:
com.ewp.core.exceptions Class:
public class InternalException extends EWPException
Attributes: Inherited from parent class.

BusinessException

This exception represents errors that may be presented to the client application. The error message contained in the exception object is not the message shown to a account holder. The error message returned to a account holder be in a account holder-understandable form and localized. The errorCode to error message translation occurs in the Gateway.
Package:
 com.ewp.core.exceptions
Class:
 public class BusinessException extends EWPException
Attributes: Inherited from parent class.
Error Codes
Error codes that sometimes appear as TransactionEvent event status code and AuditEvent event status code. Please refer to ErrorCodesAndNotifications.doc for error codes and definitions.

Business Objects

This section addresses the data objects used in one embodiment. A set of data objects are defined in the EWP_Design_Pilot.doc and EWPDOModel_v2.vsd design documents. Those objects represent the entire EWP system design beyond this embodiment. Examples of the business objects for one embodiment are presented in the following table. It will be appreciated that the objects themselves may contain only a subset of the attributes proposed in the EWPDOModel_v2.vsd design model.

The following table shows the business object class name, its corresponding data table name, the attribute names, the corresponding data table column names, and an estimated rate of growth for the data table.

| Business Object | Data Table Name | Attributes Used | Data Table Column Name | Growth Rate |
| --- | --- | --- | --- | --- |
| Account | ACCOUNT | Integer id<br>Long createTimeStamp<br>Long timeStamp<br>String accountNumber<br>String acctStatusCode<br>Boolean acctWhtlistFlag<br>BigDecimal availBalance<br>BigDecimal balance<br>String cardNumber<br>String currencyCode<br>String deviceNumber<br>Profile profile<br>BigDecimal dailyTransTotal<br>BigDecimal monthTransTotal<br>BigDecimal weekTransTotal | NUMBER(24) ID<br>NUMBER(16) CREATETIMESTAMP<br>TIMESTAMP<br>NUMBER(16) ACCOUNTNUMBER<br>VARCHAR2(8) ACCTSTATUSCODE<br>NUMBER(1) ACCTWHTLISTFLAG<br>NUMBER(19,4) AVAILBALANCE<br>NUMBER(19,4) BALANCE<br>VARCHAR2(16) CARDNUMBER<br>VARCHAR2(3) CURRENCYCODE<br>VARCHAR2(20) DEVICENUMBER<br>NUMBER(24) PROFILEREFID<br>NUMBER(19,4) DAILYTRANSTOTAL<br>NUMBER(19,4) MONTHTRANSTOTAL<br>NUMBER(19,4) WEEKTRANSTOTAL | 80 reg requests initially<br>4 viral reg requests per week<br>1 per registration |
| AuditEvent | AUDITEVENT | Integer id<br>Long timeStamp<br>Integer accountId<br>String auditNumber<br>String auditTypeCode<br>String eventStatusCode<br>String infoText<br>Integer memberId<br>String networkConnInfo<br>Integer transEventId<br>BigDecimal transFeesAmt<br>BigDecimal transGrossAmt<br>String transNumberRef<br>Integer transTgtAcctId<br>String transTypeCode<br>String memo<br>String message1 | NUMBER(24) ID<br>NUMBER(16) TIMESTAMP<br>NUMBER(24) ACCOUNTID<br>VARCHAR2(16) AUDITNUMBER<br>VARCHAR2(8) AUDITTYPECODE<br>VARCHAR2(8) EVENTSTATUSCODE<br>VARCHAR2(250) INFOTEXT<br>NUMBER(24) MEMBERID<br>VARCHAR2(250) NETWORKCONNINFO<br>NUMBER(24) TRANSEVENTID<br>NUMBER(19,4) TRANSFEESAMT<br>NUMBER(19,4) TRANSGROSSAMT<br>VARCHAR2(16) TRANSNUMBERREF<br>NUMBER(24) TRANSTGTACCTID | All trans events + reg requests |

-continued

| Business Object | Data Table Name | Attributes Used | Data Table Column Name | Growth Rate |
|---|---|---|---|---|
| | | | VARCHAR2(8) TRANSTYPECODE VARCHAR2(32) MEMO VARCHAR2(32) MESSAGE1 | |
| TransactionEvent | TRANSACTIONEVENT | Integer id<br>Long timeStamp<br>CurrencyExchange currencyXC<br>String currencyTranRef<br>String currencyCode<br>String eventStatusCode<br>String extPayConfRef<br>String extPayAcctRef<br>String extPayTransRef<br>Float feeRetainRate<br>BigDecimal grossAmount<br>String infoText<br>String locationRef<br>String networkConnInfo<br>Integer srcAccountId<br>BigDecimal srcFeesAmount<br>Integer srcMemberId(*)<br>String srcMemTransRef<br>Integer tgtAccountId<br>BigDecimal tgtFeesAmount<br>Integer tgtMemberId(*)<br>String transNumber<br>String transTypeCode<br>String memo<br>String message1 | NUMBER(24) ID<br>NUMBER(16) TIMESTAMP<br>NUMBER(24) CURRENCYXCREFID<br>VARCHAR2(24) CURRENCYTRANREF<br>VARCHAR2(3) CURRENCYCODE<br>VARCHAR2(8) EVENTSTATUSCODE<br>VARCHAR2(24) EXTPAYCONFREF<br>VARCHAR2(24) EXTPAYACCTREF<br>VARCHAR2(24) EXTPAYTRANSREF<br>NUMBER(5,4) FEERETAINRATE<br>NUMBER(19,4) GROSSAMOUNT<br>VARCHAR2(250) INFOTEXT<br>VARCHAR2(24) LOCATIONREF<br>VARCHAR2(250) NETWORKCONNINFO<br>NUMBER(24) SRCACCOUNTID<br>NUMBER(19,4) SRCFEESAMOUNT<br>NUMBER(24) SRCMEMBERID<br>VARCHAR2(24) SRCMEMTRANSREF<br>NUMBER(24) TGTACCOUNTID<br>NUMBER(19,4) TGTFEESAMOUNT<br>NUMBER(24) TGTMEMBERID<br>VARCHAR2(16) TRANSNUMBER<br>VARCHAR2(8) TRANSTYPECODE<br>VARCHAR2(32) MEMO<br>VARCHAR2(32) MESSAGE1 | 2 per account per day |
| Member | MEMBER | Integer id<br>Long createTimeStamp<br>Long timeStamp<br>Boolean memBlkListFlag<br>String chalQuestion<br>String chalAnswer<br>Integer contactInfoId<br>Integer feeStructureId<br>ArrayList fundsAccounts<br>String language<br>String memStatusCode<br>String pinAlarmCode<br>String pinCode<br>Profile profile<br>String screenName | NUMBER(24) ID<br>NUMBER(16) CREATETIMESTAMP<br>NUMBER(16) TIMESTAMP<br>NUMBER(1) MEMBLKLISTFLAG<br>VARCHAR2(32) CHALQUESTION<br>VARCHAR2(32) CHALANSWER<br>NUMBER(24) CONTACTINFOID<br>n/a<br>n/a<br>VARCHAR2(24) LANGUAGE<br>VARCHAR2(8) MEMSTATUSCODE<br>VARCHAR2(16) PINALARMCODE<br>VARCHAR2(16) PINCODE<br>NUMBER(24) | |

-continued

| Business Object | Data Table Name | Attributes Used | Data Table Column Name | Growth Rate |
|---|---|---|---|---|
| Consumer Member | CONSUMER MEMBER (+MEMBER) | Integer id<br>Long birthDate<br>String governmentIdNum<br>Long idDocExpDate<br>String idDocIssuer<br>String idDocNum<br>String idDocTypeCode<br>n/a | PROFILEREFID VARCHAR2(16)<br>SCREENNAME NUMBER(24) ID<br>NUMBER(16) BIRTHDATE<br>VARCHAR2(24) GOVERNMENTIDNUM<br>NUMBER(16) IDDOCEXPDATE<br>VARCHAR2(24) IDDOCISSUER<br>VARCHAR2(24) IDDOCNUM<br>VARCHAR2(8) IDDOCTYPECODE<br>NUMBER(24) MEMBERREFID | (*)1 per registration |
| Merchant Member | MERCHANT MEMBER (+MEMBER) | Integer id<br>String employerIdNum<br>n/a | NUMBER(24) ID<br>VARCHAR2(24) EMPLOYERIDNUM<br>NUMBER(24) MEMBERREFID | (*)1 per registration |
| Member AccountRole | MEMBERACCOUNTROLE | Integer accountId<br>Integer memberId<br>String roleTypeCode<br>Long timeStamp | NUMBER(24) ACCOUNTID<br>NUMBER(24) MEMBERID<br>VARCHAR2(8) ROLETYPECODE<br>NUMBER(16) TIMESTAMP | (*)1 per registration |
| ContactInformation | CONTACTINFORMATION | Integer id<br>Long createTimeStamp<br>Long timeStamp<br>String dataStatusCode<br>String e-mailAddress<br>String firstName<br>String middleName<br>String familyName<br>Address homeAddress<br>PhoneNumber homePhone<br>PhoneNumber mobilePhone<br>Address officeAddress<br>PhoneNUMBER officePhone | NUMBER(24) ID<br>NUMBER(16) CREATETIMESTAMP<br>NUMBER(16) TIMESTAMP<br>VARCHAR2(8) DATASTATUSCODE<br>VARCHAR2(32) E-MAILADDRESS<br>VARCHAR2(16) FIRSTNAME<br>VARCHAR2(16) MIDDLENAME<br>VARCHAR2(24) FAMILYNAME<br>n/a<br>n/a<br>n/a<br>n/a<br>n/a | (*)1 per registration |
| Address | ADDRESS | Integer id<br>Long timeStamp<br>String addressLine1<br>String addressLine2<br>String addressLine3<br>String addressTypeCode<br>String city<br>String country<br>String stateCode<br>String province<br>String postalCode<br>n/a<br>n/a | NUMBER(24) ID<br>NUMBER(16) TIMESTAMP<br>VARCHAR2(24) ADDRESSLINE1<br>VARCHAR2(24) ADDRESSLINE2<br>VARCHAR2(24) ADDRESSLINE3<br>VARCHAR2(8) ADDRESSTYPECODE<br>VARCHAR2(24) CITY<br>VARCHAR2(24) COUNTRY<br>VARCHAR2(2) STATECODE<br>VARCHAR2(24) PROVINCE<br>VARCHAR2(8) POSTALCODE<br>NUMBER(24) CONTACTINFREFID<br>NUMBER(24) FUNDSACCTREFID | (*)1 per registration |
| PhoneNumber | PHONENUMBER | Integer id<br>Long timeStamp | NUMBER(24) ID<br>NUMBER(16) | (*)1 per registration |

-continued

| Business Object | Data Table Name | Attributes Used | Data Table Column Name | Growth Rate |
|---|---|---|---|---|
| | | String areaCode<br>String localNumber<br>String extension<br>String phoneTypeCode<br>n/a<br>n/a | TIMESTAMP<br>VARCHAR2(8) AREACODE<br>VARCHAR2(12) LOCALNUMBER<br>VARCHAR2(8) EXTENSION<br>VARCHAR2(8) PHONETYPECODE<br>NUMBER(24) CONTACTINFREFID<br>NUMBER(24) FUNDSACCTREFID | |
| Profile | PROFILE | Integer id<br>Long createTimeStamp<br>Long timeStamp<br>String dataStatusCode<br>String description | NUMBER(24) ID<br>NUMBER(16) CREATETIMESTAMP<br>NUMBER(16) TIMESTAMP<br>VARCHAR2(8) DATASTATUSCODE<br>VARCHAR2(80) DESCRIPTION | (*)1 per registration |
| NoAccess Event | NOACCESSEVENT | Integer id<br>Long timestamp<br>String identityRef<br>String infoText<br>String networkConnInfo<br>String requestTypeCode | NUMBER(24) ID<br>NUMBER(16) TIMESTAMP<br>VARCHAR2(24) IDENTITYREF<br>VARCHAR2(250) INFOTEXT<br>VARCHAR2(250) NETWORKCONNINFO<br>VARCHAR2(8) REQUESTTYPECODE | |
| GatewayEvent | GATEWAYEVENT | Integer id<br>Long timestamp<br>String chanTypeCode<br>String chanOrigInfo<br>String chanDestInfo<br>String hostInfo<br>String message | NUMBER(24) ID<br>NUMBER(16) TIMESTAMP<br>VARCHAR2(8) CHANTYPECODE<br>VARCHAR2(80) CHANORIGINFO<br>VARCHAR2(80) CHANDESTINFO<br>VARCHAR2(250) HOSTINFO<br>VARCHAR2(250) MESSAGE | |
| DeviceInfo | DEVICEINFO | Integer id<br>String deviceNumber<br>String deviceKey<br>String connectionKey<br>String processorType<br>String applicationType | NUMBER(24) ID<br>VARCHAR2(20) DEVICENUMBER<br>VARCHAR2(16) DEVICEKEY<br>VARCHAR2(250) CONNECTIONKEY<br>VARCHAR2(16) PROCESSORTYPE<br>VARCHAR2(24) APPLICATIONTYPE | |
| Invitation | INVITATION | Integer id<br>Long timestamp<br>String deviceNumber<br>Integer transEventId<br>String transNumberRef<br>String srcAccountId<br>String srcMemberId<br>String invitStatusCode | NUMBER(24) ID<br>NUMBER(16) TIMESTAMP<br>VARCHAR2(20) DEVICENUMBER<br>NUMBER(24) TRANSEVENTID<br>VARCHAR2(16) TRANSNUMBERREF<br>NUMBER(24) SRCACCOUNTID<br>NUMBER(24) SRCMEMBERID<br>VARCHAR2(8) INVITSTATUSCODE | |

(*)if Member data is kept

Italic text indicates fields that will not be defined.

Bold text indicates fields that will be defined, but will not be used (null values in objects).

PaymentProcessorHelper

This section defines test APIs to emulate the existence of the partner bank as the payment processor and keeper of the system of record. Package:

com.ewp.integration.interfaces—defines the helper methods.

com.ewp.integration.implemenations—for implementations of the interface to be used by services executing the helper methods.

com.ewp.integration.paymentProcessor—for services executing the helper method

Class:

public class PaymentProcessorHelper

The application programming interfaces (APIs) defined for the helper are:

balance—handles the request to return the current balance history—handles the request to return a list of the lase five (5) transaction records and a current balance p2p—handles the p2p payment transaction verifyPin—handles the request to validate a pin against an account

---

Method signature: balance
public BalanceSummary balance (
    String sourceMobileID, String sourcePIN );
Method signature: history
public TransactionSummary[ ] history(
String devNumber,
String pin);
Method signature: p2p
public PaymentSummary p2p(
          String srcDevNumber,
          String srcPin,
          String tgtDevNumber,
          String transactionAmount);

---

Value-Added Services

Many small businesses use a commercial accounting service to handle accounts receivable and their general ledger. The present invention preferably links to the accounting service to provide one value added service that eliminates a data entry step and keeps a timely record of all transactions. When a financial transaction is completed, the payment platform posts the payment automatically to the accounts receivable system. A message, voice annotation, or other means of designating the type of financial transaction is also sent to the accounting service.

Off-Line Transactions

The embodiments of the present inventions discussed relate to a real time on-line system where the account holder's balance is maintained on the payment server. However, there are instances where an off-line payment option is desirable. Accordingly, in one embodiment of the present invention, the balance in the account holder's account is stored on a chip attached or associated with the mobile device. The chip, which is often referred to as a smart chip, is updated as transactions occur. An example of such a smart chip is a smart card chip manufactured by Sony Corporation and known as the FeliCa chip. A batch transmission at the end of the day occurs between each merchant and the payment system provider to effect settlement.

Figure 87:
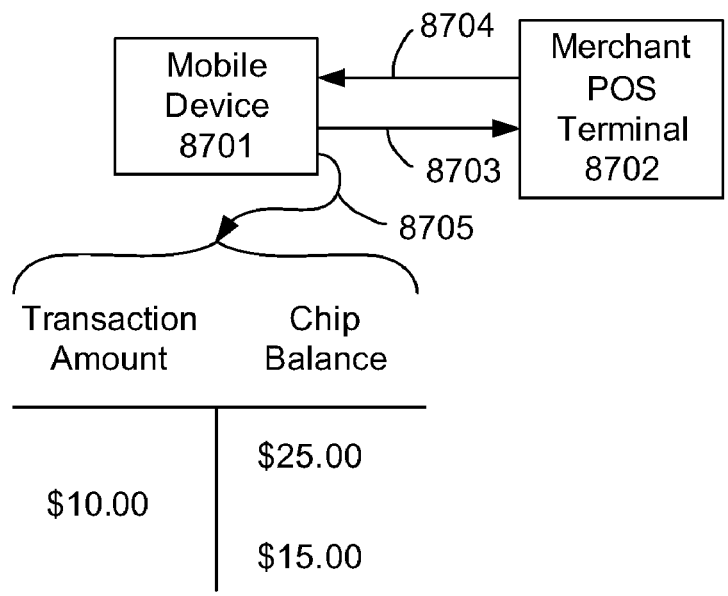
FIGS. 87 and 88 show an architecture for providing an off-line payment system in accordance with an embodiment of the present invention.
Figure 88:
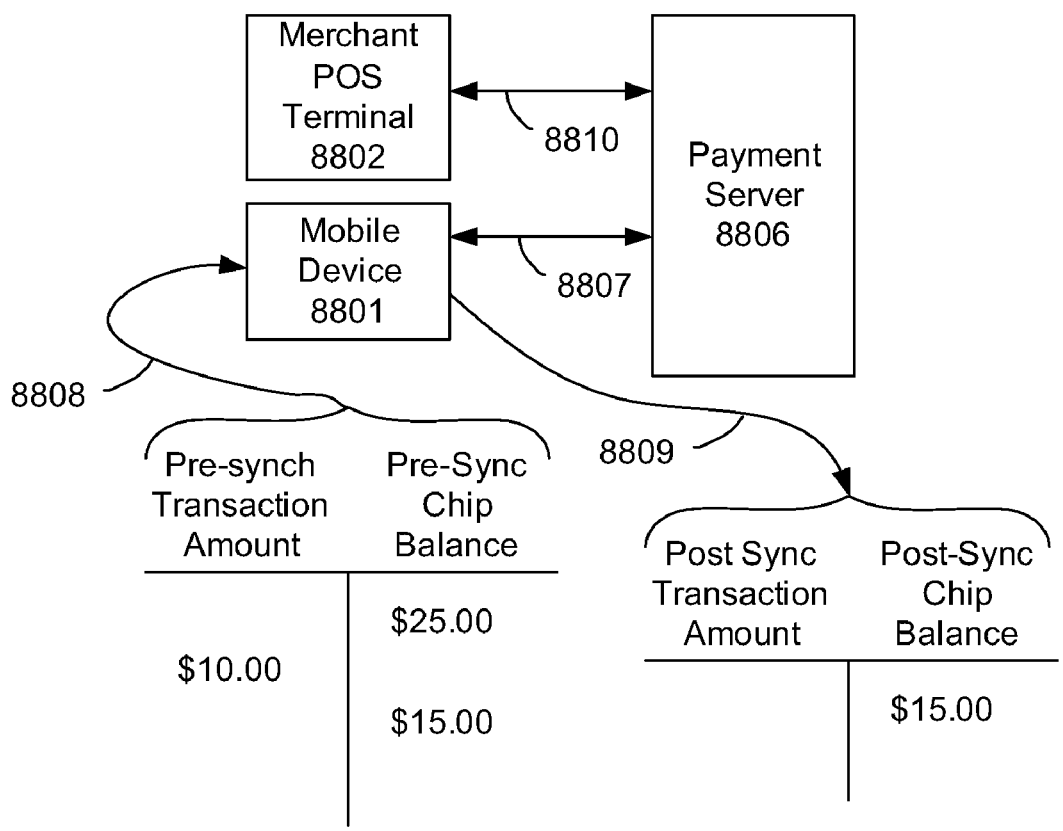
Figure 89:
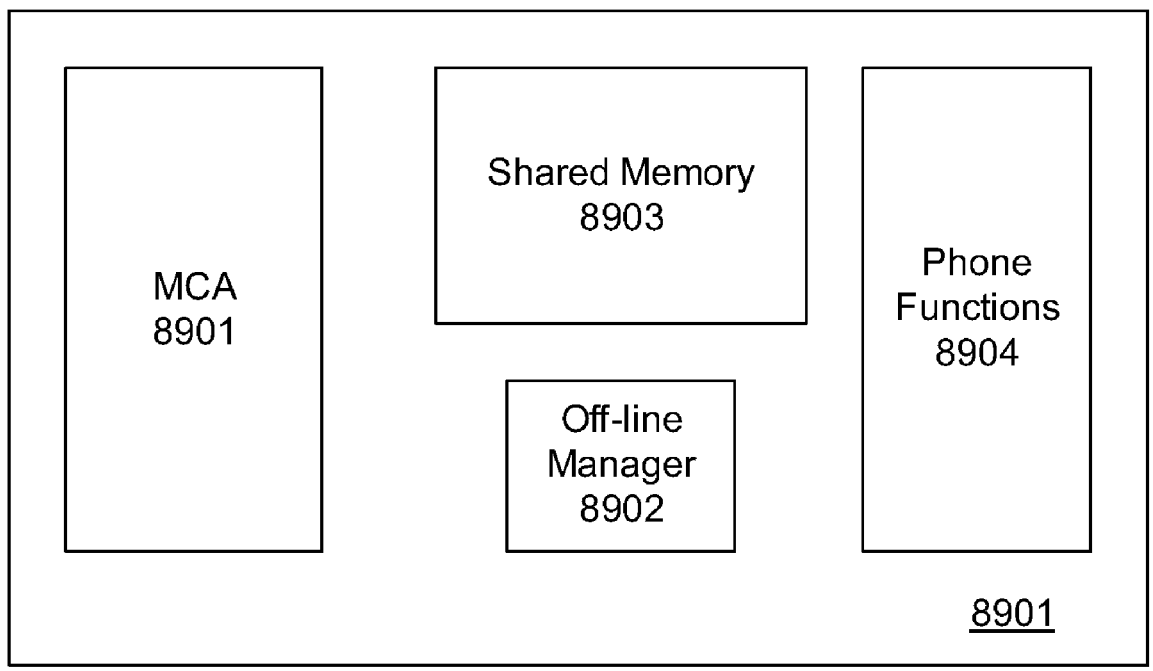
FIG. 89 is a block diagram of components of a mobile device for conducting both real-time and off-line financial transactions on a mobile device in accordance with an embodiment of the present invention.

The off-line payment option is illustrated in FIGS. 87 and 88 in conjunction with the real time on-line architecture of an embodiment of the present invention that is shown in FIG. 89.

With reference first to FIG. 89 the MCA 8901, resident on mobile device 8701, interfaces with a chip (associated with mobile device 8701) that functions as the off-line manager 8702. Both MCA 8901 and off-line manager 8902 have access to a shared memory 8903. In one embodiment, off-line manager 8902 also has an internal memory where it stores each transaction before it updates shared memory 8903. Off-line manager 8902 is controlled by MCA in terms of setting an initial account balance available for off-line transactions as well as clearing stale transactions from off-line manager 8902 after device 8901 resynchronizes accounts. Re-synching is performed by MCA 8901 using communications platform 8904 either at a set time each day or when a next to occur on-line transaction is initiated by the account holder.

Refer now to FIG. 87, when the off-line manager is activated and detects a merchant's POS terminal, a transaction may occur in the off-line mode. In this mode, the off-line manger 8902 is responsible for interfacing with the POS terminal 8702 to deduct the amount of the transaction. When manager 8902 detects a pay request, it sends a message to MCA to request authorization or, alternatively, waits for authorization from the user. Such authorization may be a selected key or combination of keys being pressed in response to the authorization request. As indicated by reference arrow 8703, the payment is sent to POS 8702. In response, POS 8702 accepts the payment and sends a receipt as indicated by reference arrow 8704. Manager 8902 maintains a running balance of the amount available for off-line purchases as indicated at 8705.

At a later time, mobile device 8701 must resynchronize with the payment server 8806, a process that is illustrated in FIG. 88. Since off-line manager maintains account holder's balance available for off-line purchases, it periodically sends an off-line spending report and the ending balance to the payment server 8806 as indicated by reference arrow 8807. Typically, the re-synching occurs at either the end or the beginning of each day. During re-synching, the off-line manager transmits to server 8806 the summary of transactions, which includes the amount of the transaction along with a date stamp and the merchant's identification number as indicated by reference arrow 8808. Server 8806 acknowledges the transaction and re-sets the available off-line transaction amount to a post-synch value as indicated by reference arrow 8809. It is to be understood that the value stored for use by the off-line manager may be user selected. Thus, each day, week or month, the account holder could start with a preselected amount of funds available for off-line transactions. To confirm balances, server 8806 also synchronizes accounts with each merchant 8802 as indicated by reference arrow 8810.

The advantages of this off-line embodiment compared to sending offline money via a mobile phone equipped only with a smart chip include:

(1) Loss of the mobile device does not mean loss of the money because with the on-line synchronization, accounts can be closed and balances can be transferred to a new account; and (2) Problem accounts can be readily disabled and then reenabled after problem resolution.

The primary advantage of the offline transaction is very low transaction time to conclude a transaction. Off-line transactions are a benefit to the account holder where a network authorized transaction may be too slow. However, the combination of the real time network authorized model of the present invention when combined with off-line payment capabilities provide a versatile, adaptive, and useful system.

As described above, the present invention relates to a mobile payment platform and service that provides a fast, secure, and easy method for making payments by individuals using a mobile device. Funds are accessed from account holder's mobile device, which may be a cell phone, PDA or other packet oriented communication device, to make and receive payments. Financial transactions are conducted on a person-to-person (P2P) basis where each party is identified by a unique indicator such as a telephone number or bar code. A Mobile Client Application (MCA), resident on the mobile device, simplifies access and performing financial transactions in a fast, secure manner.

Figure 90:
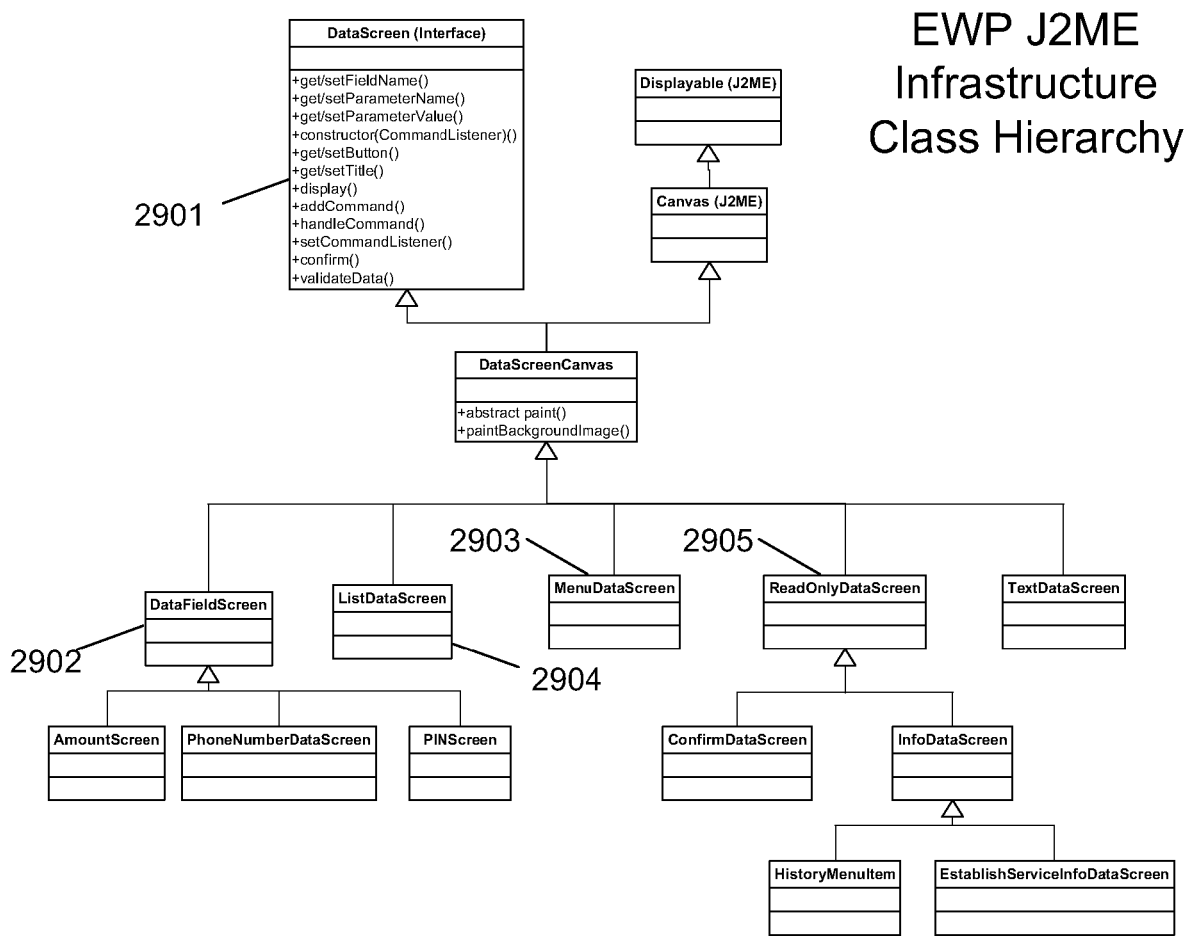
FIG. 90 shows the J2ME Application Infrastructure for the MCA in accordance with an embodiment of the present invention.

FIG. 90 shows the J2ME application infrastructure for the MCA in accordance with an embodiment of the present invention. Screen sequences 9000 are composed of a series of one or more instances of DataScreen classes, such as illustrated at 9001. A DataScreen instance allows a user to either provide specific input or read information. DataFieldScreen 9002 specializations allow input for a dollar amount, phone number, text or personal identification number, etc. DataFieldScreen instances are responsible for validating user data input. MenuDataScreen 9003 and ListDataScreen 9004 provide various menu and list selection capabilities. Variations implement single-selection (radio button), multiselection (check boxes) or menu-style interaction. ReadOnlyDataScreen 9005 instances provide output. Specializations provide formatting appropriate to the data being displayed. Variations implement single-selection (radio button), multi-selection (check boxes) or menu-style interaction. ReadOnlyDataScreen instances provide output. Specializations provide formatting appropriate to the data being displayed.

Figure 91:
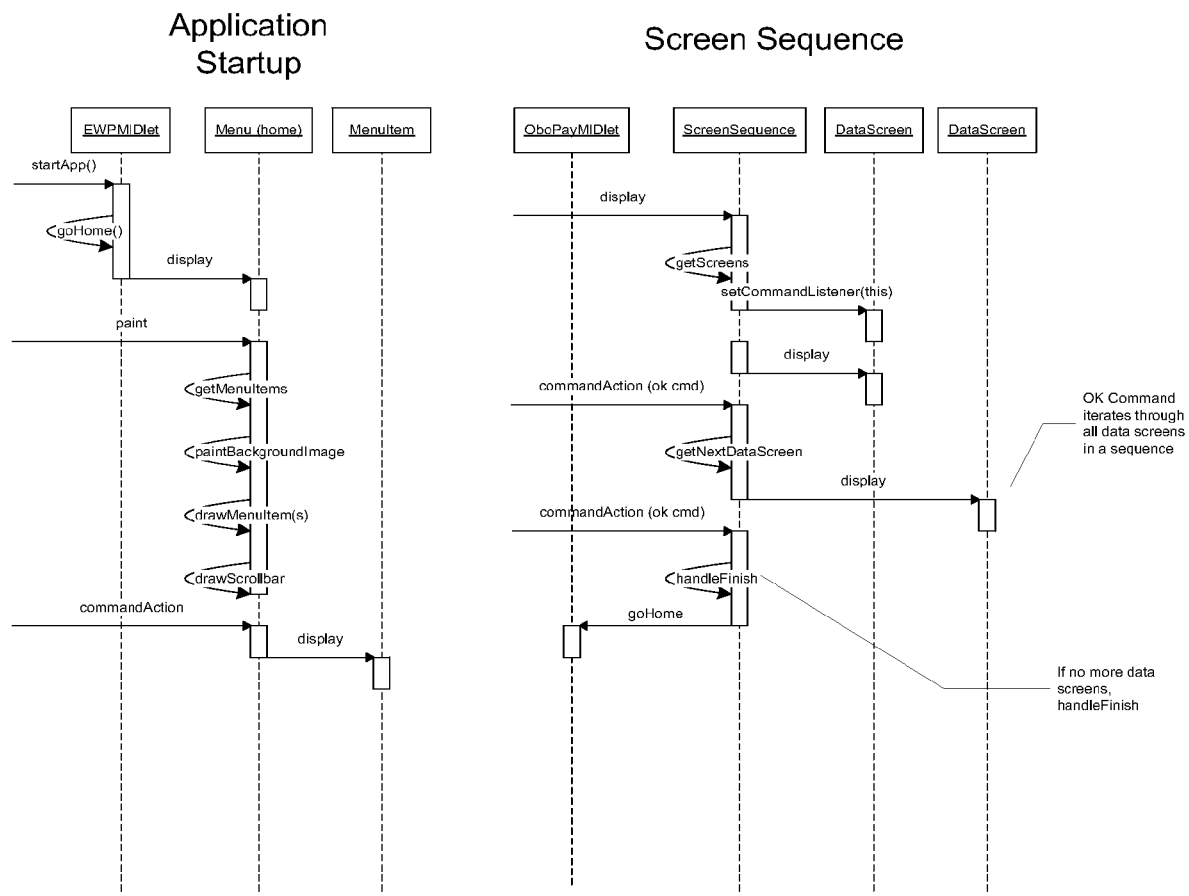
FIG. 91 shows the application (MCA) initialization and screen sequence diagrams in accordance with an embodiment of the present invention.

FIG. 91 shows the application (MCA) initialization and screen sequence sequence diagrams. The application startup sequence shown in FIG. 91 shows how the Menu base class manages the displaying and selection of its contained menu items. Menu item classes define their associated functionality—e.g., Pay, Balance, History, etc. Typically this initiates a screen sequence.

Figure 92:
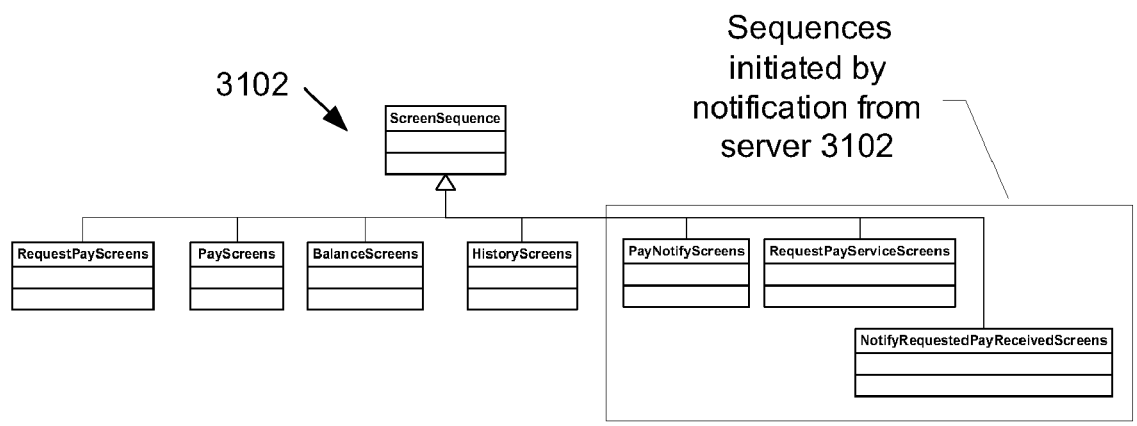
FIG. 92 shows screen sequence classes in accordance with an embodiment of the present invention.

FIG. 92 shows screen sequence classes. Screen sequences 9201 group a series of DataScreen instances and drive the sequence initiated through user actions such as data entry and selection of the OK and Back buttons. Screen sequence instances also implement the behavior initiated by the completion of the screen sequence. Typically, this results in the invocation of a service method—that is, a call to a server-side service such as a person-to-person payment. Sequences initiated by notification from server are illustrated at 9202.

Figure 93:
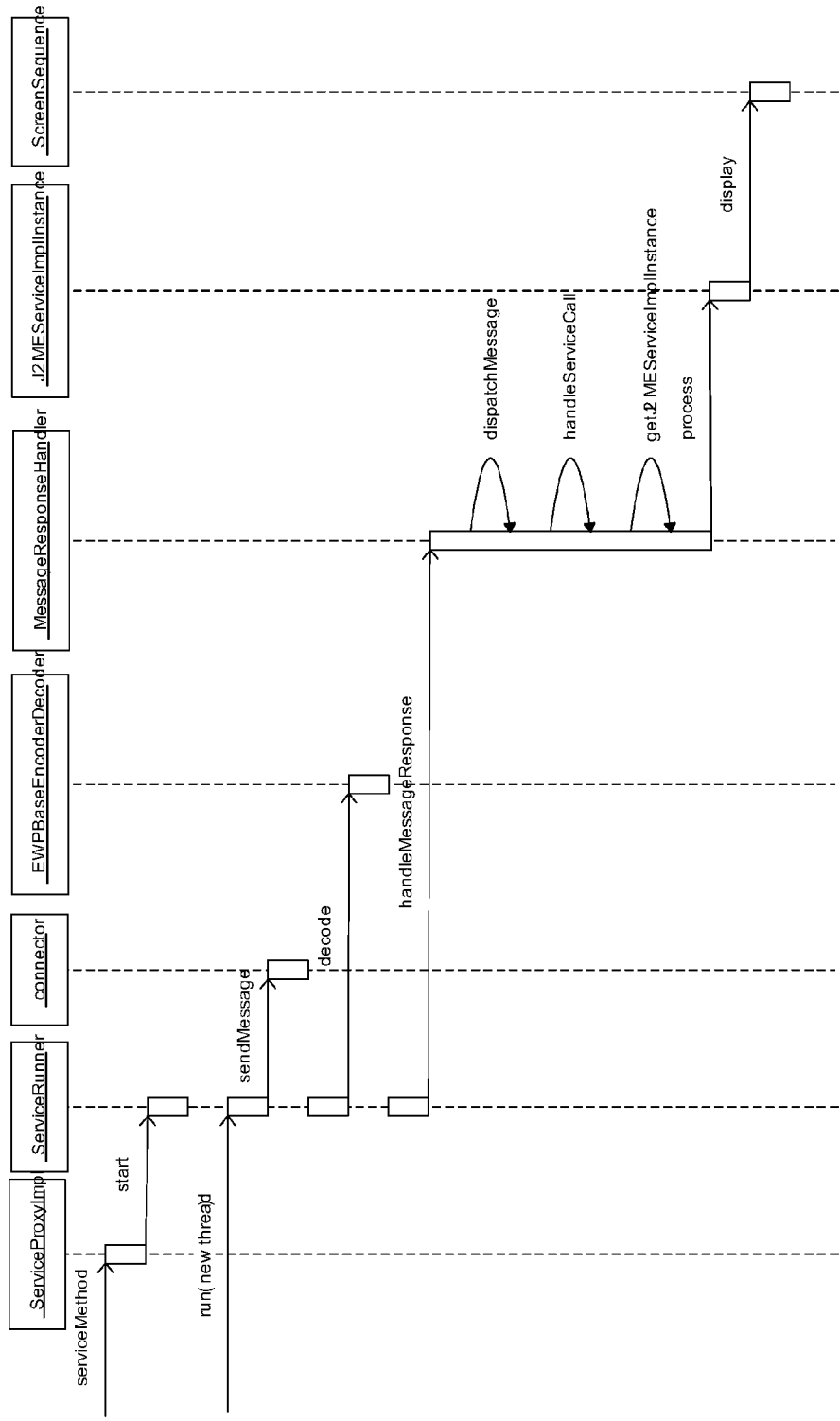
FIG. 93 shows the EWP J2ME synchronous service invocation in accordance with an embodiment of the present invention.

FIG. 93 shows the EWP J2ME synchronous service invocation. Synchronous service invocations are initiated by a user action such as the completion of a screen sequence such as Pay. In this case, the same thread that initiates communication with the server-side service also processes the return value.

Figure 94:
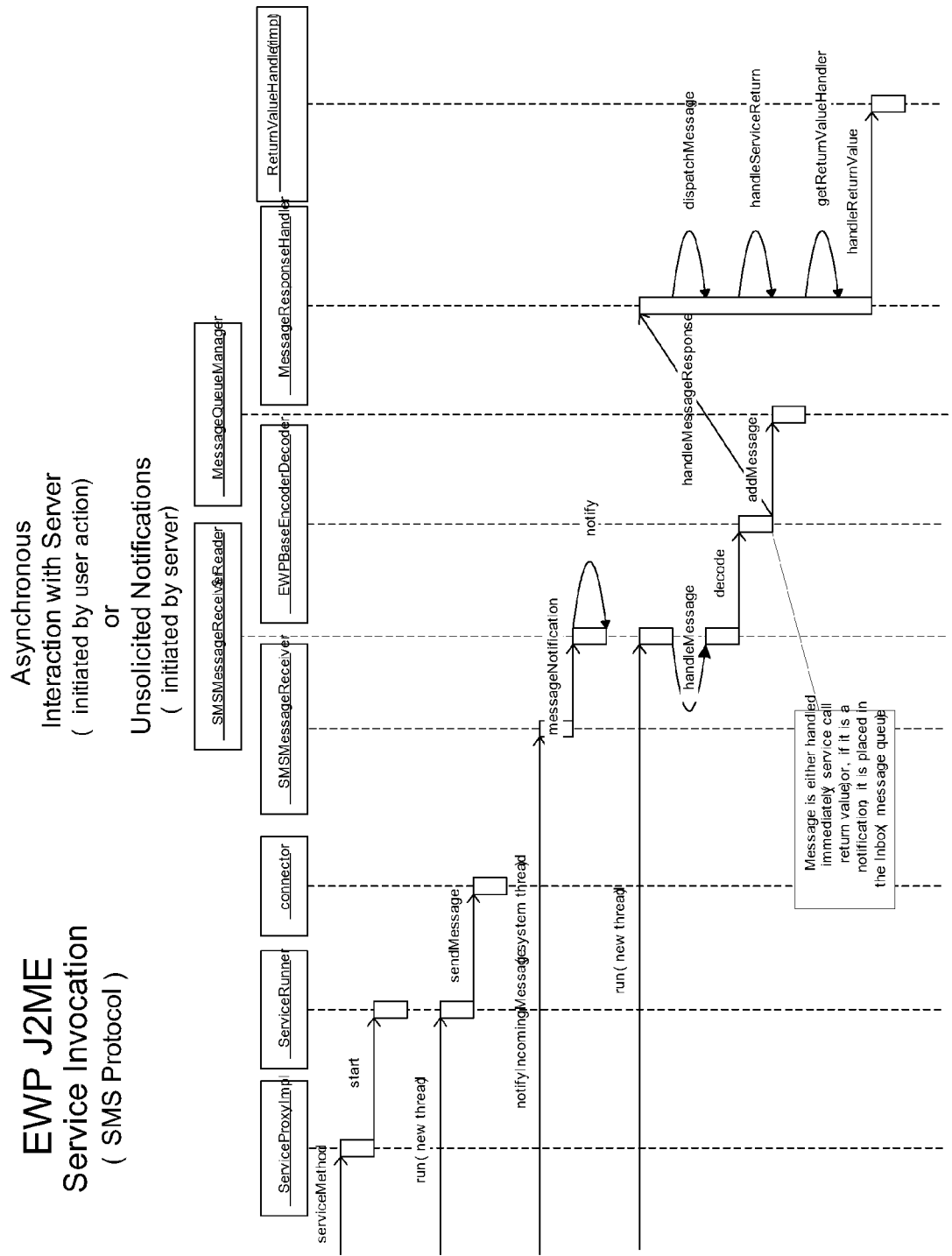
FIG. 94 shows an asynchronous interaction with server or unsolicited notification in accordance with an embodiment of the present invention.

FIG. 94 shows the EWP J2ME asynchronous service invocation. If, however, the protocol is SMS, the service is invoked in an asynchronous manner and the thread completes once the (SMS) message has been sent. The return value from the server-side service is handled on a new thread spawned from the system thread that receives the message notification.

In an embodiment, this invention is related to mobile communications devices for consumers and, more particularly, to the ways of increasing the functionality of cellular telephones and other mobile consumer communications devices with removable identification modules.

Most mobile consumer communications devices, e.g., cellular telephones, PDAs (Personal Digital Assistants), laptop computers, and the like, contain a removable identification module (IM) card or chip which uniquely identifies a specific consumer's account to a wireless communications network carrier. The IM card/chip stores data and provides some of the "brains" which allows the host mobile consumer communications device to function, e.g., to make and receive voice calls, to send or receive messages, to run computer applications, and so forth. This allows a user, for instance, to easily change cellular telephones by removing his or her IM card/chip from one telephone and reinserting the card/chip into another telephone. The need to activate the second cellular telephone by the communications network is eliminated.

Different types of mobile consumer communications devices use different types of IM cards/chips. For example, a SIM (Subscriber Identity Module) card works with GSM (Global System for Mobile communications) devices. Another type of IM card/chip is a USIM (Universal Subscriber Identity Module) which operates with the UMTS (Universal Mobile Telecommunications System) devices and still another is the RUIM (Removable User Identity Module) for CDMA (Code Division Multiple Access) devices. For purposes of this patent application, any IM card/chip is termed simply an IM or identification module.

But regardless of the type, the IMs and their host mobile communications devices are generally "closed" systems, proprietary to the wireless communications network carriers (e.g., Cingular, T-Mobile, Verizon, and so forth), the manufacturer of the mobile consumer communications device, and the IM manufacturers (e.g., Gemplus, Oerthur, and so forth). Nonetheless, the communications protocols, and the interface between the IM host communications devices, i.e., the mobile consumer communications device, and the IMs are open by the engineering standards set by the ISO (International Standards Organization).

The present invention takes advantage of these open standards to create additional functionalities for the host mobile consumer communications device without interfering with the IM operations. The mobile consumer communications device still operates with the IM, but additional functionality is "inserted" into the device. The present invention allows the restrictions of the mobile carriers, handset manufacturers and IM manufacturers to be bypassed so that mobile program applications can run in the mobile consumer communications device for enhanced functionality of the device.

The PIP CPU has an operating system, an event Interface call-outs, Post IM card processing call-outs.

Figure 95:
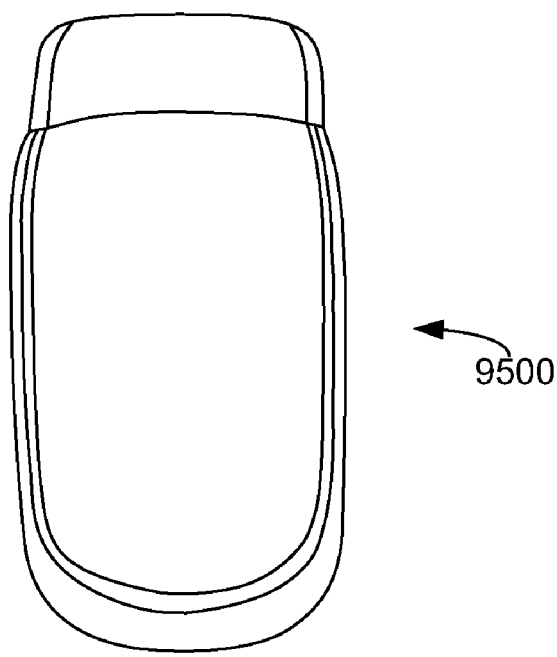
FIG. 95 is a representation of a typical mobile consumer communications device, a cellular telephone, which operates with an identification module.

FIG. 95 shows an example mobile consumer communications device, a typical cellular telephone 9500 in this case, which can benefit from the present invention. Inside the cellular telephone is an IM (identification module) which fits into an IM socket. As stated earlier, the IM contains the user's identification information for the access to the communications network and with the IM inserted into the IM socket, the device 9500 can operate with the wireless communications network in a conventional fashion.

Figure 96:
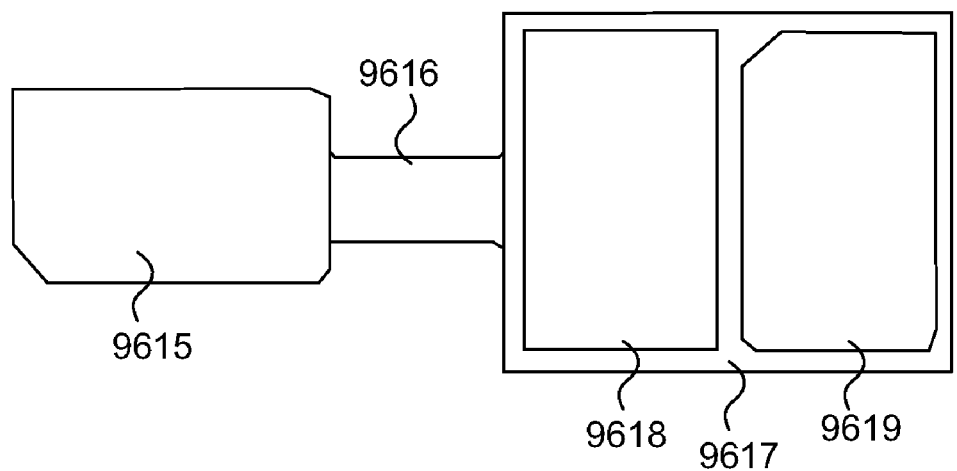
FIG. 96 is a block diagram of an arrangement of an IM adaptor connected to an IM and a programmable processing unit, in accordance with one embodiment of the present invention

FIG. 96 shows one embodiment of the present invention. An IM 9619, whether in the form of a card or chip, is mounted in a thin housing 9617 which also holds a programmable processing unit 9618. The housing 9617 interconnects the IM 9619 and the programmable processing unit 9618, and by a thin ribbon cable 9616, the housing 9617 is connected to an IM adaptor 9615.

Figure 97:
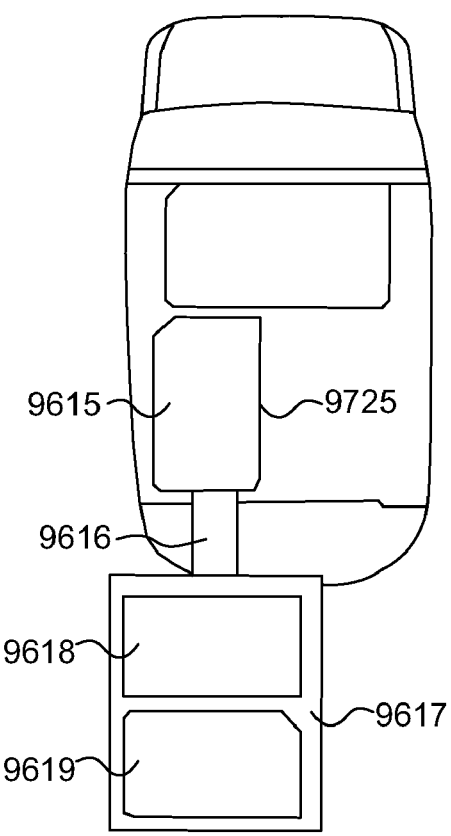
FIG. 97 illustrates how the IM adaptor of the FIG. 96 arrangement may be plugged into the IM socket of a cellular telephone.
Figure 98:
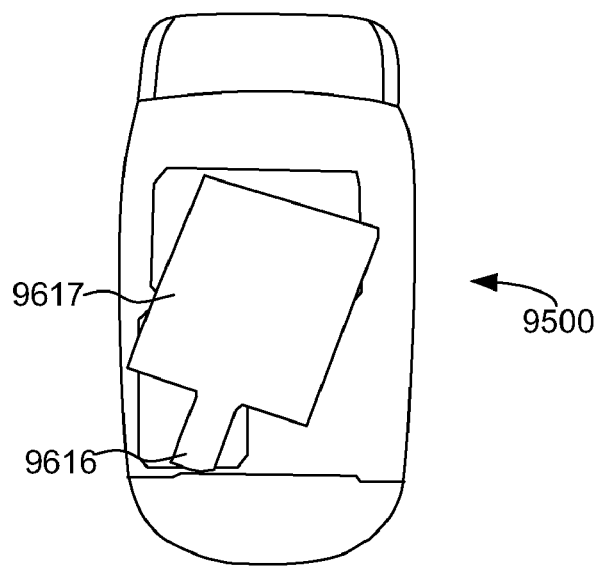
FIG. 98 illustrates how the FIG. 96 arrangement is flipped over so that it can be stored within the cellular telephone.

The IM adaptor 9615 can fit into the IM socket of the mobile consumer communications device 9500, as illustrated in FIG. 97. The IM adaptor 9615 fits into the IM socket 9625 of the cellular telephone 9500 which has its back cover (not shown) removed. As shown, the IM adaptor 9615 fits into the IM socket 9625 and connects the IM 9619 through the ribbon cable 9616 and the programmable processing unit 9619. Since the cable 9616 is flexible, the housing 9617 can be flipped over into the cellular telephone 9500, as shown in FIG. 98. In practice, a battery (not shown) for the cellular telephone 9500 may be installed over the IM socket 9625 and IM adaptor 9615 and then the housing 9617 flipped over the battery, before the cover can be replaced as shown in FIG. 95.

Figure 99:
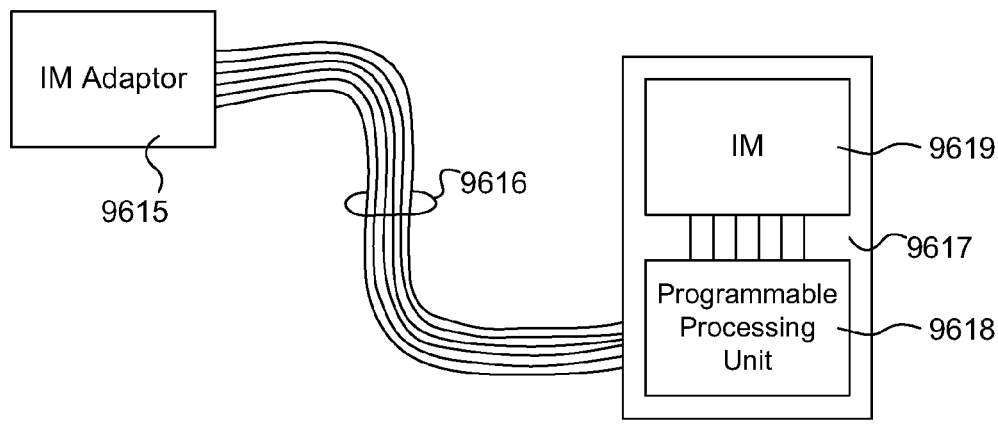
FIG. 99 is a block diagram illustrating the electrical connections of the FIG. 96 arrangement according to an embodiment of the present invention.

FIG. 99 shows the electrical connections between the IM adaptor 9615, the ribbon cable 9616, the programmable processing unit 9618 and the IM 9619. All electronic traffic (i.e. data communications) between the IM socket 9625 in the mobile consumer communications device 9500 and the IM 9619 must pass through the programmable processing unit 9618. As explained below, the programmable processing unit 9618 operates as a gate to allow the electronic traffic to pass-through unimpeded for conventional, or native, wireless communications in one case. In another case the electronic traffic can be intercepted and enhanced by program applications running in the programmable processing unit 9618 to provide enhanced functionality to the user of the device 9500.

The programmable processing unit 9618 can be implemented in a microcontroller, an ASIC (Application Specific Integrated Circuit), a so-called SOC (System-On-a-Chip) and other integrated circuits. Each of these types of integrated circuits has one or more processor units and memory of varying capacity and capability and costs for the particular requirements of the program applications. The memory of the programmable processing unit 9618 holds the program applications for enhanced functionalities and the processor units execute the program applications. The program applications are uploaded through the wireless communications network.

Figure 101:
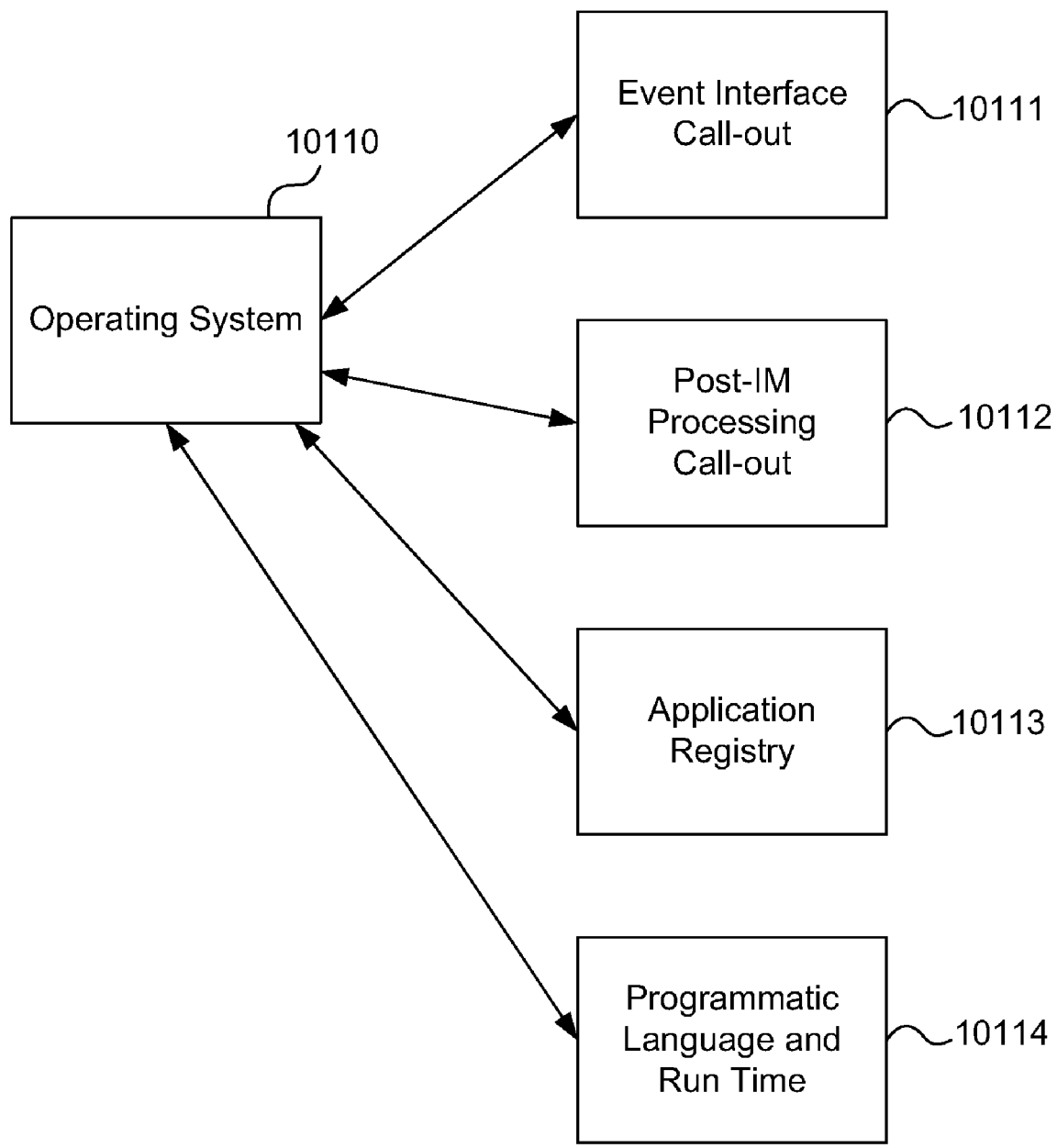
FIG. 101 is a representation of some of the software elements in the programmable processing unit in the FIG. 96 arrangement in accordance with an embodiment of the present invention.

In any case, the programmable processing unit 9618 operates with an operating system 10110, event interface call-outs 10111, post-IM processing call-outs 10112, an application registry 10113, and a programmatic language and runtime 10114, as illustrated in FIG. 101. The operating system facilitates the pass-through communications between the host mobile consumer communications device 9500 and the IM 9619, as explained previously. The operating system also provides programmatic call-outs to the program applications which are registered and installed in the programmable processing unit 9618.

The event interface call-outs 10111 provide a programmatic event interface which a program application implements in order to gain programmatic control of the host mobile consumer communications device upon specific mobile device events, e.g., a press of a button, a ring signal, and so forth. During this control, the program application has the ability to add functionality and processing to the event.

The post-IM processing call-outs 10112 provide a programmatic event interface which a program application implements in order to gain programmatic control of the host mobile consumer communications device upon a return from the native IM processing of the mobile consumer communications device event. The IM is always included last in the processing chain of an event. During this control, the program application has the ability to add functionality and post processing to the event before the mobile consumer communications device regains control.

The application registry 10113 provides a configuration so that program applications can be registered as interested in specific events (and therefore be programmatically called when those events occur). Several program applications may be registered for the same event and are called in a chain.

The programmatic language and runtime 10114 provides a programmatic language and platforms upon which the applications are created. Several suitable languages/runtimes which are standard include BREW (Binary Runtime Environment for Wireless) developed by Qualcomm, Inc. of San Diego, Calif. to provide a standard set of application-programming interfaces for developers to easily add new features and applications to Qualcomm-based wireless hardware, i.e., handsets equipped with CDMA chipsets; J2ME (Java 2 Mobile Edition), a Java-based technology for mobile systems from Sun Microsystems, Inc. of Santa Clara, Calif.; .NET from Microsoft, Inc. of Redmond, Wash. to provide a software development platform for the Windows operating system and uses XML (eXtended Markup Language); and Symbian, a platform designed for mobile devices by a joint venture of many companies, including L. M. Ericsson of Stockholm, Sweden, and Nokia Corp. of Espoo, Finland. Of course, the preceeding language/platforms represent only examples and other languages could be used.

Some examples of program applications which may be run in the programmable processing unit are described in this application. For example, below, the application describes a way of sending data over the voice channel, rather the data channel, of the wireless communications network of a mobile consumer communications device. In one program application, the mobile consumer communications device can send text messages to another mobile consumer communications device over its voice channel. In another patent application mobile payments may be performed by the mobile consumer communications device over its voice channel.

Figure 100:
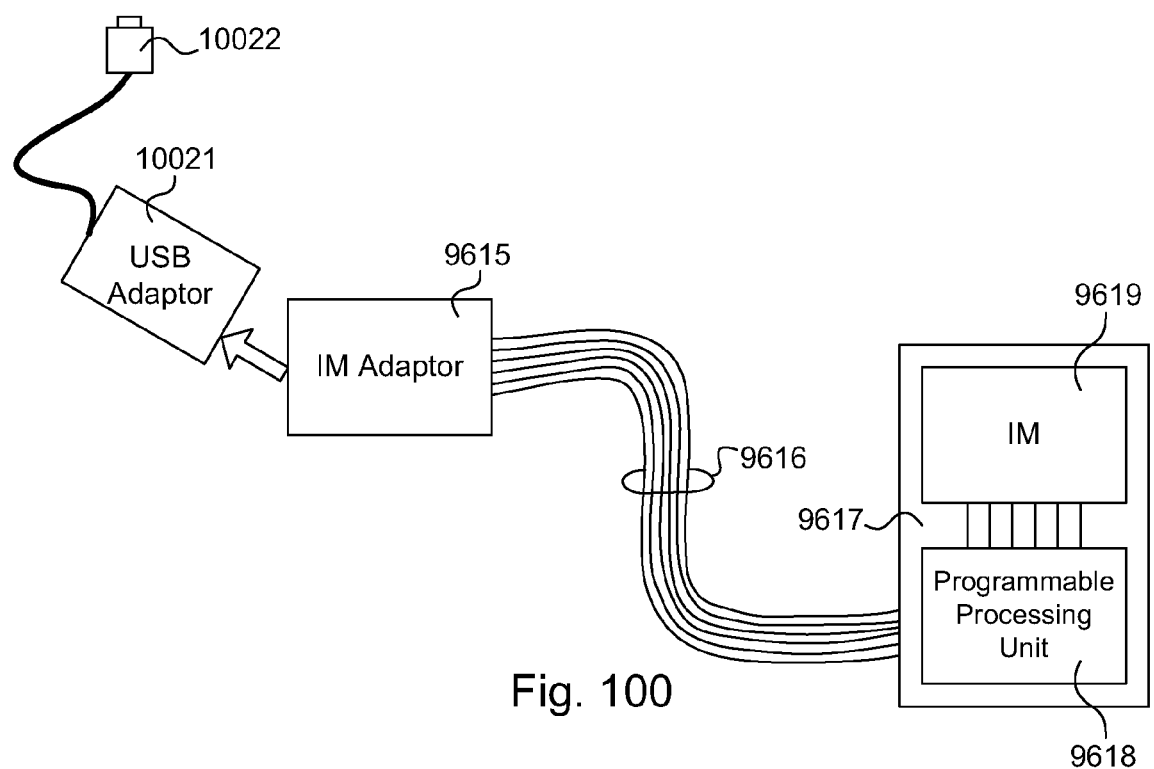
FIG. 100 is a block diagram of the FIG. 96 arrangement with a USB connection for laptop computers to communicate with a wireless communications network with the advantages of the present invention.

Thus far the mobile consumer communications device, such as the cellular telephone 9500 of FIG. 95, has been described as requiring only an IM which fits into the device's IM socket to engage a wireless communications network. On the other hand, laptop computers typically do not have a built-in IM socket. Laptop computers use a USB adaptor 10021 which accepts the user's IM and the USB adaptor 10021 is connected to a USB connector 10022 which fits into the laptop computer's USB port. FIG. 100 shows how the previously described IM adaptor 9615 fits into the USB adaptor 10021 to place the IM 9619 in contact with the host laptop computer. With the IM 9619 in contact with the laptop computer to engage the wireless communications network, the programmable processing unit 9618 allows additional functionality through program applications.

Mobile consumer communications devices, such as cellular telephones, ordinarily use a voice channel to transmit and receive voices. The present invention provides a way for program applications to communicate their data over the voice channel of mobile consumer communications devices.

The present invention permits applications which may be created on any number of programming platforms/runtimes for mobile applications to be networked by the voice channel of the host mobile consumer communications device. Example platforms include BREW (Binary Runtime Environment for Wireless) developed by Qualcomm, Inc. of San Diego, Calif. to provide a standard set of application-programming interfaces for developers to easily add new features and applications to Qualcomm-based wireless hardware, i.e., handsets equipped with CDMA chipsets; J2ME (Java 2 Mobile Edition), a Java-based technology for mobile systems from Sun Microsystems, Inc. of Santa Clara, Calif.; .NET from Microsoft, Inc. of Redmond, Wash. to provide a software development platform for the Windows operating system and uses XML (eXtended Markup Language); Symbian, a platform designed for mobile devices from a joint venture of many companies, including L. M. Ericsson of Stockholm, Sweden and Nokia Corp. of Espoo, Finland. Of course, other programming platforms/runtimes may be used.

Figure 102:
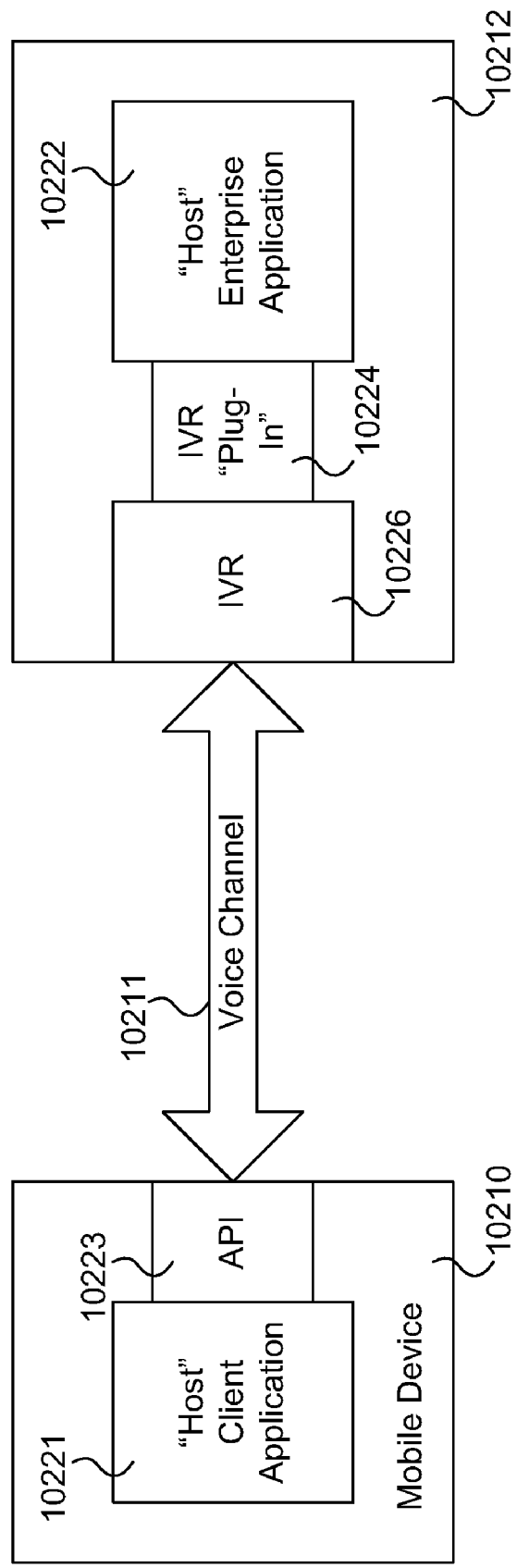
FIG. 102 is a block diagram representation of the voice channel communication between a mobile consumer communications device and a network server, according to one embodiment of the present invention.

FIG. 102 shows an arrangement by which data is transmitted over a voice channel of a wireless communications network, according to one embodiment of the present invention. An example mobile consumer communications device

10210, e.g., a cellular telephone, PDA and the like, communicates over a voice channel 10211 of the wireless communications network. Ordinarily these communications are conversations. An API (Application Program Interface) 10223 allows the data from a mobile application, i.e., the host client application 10221, implemented in a platform/runtime described above to communicate over the voice channel 10211 to a server system 10212. The API 10223 encodes the data in tones for transmission over the voice channel 10211. In this example, the long-standing DIMF (Dual Tone Multi-Frequency) is used, but other encoding suitable for the voice channel can be used.

With DIMF tones being received, the server 10212 across the wireless communications network engages IVR (Interactive Voice Response) unit 10226 to decode the tones. IVR can send and receive DIMF tones (sometimes called "touch tones") and is found in many current automatic telephone answering systems. It allows a computer to automatically interact with a human using Voice Recognition, Audio Playback, Text-To-Speech (TTS) and DIMF technologies. An IVR "Plug-in" 10224 is an IVR-adapted API to place the data into a proper form for an application 10222 in the server 10212. This allows the application 10221 hosted in the mobile consumer communications device 10210 to communicate with the enterprise application 10222 hosted in the server 10212 over the voice channel 10211. Data signals travel in both directions between the two applications 10221 and 10222. Communications simply between the mobile consumer communications device 10210 and the server 10212 are examples of client/server communications over the voice channel. On the other hand, the operation of the server application 10222 might be to simply relay the data from the mobile consumer communications device 10210 to another mobile consumer communications device. This is an example of peer communications over the voice channel.

The API in an embodiment of the present invention, e.g., the APIs 10223 and 10224 of FIG. 102, is based upon a simple "sendRequest( )"/"processRequest( )" model with well-known request/response data structures on both the client and server sides. The APIs 10223 and 10224 are a paired set of client and server APIs which mobile application and enterprise server developers use to build a complete client/server application. Voice data processing software (i.e. library components) on both the client (mobile consumer communications device) and server sides implement voice data processing algorithms for data communication across the voice channel. These algorithms are, of course, distinct from the particular client/server applications 10221 and 10223.

An example of an API is as follows:

SendRequest( ) Client Function:

This is the single API interface that a mobile client application uses in order to send a request/data to an enterprise server application.

Input: A Request structure

Output: A Response structure

ProcessRequest( ) Server Function:

This is the single API interface that the enterprise server application implements in order to process a calling mobile client's request. The processing logic is completely the responsibility of the "host" enterprise application and it is also the responsibility of the host enterprise application to assemble the response data that will be returned to the calling mobile client.

Input: A Request structure

Output: A Response structure

Request Structure:

CommandID—A numeric value which uniquely represents a command (and associated parameter data) that is understood by both the host client and server applications.

ServerAddress—A numeric value which represents a "phone number" that will be used in order to "dial" a voice call which will reach the server IVR component which "front ends" the target enterprise service.

ParameterData—An array of ParameterData that is associated to "this" CommandID request.

Response Structure:

ResponseID—A numeric value which uniquely represents a response (and associated parameter data) that is understood by both the host client and server applications.

ParameterData—An array of ParameterData that is associated to "this" ResponseID result.

ParameterData Structure:

ParameterID—A numeric value which uniquely represents a parameter within a given CommandID and is understood by both the host client and server applications.

ParameterType—A numeric value with the following settings:

1—numeric

2—alpha

. . . other types

ParameterValue—The actual value of the parameter

Encoding/decoding

As mentioned above, an API can use different encoding/decoding algorithms, according to the present invention. The following is one example for encoding with DIMF. These rules of DIMF encoding are based on commonly accepted rules of entering numbers and letters using the keypad labeling found on telephones:

All data elements are ultimately encoded as a number.

Each complete data element ends with a "#" code.

Number data elements use their associated DIMF numbers.

Number data elements are sent as unbroken sequence.

Each complete number data element sequence ends with a "#" code.

Alpha data elements are broken up into individual character elements.

Individual alpha character elements are encoded using the following scheme:

"A"=2

"B"=22

"C"=222

"D"=3

"E"=33

"F"=333

. . . and so on using standard DIMF alpha encoding rules.

Individual alpha character elements end with "#" code.

Each complete alpha data element ends with a "#" code.

Each complete request/response structure ends with a "#" code.

The encoding example above shows numeric and upper case alphabetic characters specifically.

However, encoding for lower case and special characters can be made as well.

Hence the elements of the API described above provide a protocol by which data from program applications can communicate over the voice channel of mobile consumer communications devices.

Examples of Voice Channel Data Applications

One example of an application is simple text messaging through the voice channel, rather than through a data channel as done conventionally. The application 10221 hosted by the mobile consumer communications device 10210 of FIG. 102, for instance, sends alphanumeric signals with an identification of the recipient, e.g., a telephone number, across the voice channel 10211. The enterprise application 10222 in the server 10212 simply relays the alphanumeric signals to the designated recipient across another voice channel. Of course, it is assumed that the recipient also has the described capabilities of receiving and sending data across a voice channel.

A more complex example of a networked application which more fully utilizes the particular API features described above is a mobile payment functionality for mobile consumers. All required client/server data communications are performed via a voice channel "phone call." In this application example, the mobile consumers are assumed to have mobile consumer communications devices which are capable of running a mobile payment application and the consumer's mobile service plan allows voice calls only. A "source" consumer wants to send money from his or her mobile account to a friend's ("target" consumer) mobile account. Both the source and target consumers are "signed up" for the service that the enterprise server application provides. The enterprise server application provides a web service API which transfers funds from a source account to a target account.

The commands in this example are payRequest, represented by CommandID 1, and payResponse, represented as CommandID 2. The parameter data structures are defined in the two tables below:

TABLE E payRequest Parameter Data Definition:

| Parameter Name | Parameter Description | Data Type | ParameterID |
|---|---|---|---|
| sourceAccountNumber | Account number of the consumer that is sending the money | 1-numeric | 1 |
| sourcePIN | Authentication data of the consumer sending the money | 1-numeric | 2 |
| payAmount | Amount of money the source consumer wants to send to the target consumer | 1-numeric | 3 |
| targetAccountNumber | Account number of the consumer that the money is being sent to | 1-numeric | 4 |
| payMessage | A message that the source consumer wants to attach to this transaction (i.e. a memo) | 2-alpha | 5 |

TABLE F payResponse Parameter Data Definition:

| Parameter Name | Parameter Description | Data Type | ParameterID |
|---|---|---|---|
| status | Status of the transaction. 0 means success, 1 means failure. | 1-numeric | 6 |
| transactionNumber | Unique transaction number associated to this request | 1-numeric | 7 |

Now for the source consumer to pay a target consumer, the following operations and interactions occur:

The host mobile client application interacts with the source consumer and gathers the following data:
sourceAccountNumber—"123456789"
sourcePin—"1234"
payAmount—"15"
sourceAccountNumber—"987654321"
payMessage—"THANKS"

The host mobile client application "knows" the following data as a result of context and configuration:
commandID—"1" (i.e. payRequest)
serverAddress—"8885551212" (i.e. the "phone number" of the enterprise application's IVR component)

The host mobile application assembles the following data structures:
ParameterData[1]
ParameterID=1
ParameterType=1
ParameterValue="123456789"
ParameterData[2]
ParameterID=2
ParameterType=1
ParameterValue="4321"
ParameterData[3]
ParameterID=3
ParameterType=1
ParameterValue="15"
ParameterData[4]
ParameterID=4
ParameterType=1
ParameterValue="987654321"
ParameterData[5]
ParameterID=5
ParameterType=2
ParameterValue="THANKS"
Request
commandID=1
serverAddress="8885551212"
parameterData=5 element ParameterData arrary from above The mobile application then calls the SendRequest( ) API using the above Request structure data. Control now passes to the client API.

The client API now performs the encode algorithm and converts the Request structure into the following text string:
1#1#1#123456789#2#1#4321#3#1#15#4#1#987654321 #5#2#8#44#2#66#55#7777###

Applying the above rules to the encoded example above, the following is seen:

The leading "1#" means "CommandID 1" which is known to be a "payRequest" command The following "1#" means "ParameterID 1" which is known to be a "sourceAccountNumber" parameter.

The following "1#" means "AMD parameter type 1" which is known to be "numeric."

The following "123456789#" means that the sourceAccountNumber value is "123456789." and so on for the numeric parameter types The trailing "8#44#2#66#55#7777##" is the DIMF alpha encoding for the word "THANKS."

The last "#" indicates a complete alpha data element sequence.

The final "#" indicates the end of the complete request/response data.

Returning to the operations of the example application,

The API then dials the indicated server "phone number" (i.e. "8885551212") and initiates a voice call.

The server IVR component "picks up" and waits for the encoded DIMF request data.

The client API then transmits the entire above encoded DIMF request.

When the final # is received, the server IVR "plugin" component begins decoding the encoded DIMF request data. To do this, the IVR "plugin" uses the inverse of the encoding rules presented above.

The IVR "plugin" has now assembled an exact duplicate of the client's Request structure, only now on the server side memory space.

The IVR "plugin" now invokes the enterprise server application via the ProcessRequest( ) interface which the enterprise server application has implement.

The enterprise server application processes the request accordingly.

The enterprise server application then assembles an Response structure just as the mobile client application assembled the Request structure.

The enterprise server application returns the Response structure and control to the IVR plugin.

The IVR plugin then encodes the Response structure as described above (i.e., in this case with the status and transactionNumber data elements).

The IVR transmits the encoded DIMF response data to the mobile client application API.

The mobile client application API decodes the encoded DIMF response data into a client side Response structure using the decoding rules described above (i.e. in this case into an Response structure).

The API returns the Response structure and control to the host client mobile application.

The host client mobile application regains control, has access to the server Response structure and continues processing.

Hence the present invention provides for program applications to communicate over the voice channel of mobile consumer communications devices. As mentioned earlier, encoding different from DIMF might be selected to speed the transmission of data across the voice channel. Such encoding might depend upon the particular application on the host mobile consumer communications device and corresponding enterprise server. Mobile consumer communications devices could be adapted to communicate program application data across the voice channel, rather than the data channel, of the wireless communications network.

There are many existing products, and potentially a large number of new products, that will benefit from the present invention. For example, any Internet-enabled telephone device, such as a voice-over-IP (VoIP) telephone may be used to practice the present invention even though it may be affixed at a specific location and is not necessarily mobile. In other embodiments, e-mail addresses can be used in addition to or in lieu of telephone numbers to identify one or more parties to a financial transaction. Further, the present invention is not limited to cell phones but rather includes any mobile device, handset, PDA, or other communication device having the ability to connect to a communication channel such as the telephone, Internet, cellular, or other wire or wireless communication network.

It will further be appreciated that one or more of the elements depicted in the drawings or figures can also be implemented in a more separated or integrated manner, or even removed or rendered as inoperable in certain cases, as is useful in accordance with a particular application.

Although the invention has been described with respect to specific embodiments thereof, these embodiments are merely illustrative, and not restrictive of the invention. For example, further embodiments may include various display architectures, biometric sensors, pressure sensors, temperature sensors, light sensors, chemical sensors, X-ray and other electromagnetic sensors, amplifiers, gate arrays, other logic circuits, printers, and memory circuits to implement the various embodiments described. The cell phone may be any communication device.

Additionally, any signal arrows in the drawings or figures should be considered as only exemplary, and not limiting, unless otherwise specifically noted. Furthermore, the term "or" as used in this application is generally intended to mean "and/or" unless otherwise indicated. Combinations of components or steps will also be considered as being noted, where terminology is foreseen as rendering the ability to separate or combine is unclear.

As used in the description in this application and throughout the claims that follow, "a," "an," and "the" includes plural references unless the context clearly dictates otherwise. Also, as used in this description and throughout the claims that follow, the meaning of "in" includes "in" and "on" unless the context clearly dictates otherwise.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
handling financial transactions of a group of users of a system, wherein the financial transactions are initiated through users' mobile phones communicating with at least one server and a plurality of subgroups of the users are associated with a plurality of banking institutions;
processing, through the at least one server, the financial transactions associated with a first banking institution, wherein users in a first subgroup are associated with the first banking institution;
processing, through the at least one server, financial transactions associated with a second banking institution, wherein users in a second subgroup are associated with the second banking institution;
processing, through the at least one server, financial transactions associated with a third banking institution, wherein users in a third subgroup are associated with the third banking institution;
maintaining a virtual pooled account, accessible by the at least one server, comprising funds for the first, second, and third subgroups of users associated with the first, second, and third banking institutions for managing funds transfers required by the financial transactions; and
distributing, via the at least one server, a first dividend to the first banking institution based on float for funds in the virtual pooled account for the first subgroup users plus a percentage of float on funds in the virtual pooled account for the third subgroup users.

2. The method of claim 1 comprising:
distributing, via the at least one server, a second dividend to the second banking institution based on float for funds in the virtual pooled account for the second subgroup users plus a percentage of float on funds in the virtual pooled account for the third subgroup users.

3. The method of claim 1 comprising:
receiving, via the at least one server, an instruction from a first user in the first subgroup to initiate a transaction to transfer funds to a second user in the second subgroup, wherein funds are not transferred outside the virtual pooled account.

4. The method of claim 3 wherein the instruction is wirelessly sent from a mobile phone via SMS messaging.

5. The method of claim 3 wherein the instruction is wirelessly sent from a mobile phone using an application executing on the mobile phone.

6. The method of claim 1 wherein the third banking institution is a direct partner of the system.

7. The method of claim 1 where each user is associated with only one of the first, second, or third financial institutions.

8. The method of claim 1 comprising:
managing a system of record for virtual pooled account, wherein the system of record comprises records of transactions for users in the first, second, and third subgroups.

9. A method comprising:
handling, via at least one server, financial transactions of a group of users of a system, wherein the financial transactions are initiated through users' mobile phones and each of a plurality of subgroups of the users are associated with one of a plurality of banking institutions;
processing, via the at least one server, financial transactions associated with a first banking institution, wherein users in a first subgroup are associated with the first banking institution;
processing, via the at least one server, financial transactions associated with a second banking institution, wherein users in a second subgroup are associated with the second banking institution;
processing, via the at least one server, financial transactions users in a third subgroup that are associated with the system and not the first and second banking institutions;
maintaining a virtual pooled account, accessible by the at least one server, comprising funds for the first, second, and third subgroup users associated with the first and second banking institutions and the system; and
distributing, via the at least one server, a first dividend to the first banking institution based on float for funds in the virtual pooled account for the first subgroup users plus a percentage of float on funds in the virtual pooled account for the third subgroup users.

10. The method of claim 9 comprising:
distributing, via the at least one server, a second dividend to the second banking institution based on float for funds in the virtual pooled account for the second subgroup users plus a percentage of float on funds in the virtual pooled account for the third subgroup users.

11. The method of claim 9 comprising:
receiving an instruction from a first user in the first subgroup to transfer money to a second user in the second subgroup, wherein money is not transferred outside the virtual pooled account.

12. The method of claim 11 wherein the instruction is wirelessly sent from a mobile phone via SMS messaging.

13. The method of claim 11 wherein the instruction is wirelessly sent from a mobile phone using an application executing on the mobile phone.

14. The method of claim 9 where each user is associated with only one of the first financial institution, second financial institution, or the system.

15. The method of claim 9 comprising:
receiving an instruction from a first user in the first subgroup to transfer money to a second user in the third subgroup, wherein money is not transferred outside the virtual pooled account.

16. The method of claim 11 wherein the instruction is sent via an Internet browser.

17. The method of claim 11 comprising:
managing a system of record for virtual pooled account, wherein the system of record comprises records of transactions for users in the first, second, and third subgroups.

* * * * *